(12) United States Patent
Tuttle et al.

(10) Patent No.: US 6,694,196 B2
(45) Date of Patent: **\*Feb. 17, 2004**

(54) METHOD AND APPARATUS FOR CREATING TIME-OPTIMAL COMMANDS FOR LINEAR SYSTEMS

(75) Inventors: Timothy D. Tuttle, Cambridge, MA (US); Warren P. Seering, Sherborn, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/152,407

(22) Filed: May 21, 2002

(65) Prior Publication Data

US 2003/0018400 A1 Jan. 23, 2003

Related U.S. Application Data

(63) Continuation of application No. 09/261,987, filed on Mar. 4, 1999.
(60) Provisional application No. 60/076,951, filed on Mar. 5, 1998.

(51) Int. Cl.⁷ ................................................ G05B 13/02
(52) U.S. Cl. ............................. 700/28; 700/29; 700/33
(58) Field of Search ............................ 700/28, 31, 29, 700/254, 32–35, 44, 45, 39, 52, 54, 55, 250; 318/561

(56) References Cited

U.S. PATENT DOCUMENTS 4,916,635 A * 4/1990 Singer et al. ................ 700/254
5,638,267 A * 6/1997 Singhose et al. ............. 700/28
6,138,048 A * 10/2000 Hayner ........................ 700/31

OTHER PUBLICATIONS

Tuttle et al. Proceedings of the IEEE International Conference on Control Appications, Sep. 15–18, 1996 "Creating Time–Optimal Commands For Systems with Denominator Dynamics", pp. 385–390.*

* cited by examiner

*Primary Examiner*—Leo Picard
*Assistant Examiner*—Steven R. Garland
(74) *Attorney, Agent, or Firm*—Choate, Hall & Stewart

(57) ABSTRACT

A system for and method of determining an input command profile for substantially any dynamic system that can be modeled as a linear system, the input command profile for transitioning an output of the dynamic system from one state to another state. The present invention involves identifying characteristics of the dynamic system, selecting a command profile which defines an input to the dynamic system based on the identified characteristics, wherein the command profile comprises one or more pulses which rise and fall at switch times, imposing a plurality of constraints on the dynamic system, at least one of the constraints being defined in terms of the switch times, and determining the switch times for the input to the dynamic system based on the command profile and the plurality of constraints. The characteristics may be related to poles and zeros of the dynamic system, and the plurality of constraints may include a dynamics cancellation constraint which specifies that the input moves the dynamic system from a first state to a second state such that the dynamic system remains substantially at the second state.

28 Claims, 33 Drawing Sheets

Problem Constraints change in output 0.5
actuator upper limit 1
actuator lower limit -1
maximum tail length [ ]

System Dynamics

| | s-plane location | desired robustness value | plot |
|---|---|---|---|
| real poles | 0 | 1 | |
| | -0.367 | 1 | ☐ |
| complex poles | -0.92+1.4i | 1 | ☐ |
| complex zeros | -0.2+0.98i | 1 | ☐ |

DC gain of non-rigid dynamics: 1

Optimization Options initial guess [ ]

☒ display messages
☐ display plots
☒ check optimality

[Close]  [Create Command]

FIG. 48

METHOD AND APPARATUS FOR CREATING TIME-OPTIMAL COMMANDS FOR LINEAR SYSTEMS

This application is a continuation of and claims priority to U.S. application Ser. No. 09/261,987 filed Mar. 4, 1999, which claims priority to U.S. Provisional Application No. 60/076,951 filed Mar. 5, 1998. Both of these references are hereby incorporated by reference in their entirety.

GOVERNMENT SUPPORT

This invention was made with government support under Contract Number NAGW-1335, awarded by NASA. The United States government has certain rights in the invention.

BACKGROUND OF THE INVENTION

1. Field of the Invention

The present invention is directed to a system for creating commands that increase the speed of system response. The invention can be applied to virtually any type of machine, process, or entity that can be modeled linearly. In particular, the invention deals with the creation of command profiles that are time-optimal, meaning commands that will move a system from one rest state to another rest state in the shortest amount of time. To this end, the invention provides a three-step procedure for generating time-optimal command profiles for all types of linear single-input, single-output systems. Constraint equations that result from this approach are both notationally and computationally simple. Consequently, the invention delivers results for complex systems faster and more reliably than traditional approaches. The invention furthermore incorporates additional practical constraints into its solution framework, thereby producing different types of time-efficient commands which satisfy a range of system performance requirements.

2. Description of the Related Art

With every passing year, the modern world demands that things change faster than they did before. In machines, processes, and attitudes, success is often defined by the speed with which these transitions can be made. In the information storage industry, for example, the speed of change is the primary performance metric than can make or break a product. In every computer disk drive or compact disk player, data storage and retrieval is performed by a read-write head that must scan rapidly from one disk track to another. The speed at which this read-write head can reposition itself between tracks is directly related to the speed of information access and the overall performance of the product. As another example of the importance of rapid change, the modern manufacturing environment contains many types of automated machines that are used for precision positioning, assembly, and inspection operations. The performance of these machines is measured largely by their ability to produce rapid and precise motions. Companies typically focus considerable attention toward improving the speed of these machines in order to maximize the throughput of the entire plant.

As with disk drives and manufacturing systems, it is not difficult to think of examples of automated machines that could benefit by an enhanced speed of operation. Furthermore, this rationale can be extended beyond mechanical hardware to many other kinds of systems. The pilot of a fighter jet, for example, would probably be very interested in the fastest way to change altitude if trying to avoid an oncoming missile. One could also imagine a stock broker working with a complicated financial model wondering how to quickly maximize profits by varying his investment portfolio. Alternately, the operators of a hydroelectric power plant might wish to increase the plant's power output as fast as possible to meet a sudden increase in demand. In all of these cases, as well as countless others, a knowledge of how to change things quickly would prove highly valuable.

Understanding how to move things faster can go a long way toward enhancing the performance of many systems. In some situations, however, this is not enough. Imagine a manufacturing robot moving so quickly that it tears itself from the factory floor. Or, how about a weather satellite that can scan the atmosphere with blazing speed but, in the process, exhausts its supply of fuel. One can imagine that the chairman of the Federal Reserve has more on his mind when adjusting interest rates than reducing inflation as rapidly as possible. Since he knows that his economic models are not perfect, he opts for a prudent schedule of interest rate adjustment in order to reliably and gradually improve economic indicators. In most applications, resting alongside the need for speed is such a set of practical issues that must also be addressed.

The modern world demands indeed that many systems change in a rapid and desirable manner. The question that still remains, however, is how to effect this change. As varied as the performance demands from system to system, so are the strategies for meeting these demands. A disk drive designer, for example, might choose to use a lighter material or a different type of actuator to reduce the access time of his drive. As an alternate approach, he might also decide to outfit his machine with sensors and develop a high-performance control system to meet more stringent performance specifications. These two strategies, hardware redesign and enhanced feedback control, are both viable methods for improving system performance. Many systems, however, do not tolerate these types of changes. An engineer at a hydroelectric plant, for example, would be foolhardy to consider building a new dam to better control the power output. Similarly, commissioning the Space Shuttle to install new sensors on an operating weather satellite might also prove equally absurd. In situations like these, engineers must focus their effort on improving performance by working with the system at hand. Even for systems that can be improved through hardware redesign and feedback control, the designer must then work with the improved system to further maximize performance.

The question, then, that remains is how to control the inputs to a given system to achieve a desired behavior at the system's output. For example, how can a crane operator best position a joystick to maneuver a cargo crate from a transport ship to a train platform as quickly as possible? What kind of torque profile should a designer specify in a disk drive actuator to most efficiently move the read-write head of the drive from track to track? How should the Fed vary the interest rate to quickly and reliably control inflation? The answer to each of these questions depends on many different factors. Understanding these factors and how they influence performance is the key to understanding how to answer these questions.

1 The Feedforward Control Problem

The problem facing designers who wish to improve the performance of their systems, which can be called "the feedforward control problem", addresses the question of how to select the input command for a given system that produces the most desirable output response. As illustrated in FIG. 1, the feedforward control problem can be stated as follows:

Given a known system, what is the input command that will move the output of the system from one state to another in the most desirable manner?

When stated in this form, it can be reasoned that the answer to this question will depend on four different factors. These four factors are as follows.

1. The first factor which influences the profile of the input is the nature of the change in the system output. For example, the actuator command that will best move a scanning sensor on a weather satellite over a ninety degree slew will probably have little resemblance to the command required to complete a three degree slew.

2. The second factor which influences the system response to an input command is the dynamic behavior of the system. In manufacturing systems, for example, this becomes apparent as machines are designed to be lighter and faster. As an unfortunate side-effect of these performance enhancements, undesirable machine dynamics often become the primary barrier to further performance improvements. For example, in many high-performance assembly systems, the speed with which a machine can operate is dictated not by the time required to execute positioning maneuvers, but rather by the time required for unwanted vibrations to settle. Consequently, the best input command profile for a given high-performance system should not ignore the dynamics of the system.

3. The third factor that should be considered when answering the foregoing question is the allowable level of the system inputs. One straightforward way to improve the speed of response in a manufacturing robot, for example, is to employ powerful actuators. However, due to design limitations, actuator capacity must often be restricted. As a result, motion commands used for these systems should be designed to remain within the actuator capability. Given this constraint, it can be reasoned that the command profiles that deliver the best system performance should account for the limitations of the system inputs.

4. The fourth factor that should be considered is system performance variables. In this regard, in addition to accounting for desired output behavior, system dynamics, and input limitations, many systems may be sensitive to other performance variables. For example, for systems that have shifting or uncertain dynamics, the performance delivered by input commands must remain robust to these changes. Other systems may have additional requirements such as limitations on internal loading or energy efficiency. Any useful strategy for creating command profiles should effectively address these practical concerns.

Although the feedforward control problem, as posed above, is still fairly broad, it has helped to identify four issues that influence its solution. Any strategy designed to address the stated problem should address these four issues. As one way of looking at the task at hand, FIG. 2 illustrates that the problem is to determine a strategy for using information about (1) the desired system output response, (2) the system dynamics, (3) the limitations on the system inputs, and (4) any additional constraints in order to derive the best input command for a given system. Before this strategy can be formulated, however, the problem statement must be further clarified in order to define system behavior and performance in more concrete terms.

The feedforward control problem, as noted above, is a general statement that outlines the basic issues associated with selecting an input command profile for a given system. This problem statement, however, is far too general to lend insight into a solution approach. To further clarify the problem, the following assumptions will be made to limit the scope of the solution approach to more manageable levels.

First, it will be assumed that the system under consideration can be modeled linearly. Although ignoring a certain class of systems that cannot be described by linear representations, this assumption allows all the tools of linear system theory to be enlisted to help solve this problem. Note that, as long as the input-output behavior of a given system can be modeled linearly, solutions can be applied to both open-loop and closed-loop systems. Second, it will be assumed that all systems under consideration are single-input, single-output (SISO). However, it is noted that the invention described herein can also be used with multiple-input, multiple-output (MIMO) systems. Third, it will be assumed that the goal of the problem is to transition the system output rapidly from one rest state to another rest state. With these three basic assumptions, the feedforward control problem has been reduced to one of more manageable complexity. Labeled "the time-efficient control problem," this reduced problem is illustrated in FIG. 3 and can be stated as follows.

For a given SISO linear system, G(s), find the input command, u(t), that will move the system output, y(t), from one rest state to another in the shortest possible time subject to constraints such as: (1) actuator limits, (2) robustness to system uncertainty, (3) fuel usage requirements, etc.

As will be discussed later herein, this time-efficient problem formulation lends itself to a particular class of command solutions. These types of solutions can all produce a rapid state change at the system output while satisfying a variety of additional constraints. If time is the only performance variable of interest in a system, this problem can be reduced even further by eliminating all unnecessary constraints. Known widely as "the time-optimal control problem," this most fundamental form of the feedforward control problem is illustrated in FIG. 4 and can be stated as follows:

For a given SISO linear system, G(s), find the input command, u(t), that will move the system output, y(t), from one rest state to another in the shortest possible time subject to the actuator constraints: $u_{min} < u(t) < u_{max}$.

Unlike the time-efficient control problem statement, the time-optimal control problem requires that only two conditions be met: (1) that the system output transition by an amount dy, and (2) that the input command remain within the actuator limits. These two problem specifications represent the minimum set of constraints required to ensure a nontrivial solution to this problem. Furthermore, any command that satisfies this problem defines the performance baseline for how fast a linear system can be moved from one state to another. Because of the fundamental importance of this problem statement, the time-optimal control problem has been the subject of investigation for over forty years.

2 The Time-Optimal Control Problem

With this long history of research, it is difficult to know where to begin to describe the state of the art. Accordingly, the discussion herein will move from the general to the specific. To this end, the discussion will begin with an overview of work in the design and control of flexible systems. A large area of research in itself, many of the recent advances in time-optimal and time-efficient control were spawned from investigations in new techniques for controlling flexible machines. From this point, the discussion will turn from feedback to feedforward control. Since this document is concerned primarily with generating input command profiles, section 2.2 surveys various techniques for deriving motion command profiles for different types of systems. Two specific command generation techniques, time-optimal control and input shaping, have relevance to the work in this document. Consequently sections 2.3 and 2.4 are devoted to outlining the basic theories and the state of the art for each of these techniques. From this background on input shaping and time-optimal control, section 2.5 focuses on identifying the strengths and similarities of these two approaches. Building on this comparison, the need for a general approach for deriving time-efficient and time-optimal commands becomes clear.

2.1 Design and Control of Flexible Systems

The first step in creating a high-performance machine or system is to design and construct the hardware. In approaching this task, design engineers typically face a variety of design tradeoffs that influence the construction of the hardware and the performance of the machine. For machines that operate in speed-critical environments, designers often try to maximize the speed of system response by making machine components powerful and lightweight. At the same time, in order to minimize problematic vibrations, designers must also look to make structural components rigid. Primarily due to space, weight, and power constraints, this is not always possible. One strategy for overcoming this design obstacle is to modify the mechanical structure by adding damping. With increased structural damping, vibrations settle quicker and are less likely to degrade machine performance. One of the simplest and oldest techniques for adding structural damping is to use a tuned vibration absorber [1]. Although this is an old idea, the technique has evolved into a sophisticated tool and many promising modifications to the method are continually being developed [2]. When design considerations do not allow for this kind of hardware augmentation, the design engineer must turn to feedback approaches to eliminate undesirable system dynamic behavior.

In the past fifteen years, research in the area of control of flexible systems has been abundant. Targeted primarily toward boosting the performance of flexible satellites and robots, this research has explored a wide spectrum of feedback control concepts. In his 1996 survey paper, [6], Wayne Book presents an overview of some of the work in this field. Junkins and Kim also provide a thorough treatment of this subject in their recently published textbook [4]. Although providing a detailed account of the work in this field is beyond the scope of this patent, some effective strategies for controlling flexible systems can be found in [5–12]. In all of these works, and in many others, closed-loop control strategies have been demonstrated to work effectively at preserving system performance in the face of unwanted vibration. From this result, it can be argued that a good control system is an essential component of a high-performance machine. However, in some systems, such as ones where sensor feedback is unavailable, high-performance control is not an option. In these cases, the designer must turn to feedforward methods for meeting performance requirements. Additionally, even in systems that employ effective controllers, feedforward techniques can commonly be used to gain an extra measure of performance.

2.2 Survey of Feedforward Control Methods

As Wayne Book notes in [3], "our best hope to expand the envelope of feasible performance is a confluence of open- and closed-loop controls, design innovations, material improvements and sensor and actuator developments." As discussed herein above, researchers have taken this message to heart and work has been prolific in both the areas of hardware innovation and closed-loop control. What should not be overlooked, however, is the critical importance of open-loop, or feedforward control, techniques for enhancing machine performance. While closed-loop control techniques are used for minimizing error in the face of disturbances, they cannot always be optimized for the task at hand. In a factory robot, for example, the same pick-and-place task might be performed thousands of times every day. The feedback controller used by this robot, instead of being finely tuned to effectively accomplish the specific pick-and-place task, must likely be designed to meet such performance specifications as good stability robustness and disturbance rejection. In situations like these, the onus falls on a feedforward controller to specify the best command that will move the robot most effectively. From this rationale, the importance of an effective feedforward controller, working independently of or alongside a feedback controller, is clear. This section is devoted to presenting an overview of some of the research that has been performed in the area of feedforward control. Much of this research can be divided into four categories: (1) trajectory tracking, (2) command formulation using analytic functions, (3) optimal control command formulation, and (4) time-optimal and time-efficient command generation. The first three of these categories are concerned with deriving command profiles for applications that are not necessarily time-critical. The last category presents feedforward approaches catered to systems that need rapid response. In this realm of time-efficient approaches, two specific bodies of work, time-optimal control and input shaping, will be addressed in detail in later sections.

2.2.1 Deriving Commands for Trajectory Tracking

In automated equipment such as milling machines and pen plotters, the speed of the system response is secondary to path-following accuracy. For situations like these, feedforward control methods are targeted at generating motion paths that minimize machine tracking error. Perhaps the most common approach for achieving these performance specifications is to use inverse dynamics. Inverse dynamics refers to a technique for filtering input commands by the inverse of the system model so that the system output tracks a desired trajectory despite system flexibility. Recent research in this area has led to new approaches for achieving precise tracking in mechanical systems. Tomizuka [13, 14], for example, proposed a technique for generating causal command inputs to allow a system to follow a specified path. In this technique, guidelines were presented for dealing with uncancellable zeros in the system model without causing phase distortion in the shaped command. Tung [15] extended this theory by proposing a technique for improving accuracy by penalizing model error more heavily for lower frequencies. Asada [16, 17] successfully applied inverse dynamics to a flexible multiple-link robot and proposed an efficient computational scheme to generate the shaped trajectories. By using an inverse dynamics approach to construct shaped commands from a sum of sinusoids, Tu [18] also demonstrated that flexible systems could benefit from inverse dynamics feedforward control. Additional techniques for using feedforward control to enhance trajectory tracking performance can be found in [19–22].

2.2.2 Command Formulation Using Analytic Functions

Another approach for generating commands for systems is by using analytic functions with known frequency- and time-domain characteristics to construct commands with desirable properties. These techniques are often used, for example, to generate fixed-time-length commands with reduced energy at the problematic system modes. Some of the researchers in this area include Aspinwall [23], who proposed a technique for minimizing residual vibration in flexible systems by generating shaped commands using Fourier series. Wiederrich [23–26] used finite trigonometric series to generate high-speed cam profiles to avoid exciting machine vibration. Similarly, Swigert [27] outlined a method for minimizing modal vibration in a flexible satellite using shaped torque commands constructed from a finite trigonometric series. Adopting a similar shaped-function synthesis approach, Meckl [28–31] combined ramped-sinusoid functions to minimize residual vibration from point-to-point motion in flexible systems. Some additional techniques for constructing functions to yield desirable motion profiles can be found in [32–34].

2.2.3 Optimal Control Command Formulation

Building on the concepts and tools developed for optimal feedback control, several techniques have been presented for applying optimal control approaches to the generation of input commands. Classifying this field of research as optimal control command formulation, these approaches typically employ optimal control theory to generate shaped commands that minimize a specific cost index such as command energy or residual vibration. Perhaps the first application of optimal control to generate feedforward commands for flexible systems was proposed by Farrenkopf [35]. In his work, an analytic solution was derived for the input command that minimized structural excitation and residual vibration in an undamped second-order system. Turner [36, 37], using a numerical optimal-control solution technique, derived shaped commands that minimized a weighted sum of state deviation and control effort in undamped, nonlinear, multiple-mode systems. These shaped commands were constrained to produce system response with zero residual vibration. In later work, Eisler [38] used a similar numerical optimization approach to find the minimum-time motion of a two-link robot with actuator limits subject to constraints on the tracking error and residual vibration of the robot. Parker [39] applied a dynamic programming and parameter optimization approach to derive commands for point-to-point motion in cranes. In other work, Bhat [40–46] used a Linear Quadratic Regulator approach to derive a closed-form solution for the minimum energy point-to-point command for a flexible system. Last, relying on a full non-linear model, Meckl [47] proposed a numerical optimization technique for generating minimum-energy commands to effect point-to-point motion in flexible, nonlinear systems.

2.2.4 Creating Time-Optimal and Time-Efficient Commands

For automated systems that require rapid motion, feedforward commands should be designed to maximize the speed of response. Numerous methods have been proposed by designers to create these time-optimal and time-efficient commands. Two, in particular, are of interest: time-optimal control and input shaping. Time-optimal control refers to the field of research dedicated to finding the input command that will move a system as fast as possible from one point to another. Much research has been performed in this area in the past forty-five years, and the following section will attempt to present an overview of some of this work. The second area of research to be discussed in detail, input shaping, is a field based on a strategy for deriving time-efficient discontinuous command profiles that suppress residual vibration and are robust to system uncertainties. Much attention has been focused on this subject in the past ten years, and section 2.4 will give a detailed account of this research effort.

In addition to time-optimal control and input shaping, many other techniques exist for creating time-efficient commands. For example, some researchers [48–50] have set conventional digital filtering techniques to the task of command profile design. Work in this area has revealed that these filtering approaches can be effective for deriving relatively fast commands that avoid exciting unwanted system vibration. By constructing command profiles from a series of correctly timed pulses, other researchers [51–55] have illustrated that rapid motion can be produced in some flexible systems without residual vibration. These techniques and others have successfully demonstrated that many approaches can be adopted for creating time-efficient commands for flexible systems. The following two sections focus on two particular techniques that have demonstrated widespread use and acceptance: the first, time-optimal control, stands alone for its power and generality, and the second, input shaping, gains distinction for its simplicity and practicality.

2.3 Time-Optimal Control

The time-optimal control problem, as stated above, is concerned with finding the fastest possible ways to move systems from one state to another. Much of the research in this field can be divided into two schools. The first school, comprised of work performed primarily in the 1950's and 1960's, was concerned with developing the underlying mathematical theory for time-optimal control. Due in part to the complexity of these initial approaches and since energy-based control methods promised greener pastures, work in this area was largely abandoned. More recently, perhaps in the past fifteen years, a new school of work has formed. This new approach to time-optimal control has been driven by expanding research efforts in the control of flexible structures as well as new computer capabilities. The result of this new school of work has been the development of new techniques for solving for time-optimal command profiles for a small class of flexible systems. This section proposes to present an overview of the state of the art in time-optimal control and will address both underlying principles as well as recent advancements in this field. This discussion will begin by describing the origins of time-optimal control as found in Pontryagin's Maximum Principle and the Bang—Bang Principle. Approaches for applying these theories to nonlinear systems will then be addressed followed by an overview of recent work in deriving time-optimal commands for linear systems.

2.3.1 Pontryagin's Minimum Principle and the Bang—Bang Principle

For over forty years, researchers have been investigating strategies for finding time-optimal commands. Much of this research has resulted from Pontryagin's original formulation and investigation of the time-optimal control problem [56]. In this original work, Pontryagin outlines a set of necessary conditions that the time-optimal control for a system must satisfy. Specifically, these conditions require that the time-optimal control which transitions a system from a fixed initial state to a desired final state must necessarily satisfy the following conditions: (1) it must satisfy the system state and costate equations, (2) it must remain within the given actuator limits and minimize the Hamiltonian, and (3) it must result in a Hamiltonian value of zero over the time-length of the command. The mathematical details of this principle are avoided here but outlined below in section 6.2.1 of this document. Also, a comprehensive treatment of this principle, including a detailed derivation, can be found in [57]. A less detailed overview of the fundamentals of the principle can be found in [58]. Due to its generality, Pontryagin's Minimum Principle proved to be a theory of far-reaching impact. Not only did it allow researchers to make strong claims about the nature of time-optimal commands for linear and nonlinear systems, but its result can be applied with equal efficacy to SISO and MIMO systems alike.

Stemming from the powerful insights of the Minimum Principle, the Bang—Bang Principle further postulates about the nature of the shape of time-optimal commands. Phrased by Hermes [59] as follows, the Bang—Bang Principle states that " . . . if it is desired to have the system change from one state to another in minimum time, then it is necessary at all times to utilize the power available; that is, to use bang—bang control." With this assertion, the time-optimal command for a given system, must have a value that always maximizes, in a positive or negative sense, at least one of the system actuators. For a system with a single input, the time-optimal command, such as the one shown in FIG. 5, must always saturate the system actuator. The resulting command profile for such a system will consist, therefore, of a series of positive and negative pulses with a finite number of times where the command value switches between the positive and negative limit. This observation greatly simplifies the time-optimal control problem by reducing the solution space of possible command profiles to simply the set of possible switch times.

2.3.2 Time-Optimal Control of Nonlinear Systems

Pontryagin's Minimum Principle provides powerful tools for assessing the time-optimality of system commands. Unfortunately, applying these tools to the task of deriving commands for a given system is not immediately straightforward. For very simple systems, some analytic solutions for time-optimal commands exist [57], but in general, commands must be derived numerically. A number of techniques have been proposed for doing this, but all are numerically intensive and largely too unreliable to be applied to a wide class of systems. The general approach for deriving time-optimal commands typically relies on solving a two-point, boundary-value problem (TPBVP) with one endpoint that is free in time. An iterative approach can be employed to solve this problem, solving the state and costate equations during every iteration, in order to find the initial costate vector that meets the problem specifications and optimality conditions. Scrivener and Thompson [60], in their literature survey of work in this area, discuss a number of different techniques used to approach this problem. Additional iterative techniques for solving the TPBVP using linear programming or the shooting methods can be found in [61, 62]. A more recent approach called switch-time optimization (STO) is discussed in [63].

Although solution techniques are numerically complex and unreliable, many researchers have set these processes to the task of deriving time-optimal commands for nonlinear systems. Schiller [64–67], for example, derived commands for a nonlinear multi-link robot and incorporated additional constraints such as joint motion limits and obstacle avoidance. Liu and Singh [68] used Meier's STO process to derive time-optimal commands for nonlinear systems with improved robustness to parameter uncertainties. Additional examples of time-optimal commands for nonlinear systems can be found in [69, 70].

2.3.3 Time-Optimal Control of Linear Systems

When concerned strictly with linear, time-invariant systems, the claims that can be drawn from Pontryagin's Minimum Principle can be further strengthened. First, as long as the desired final state can be reached by an input command that remains within the actuator limits, the time-optimal control for a linear system will exist and be unique. Second, the three general conditions that the time-optimal control must satisfy are not only necessary, as was the case for nonlinear systems, but they are also sufficient. With these statements, it can be safely postulated that, if any command profile satisfies the three conditions outlined in Pontryagin's Minimum Principle, it must necessarily be the unique time-optimal control solution for a given system.

Given these powerful assertions about the nature of time-optimal commands for linear systems, some generalizations can be made about the shape of time-optimal command profiles. As dictated by the Bang—Bang Principle, any time-optimal command for a linear system must saturate the system actuators from the initial time of the command until the time that the system reaches its desired final state. After this terminal time, the time-optimal command must then adopt the profile required to maintain the system at its desired final state. For systems that have poles and no zeros after the final switch, the time-optimal command must necessarily remain at a constant value. More specifically, if the system has any rigid-body poles, the final value of the command must be zero, and if there are no rigid-body poles, the final command value must be set to the level required to keep the system at its desired terminal state. The profile of a typical time-optimal command for a system with just poles and no zeros is shown in FIG. 6.

When a system has zeros as well as poles, the profile of the time-optimal command is somewhat different. Again, the Bang—Bang Principle requires that the command saturate the system actuators from the initial time to the time that the system reaches its desired final value. However, the profile of the command after this final time can now adopt a wider range of possible values. The only requirement for this portion of the command is that it maintains the system at its desired final state. Consequently, since the system has zeros as well as poles, any command profile that has the appropriate initial conditions and drives the system strictly at the frequencies of the system zeros will not influence the system output. As a result, any command profile that is a linear combination of the initial condition response at the frequencies of the system zeros will be a potential candidate for the terminal component, or tail, of the time-optimal command profile. An example of a typical time-optimal command profile for a system with poles and zeros is shown in FIG. 7. As illustrated, this command has two components: (1) a pulse train which delivers the system output to its desired final value, and (2) a tail which maintains the system output at its desired final value. Since the tail of the time-optimal command provides an additional degree of flexibility in the possible solution space of the optimal command profile, commands designed for both poles and zeros can often result in much shorter system response times than commands designed for poles alone.

Both the time-optimal command for a system with poles and the time-optimal command for a system with poles and zeros contain a pulse train with a finite number of switches. Although the exact number of switches in this pulse train is not always known, some general statements can be made to bound the possible number of switch times. By convention, the number of switches refers to the number of times the command profile transitions between the upper and lower actuator limits; the transitions at the initial time and the terminal time are ignored. First, for the case where the system under consideration has only real or rigid-body poles and no zeros, the number of switches in the time-optimal command profile is exactly equal to n−1, where n is the number of system poles. If the system has complex poles as well as real and rigid-body poles and no zeros, the number of switches in the time-optimal command will be finite and have a lower bound of n−1. In general, the exact number of switches in the time-optimal command for systems with complex poles will depend on the desired state change; the larger the state change, the more switches that will be required in the time-optimal command. For systems with zeros, the minimum number of switches required in the time-optimal command can be reduced by one for every zero in the system. For example, for a system with real poles, rigid-body poles and zeros, the minimum number of switches is $(n-1)-r$, and the maximum number of switches is $n-1$, where n is the total number of system poles and r is the total number of system zeros. For systems with complex poles as well, the lower bound on the number of switches is $(n-1)-r$, and the upper bound is finite but dependent on the desired state change.

By applying these general principles about the nature of time-optimal commands for linear systems, several researchers have made some important insights about time-optimal command solutions for specific types of systems. In some early work, Barbieri [71] and Dodds [72] looked at linear systems with a single undamped flexible mode and made general statements about finding values for the command switch times without using complex numerical search routines. Pao [73] investigated systems with damped flexible modes and outlined basic properties as well as a set of algebraic equations that the time-optimal commands must satisfy. Investigating new strategies for deriving time-optimal commands for linear systems with multiple flexible modes, several researchers [74–80] have proposed techniques for deriving time-optimal commands by solving a set of algebraic constraint equations. These algebraic constraint equations were formulated by making some general insights about symmetry properties of the time-optimal commands and the mathematical interpretation of the problem boundary conditions.

Building on the initial developments about deriving time-optimal commands for systems with flexibility, several researchers also proposed techniques for extending this work to derive time-efficient commands with more desirable properties. In particular, several researchers [68, 81–84] proposed methods for including additional constraint equations into the time-optimal formulation in order to derive robust, time-optimal commands. The resulting command profiles still displayed a bang—bang shape, but included additional switches and a longer overall time to better tolerate systems with dynamic uncertainty. An example of a robust, time-optimal command profile is shown in FIG. 8. Following a similar approach, researchers [85–89] have also explored ways to incorporate fuel-usage constraints in order to create time-efficient command profiles with better fuel-usage characteristics. These fuel/time-optimal command profiles, like the one shown in FIG. 9, displayed a typical bang—bang nature but also contained idle periods between the actuator pulses. Lastly, researchers [90–93] have also explored techniques for adding smoothness constraints to typical time-optimal bang—bang profiles. The resulting near-time-optimal commands, while no longer retaining the bang—bang profile, excited less vibration in the structure upon implementation.

Although focused almost exclusively on systems with solely flexible modes, the techniques developed in the past fifteen years for deriving time-optimal command share some similarities that deserve note. First, largely due to the complexity of numerical and iterative approaches for solving this problem, much of the recent work in this area has focused on making statements about the general nature of optimal commands in order to reduce the size of the solution space. From these insights, researchers have developed algebraic equations that relate the properties of the time-optimal command to specific problem constraints such as zero residual vibration. Because of the simplicity of these resulting equations, some analytic solutions for very simple systems have been proposed. More importantly, it has been illustrated that these algebraic constraints can be solved effectively using an optimization process. Furthermore, since optimizations are not always guaranteed to yield a global optimal solution, some researchers [77, 94–96] have proposed a simple method for verifying the optimality of command profiles using the conditions from Pontryagin's Minimum Principle. This new approach, which combines an optimization of algebraic constraint equations with a simple optimality verification scheme, has been illustrated, for the case of systems with flexible modes, to deliver solutions much faster and more reliably than conventional iterative solution methods.

2.4 Input Shaping

First proposed by Singer and Seering in 1989 [97, 101], input shaping is a technique for shaping system commands to suppress unwanted system vibration. Due to its simplicity and effectiveness, even in the face of substantial system uncertainty, this technique has seen widespread use and development in the past decade. Originally developed as a method for filtering input command profiles in real-time, researchers have extended this work in many directions. Most recently, due to similarities in the command structure between input shaping commands and time-optimal commands, researchers have applied the basic principles of input shaping to the task of creating time-optimal command profiles.

The purpose of this section is to present an overview of input shaping research performed in the past decade with particular attention toward advances made in addressing the time-optimal control problem. This section begins with a discussion of the basic theory of input shaping followed by a survey of the various extensions that have been made to this theory since its conception. Since the popularity of this technique is largely a measure of its effectiveness, an attempt will be made to mention many of the recent applications of input shaping that have been reported in the literature. Given this overview of the theory and use of input shaping, this section will then turn to the time-optimal control problem and outline the work that several researchers have done to apply input shaping techniques to solve this fundamental problem.

2.4.1 The Basic Theory of Input Shaping

In its basic form, input shaping is a strategy for shaping command inputs by convolving them with a sequence of impulses. The sequence of impulses, called the input shaper, is selected based on information about the system modes of vibration. For the case when a step command is shaped using an input shaper, the resulting command profile is a staircase, as shown in FIG. 10. This shaped command, if designed correctly, will deliver the system from its initial value to its desired final value without exciting unwanted system vibration. Since this approach relies on impulses, or sharp changes in the command profile, the resulting commands are very time-efficient and can typically deliver the system to its destination faster than many other methods.

Much of the value in the input shaping approach resides in its simplicity. Typically, input shapers are designed by solving a set of algebraic constraint equations. These algebraic equation are derived from the fact that the system must have zero residual vibration and can be solved analytically for some simple systems. The result of these analytic solutions are a set of special purpose impulse sequences that can be implemented readily in a variety of systems with flexibility. Much of Singer's original work [97–101], in addition to thoroughly investigating the basic theory and its properties, focuses on these basic impulse sequences that are highly effective at eliminating unwanted vibration in systems with a single flexible mode. Additional work by Hyde [102–104], as well as Singer, looks at numerical approaches for deriving input shapers for systems with multiple modes. These approaches typically rely on an optimization routine to solve a set of nonlinear algebraic equations, and results have demonstrated input shapers can be derived quickly and reliably for systems with up to around six to ten modes of vibration.

The concept of using correctly timed staircase profiles to create commands that eliminate unwanted vibration, although fully explored by Singer, was originally presented by Smith [105, 106] about forty years ago. Known as posicast control, this technique presented guidelines for timing the transitions in a staircase command profile using knowledge about the system vibration modes. Since its original presentation, many researchers [107–111] have illustrated that these commands can produce time-efficient and vibration-free motion in flexible mechanical systems. A primary advantage of Singer's input shaping over posicast control is the use of robustness constraints to yield commands that can still perform effectively in the face of system uncertainty. The robustness constraints rely on taking the derivative of an analytic expression for system residual vibration and yield command profiles with a longer time-length but better tolerance to system uncertainty. Because of this inherent robustness, input shaping has seen much success when applied to a wide class of flexible systems with varying degrees of uncertainty.

One way to gain insight into the principles and operation of input shaping is to consider its interpretation in several different domains. FIG. 11 offers a schematic of how input shaping can be interpreted in four different domains: (1) the time domain, (2) the frequency domain, (3) the Laplace domain, and (4) the discrete domain. For the purposes of this discussion, consider a step command shaped by an input shaper consisting of two impulses in the time-domain. The resulting shaped command, which is a two-step staircase, can then be applied to either an open- or closed-loop flexible system to produce output motion without residual vibration. In the frequency domain, the input shaper resembles a notch filter. If the magnitudes and the times of the impulses in the sequence are selected correctly, this notch will align with the resonant frequency of the system, and the resulting shaped command will excite little vibration at this mode. In the Laplace domain, the input shaper contains an infinite number of zeros placed at periodic intervals along the imaginary axis. If the shaper is designed correctly, the lowest frequency zeros of the shaper will rest at the identical location of the system complex poles. Since these shaper zeros cancel the system poles, the system response will display no vibration at the canceled mode. By selecting a sampling interval coincident with the impulse spacing in the input shaper, a discrete domain representation can also be formulated. As shown in FIG. 11, the input shaper is comprised of a pair of complex zeros and an equal number of poles at the z-plane origin. As in the Laplace domain, when designed correctly, these zeros exactly cancel the system poles, resulting in a system response with no problematic vibration.

Now, in the case where input shaping is designed with enhanced robustness, the same multi-domain interpretation can also be applied. In the time-domain, robust input shapers typically require more impulses in the shaper and produce a staircase command with more steps. This results, in the frequency domain, in a notch filter with a wider notch. In the Laplace and discrete domains, this enhanced robustness is manifested by the presence of additional zeros located at or near the frequencies of the system poles. Typically the number of zeros in the shaper and their proximity to the system poles can be used to tailor the level of robustness required in a given system.

2.4.2 Extensions to the Input Shaping Theory

Research in the past decade has led to many extensions of the basic input shaping theory in many different research areas. These areas of active research include: (1) developing new techniques for deriving shaped inputs, (2) proposing different strategies for tailoring the command robustness to system uncertainty, (3) implementing input shaping in an adaptive framework, (4) proposing new kinds of constraints on shaper performance such as system deflection and fuel usage, and (5) applying input shaping techniques to improve trajectory tracking. This section will attempt to give an account of much of the work that has been performed in these areas to date.

Perhaps the most active area of input shaping research in recent years has been in the realm of new derivation strategies for shaped commands and impulse sequences. Many researchers have explored a range of new derivation tools as well as proposed new types of sequences for reducing vibration in flexible systems. In particular, several researchers have proposed strategies for using zero-placement in the discrete domain [112–114] as well as the Laplace domain [115–117] for deriving input shapers for both single- and multiple-mode systems. Additionally, researchers such as Singhose and Rappole have investigated specific classes of shaped commands and proposed analytic expressions and design heuristics to aid in the derivation of certain types of impulse sequences [118–125]. By building on a representation proposed by Singer [99] called vector diagrams, Singhose described new strategies for deriving impulse sequences using graphical methods [126–129]. By modifying constraints to allow for negative impulses, Rappole and Singhose have also illustrated that shaped commands can be shortened for some systems and still effectively suppress unwanted vibration [130, 131]. Crain and Singhose have investigated properties of two-mode shapers and suggested guidelines for their construction [132, 133]. In recent work, Pao [134] presented new techniques for deriving input shapers for systems with multiple actuators, and Singhose [135] has applied neural nets to the task of creating input shapers.

Another active area of research in the field of input shaping has been formulating new methods for improving the robustness properties of shaped commands. In a technique proposed by Singer [136], a method was outlined for better controlling shaper robustness by explicitly specifying problem constraints at sampled frequencies in the frequency domain. In a related approach, Singhose [137, 138] proposed that command robustness could be better tailored to system uncertainty by designing input shapers that better place shaper zeros at and near problematic system frequencies. The resulting sequences, called multi-hump shapers, can then be incorporated into an optimization strategy to specify precisely the desired robustness of a given shaper [139, 140]. In more recent work, Pao [141] has suggested an approach for better tailoring input shaping robustness to known uncertainty in the damping and frequency of the flexible modes of a system.

Although input shaping was originally developed for linear, time-invariant systems, many researchers have investigated adaptive implementations of input shaping to better apply the technique to systems with time-varying and configuration-dependent dynamics. In particular, Khorrami [142] employed a nonlinear controller and a single-mode shaper to eliminate vibration on a two-link flexible arm. In this approach, a real-time FFT process was used to identify system modes and update both the controller and shaper parameters adaptively. In a similar approach, Magee and Book [143–146] employed an adaptive approach to implement a two-mode shaper on a two-link robot. Using analytic solutions combined with an interpolated lookup table, Rappole [118] proposed another method for implementing input shaping adaptively on a two-link flexible robot. Lastly, in work by Tzes [147–149], an adaptive input shaping scheme was presented that uses a non-collocated controller with acceleration feedback and a real-time frequency identification scheme. In this case and the others mentioned, input shaping was demonstrated to effectively produce the desired machine motion without residual vibration in the face of changing system modes.

By appending the basic input shaping equations with new types of constraints, recent research has revealed that a variety of shaped commands can be created with certain desirable properties. For example, for some systems it is desirable to regulate the amount of deflection experienced by a system during motion. By incorporating this condition into the input shaping formulation, Banerjee and Singhose derived new types of deflection-limited shaped commands [150–153]. Similarly, in some systems with limited fuel, command profiles with better fuel usage characteristics are required. By modifying the command structure to include idle periods, Singhose developed a new class of shaped commands with desirable fuel-efficient properties [154–156]. Lastly, by combining both fuel-efficient command characteristics with deflection limiting constraints, recent research has also revealed that commands can be created with both of these desirable properties [157, 158].

Although not specifically designed with the task of trajectory following in mind, the vibration suppression properties of input shapers have led many researchers into investigating the effectiveness of shaped commands for tracking applications. Work in this area has revealed that certain types of shaped commands can yield better trajectory following performance in flexible systems than unshaped commands [159–162].

2.4.3 Applications of Input Shaping

Due to its ease of implementation and robustness to system uncertainty, input shaping has been applied with much success to many types of open- and closed-loop systems. As an area of particular interest, many researchers have investigated the interaction of shaped commands with closed-loop control methodologies. Specifically, by applying input shaping to a controlled two-link flexible robot arm, Hillsley and Yurkovich [163, 164] noted that the use of input shaping with an endpoint-feedback controller provided superior performance over each technique alone. Similarly, Khorrami [165, 166] noted that, when combined with a nonlinear feedback controller, input shaping proved effective at enhancing the performance of another two-link flexible robot. Lim [167] also demonstrated success when integrating input shaping with high-performance control. Finally, although input shaping was designed to be a strictly feedforward technique, several researchers [168–172] have shown enhanced system performance when a shaper is included inside the feedback loop.

Out of the many possible applications for input shaping, two primary application areas that have benefited from input shaping techniques are flexible robots and flexible space structures. For example, in two early applications, Christian [173] and Yurkovich [174] demonstrated the effectiveness of the technique on multi-link flexible robots. Magee and Book [175, 176] also applied input shaping with success to reduce vibration in a Schilling manipulator. In the area of flexible space structures, Singh [177, 178] demonstrated ways to reduce vibration in 3-D slewing maneuvers of flexible spacecraft by applying input shaping. Additionally, Banerjee [179] successfully implemented input shaping on a model of a long spaced-based antenna, and Chang [180] collected experimental results from a satellite testbed in 1-g. In more recent experimental work, Tuttle [181] demonstrated the effectiveness of input shaping on space-based systems by collecting data from an experimental testbed flown aboard the Space Shuttle Endeavour in March of 1995.

In addition to flexible robots and space structures, input shaping has seen implementation on a variety of other system types. Some of the applications that have been reported in the literature are summarized here. In order to eliminate measurement-corrupting vibration in coordinate measuring machines, several researchers [182–187] have enlisted input shaping. Additionally, input shaping has also seen success when applied to cranes for eliminating swinging in the payload during operation [188, 189]. As a testament to the wide applicability of this technique, researchers have demonstrated success when using input shaping with such applications as force control [190, 191], spherical motors [192], and fluid-pouring systems [193]. Other examples of input shaping applications can be found in [194–197].

In addition to applying input shaping to a wide class of systems, several researchers have drawn comparisons among input shaping techniques and other feedforward control approaches. For example, some results presented by Bhat [41] compared input shaping, optimal-control techniques, and Fourier synthesis and concluded that all techniques were effective at reducing system vibration since they placed the shaped command zeros at the system poles. Kwon [198] and Rattan [159] also drew some comparisons between input shaping, digital filtering, and inverse dynamics, and Wie [199] looked at the performance of input shaping versus closed-loop techniques. In other work, Pao [200] and Singhose [201] made comparisons among different input shaping techniques, and Singer [98, 202], Singhose [203], and Bodson [204] compared input shaping to digital filtering. Research results revealed that, although input shaping is inherently a digital filtering technique, conventional digital filters, since they are not intended for mechanical systems, cannot equal the performance of input shapers.

2.4.4 Input Shaping and Time-Optimal Control

In Singer's original formulation, input shaping was intended to be used for shaping arbitrary actuator commands with a sequence of impulses. Because the impulses in this sequence were constrained to be positive in amplitude, the resulting transfer function of the shaped command, in addition to having reduced energy at the system natural frequencies, was guaranteed never to exceed unity gain. Consequently, the resulting shaped commands had the desirable property of eliminating residual vibration in the modeled system modes while not exciting unwanted vibration in unmodeled system modes. By relaxing the constraint that impulse amplitudes be positive, Singer [99] illustrated that shorter commands could be derived that still cancelled vibration at the modeled system modes. Singhose [205, 206] further demonstrated that the same input shaping constraint equations could be used to derive bang—bang command profiles for flexible systems. By comparing these bang—bang commands to traditional time-optimal command profiles, it was revealed that they were indeed time-optimal [207, 208]. From this work, it became clear that the input shaping equations and solution approach, arguably more simple than conventional techniques, could now be used to derive time-optimal commands for linear systems with flexible modes.

In addition to providing a much more convenient procedure for finding time-optimal commands, the similarities between input shaping and time-optimal control suggested possible methods for enhancing the performance of time-optimal commands. In particular, by applying the same robustness strategies originally developed for input shaping to time-optimal commands, researchers [95, 209–211] illustrated that time-optimal command profiles with improved robustness could be derived easily. Work by Pao and Singhose [207] also revealed that the robust, time-optimal command for a certain system was equivalent to the time-optimal command for the same system augmented with additional poles at the system modes of vibration. Furthermore, by adapting input shaping insights to the time-optimal control problem, Singhose [212] developed new methods for creating time-optimal commands with better fuel-usage properties, and Pao [213] proposed a simpler analytic procedure for creating bang—bang commands that were near time-optimal.

2.5 The Next Step

As the profusion of research outlined herein indicates, considerable work has been done in the area of feedforward control, and, in particular, in the area of creating time-optimal and time-efficient commands. In the case of time-optimal control, many processes have been developed for deriving command profiles for a wide range of systems. Built on the strength of Pontryagin's Minimum Principle, these approaches can be applied to many kinds of linear and nonlinear systems without loss of generality. Unfortunately, due the nature of the constraints in Pontryagin's principle, iterative search routines can be numerically intensive and solutions can be elusive. Largely due to this inherent complexity, these types of solution approaches have seen limited application on complex systems. More recently, as a product of research in the area of flexible systems, new methods have been presented for creating time-optimal commands for systems with flexible modes. In these techniques, researchers developed new types of algebraic constraint equations that allowed for easier solution of the time-optimal control problem for some simple linear systems with flexibility. Following a similar strategy, but approaching the problem from a different field of research, input shaping has recently proven effective for creating time-optimal command profiles as well. Originally designed to suppress residual vibration in flexible systems, the input shaping theory relies on solving a set of constraint equations that describe the vibration characteristics of the system. Using these same equations, but with different requirements on the command amplitude, input shaping has yielded time-optimal solutions for linear systems with flexibility. This approach, since it relies on a set of simple algebraic equations, is both numerically and conceptually simple and has been demonstrated to effectively reduce vibration in many different types of systems. Furthermore, since the technique can be easily augmented with additional constraints, many researchers have successfully developed time-efficient commands with a range of enhanced qualities, such as improved robustness and fuel efficiency.

Research in the past half-century has made considerable progress investigating the creation of time-optimal and time-efficient commands. General but complex processes have been proposed to solve the time-optimal control problem, and many simple solution strategies have been developed for systems with flexibility. What is yet unavailable, however, is a simple approach that can be applied with generality to virtually all types of linear systems. Such an approach should combine the simplicity, practicality, and ease of implementation of input shaping with the generality and strength of Pontryagin's Minimum Principle

SUMMARY OF THE INVENTION

The present invention addresses the foregoing needs by providing a new and practical approach for deriving time-optimal and time-efficient command profiles for virtually all types of linear systems. The invention is general enough to apply to a wide class of systems, yet simple enough to allow for quick and effective solutions. The general solution framework can be summarized in the following three steps.

Step 1: Select a candidate command profile. Time-optimal and time-efficient commands represent a special subclass of optimal command profiles designed to move systems rapidly from one point to another. As a result, they all have similarities in structure that can be leveraged to better find a solution. Specifically, as above, time-optimal and time-efficient commands are typically comprised of a staircase or pulse train with a finite number of discontinuities. In some cases, namely for systems that have zeros, this pulse train or staircase can be followed by a tail made up of a sum of exponential terms. Due to this unique construction, the profile of these commands can typically be described completely by a small number of parameters. The solution space of these parameters, then, outlines the entire family of solutions for the optimal command profile. As is illustrated below, navigating the solution space of possible command profiles using a small number of command parameters greatly reduces the computational complexity of this problem. As a result, solutions for time-optimal and time-efficient commands are easy to identify and implement.

Step 2: Impose the problem constraints. Given a parameterized analytic expression for a candidate command profile, the next step toward finding an optimal solution is imposing the problem constraints. Typically, the problem statement, such as the time-optimal and time-efficient control problem statements outlined above, specifies the exact nature of the constraints required for a specific problem. These constraints, however, are most commonly expressed as conditions on the system performance in response to an input command. For example, in the case of the time-optimal control problem, it is required that the system output transition by a specified amount and come to rest. In order to explore the solution space of possible command profiles that meet these conditions, these constraints on the performance of the system output must first be translated into constraints on the command profile itself. This expression of the problem constraints in terms of the parameters that describe the input command is very much at the heart of this approach. Below, it will be illustrated how a minimum set of constraint equations can be derived to bound the optimal solution space. As will be discussed, these equations are algebraic and of manageable complexity and, consequently, allow for rapid and reliable solution.

Step 3: Solve and verify. Given a family of candidate command profiles and a set of properly formulated constraints that structure the solution space, the only remaining problem is solving the constraints to find the optimal solution. For some very simple systems, the problem constraints can be solved analytically to yield an optimal command profile. In most cases, however, solution requires a numerical optimization. Since optimization processes can be vulnerable to suboptimal local minima, an effective solution strategy should also provide a means for verifying the optimality of the result. As set forth below, by using conditions prescribed by Pontryagin's Minimum Principle, not only can solutions for time-optimal and time-efficient commands be derived quickly and reliably, by they can also be verified as optimal for certain classes of problems.

In more detail, according to one aspect, the present invention is directed to a system (i.e., a method, an apparatus, and computer-executable process steps) for determining an input command profile for a dynamic system that can be modeled as a linear system, where the input command profile is used to transition an output of the dynamic system from one state to another state. The invention identifies characteristics of the dynamic system, and selects a command profile which defines an input to the dynamic system based on the identified characteristics. The command profile comprises one or more pulses which rise and fall at switch times and is useable with substantially any dynamic system that can be modeled as a linear system. The invention then imposes a plurality of constraints on the dynamic system, at least one of which is defined in terms of switch times. Thereafter, the invention determines the switch times for the input to the dynamic system based on the command profile and the plurality of constraints According to another aspect, the present invention is a system for determining an input command profile for a dynamic system that can be modeled as a linear system, where the input command profile is used to transition an output of the dynamic system from one state to another state. The invention includes selecting a command profile for the input to the dynamic system, where the command profile comprises a pulse train with pulses that rise and fall at switch times and is useable with substantially any dynamic system that can be modeled as a linear system. The selecting step comprises setting pulse train amplitudes based on actuator limits, determining if there are any system zeros and, if so, including a tail in the command, making an initial guess for the switch times, and, in a case that there are system zeros, making an initial guess for coefficients defining the tail. Thereafter, the invention imposes constraints on the system, which constraints comprise one or more of dynamics cancellation constraints, boundary condition constraints, and, in a case that there are system zeros, actuator limit constraints. The switch times are then solved for based on (1) the command profile selected in the selecting step, (2) the initial guess for the switch times, (3) in a case that there are zeros in the system, the initial guess for the coefficients defining the tail, and (4) the problem constraints imposed above. Finally, the invention determines whether the switch times define an input which makes the command profile time optimal.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 48 shows a graphical user interface for use with the process of FIG. 47.

DETAILED DESCRIPTION OF THE PREFERRED EMBODIMENT

Initially, it is noted that the present invention can be implemented by processors which control the operation of many different types of dynamic systems, such as disk drives, CD players, robot arms, etc. For the sake of brevity, however, the routines comprising the present invention will be described as executing on a personal computer ("PC") which controls an external dynamic system.

Figure 12:
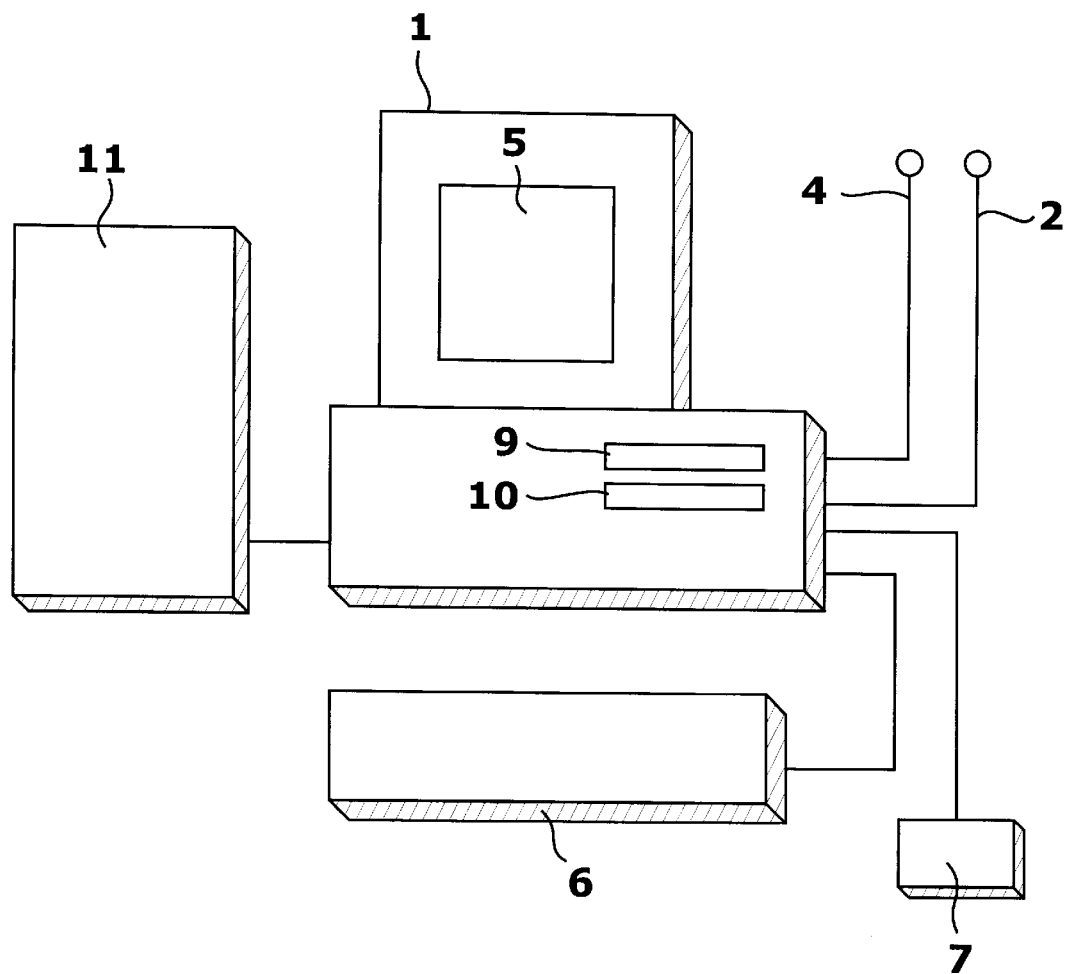
FIG. 12 shows a computer system for implementing the invention.

FIG. 12 shows computing equipment for a PC on which the present invention is implemented. As shown, PC 1 includes network connection 2 for interfacing to a network and fax/modem connection 4 for interfacing to other devices or dynamic systems (not shown). PC 1 also includes display screen 5 for displaying information to a user, keyboard 6 for inputting text and user commands, mouse 7 for positioning a cursor on display screen 5 and for inputting user commands, disk drive 9 for reading from and writing to floppy disks installed therein, and drive 10 for accessing data stored on CD-ROM or DVD. PC 1 may also have one or more local peripheral devices connected thereto, such as printer 11.

Figure 1:
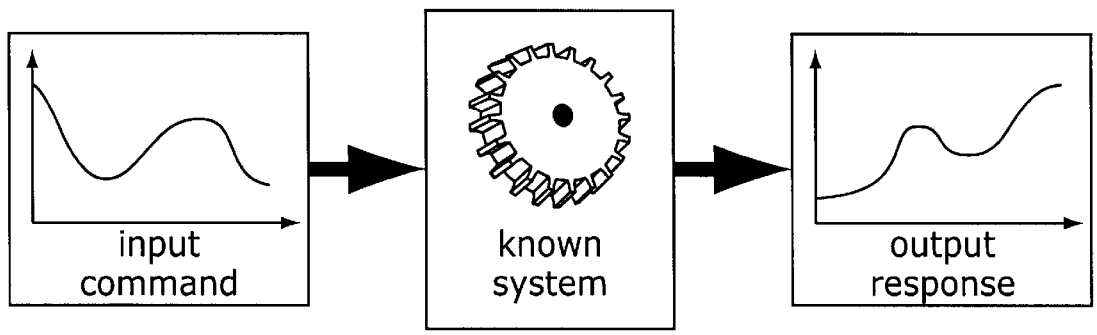
FIG. 1 illustrates the feedforward control problem graphically.
Figure 2:
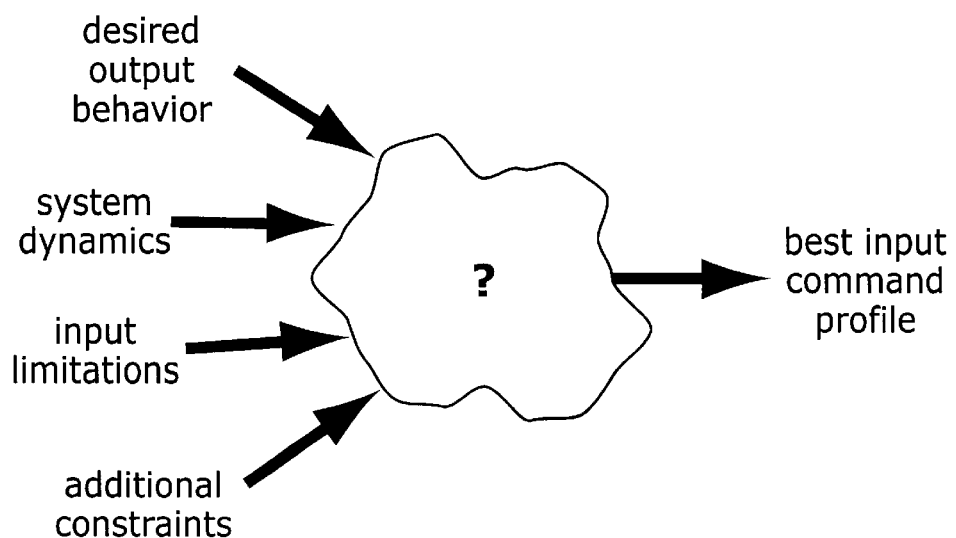
FIG. 2 illustrates the problem addressed by the present invention.
Figure 3:
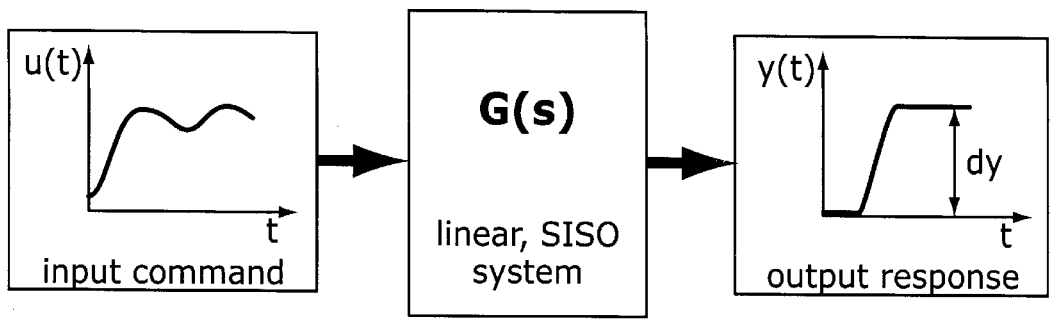
FIG. 3 illustrates the time-efficient control problem graphically.
Figure 4:
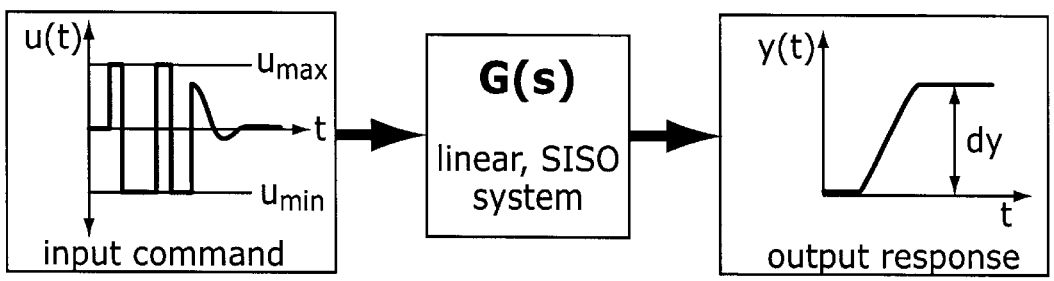
FIG. 4 illustrates the time-optimal control problem graphically.
Figure 5:
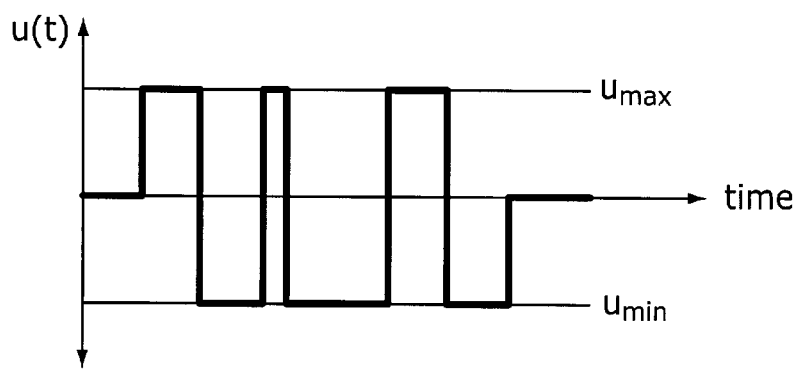
FIG. 5 shows a typical time-optimal command.
Figure 6:
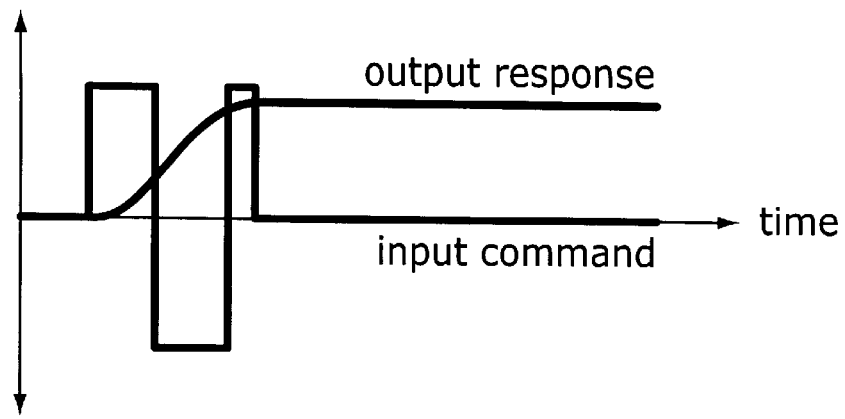
FIG. 6 shows a typical time-optimal command for a system with poles.
Figure 7:
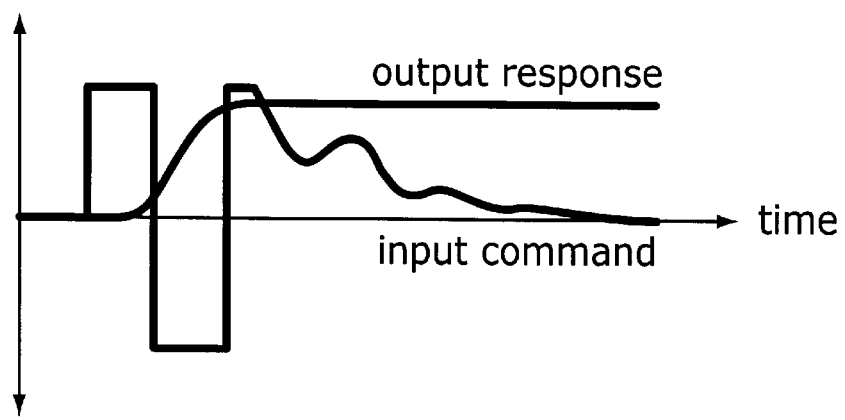
FIG. 7 shows a typical time-optimal command for a system with poles and zeros.
Figure 8:
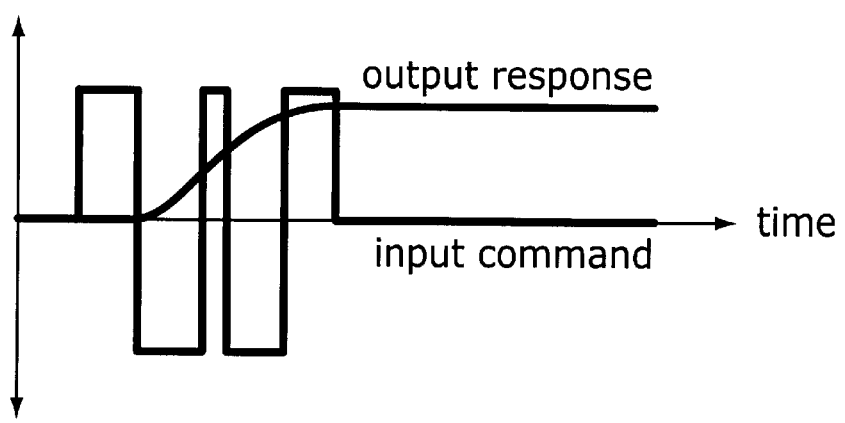
FIG. 8 shows a typical robust time-optimal command.
Figure 9:
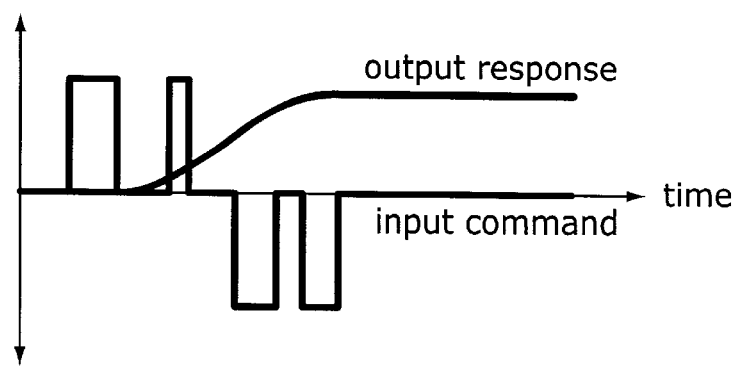
FIG. 9 shows a typical fuel/time-optimal command.
Figure 10:
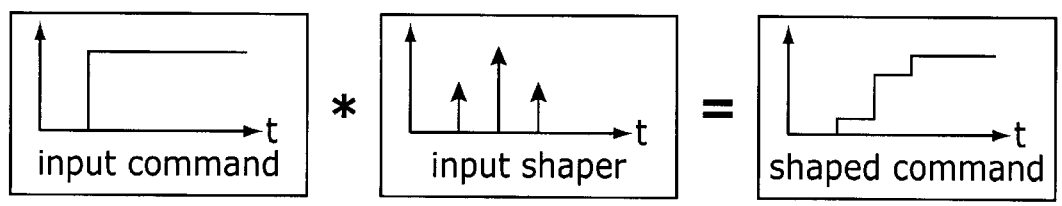
FIG. 10 illustrates the process of generating a shaped command using input shaping.
Figure 11:
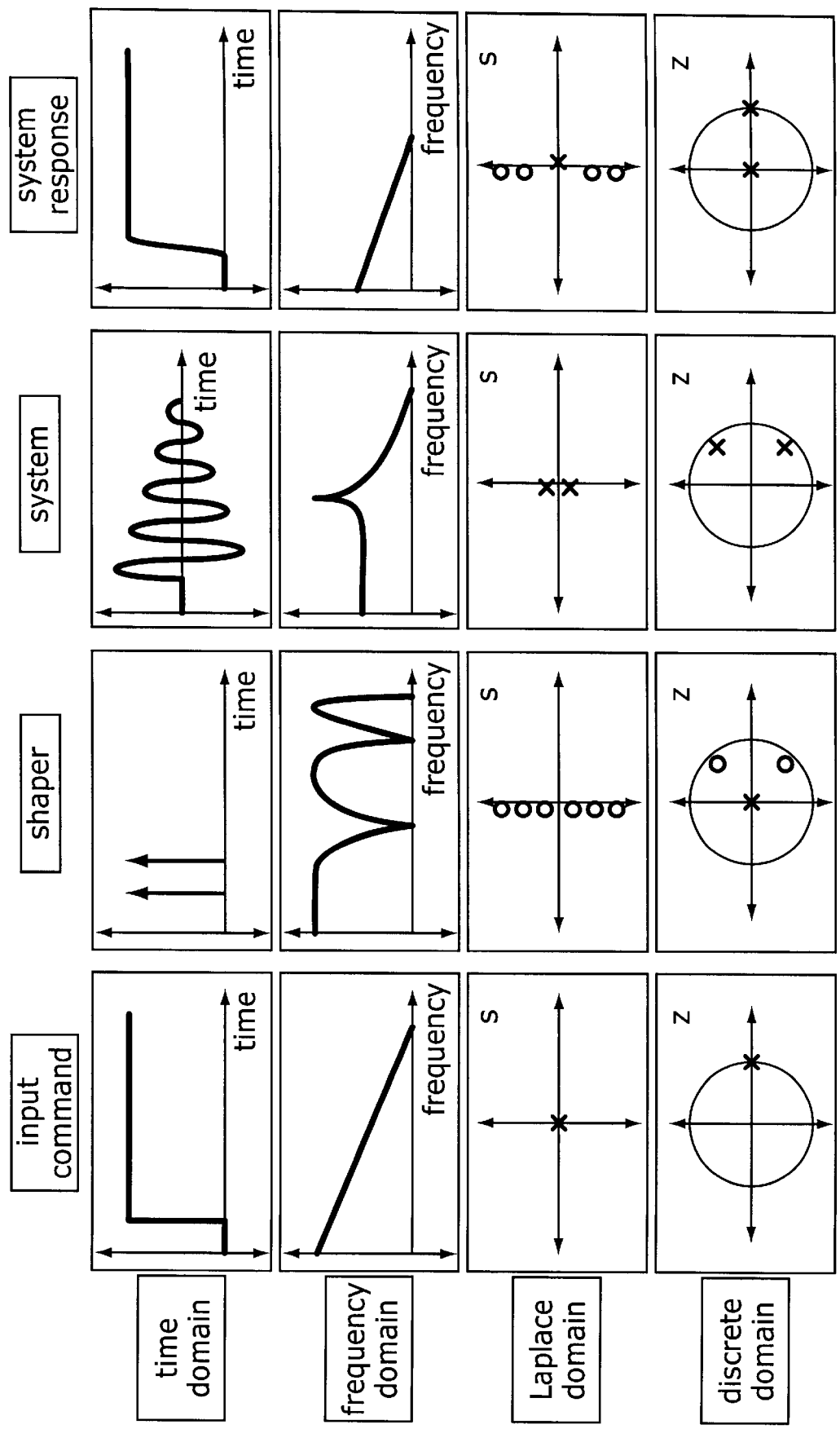
FIG. 11 illustrates input shaping in four different domains.
Figure 13:
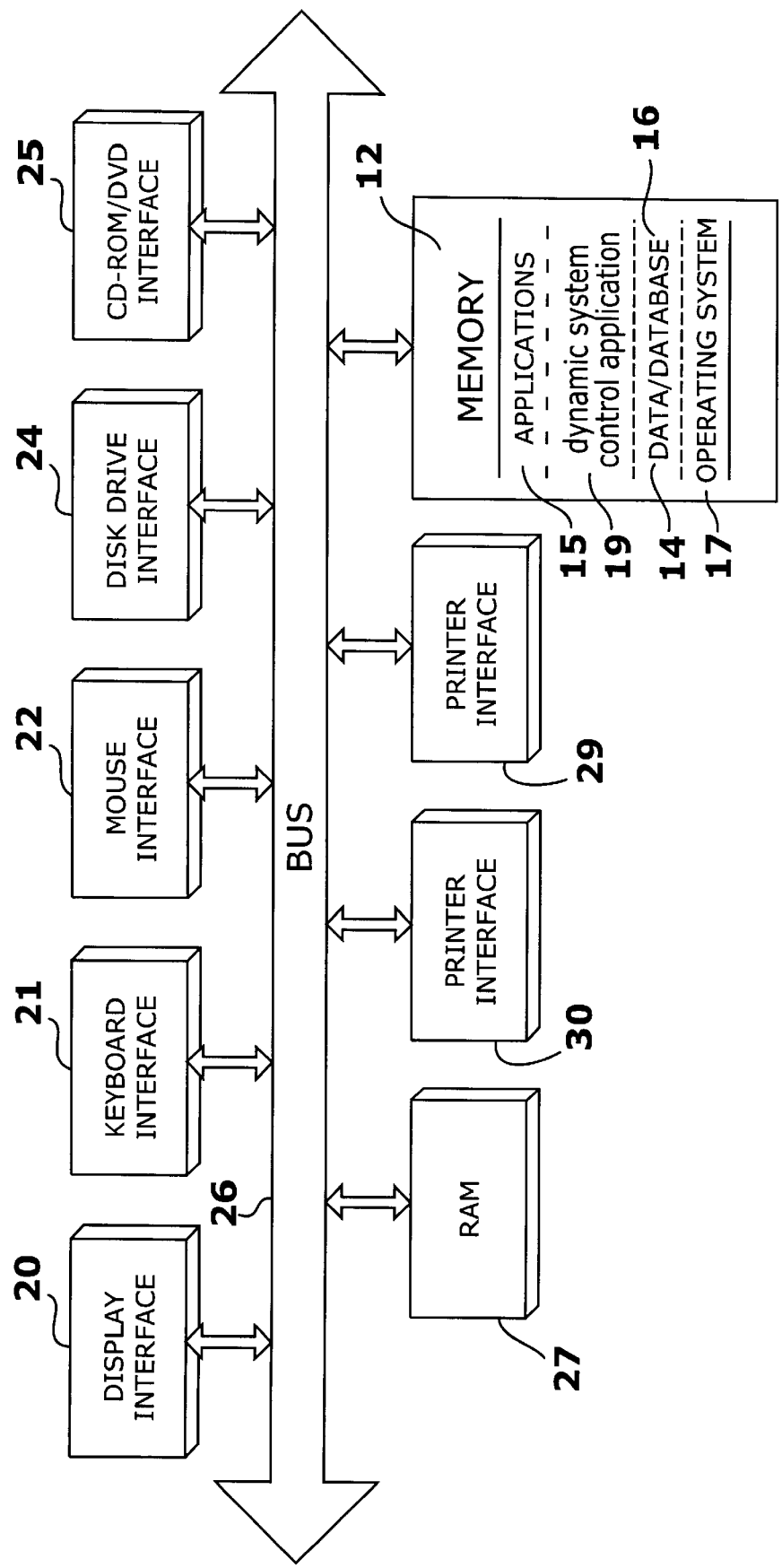
FIG. 13 shows the architecture of the computer system of FIG. 12.

FIG. 13 shows the internal structure of PC 1. As shown in FIG. 2, PC 1 includes memory 12, which comprises a computer-readable medium such as a computer hard disk and/or RAID ("redundant array of inexpensive disks"). Memory 12 stores data 14, applications 15, database 16, and operating system 17. In preferred embodiments of the invention, operating system 17 is a windowing operating system, such as Microsoft® Windows98; although the invention may be used with other operating systems as well. Among the applications stored in memory 12 is dynamic system control application 19, which stores code to implement the present invention in the manner described below.

PC 1 also includes display interface 20, keyboard interface 21, mouse interface 22, disk drive interface 24, drive interface 25, computer bus 26, RAM 27, processor 29, and printer interface 30. Processor 29 preferably comprises a microprocessor or the like for executing applications, such those noted above, out of RAM 27. Such applications, including application 19, may be stored in memory 12 (as noted above) or, alternatively, on a floppy disk in disk drive 9. Processor 29 accesses applications (or other data) stored on a floppy disk via disk drive interface 24 and accesses applications (or other data) stored on a CD-ROM or DVD via drive interface 25.

Application execution and other tasks of PC 1 may be initiated using keyboard 6 or mouse 7, commands from which are transmitted to processor 29 via keyboard interface 21 and mouse interface 22, respectively. Output results from applications running on PC 1 may be processed by display interface 20 and then displayed to a user on display 5 and/or output to an actuator of a dynamic system via, e.g., fax/modem connection 4. Display interface 20 preferably comprises a display processor for forming images based on image data provided by processor 29 over computer bus 26, and for outputting those images to display 5

3 Creating Time-Optimal Commands for Linear Systems

Turning to dynamic system control application 19, this application comprises computer-executable process steps (i.e., code) to determine an input command profile for a dynamic system that can be modeled as a linear system, where the input command profile is used to transition an output of the dynamic system from one point to another point. The application also includes code to identify characteristics of the dynamic system, and to select a command profile which defines an input to the dynamic system based on the identified characteristics. The command profile comprises one or more pulses which rise and fall at switch times and is useable with substantially any dynamic system that can be modeled as a linear system. The application further includes code to impose a plurality of constraints on the dynamic system, at least one of which is defined in terms of switch times, and then to determine the switch times for the input to the dynamic system based on the command profile and the plurality of constraints The following outlines the general procedure used by the invention to generate time-optimal actuator command profiles that transition a dynamic system from one rest state to another rest state as quickly as possible. In this process, it is assumed that the time-optimal command will deliver the system from a known initial rest state to a desired rest state without exceeding pre-specified actuator limits. Furthermore, it is assumed that the given system behavior can be represented by a linear system model. Given these assumptions, the procedure outlined above is followed to derive time-optimal commands. Once it has been shown how this procedure delivers reliable solutions to the time-optimal control problem, practical constraints are incorporated into this framework to yield more desirable optimal command profiles.

A complete description of the time-optimal solution approach for linear, SISO systems will be presented first. This presentation will follow the three-step framework above. In step one of this framework, a general parametric equation is defined to represent all candidate time-optimal command profiles. In the second step, a set of equations is determined to impose the constraints established in the problem statement. These equations comprise the minimum set of necessary constraints required to properly bound the time-optimal solution space. In the third and final step, recommendations are made for solving the constraint equations in order to extract the desired time-optimal command profile for a given system. With these steps complete, the specific solution of the time-optimal control problem for systems with only denominator dynamics is determined. This particular solution proves to be extremely useful for its simplicity. Finally, following a brief discussion about the influence of nonminimum phase zeros on the nature of the optimal command profiles, an overview is presented of the equations and solution approach provided by the invention.

3.1 Step 1: Select a Candidate Command Profile

Figure 14:
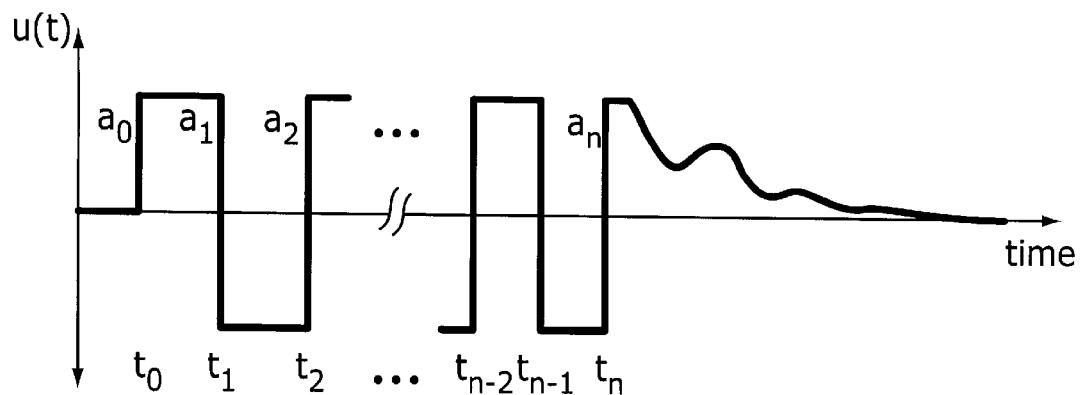
FIG. 14 shows a typical time-optimal command profile.

As discussed in section 2.3.3 above, Pontryagin's Minimum Principle and the Bang—Bang Principle dictate that the time-optimal command profiles for linear systems necessarily have a certain structure. For systems with no zeros, this structure is a simple pulse train with a finite number of pulses. For systems with both poles and zeros, the time-optimal command consists of a pulse train followed by a tail that is a linear combination of the responses at the frequencies of the system zeros. FIG. 14 illustrates a typical time-optimal command profile for a system with any type of linear dynamics. As this figure suggests, the structure of this command can be described by a small number of parameters such as the switch times, the switch amplitudes and the amplitudes of the components in the tail. More accurately, by defining some variables to represent these values, an analytic expression for a candidate time-optimal command profile can be written as $$u(t) = \sum_{j=0}^{n} a_j 1(t - t_j) + \sum_{j=1}^{r} c_j e^{z_j(t-t_n)} 1(t - t_n), \quad (3.1)$$

where
  1(t) is the unit step command and
  $a_j$=the amplitude of the steps in the pulse train,
  $t_j$=the switch times of the pulse train,
  $c_j$=the coefficients of the exponential terms in the command tail,
  $z_j$=the system zeros,
  n=the total number of switches, excluding the first, and
  r=the number of system zeros.

Note that, since the values of the system zeros, $z_j$, can be complex, the coefficients, $c_j$, corresponding to these complex zero values must also be complex so that the value of the command, u(t), is purely real. Using the same notation defined above, the Laplace Transform of the candidate time-optimal command can be expressed as $$U(s) = \frac{1}{s} \sum_{j=0}^{n} a_j e^{-st_j} + e^{-st_n} \sum_{j=1}^{r} \frac{c_j}{s - z_j}. \quad (3.2)$$

Given a linear system model, the number of system zeros, r, and their values, $z_j$, can be completely determined. Also, since the pulse train of a time-optimal command must always saturate the system actuators, the specified system actuator limits can be used to directly determine values for the step amplitudes, $a_j$. Consequently, for a given time-optimal control problem, the only unknowns that remain in equations 3.1 and 3.2 are the number, n, and values of the switch times, $t_j$, and the tail coefficients, $c_j$. As the following sections illustrate, if the problem constraints can be expressed in terms of these unknown command parameters, a solution process can be employed to identify optimal values for the command profile.

3.2 Step 2: Impose the Problem Constraints

As outlined above, the time-optimal control problem places a strict set of constraints on system response to a time-optimal command profile. In order to understand how these constraints influence the selection of an optimal command profile, they must first be expressed mathematically in terms of the parameters that define the input command. Additionally, to avoid over- or under-constraining the problem solution, the resulting constraint equations should represent the minimum set of necessary conditions required to characterize the desired time-optimal command solution.

From the time-optimal problem statement, three distinct constraints can be identified. The first of these constraints requires that the system begin and end at a rest state. This constraint, labeled the dynamics cancellation constraint, necessitates that any dynamics excited by the time-optimal input command must also be canceled by the command by the time the system reaches its final value. The second constraint imposed by the time-optimal control problem requires that the boundary conditions be satisfied. In particular, this constraint specifies the initial time of the time-optimal command and demands that the time-optimal command transition the system output by the desired amount. The third and final constraint imposed by the time-optimal control problem necessitates that the time-optimal input command never exceed the system actuator limits. This constraint, for obvious reasons, is called the actuator limits constraint.

In the remainder of this section, algebraic expressions are derived to capture each of these three problem constraints. For each of these three cases, the exact intention of the constraint will be expressed mathematically and related to the parameters that define the candidate command profile in equation 3.1. Following this derivation, the resulting constraint equations are then used to solve for the unknown values of the command profile that best satisfy the time-optimal control problem.

3.2.1 The Dynamics Cancellation Constraint

The dynamics cancellation constraint is largely responsible for the effectiveness of the solution approach outlined herein. Based on the intuitive concept of pole-zero cancellation, this section outlines how a powerful set of algebraic equations can be formulated to prevent time-optimal commands from exciting unwanted system dynamics. These equations, although general enough to apply to all types of linear systems, are simple enough to allow for fast implementation and solution. Furthermore, as illustrated by the detailed derivation in Appendix A, these equations can be shown to be necessary conditions for any time-optimal command profile. This section will proceed by first deriving the dynamics cancellation constraint equations for systems that have no repeated roots. Following this derivation, the more complex yet general equations for systems with repeated roots will be presented. For each derivation, the resulting equations will be presented in both standard mathematical form as well as a convenient matrix notation to allow for easy implementation.

Figure 15:
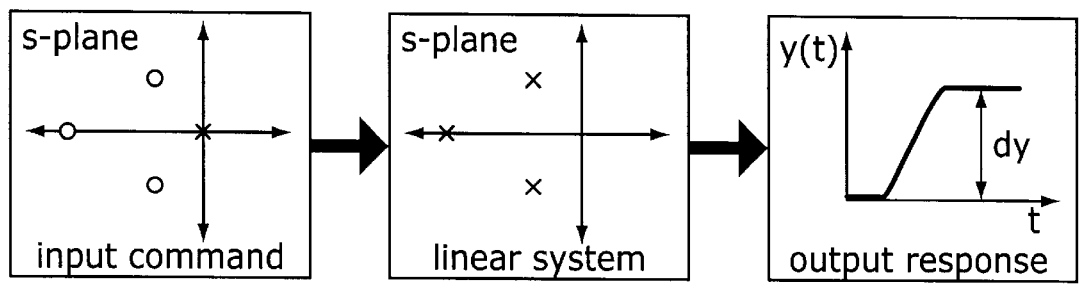
FIG. 15 shows the dynamics cancellation requirement, wherein the input command has zeros that cancel the system poles.

3.2.1.1 The Dynamics Cancellation Constraint Equations for Systems with No Repeated Roots The dynamics cancellation constraint is a mathematical statement of fact that the time-optimal command must move the system from one point and bring it to rest at another point. Previous research [48, 105, 113–115, 146] in the area of flexible system control has noted that, for the case of flexible modes, this constraint can be implemented by designing an input command that has zeros at the complex system poles, as depicted in FIG. 15. More specifically, Bhat [41] writes, "the necessary and sufficient condition for zero residual vibration is that the Laplace transform of the time-bounded control input have zero component at the system poles." This is an equivalent statement to the zero-vibration condition in Singer's input shaping approach [97] and can be used to derive a set of constraint equations governing the optimal command solution. However, unlike traditional command shaping approaches, the work in this document will illustrate that the dynamics cancellation principle applies not only to oscillatory modes, but to real modes, rigid-body modes, and minimum-phase zeros as well. Furthermore, by performing a complex derivation of the linear system response to a time-optimal command, Appendix A demonstrates that the dynamics cancellation equations developed in this section are necessary conditions for the time-optimal control of a linear system.

Figure 16:
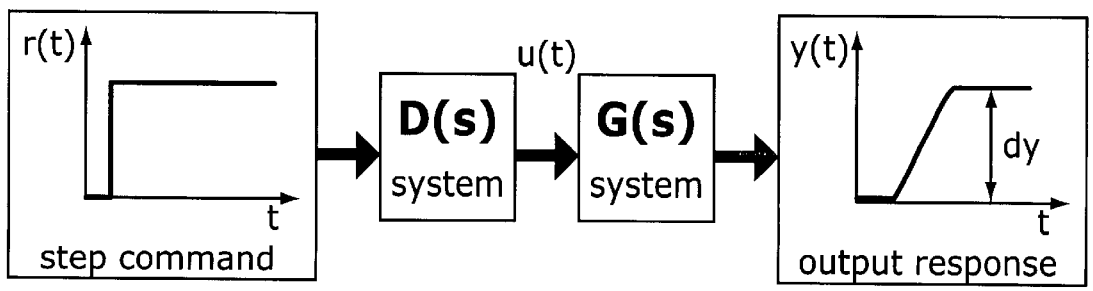
FIG. 16 shows an alternative illustration of the dynamics cancellation requirement.

Another view of the dynamics cancellation requirement for optimality is illustrated in FIG. 16. In this illustration, the optimal input command for a given system, $G(s)$, is generated by filtering a step command using a shaper, $D(s)$. In order to yield a shaped command, $u(t)$, that matches the time-optimal command profile of FIG. 14, this shaper must necessarily be identical to the impulse response of the time-optimal command profile, where the time-optimal impulse response, $d(t)$, is defined as the derivative of the time-optimal command, $u(t)$, itself. In the ideal case, the time-optimal command would move the system output from one point to another instantaneously. Therefore, the most desirable system response would be the one that most resembles, in some sense, a step command. Given that the input to the shaper, in the context of FIG. 16, is also a step command, it can be argued that the time-optimal shaper, $D(s)$, would be the one that exactly cancels the dynamics of the system, $G(s)$. In general, finding a $D(s)$ to exactly cancel $G(s)$ is not often possible. However, since the time-optimal impulse response is the derivative of the time-optimal command profile, $u(t)$, it will necessarily contain a series of impulses. Additionally, for the case of systems with numerator dynamics, it will also contain a tail with dynamic components at the location of the system zeros. If designed correctly, the tail of a time-optimal command will cancel any system numerator dynamics by placing poles at the locations of the system zeros. This can be seen in equation 3.2, by observing that the value of $U(s)$ is infinite when s is equal to the system zeros. The sequence of impulses from the pulse train of the time-optimal command, however, will have a Laplace Transform with an infinite number of zeros. If designed correctly, the time-optimal command can be constructed to place some of these zeros at the system poles. The impulse response of the time-optimal command will be the one that has exactly one zero at every system pole.

With this understanding, we will now proceed to derive the dynamics cancellation constraint equations for linear systems with no repeated roots. The goal of this derivation is to compose a set of simple equations that ensure that the time-optimal command has poles that cancel the system zeros and zeros that cancel the system poles. As described above, by properly constructing the tail of the candidate time-optimal command, the resulting command profile is automatically guaranteed to contain poles at the system zeros. The task at hand, then, is to fashion constraint equations that ensure that the time-optimal command also has zeros at the system poles. Since the location of the command zeros are determined by the switch times of the optimal command profile, these equations should provide a mathematically simple representation for relating the known system dynamics to the switch time values in the candidate time-optimal command.

We will begin the derivation from the fact that, as described above, the impulse response, $d(t)$, of the time-optimal command, $u(t)$, must be designed to have zeros at the locations of every system pole:

$$L\{d(t)\}|_{s=p_i} = D(s)|_{s=p_i} = 0, \qquad (3.3)$$

for i=1, 2, . . . , m, where $p_i$ is the i-th system pole, and m is the total number of system poles. This is equivalent to saying that the Laplace Transform of the derivative of the time-optimal command must have exactly one zero at each of the system poles:

$$L\left\{\frac{d}{dt}u(t)\right\}\bigg|_{s=p_i} = sU(s)|_{s=p_i} = 0. \qquad (3.4)$$

By substituting the expression for $U(s)$ from equation 3.2 into this result, the following algebraic or, more specifically, trigonometric equation can be derived:

$$\left[\sum_{j=0}^{n} a_j e^{-st_j} + e^{-st_n} \sum_{j=1}^{r} \frac{c_j s}{s - z_j}\right]_{s=p_i} = 0, \qquad (3.5)$$

for i=1, 2, . . . , m. This expression is the general form of the dynamics cancellation constraint for linear systems with no repeated roots. It expresses the requirement for rest-to-rest motion in terms of the parameters that define the command profile. In order to properly constrain the search for a time-optimal command profile, this expression must be evaluated for every system pole, $p_i$, including real, complex, and rigid-body poles. For real and rigid-body poles, this expression will yield a single real-valued constraint. For complex pole pairs, this equation will yield the identical result for each complex-conjugate pole. This result, however, will have a complex value, and its corresponding real and imaginary parts must both be set to zero to properly enforce the constraint.

To better facilitate the computer implementation of this dynamics cancellation requirement, a simple matrix expression can be defined that imposes the constraint in equation 3.5 for every system pole. Before this expression can be presented, however, a convenient set of vectors must first be defined:

$$s = \begin{bmatrix} p_1 \\ p_2 \\ \vdots \\ p_m \end{bmatrix} \text{ system poles,} \quad (3.6)$$

$$a = \begin{bmatrix} a_1 \\ a_2 \\ \vdots \\ a_n \end{bmatrix} \text{ pulse train step amplitudes,} \quad (3.7)$$

$$c = \begin{bmatrix} c_1 \\ c_2 \\ \vdots \\ c_r \end{bmatrix} \text{ coefficients of the command tail,} \quad (3.8)$$

$$z = [z_1 \; z_2 \; \cdots \; z_r] \text{ system zeros, and} \quad (3.9)$$

$$t = [t_o \; t_1 \; \cdots \; t_n] \text{ command switch times,} \quad (3.10)$$

where, n=the total number of switches, excluding the first, m=the total number of system poles, and r=the total number of system zeros.

Given these vector definitions, the matrix form of the dynamics cancellation constraint can be written as $$exp(-st)a + M.*exp(-st_n) = 0, \quad (3.11)$$

where $$M = (1./(1-(1./s)z))c. \quad (3.12)$$

Note that, in these expressions, the function exp ( ) refers to the element-by-element exponential rather than the matrix exponential, the operator .* refers to the element-by-element multiplication, and the operator ./ refers to the element-by-element division. These equations can be easily entered into a linear algebra software package, such as Matlab [215], to evaluate the dynamics cancellation constraints. Substituting the vector definitions into these matrix equations and calculating the result will yield a column vector with m elements. Each of these elements represents the value of equation 3.5 evaluated at each of the m different system poles.

An example of the Matlab code required to implement the above constraints is shown in Table 3.1. As this listing illustrates, only three lines of code are required. Additionally, since the equations are algebraic and implemented as vector operations, computational requirements are small. In this code, the values of all the constraints are returned in a vector. This vector, which can contain both real and imaginary components, must be completely zero for the command that satisfies the time-optimal control problem. Note that, since the constraint equations for complex pole pairs are identical, only one of the poles in the pair needs to be evaluated for the dynamics cancellation requirement. Also, since the dynamics cancellation constraint for the first system rigid-body mode is automatically satisfied by the correct selection of the pulse train amplitudes, it can also be ignored in constraint calculation. This point can be better seen by evaluating equation 3.16 for the rigid-body pole, that is, for s=0.

TABLE 3.1

Matlab code to implement the dynamics cancellation constraint for systems that have no repeated roots

```
% Given the vectors, s, a, c, z, and t defined according to
% equations 3.6 through 3.10, this code calculates the
% dynamics cancellation constraints for systems with no
% repeated roots and returns them in the vector dc_constr.
% Any time-optimal command must necessarily yield a value
% of zero for each of these constraints
n = length(t);
M = (1./(1-(1./s)*z))*c;
dc_constr = exp(-s*t)*a + M.*exp(-s*t(n));
```

3.2.1.2 The Dynamics Cancellation Constraint Equations for Systems with Repeated Roots For systems with repeated roots, the dynamics cancellation equations prove to be somewhat more complex, to express. Despite this added notational complexity, these equations still retain the computational simplicity of the equations for systems with no repeated roots. As a result, solutions derived using these equations can still be found quickly and reliably. Furthermore, due to their unique properties in the Laplace domain, these constraints will prove valuable below for deriving time-efficient commands with enhanced robustness to system uncertainty. The derivation in this section will proceed by first developing the general mathematical equations and then a convenient matrix expression to impose this constraint. In order to illustrate the manageable implementation complexity of the result, an example of representative computer code to express these equations will also be presented.

The dynamics cancellation constraint for systems with nonrepeated poles is given in equation 3.5. For systems that have more than one pole at a single location, there must be one unique constraint equation for every pole in the system. For the first pole at a location, equation 3.5 still applies. However, for additional poles, a new type of constraint is required. In general, for a system that has $q_T$ repeated poles at a single location, the required constraint equations for each of the poles are $$\text{pole 1: } sU(s)\big|_{s=p_i} = 0 \quad (3.13)$$

$$\text{pole 2: } \frac{d(sU(s))}{ds}\bigg|_{s=p_i} = 0$$

$$\text{pole 3: } \frac{d^2(sU(s))}{ds^2}\bigg|_{s=p_i} = 0$$

$$\vdots$$

$$\text{pole } q_T: \left. \frac{d^{q_T-1}(sU(s))}{ds^{q_T-1}} \right|_{s=p_i} = 0,$$

where U(s) is the Laplace Transform of the candidate time-optimal command, u(t), and $p_i$ is the value of the repeated system pole. By substituting the expression for U(s) in equation 3.2, we can rewrite these equations as $$\text{pole 1: } \left[ \sum_{j=0}^{n} a_j e^{-st_j} + e^{-st_n} \sum_{j=1}^{r} \frac{c_j s}{s-z_j} \right]_{s=p_i} = 0 \quad (3.14)$$

$$\text{pole 2: } \frac{d}{ds} \left[ \sum_{j=0}^{n} a_j e^{-st_j} + e^{-st_n} \sum_{j=1}^{r} \frac{c_j s}{s-z_j} \right]_{s=p_i} = 0$$

$$\vdots$$

$$\text{pole } q_T: \left. \frac{d^{q_T-1}}{ds^{q_T-1}} \left[ \sum_{j=0}^{n} a_j e^{-st_j} + e^{-st_n} \sum_{j=1}^{r} \frac{c_j s}{s-z_j} \right] \right|_{s=p_i} = 0,$$

where the variables in this expression are defined as in section 3.1. Therefore, if a system has a pole of multiplicity 3 at a certain location, $p_i$, then three equations in this series must be used to properly specify the dynamics cancellation constraint for that pole location.

Now, in order to implement these equations, the analytic solution for the multiple derivative in the dynamics cancellation constraint, as in the above equations, must be found. This can be done more easily by placing the above equations in the form $$\left. \frac{d^{q_T-1}}{ds^{q_T-1}} \left[ \sum_{j=0}^{n} a_j e^{-st_j} + e^{-st_n} \sum_{j=1}^{r} \left( \frac{c_j s}{s-z_j} \right) \right] \right|_{s=p_i} = 0. \quad (3.15)$$

Although not shown here, a little math will illustrate that this expression is identical to the ones in equation 3.14 for the case where $q_i = 1, 2, \ldots, q_T$, where $q_i$ represents the multiplicity of each system pole, $p_i$. For example, for a system with two identical poles, the first pole, $p_1$, would have $q_1 = 1$, and the second, $p_i$, would have $q_2 = 2$. Any nonrepeated system poles would have $q_i = 1$. Evaluating the derivative in this equation analytically yields equations of the following forms:

For a single pole at $s = p_i$, that is for $q_i = 1$, equation 3.15 becomes $$\left[ \sum_{j=0}^{n} a_j e^{-st_j} + e^{-st_n} \sum_{j=1}^{r} \left( \frac{c_j s}{s-z_j} \right) \right]_{s=p_i} = 0.$$

Similarly, for a second pole at $s = p_i$, $q_i = 2$, equation 3.15 becomes $$\left[ \sum_{j=0}^{n} a_j t_j e^{-st_j} + e^{-st_n} \sum_{j=1}^{r} \left( c_j t_n + \frac{c_j z_j}{(s-z_j)} t_n + \frac{c_j z_j}{(s-z_j)^2} \right) \right]_{s=p_i} = 0.$$

Again, for a third pole at $s = p_i$, $q_i = 3$, equation 3.15 becomes $$\left[ \sum_{j=0}^{n} a_j t_j^2 e^{-st_j} + \right.$$

$$\left. e^{-st_n} \sum_{j=1}^{r} \left( c_j t_n^2 + \frac{c_j z_j}{(s-z_j)} t_n^2 + \frac{2 c_j z_j}{(s-z_j)^2} t_n + \frac{2 c_j z_j}{(s-z_j)^3} \right) \right]_{s=p_i} = 0.$$

By observing the pattern followed by this series of equations, insight can be gained about a general analytic expression that can capture all of these constraints. This expression can be written as follows:

$$\left\{ \sum_{j=0}^{n} a_j t_j^{q_i-1} e^{-st_j} + \right. \quad (3.16)$$

$$\left. e^{-st_n} \sum_{j=1}^{r} \left[ c_j t_n^{(q_i-1)} + \sum_{k=1}^{q_i} (\beta_{q_i}(k)) \frac{c_j z_j}{(s-z_j)^k} t_n^{(q_i-k)} \right] \right\}_{s=p_i} = 0.$$

For a repeated pole of multiplicity $q_T$, this expression must be evaluated $q_T$ times, once for every $q_i = 1, 2, \ldots, q_T$. In this equation, the variable $\beta_{q_i}$ represents a function that determines the value of the coefficient for the appropriate term in the equation. This function can be calculated recursively using the formula $$\beta_1(k) = \begin{cases} 1, & \text{for } k = 1 \\ 0, & \text{for } k \neq 1 \end{cases} \quad (3.17)$$

$$\beta_{q_i}(k) = \beta_{q_i-1}(k) + (k-1) \cdot \beta_{q_i-1}(k-1).$$

Table 3.2 lists a range of values for this function $\beta$ that were calculated using this formula.

In order to correctly specify the dynamics cancellation constraints for a given system, equation 3.16 must be specified once for every system pole, $p_i$. In each equation, the value of $q_i$ corresponding to each system pole must be used. As stated before, for nonrepeated system poles, $q_i = 1$, and for repeated poles of multiplicity $q_T$, $q_i = 1, 2, \ldots, q_T$.

TABLE 3.2

Selected values for the function $\beta$

| | k = 1 | k = 2 | k = 3 | k = 4 | k = 5 | k = 6 |
|---|---|---|---|---|---|---|
| $\beta_1(k)$ | 1 | 0 | 0 | 0 | 0 | 0 |
| $\beta_2(k)$ | 1 | 1 | 0 | 0 | 0 | 0 |
| $\beta_3(k)$ | 1 | 2 | 2 | 0 | 0 | 0 |
| $\beta_4(k)$ | 1 | 3 | 6 | 6 | 0 | 0 |
| $\beta_5(k)$ | 1 | 4 | 12 | 24 | 24 | 0 |
| $\beta_6(k)$ | 1 | 5 | 20 | 60 | 120 | 120 |

Given this general expression for the dynamics cancellation constraints that can accommodate systems with repeated roots, a matrix equation can be developed to allow for easy implementation. Specifically, by using the vector definitions in equations 3.6 through 3.10, the following equation can be defined:

$$\exp(-st)T^{(q_i-1)}a + \left[\alpha t_n^{(q_i-1)} + \left(\sum_{k=1}^{q_i} \beta_{q_j}(k)F^{\cdot k} t_n^{(q_i-k)}\right)h\right].^*\exp(-st_n) = 0, \quad (3.18)$$

where the following definitions hold $\exp(\ )\equiv$element-by-element exponential of a matrix or vector, $.(\ )\equiv$element-by-element math operation, T≡diagonal matrix with the switch time vector, t, along the diagonal, $$\alpha = \sum_{j=1}^{r} c_j,$$

$\beta(\ )$ is defined as in equation 3.17, $$F = \begin{bmatrix} \frac{1}{p_1 - z_1} & \frac{1}{p_1 - z_2} & \cdots & \frac{1}{p_1 - z_r} \\ \frac{1}{p_2 - z_1} & \ddots & & \vdots \\ \vdots & & & \\ \frac{1}{p_m - z_1} & \cdots & & \frac{1}{p_m - z_r} \end{bmatrix}, \text{ and}$$

$$h = c.^*z^T = \begin{bmatrix} c_1 z_1 \\ c_2 z_2 \\ \vdots \\ c_r z_r \end{bmatrix}.$$

For a system with poles all having the same multiplicity, $q_T$, equation 3.18 can be evaluated once for every value of $q_i$, where $q_i=1, 2, \ldots, q_T$, to impose all of the necessary dynamics cancellation constraints. In general, all poles in a given system do not have the same multiplicity. In these cases, equation 3.18 must first be calculated for every pole with a multiplicity of 1, and then for only the poles of multiplicity 2, 3, etc. In order to aid this calculation, a multiplicity vector, q, can be defined. This vector contains the corresponding multiplicity value, $q_i$, for every system pole, and, consequently is the same length as the vector s. For example, in a system with poles s=[−4 −6 −6]$^T$, the corresponding multiplicity vector should be q=[1 1 2]. Using this definition, Table 3.3 lists a segment of Matlab code that is a possible implementation of equation 3.18 for systems with poles with different multiplicities. From this listing, it can be seen that the full implementation of the dynamics cancellation constraint for any kind of linear system requires less than twenty lines of code. Additionally since all of the calculations in this code are algebraic and can be expressed largely as vector operations, the computational requirements of this code are small. By incorporating this code, as well as the other problem constraints, into an optimization routine, solutions for the time-optimal command for any kind of linear SISO system can be found.

TABLE 3.3

Matlab code to implement the full dynamics cancellation constraint for systems that can include repeated roots

```
% Given the vectors, s, a, c, z, and t defined according to
% equations 3.6 through 3.10, this code calculates the complete
% set of dynamics cancellation constraints and returns them
% in the vector dc_constr. Any time-optimal command
% must necessarily yield a value of zero for each of these
% constraints. This code also requires the multiplicities of
% each system pole to be stored in the vector q.
dc_constr = [ ];
n = length(t); r = length(z);
T = diag(t);
alpha = sum(c);
beta = 1;
h = c.*(z.');
for qi = 1:max(q),
    ind = find(q>=qi);   s = s(ind); q = q(ind);
    E = exp(-s*t);
    Etn = exp(-s*t(n));
    F = 1./(s*ones(1, r) - ones(length(s), 1)*z);
    val = 0;
    for k = 1:qi,
        val = val + (beta(k) * (F.^k) * (t(n)^(qi-k)));
    end;
    R = E*(T^(qi-1))*a + (alpha*(t(n)^(qi-1)) + val*h).*Etn;
    dc_constr = [dc_constr; R];
    beta = [beta 0] + [0 cumsum(ones(1, qi)).*beta];
end;
```

3.2.2 The Boundary Condition Constraint

Figure 17:
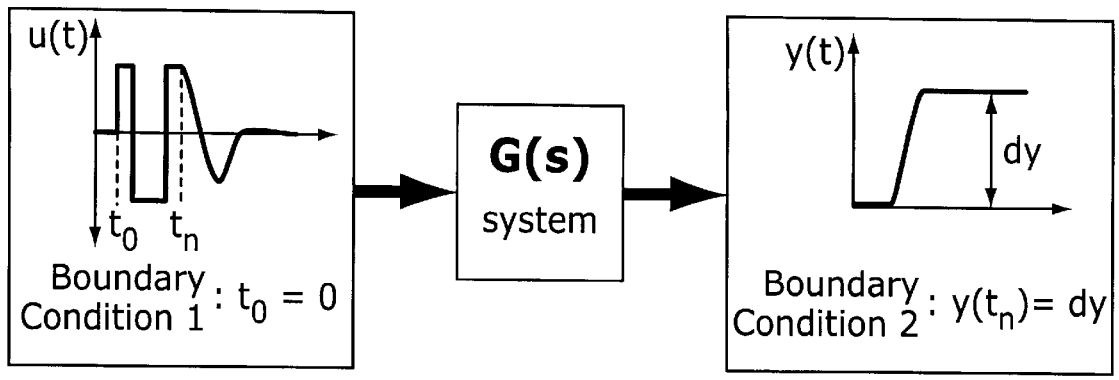
FIG. 17 shows the time-optimal control problem's boundary conditions.

In addition to the dynamics cancellation constraints, the problem boundary conditions must also be established mathematically. Specifically, for the time-optimal control problem, as illustrated in FIG. 17, two boundary conditions are required. The first sets the initial time of the optimal command to zero and is trivial to implement:

$$t_0=0. \quad (3.19)$$

The second boundary condition, which requires that the system output change by the desired amount, dy, is more complicated to express. In general, if the dynamics cancellation constraints are successfully satisfied by an optimal command profile, at the end of the pulse train of the optimal command, the system output, y(t), will remain at rest at some final value. The boundary condition constraint must be selected to ensure that this value agrees with the specified dy. One possible way to do this is simulate the time response of the system to the candidate optimal input command and impose the following constraint:

$$y(t_n)=dy. \quad (3.20)$$

If this approach is used in a numerical optimization of the problem constraints, the system state-transition matrix would have to be calculated during every iteration. This numerically intensive procedure would likely result in undesirably long solution times.

A better approach for expressing the second boundary condition is to use the Final Value Theorem [216] to derive a single expression relating dy to the unknown command parameters. This can be done as follows. First, from the system transfer function, an expression can be derived for the Laplace Transform of the output response, Y(s):

$$\frac{Y(s)}{U(s)} = G(s) \Rightarrow Y(s) = G(s)U(s). \quad (3.21)$$

Now, from the Final Value Theorem, $$dy = \lim_{s \to 0}(sG(s)U(s)). \tag{3.22}$$

Substituting the expression for U(s) in equation 3.2 into this equation yields $$dy = \lim_{s \to 0}\left(G(s)\left[\sum_{j=0}^{n} a_j e^{-st_j} + e^{-st_n}\sum_{j=1}^{r} \frac{c_j s}{s - z_j}\right]\right). \tag{3.23}$$

Now, in general, the system transfer function, G(s), can be rewritten in the form $$G(s) = \frac{s^{rbz}N(s)}{s^{rbp}D(s)}, \tag{3.24}$$

where rbp is the number of rigid-body poles, that is poles at the s-plane origin, in the system, rbz is the number of rigid-body zeros, that is zeros at the s-plane origin, in the system, and N(s) and D(s) contain only non-rigid dynamics. Depending on the number of rigid-body poles and zeros in the system, the solution of equation 3.23 can take on three different forms. Each of three cases will be considered independently:

Case 1: G(s) has excess rigid-body zeros (rbz>rbp).

In this case, applying the Final Value Theorem reveals that the final value of the system in response to the time-optimal command will always be zero. In general, if G(s) has any uncancelled zeros at the s-plane origin, it will be impossible to transition the output from one rest state to another using a bounded input. For example, for the case of a system with a single rigid-body zero, the type of command profile required to move the output to a new rest state is a ramp. Since this type of command will eventually exceed the system actuator limits, there is no time-optimal command that will satisfy the problem constraints.

Case 2: G(s) has no rigid-body poles or zeros (rbz=rbp).

In this case, equation 3.23 can be written in the following form:

$$dy = \lim_{s \to 0}\left(\frac{N(s)}{D(s)}\right)\left[\sum_{j=0}^{n} a_j(1) + (1)\sum_{j=1}^{r} \frac{c_j(0)}{-z_j}\right], \tag{3.25}$$

which then reduces to $$dy = \lim_{s \to 0}\left(\frac{N(s)}{D(s)}\right)\sum_{j=0}^{n} a_j. \tag{3.26}$$

Therefore, implementing this constraint is straightforward. All that is required is that the sum of the step amplitudes multiplied by the transfer function steady-state gain is equal to dy. Since the transfer function steady-state gain can be readily determined from the given system model, this condition can be met by properly selecting the step amplitudes. More specifically, given that the values for all of the step amplitudes except the last, $a_n$, must be set so that the command profile saturates the system actuators, their values are dictated by the given actuator limits. Consequently, equation 3.26 can be used to directly calculate the optimal value for $a_n$ to meet the specified boundary conditions.

Case 3: G(s) has excess rigid-body poles (rbz<rbp).

In this case, equation 3.23 takes the following form:

$$dy = \lim_{s \to 0}\left(\frac{N(s)}{D(s)}\right) \cdot \frac{1}{0} \cdot \left[\sum_{j=0}^{n} a_j(1) + (1)\sum_{j=1}^{r} \frac{c_j(0)}{-z_j}\right]. \tag{3.27}$$

Due to the rigid-body poles in the system transfer function, this equation has a (1/0) term. Additionally, since the dynamics cancellation equation for the rigid-body pole, which can be derived from equation 3.5 for s=0, results in the expression $$\sum_{j=0}^{n} a_i = 0, \tag{3.28}$$

it can be seen that equation 3.27 will be indeterminate of the form (0/0). Since this is the case, L'Hospital's Rule [217] can be invoked to calculate the limit in equation 3.23. L'Hospital's Rule states that if f(x) and g(x) are zero at x=a, then $$\lim_{x \to a}\frac{f(x)}{g(x)} = \frac{f'(x)}{g'(x)}\bigg|_{x=a}. \tag{3.29}$$

This rule can be applied as many times as necessary to reach a determinate result. For very simple systems, L'Hospital's Rule can be used to solve for the boundary condition constraints by hand. However, it is difficult to derive a general analytic expression for the solution of equation 3.23 using this approach. A better approach, that is conceptually simpler, easier to implement in computer code, and numerically comparable is the following.

For a system with rbp rigid-body modes, $$G(s) = \frac{N(s)}{s^{rbp}D(s)}, \tag{3.30}$$

the Final Value Theorem can be used, as before, to relate the system dynamics and input command to the desired output response, dy:

$$dy = \lim_{s \to 0}(s\, G(s)\, U(s)) \tag{3.31}$$

$$= \lim_{s \to 0}\left(\frac{N(s)}{D(s)} \cdot \frac{1}{s^{rbp}} \cdot s\, U(s)\right)$$

$$= \lim_{s \to 0}\left(\frac{N(s)}{D(s)}\right) \cdot \lim_{s \to 0}\left(\frac{1}{s^{rbp}} \cdot s\, U(s)\right).$$

Figure 18:
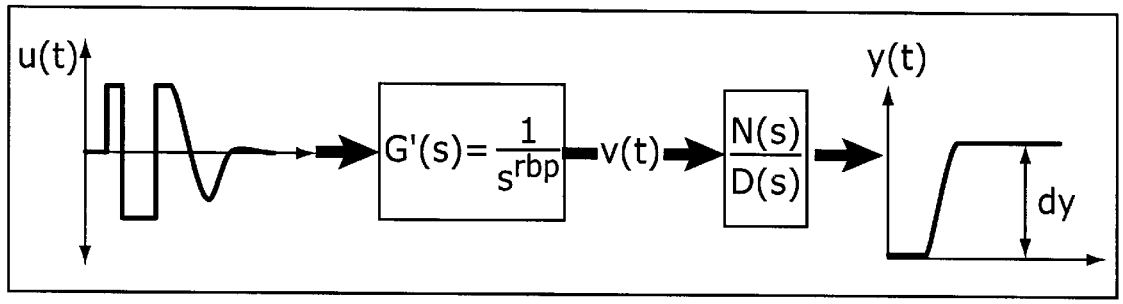
FIG. 18 is another view of the boundary condition constraint.

Now, since by the Final Value Theorem, we know that the expression $$dv = \lim_{s \to 0}(s\, G'(s)\, U(s)) = \lim_{s \to 0}\left(s \cdot \frac{1}{s^{rbp}} \cdot U(s)\right) \tag{3.32}$$

implies that dv is the steady-state output of some system, G'(s), to the candidate time-optimal input command, u(t). As implied by equation 3.32, and illustrated in FIG. 18, this system has the transfer function $$G'(s) = \frac{1}{s^{rbp}}. \tag{3.33}$$

Following this logic, we can then combine equations 3.31 and 3.32 to yield the simpler expression $$dy = \lim_{s \to 0} \left(\frac{N(s)}{D(s)}\right) \cdot dv. \qquad (3.34)$$

Now, since dv is the steady state output of a system that consists of a cascade of simple integrators to the input command, u(t), an expression for dv can be formulated as follows:

$$dv = \int^{(rbp)} u(t) dt \bigg|_{t=\infty}. \qquad (3.35)$$

In other words, dv is equal to the rbp-th integral of the candidate command profile evaluated at t=∞. Given the block diagram in FIG. 15, and the facts that (1) the transfer function N(s)/D(s) has no rigid-body poles or zeros and (2) the time-optimal command will move the system output, y(t), from one rest state to another, then it can be determined that dv will almost always approach some finite steady-state value as t goes to ∞. Consequently, equation 3.35 will almost always yield a valid result. The only exceptions to this statement are the cases when the time-optimal command has a tail that has undamped or unstable oscillation. In these situations, the integral in equation 3.35 will not converge as t goes to ∞. However, as will be discussed later herein, creating time-optimal commands with undamped or unstable oscillation is bad design practice and should not be implemented on a real system.

Therefore, by combining equations 3.34 and 3.35, an expression for the second boundary condition can be finalized:

$$dy = \lim_{s \to 0} \left(\frac{N(s)}{D(s)}\right) \cdot \left(\int^{(rbp)} u(t) dt\right)\bigg|_{t=\infty}. \qquad (3.36)$$

In order to implement this equation, all that is required is to take the limit of N(s)/D(s), which is trivial given the system transfer function, and to integrate u(t) from 0 to ∞ rbp times. To perform this integration, a numerical integration routine could be performed during the problem optimization, but this is very numerically intensive. A better approach is to use an analytic solution for the integral of the time-optimal command profile to calculate this expression. Appendix B hereto presents the derivation and resulting algebraic equations that can be used to analytically evaluate this integral. These equations and their computer implementation are highly streamlined and require very little computational effort.

3.2.3 The Actuator Limit Constraint

Figure 19:
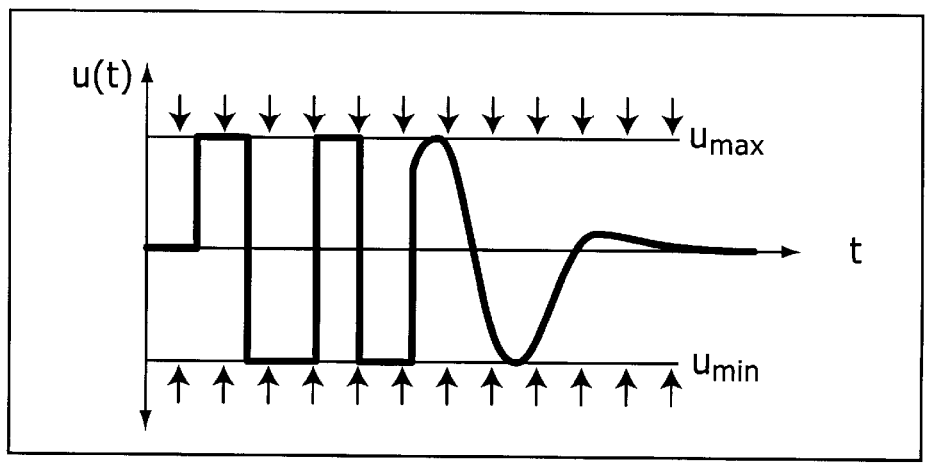
FIG. 19 shows the actuator limits constraint.

The final constraint required to bound the solution space of the time-optimal control problem is perhaps the most straightforward to implement. This constraint, called the actuator limit constraint, ensures that the input command profile will not exceed the specified system actuator limits, as shown in FIG. 19. For the case of a time-optimal command profile that contains no tail, the actuator limits are enforced by properly selecting the pulse train amplitudes to meet, but not exceed, the given actuator limits. When a tail is appended to the pulse train in the optimal command profile, a little more care must be taken to impose this constraint. Specifically, the second term in equation 3.1 can be used to calculate the profile of the tail during the solution of the constraint equations:

$$u_{tail}(t) = \sum_{j=1}^{r} c_j e^{z_j(t-t_n)} 1(t - t_n). \qquad (3.37)$$

By requiring that the tail profile at all times remain within the actuator limits, an additional constraint equation can be formulated:

$$u_{min} \leq u_{tail}(t) \leq u_{max}. \qquad (3.38)$$

To implement this equation in an optimization routine, equation 3.37 must be evaluated over a reasonable time-length at some sampling interval. From the result, the maximum and minimum value of the command can be determined and constrained by equation 3.38.

3.3 Step 3: Solve and Verify

The three types of constraint equations derived in Step 2 above comprise the minimum set of constraint equations required to determine the solution for a time-optimal command profile. In some cases, for very simple systems, these equations can be solved analytically. Some of these solutions are outlined in section 4 below. However in most cases, the constraint equations are too complex to succumb to analytic solution and must be solved using an optimization process.

The basic procedure for finding optimal commands begins by setting the values of the command amplitudes, $a_j$, from the given actuator limits and taking an initial guess for the command switch times, $t_j$. A constrained optimization process, such as the one in the Matlab Optimization Toolbox [218], can then be used to search for the shortest set of switch times that satisfy equations 3.16, 3.19, 3.36, and 3.38. From the result, equation 3.1 can be used to calculate the profile of the time-optimal command. Although search times rely on the quality of the initial guess, they are typically on the order of seconds due to the simplicity of the constraint equations presented herein.

Since optimization processes can be vulnerable to sub-optimal local minima, this solution approach cannot guarantee that the time-optimal command will always be found. Fortunately, Pontryagin's Minimum Principle provides a set of necessary and sufficient conditions to verify the optimality of a given command profile. These conditions can be used to complement an optimization routine and ensure that the solution procedure presented above generally returns a time-optimal result. Section 6 below discusses both the solution approach and the verification process in more detail.

3.4 The Reduced Equations for Systems with Only Poles

As discussed in section 2.3.3 above, time-optimal command profiles for systems with poles and zeros contain a pulse train followed by a tail. For systems that have only poles and no zeros, the tail is not required. As a result of this simpler command structure, the constraint equations for systems that contain only poles are far less complex than those for the more general case. Due to this simplicity, these reduced equations often prove useful for deriving quick solutions for many kinds of systems. For example, many systems can be modeled accurately using solely denominator dynamics. When this is the case, the reduced equations should be used to derive the time-optimal command profile. Additionally, in some systems, such as ones with a high degree of dynamic uncertainty, the presence of a tail in the input command might be undesirable. In these cases, the system numerator dynamics can be ignored during command derivation to produce a command profile with only a pulse train and no tail. This section will proceed by first presenting an expression for a candidate command profile for a system with only poles. Based on this expression, the reduced form of the three problem constraints will be outlined, and an implementation and solution of these equations will be provided.

3.4.1 The Candidate Command Profile Equation

For a system with only poles, the time-optimal command will consist of a pulse train. Consequently, the analytic expression to represent this family of commands is simply $$u(t) = \sum_{j=0}^{n} a_j 1(t-t_j), \quad (3.39)$$

where the notation is the same as defined for equation 3.1. Similarly, taking the Laplace Transform of this expression yields the result $$U(s) = \frac{1}{s}\sum_{j=0}^{n} a_j e^{-st_j}. \quad (3.40)$$

3.4.2 The Dynamics Cancellation Constraint

Following a similar approach as in section 3.2.1, the equations that describe the time-optimal command profile can be used to derive constraints that ensure rest-to-rest motion in the system output. This derivation relies on the fact the time-optimal command must have zeros at the locations of the system poles. Without going into the details of this derivation, the resulting reduced form of the dynamics cancellation constraint equations is presented below.

3.4.2.1 Dynamics Cancellation Constraint Equations for Systems with No Repeated Roots Using the same notation as in equation 3.5, the dynamics cancellation constraint for linear systems with only nonrepeated denominator dynamics can be stated as $$\left(\sum_{j=0}^{n} a_j e^{-st_j}\right)\bigg|_{s=p_i} = 0, \quad (3.41)$$

where this equation is evaluated at the value of every system pole, $p_i$, for $i=1, 2, \ldots, m$. Furthermore, by using the vector definitions in equations 3.6 through 3.10, this constraint can be expressed in a compact matrix notation:

$$\exp(-st)a=0, \quad (3.42)$$

where $\exp(\ )$ is the element-by-element exponential. This matrix expression yields a vector of constraint values with one value for every system pole. Not only is this expression computationally simple, but it can be expressed with a single line of Matlab code.

3.4.2.2 Dynamics Cancellation Constraint Equations for Systems with Repeated Roots For systems with repeated poles, the reduced form of the dynamics cancellation constraint takes on a slightly different form:

$$\left(\sum_{j=0}^{n} a_j t_j^{q_i-1} e^{-st_j}\right)\bigg|_{s=p_i} = 0. \quad (3.43)$$

For a repeated pole of multiplicity $q_T$, this expression must be evaluated $q_T$ times, once for every $q_i=1, 2, \ldots, q_T$. In matrix notation, this equation can be written as $$\exp(-st)T^{(q_i-1)}a=0, \quad (3.44)$$

where the notation is the same as in equation 3.18. For a system with poles all having the same multiplicity, $q_T$, this equation can be evaluated once for every value of $q_i$, where $q_i=1, 2, \ldots, q_T$, to impose all of the necessary dynamics cancellation constraints. For systems with poles of different multiplicities, the Matlab code in Table 3.4 can be implemented to impose the required dynamics cancellation constraints.

TABLE 3.4

Matlab code to implement the dynamics cancellation constraints for systems with just poles.

% Given the vectors, s, a, and t defined according to
% equations 3.6 through 3.10, this code calculates the
% set of dynamics cancellation constraints for systems
% with just poles and returns the result in the vector
% dc_constr. Any time-optimal command must necessarily
% yield a value of zero for each of these constraints.
% This code also requires the multiplicities of
% each system pole to be stored in the vector q.
dc_constr = [ ];
E = exp(-s*t);
for qi = 1:max(q),
    R = E(find(q>=qi),:)*(T^ (qi-1))*a;
    dc_constr = [dc_constr; R];
end;

3.4.3 The Boundary Condition Constraint

The boundary condition constraints for systems with only denominator dynamics remain largely the same as the general expressions in equations 3.19 and 3.36:

$$t_o=0, \quad (3.45)$$

and $$dy = \lim_{s \to 0}\left(\frac{N(s)}{D(s)}\right)\cdot\left(\int^{(rbp)} u(t)dt\right)\bigg|_{t=\infty} . \quad (3.46)$$

The only difference in these equations is the evaluation of the integral of the time-optimal command profile. As discussed in Appendix B attached hereto, since this command profile contains only a pulse train and no tail, its analytic integral can be evaluated and expressed more expeditiously.

3.4.4 The Actuator Limit Constraint

As mentioned previously, for the case of a time-optimal command profile that contains no tail, the actuator limits are enforced by properly selecting the pulse train amplitudes to meet, but not exceed, the given actuator limits. Since time-optimal commands for systems with only poles contain only a pulse train, no additional equations are required to enforce the actuator limit constraint.

3.5 A Note on Nonminimum-Phase Zeros

Figure 20:
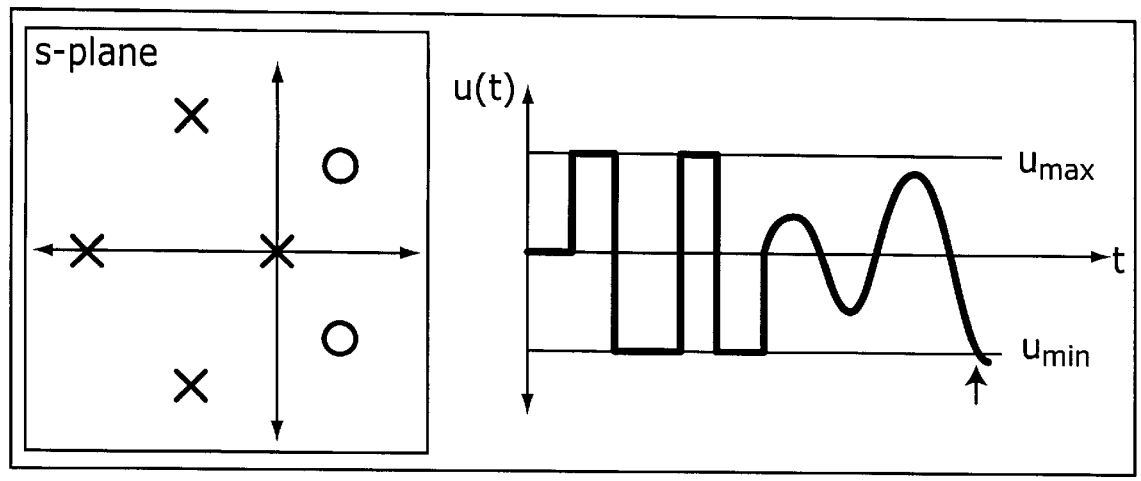
FIG. 20 shows time-optimal commands for nonminimum phase systems.

For systems with zeros, the procedure outlined above produces a command with a tail made up of components at the locations of the system zeros. When these zeros are nonminimum phase, the resulting tail of the optimal command will be unstable by nature, as shown in FIG. 20. As a result, at some finite time, the optimal command designed for a system with nonminimum-phase zeros will exceed the prescribed actuator limits. By the original problem statement for the time-optimal control problem, solutions for command profiles that exceed the actuator limits are not allowed. Consequently, it can be argued that the tail of any time-optimal command cannot contain any components from the system nonminimum-phase zeros.

Given this rationale, the question then becomes whether the dynamics of system nonminimum phase zeros can be leveraged in any other way to reduce the system response time. It is known from the dynamics cancellation constraint that incorporating any uncancelled dynamics into the command profile will either increase the time-length of the command or cause unwanted system residual vibration. Consequently, it can be argued that, outside of direct pole-zero cancellation, there are no additional dynamic properties that can be added to the command profile to compensate for the nonminimum-phase zeros. The time-optimal command, therefore, for a system with nonminimum-phase zeros is identical to the time-optimal command for the equivalent system with identical steady-state gain and the nonminimum-phase zeros removed. For example, consider a system with a transfer function that contains a nonminimum-phase zero, $z_1$:

$$G_1(s) = \frac{(s-z_1)(s+z_2)}{s(s+p_1)(s+p_2)}, \quad (3.47)$$

where the values of $z_1$, $z_2$, $p_1$, and $p_2$ are all positive. Now, by removing the nonminimum-phase zeros from this transfer function while preserving its DC gain, a new transfer function can be created:

$$G_2(s) = \frac{-z_1(s+z_2)}{s(s+p_1)(s+p_2)}. \quad (3.48)$$

Following the rationale outlined in this section, the time-optimal command for this modified system is substantially identical to the time optimal command for the system in equation 3.47. Therefore, as a general practice, for systems with nonminimum-phase zeros, time-optimal commands can be derived effectively simply by ignoring any nonminimum-phase numerator dynamics.

3.6 Summary

This section has outlined an approach for deriving time-optimal commands for linear systems. As part of this approach, a set of governing equations has been presented for defining the structure of the optimal command profile and specifying the problem constraints. These equations are summarized in Table 3.5 and Table 3.6 for the general solution case and the specific case of systems with only poles. In order to implement these equations, knowledge is required about three system features. First a linear system model is required to identify the system poles and zeros. Second, the actuator limits must be specified, and, last, the desired system output response must be known. From this information, a time-optimal command can be created by enumerating the constraint equations and employing an optimization routine to search the solution space. Since these equations are algebraic, solutions can be found rapidly and reliably using a computer. Additionally, by using the simple matrix notation suggested in this chapter, implementation can be equally streamlined.

TABLE 3.5

Summary of the governing equations for the time-optimal control of systems with both poles and zeros.

| | |
|---|---|
| Equation describing the command profile. | $u(t) = \sum_{j=0}^{n} a_j 1(t-t_j) + \sum_{j=1}^{r} c_j e^{z_j(t-t_n)} 1(t-t_n)$ |
| Dynamics Cancellation Constraints | $\left\{ \sum_{j=0}^{n} a_j t_j^{q_i-1} e^{-st_j} + e^{-st_n} \sum_{j=1}^{r} \left[ c_j t_n^{(q_i-1)} + \sum_{k=1}^{q_i} (\beta_{q_i} k) \frac{c_j z_j}{(s-z_j)^k} t_n^{(q_i-k)} \right] \right\} \Bigg|_{s=p_i} = 0$ |
| Boundary Condition Constraints | $t_o = 0$ <br> $dy = \lim_{s \to 0}\left(\frac{N(s)}{D(s)}\right) \cdot \left( \int^{(rbp)} u(t)dt \right)\Big|_{t=\infty}$ |
| Actuator Limit Constraint | $u_{min} \leq u_{tail}(t) \leq u_{max}$ |

TABLE 3.6

Summary of the governing equations for the time-optimal control of systems with just poles.

| | |
|---|---|
| Equation describing the command profile. | $u(t) = \sum_{j=0}^{n} a_j 1(t-t_j)$ |
| Dynamics Cancellation Constraints | $\left( \sum_{j=0}^{n} a_j t_j^{q_i-1} e^{-st_j} \right)\Bigg|_{s=p_i} = 0$ |
| Boundary Condition Constraints | $t_o = 0$ <br> $dy = \lim_{s \to 0}\left(\frac{N(s)}{D(s)}\right) \cdot \left( \int^{(rbp)} u(t)dt \right)\Big|_{t=\infty}$ |
| Actuator Limit Constraint | none required |

4 Examples of Time-Optimal Commands for Simple Systems

Section 3 above outlined the general procedure and necessary equations to derive time-optimal commands for any SISO linear system in accordance with the present invention. In order to illuminate how this approach can be applied to real systems, several simple examples will be considered here. This section begins with a look at three very simple systems with only denominator dynamics. For each of these three systems, the constraint equations will be used to derive analytical solutions for the time-optimal command profiles. Although these solutions are very simple and straightforward to derive, this will clarify the details of the solution approach provided by the invention and highlight key features of time-optimal command profiles for linear systems. After this look at commands for systems with only poles, an analytic solution will be provided for a system with two poles and one zero. This solution will illustrate the form of the constraint equations as well as the resulting command profiles for systems with both poles and zeros. Since analytic solutions for time-optimal commands are generally available only for simple systems, section 4.5 of this section looks at command profiles for a more complicated spring-mass system derived using numerical optimization.

4.1 A System with One Rigid-Body Pole

Figure 21A:
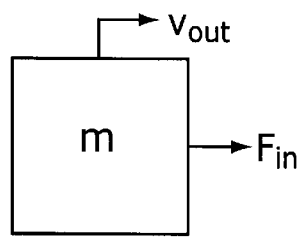
FIG. 21a shows a spring-mass system having one rigid body pole.
Figure 21B:
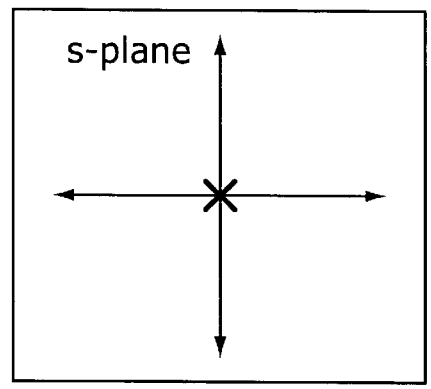
FIG. 21b shows the s-plane plot for the transfer function of the spring-mass system.

FIG. 21a shows a mechanical system having a single rigid-body pole as shown in FIG. 21b. This system has the transfer function $$G(s) = \frac{1}{ms}. \tag{4.1}$$

In this problem, it is desired to transition the mass from its initial velocity to a specified final velocity as quickly as possible using a bounded force input. Although this is a simple problem, a formal approach will be taken to illustrate the procedure for deriving time-optimal commands.

Step 1: Select a Candidate Command Profile

Figure 21C:
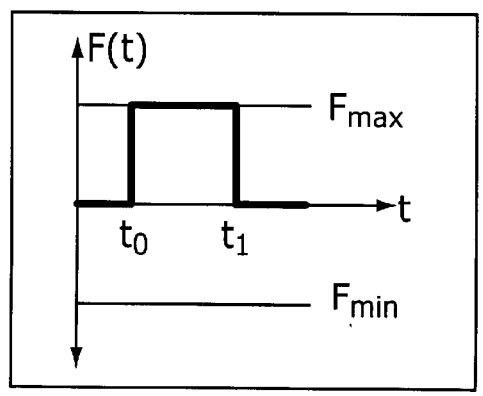
FIG. 21c shows the time-optimal command profile for the spring-mass system.

As discussed in section 2.3.1 above, the Bang—Bang Principle dictates that the time-optimal command profile must always saturate the system actuators. Furthermore, for this system, it can be seen that a single actuator pulse of finite duration can be used to transition the mass to the desired final velocity. Based on this understanding, the time-optimal command profile can be constructed, as shown FIG. 21c. Using the command profile equation outlined in Table 3.6, the parametric equation describing the time-optimal command profile for this system can be written as $$F(t) = F_{max}1(t-t_0) - F_{min}1(t-t_1) \tag{4.2}$$

Step 2: Impose the Problem Constraints

As equation 4.2 illustrates, the magnitude of the time-optimal command is completely specified by the given actuator limits. The remaining unknowns, therefore, are the switch times. In order to find values for these unknowns, the problem constraints must be met. Since the actuator limits are already met by the chosen candidate command profile, only the dynamics cancellation constraint and the boundary conditions must be imposed.

To satisfy the dynamics cancellation requirement, the equation in Table 3.6 can be invoked to yield the following expression:

$$(F_{max}e^{-st_0} - F_{max}e^{-st_1})|_{s=0} = 0. \tag{4.3}$$

This equation easily reduces to $$F_{max} - F_{max} = 0. \tag{4.4}$$

This equation is a statement of the fact that the final value of the time-optimal command for this system must be zero. Since the amplitudes of the time-optimal command were already selected to meet this condition, the result is trivial.

In addition to the dynamics cancellation constraint, the two boundary condition constraints must also be imposed: the first one sets the initial time of the command, and the second ensures that the command delivers the system to the desired final velocity. As in Table 3.6, these constraints can be stated as follows:

$$t_0 = 0, \tag{4.5}$$

and $$dv = \frac{1}{m} \cdot \int_{t_0}^{t_1} F(t)dt = \frac{1}{m} \cdot F_{max}(t_1 - t_0), \tag{4.6}$$

where dv is the desired change in velocity of the system response.

Step 3: Solve Analytically

By combining equations 4.5 and 4.6 the following result can be reached for the value of the final command switch time, $t_1$:

$$t_1 = \frac{mv_d}{F_{max}}. \tag{4.7}$$

Figure 22:
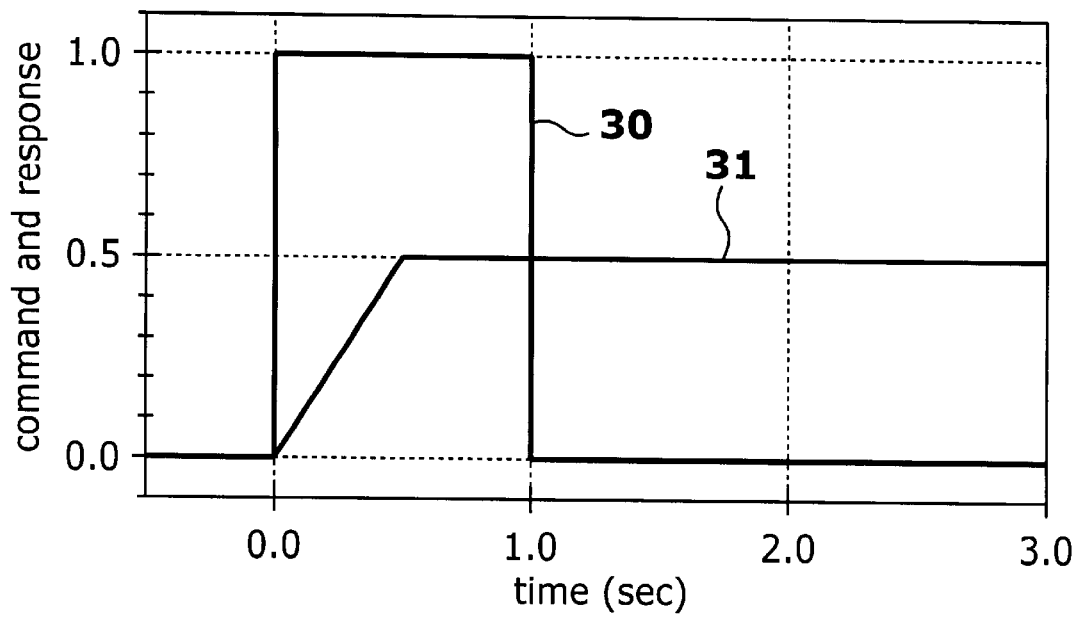
FIG. 22 shows the time-optimal command and response for the spring-mass system with one rigid body pole.

With this equation, the time-optimal command is completely specified for the system with one rigid-body pole. FIG. 22 illustrates the time-optimal command 30 and response 31 for this system, where m=1 kg, the desired change in velocity is 0.5 m/s, and the actuator limits are ±1 N.

4.2 A System with One Real Pole

Figure 23A:
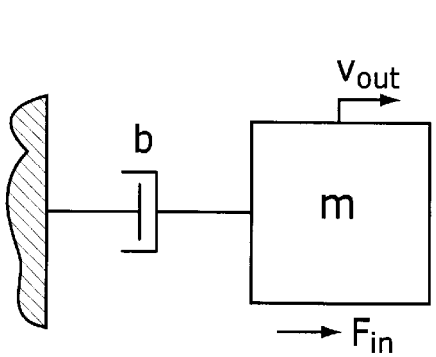
FIG. 23a shows a dynamic system having one real pole.
Figure 23B:
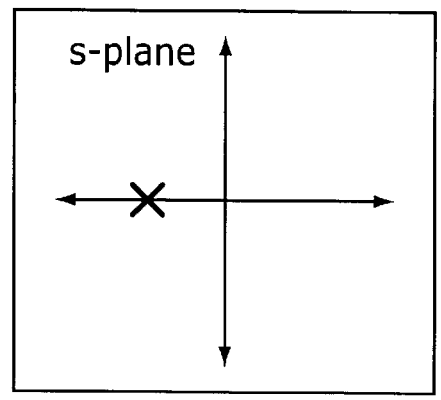
FIG. 23b shows the s-plane plot for the transfer function of the dynamic system.

FIG. 23a shows a system with one real pole, as illustrated in FIG. 23b, and can be described by the transfer function $$G(s) = \frac{1}{ms+b}. \tag{4.8}$$

In this system, it is desired to change the velocity of the mass by a specified amount as quickly as possible. The identical procedure that was used in the first example will also be used for this system to derive the time-optimal command.

Step 1: Select a Candidate Command Profile

Figure 23C:
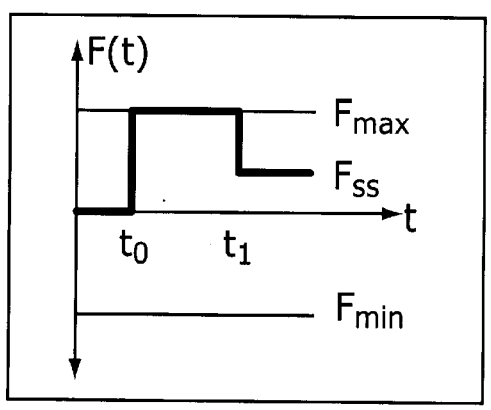
FIG. 23c shows the time-optimal command profile for the dynamic system.

The first step in creating the candidate command profile is to specify the amplitude and the number of switches. For the system in FIG. 23a, it can be reasoned that the time-optimal command requires two switches, one to turn the actuator full-on while the mass is accelerating, and one to set the actuators to the level required to maintain the desired final velocity. Such a command profile is illustrated FIG. 23c, and has the equation $$F(t) = F_{max}1(t-t_0) + (F_{ss} - F_{max})1(t-t_1), \tag{4.9}$$

where $F_{ss}$ is the final steady-state command level required to effect the desired change, dv, in the system output.

Step 2: Impose the Problem Constraints

As in the rigid-body case, the switch times of the optimal command can now be found from (1) the dynamics cancellation constraint and (2) the boundary condition constraint. In the first instance, given that the system pole is located at s=−b/m, the equation in Table 3.6 yields $$(F_{max}e^{-st_0} + (F_{ss} - F_{max})e^{-st_1})|_{s=-b/m} = 0. \tag{4.10}$$

Evaluating this expression at the value of the system pole produces the constraint equation:

$$F_{max}e^{\frac{b}{m}t_0} + (F_{ss} - F_{max})e^{\frac{b}{m}t_1} = 0. \tag{4.11}$$

Second, from the boundary conditions specified in the problem, two additional constraint equations can be formulated:

$$t_0 = 0, \tag{4.12}$$

and $$dv = \frac{1}{b} \cdot F(t)\bigg|_{t=\infty} = \frac{1}{b} \cdot F_{ss}. \quad (4.13)$$

Note that, since the given system has no rigid-body poles, the input command does not need to be integrated to impose the second boundary condition.

Step 3: Solve Analytically

Therefore, with equations (4.11) through (4.13), the time-optimal sequence is completely specified; equation (4.13) can be used to find the value for $F_{ss}$, and equations (4.11) and (4.12) can be combined to solve for $t_2$:

$$t_2 = \frac{m}{b} \ln\left(\frac{1}{1 - (F_{ss}/F_{max})}\right). \quad (4.14)$$

Figure 24:
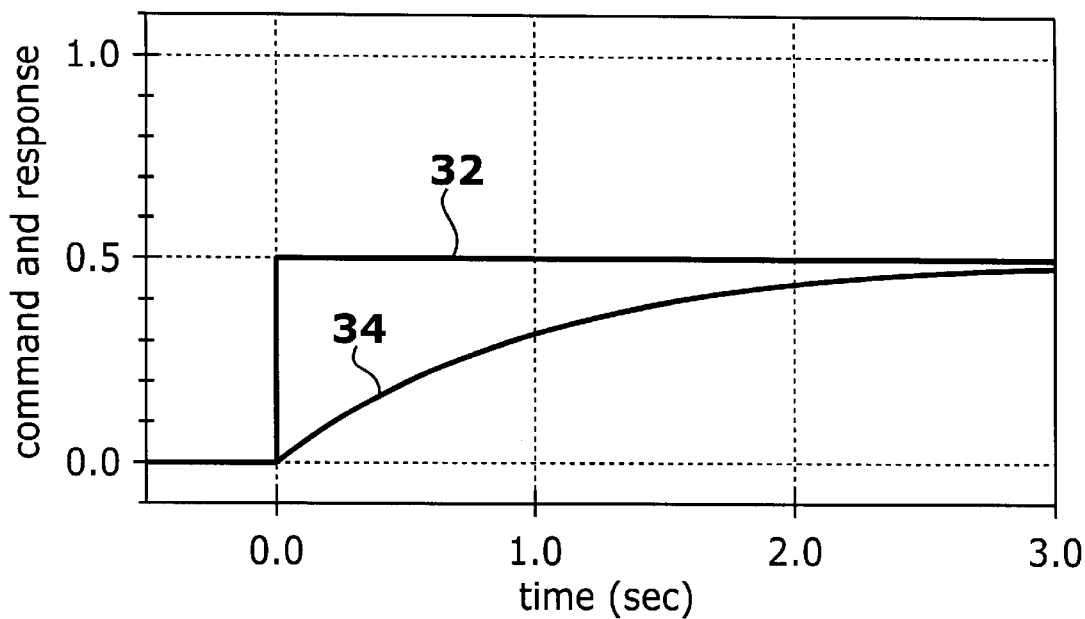
FIG. 24 shows the step command and response for the dynamic system with one real pole.
Figure 25:
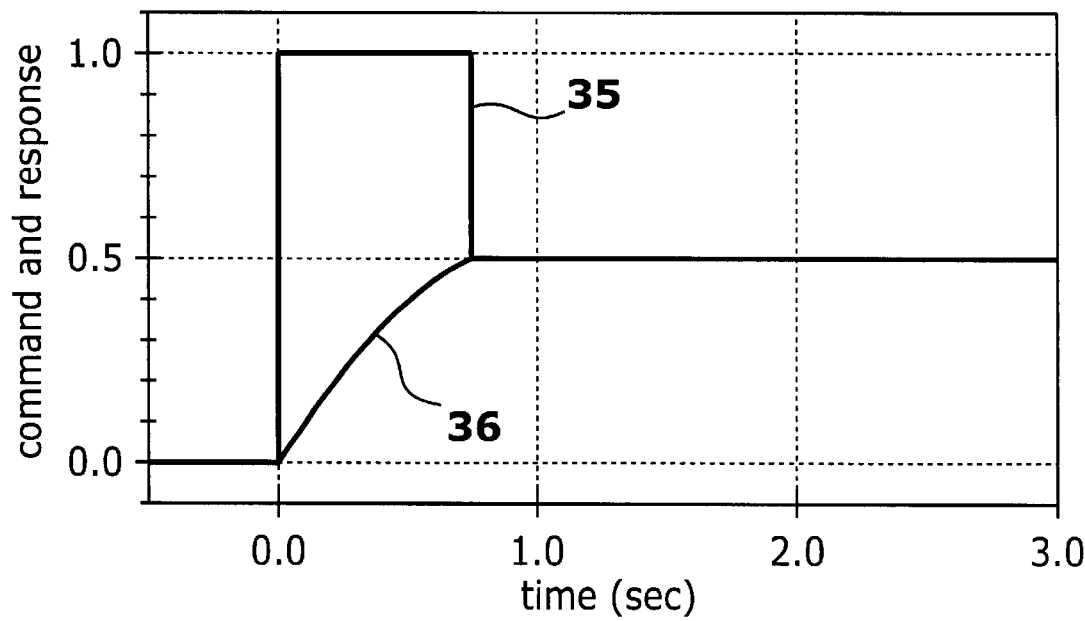
FIG. 25 shows the time-optimal command and response for the dynamic system with one real pole.

FIG. 24 illustrates response 34 of a system with one real pole to step command 32, and FIG. 25 illustrates the response 36 of such a system to time-optimal command 35. For the system used in these plots, m=1 kg, b=1 kg/s, the desired change in velocity is 0.5 m/s, and the actuator limits are ±1 N. As expected, with the time-optimal command, the settling time of the system response is reduced to about 0.7 seconds from about 4 seconds for the step response.

4.3 A System with a Pair of Complex Poles

Figure 26A:
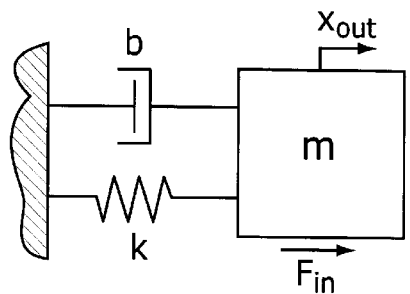
FIG. 26a shows a dynamic system having a pair of complex poles.
Figure 26B:
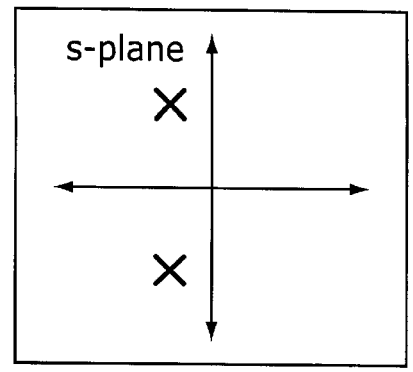
FIG. 26b shows the s-plane plot for the transfer function of the dynamic system.

As a third illustration of the procedure for deriving time-optimal commands, the system in FIG. 26a, which has the transfer function $$G(s) = \frac{1}{ms^2 + bs + k}, \quad (4.15)$$

will be considered. The plot for this transfer function is shown in FIG. 26b. In this system, it is desired to change the position of the mass and bring it to rest as quickly as possible using an input force command.

Step 1: Select a Candidate Command Profile

Figure 26C:
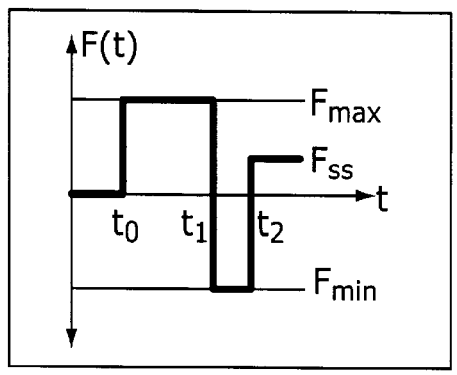
FIG. 26c shows the time-optimal command profile for the dynamic system.

Following the same procedure as in the two previous cases, the candidate time-optimal force profile shown in FIG. 26c can be represented by the equation $$F(t) = F_{max}1(t-t_0) + (F_{min} - F_{max})1(t-t_1) + (F_{ss} - F_{min})1(t-t_2), \quad (4.16)$$

where $F_{ss}$ is the final steady state force required to effect the desired change in position, dx.

Step 2: Impose the Problem Constraints

In order to find the values of the switch times in this command profile, the dynamics cancellation requirement and boundary conditions can be used to form the necessary constraint equations. First, the locations of the system poles can be specified as $$s_1 = -\zeta\omega_n + \omega_d i,$$

and $$s_2 = -\zeta\omega_n - \omega_d i, \quad (4.17)$$

where $\zeta$ is the damping ratio, $\omega_n$ is the natural frequency, and $\omega_d$ is the damped natural frequency of the given second-order system:

$$\zeta = \frac{b}{2\sqrt{km}}, \quad \omega_n = \sqrt{\frac{k}{m}}, \text{ and } \omega_d = \omega_n\sqrt{1-\zeta^2}.$$

Now, from the dynamics cancellation constraint equation, we know that, for the two system poles $$(F_{max}e^{-st_0} + (F_{min} - F_{max})e^{-st_1} + (F_{ss} - F_{min})e^{-st_2})|_{s=-\zeta\omega_n + \omega_d i} = 0,$$

and $$(F_{max}e^{-st_0} + (F_{min} - F_{max})e^{-st_1} + (F_{ss} - F_{min})e^{-st_2})|_{s=-\zeta\omega_n - \omega_d i} = 0. \quad (4.18)$$

By substituting the given value of s at each of the pole locations into these equations, it can be found that both equations yield the same result. However, by constraining the real and imaginary parts of the resulting expressions to equal zero, two equations can be formed:

$$F_{max}e^{\zeta\omega_n t_0}\cos(\omega_d t_0) + \ldots (F_{min} - F_{max})e^{\zeta\omega_n t_1}\cos(\omega_d t_1) + \ldots (F_{ss} - F_{min})e^{\zeta\omega_n t_2}\cos(w_d t_2) = 0, \quad (4.19)$$

and $$-F_{max}e^{\zeta\omega_n t_0}\sin(\omega_d t_0) - \ldots (F_{min} - F_{max})e^{\zeta\omega_n t_1}\sin(\omega_d t_1) - \ldots (F_{ss} - F_{min})e^{\zeta\omega_n t_2}\sin(\omega_d t_2) = 0. \quad (4.20)$$

These two equations are the final form of the dynamics cancellation constraint for a system with a pair of complex poles.

From the boundary condition equations in Table 3.6, two additional constraints can be formed:

$$t_0 = 0, \quad (4.21)$$

and $$dx = \frac{1}{k} \cdot F(t)\bigg|_{t=\infty} = \frac{1}{k} \cdot F_{ss}, \quad (4.22)$$

where dx is the desired change in position of the mass.

Step 3: Solve Analytically

Given equations (4.19) through (4.22), the time-optimal command profile is completely specified, and values for the optimal switch times, $t_1$ and $t_2$, can be found by solving the constraint equations. In general, these constraint equations must be solved numerically using an approach such as the one described in section 6 below. However, for the zero-damping case, an analytic solution is available:

$$t_1 = \frac{1}{\omega_n}\text{acos}\left(\frac{F_{min}(F_{max} - F_{ss}) + 0.5F_{ss}^2 - F_{max}^2}{F_{max}(F_{min} - F_{max})}\right), \quad (4.23)$$

$$t_2 = \frac{1}{\omega_n}\text{acos}\left(\frac{F_{min}(F_{max} - F_{ss}) + 0.5F_{ss}^2}{F_{max}(F_{min} - F_{ss})}\right). \quad (4.24)$$

Figure 27:
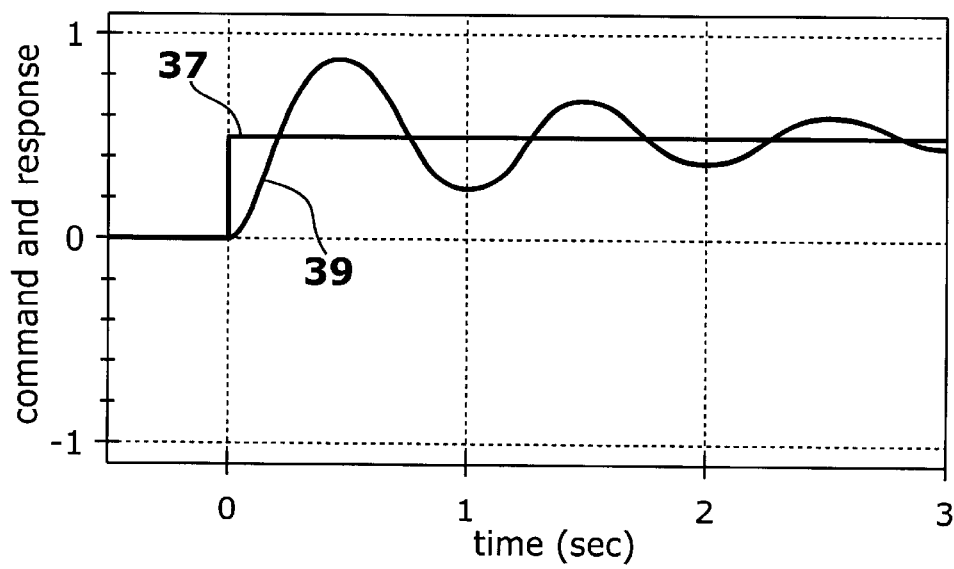
FIG. 27 shows the step command and response for the dynamic system with the pair of complex poles.
Figure 28:
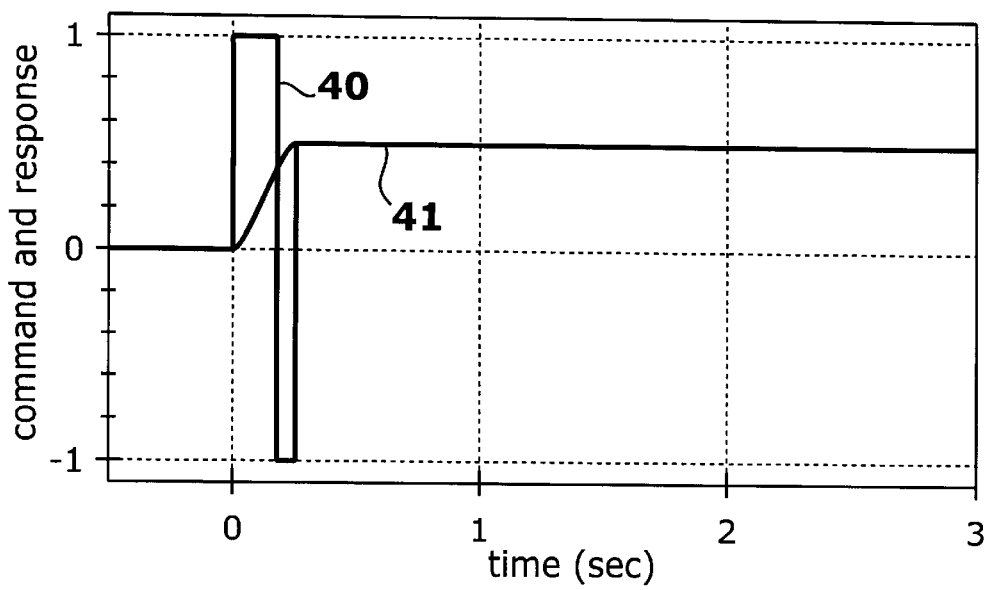
FIG. 28 shows the time-optimal command and response for the dynamic system with the pair of complex poles.

FIG. 27 illustrates a response 39 for a system with a pair of complex poles to step command 37, and FIG. 28 illustrates a response 41 for such a system to time-optimal command 40. For these plots, k=1 N/n, the natural frequency of the system is 2π rad/sec, the damping ratio is 0.1, the desired change in position is 0.5 m, and the actuator limits are ±1 N. From these results, it can be seen that the settling time of the system response can be reduced from about 6 seconds for the step response, to about 0.2 seconds for the time-optimal response.

4.4 A System with One Zero and Two Rigid-Body Poles

Figure 29A:
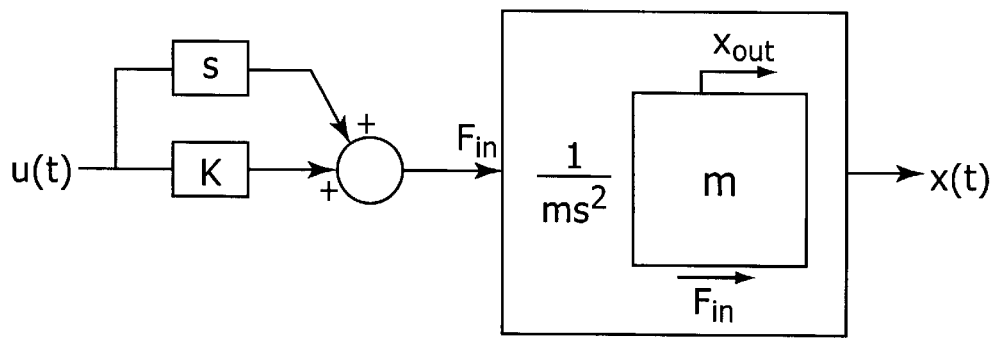
FIG. 29a shows a dynamic system having one real zero and two rigid body poles.
Figure 29B:
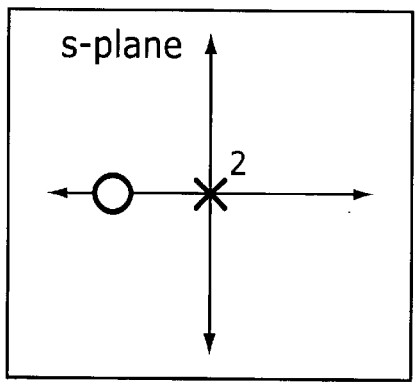
FIG. 29b shows the s-plane plot for the transfer function of the dynamic system.

As the fourth example for deriving time-optimal commands, a system with one zero and two rigid-body poles will be considered. One possible physical representation of this system is a single mass with an input force profile with a derivative feedforward term, as shown in FIG. 29a. From this block diagram, the following transfer function can be derived:

$$G(s) = \frac{X(s)}{U(s)} = \frac{s+K}{ms^2}, \quad (4.25)$$

the plot for which is shown in FIG. 29b. In this system, it is desired to derive the input command profile, u(t), that will change the position of the mass by a desired amount, dx, and bring it to rest as quickly as possible. Unlike the three previous examples, this system will illustrate how solutions can be derived for systems with numerator dynamics as well as repeated roots. Also, in order to simplify the derivation calculations, actual values for some of the system parameters will be substituted into the constraint equations. The values are as follows: $u_{max}=1$, $u_{min}=-1$, $K=2$, $m=1$, and $dx=1$.

Step 1: Select a Candidate Command Profile

Figure 29C:
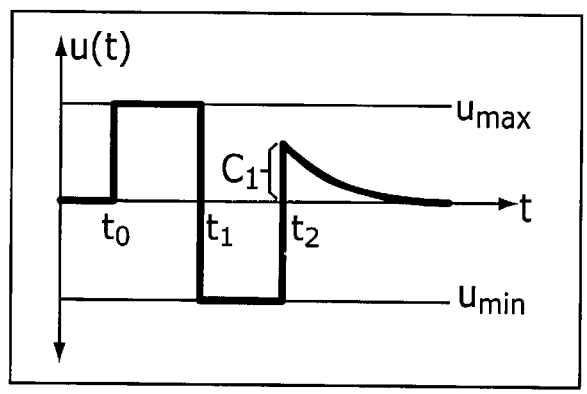
FIG. 29c shows the time-optimal command profile for the dynamic system.

As shown in FIG. 29c, the candidate time-optimal command profile for a system with two poles and two zeros will have a pulse train followed by a tail. Following the guidelines outlined in section 2.3.3, we can assume that the pulse train will have three switches, including the first and last. Furthermore, the tail of the command will have the same time constant as the system zero, at $s=-K$, and an initial amplitude of $c_1$. Given this command construction and the specified actuator limits, $u_{max}$ and $u_{min}$, an equation for the time-optimal profile, u(t), can be written as follows:

$$u(t) = u_{max}1(t-t_0) + (u_{min}-u_{max})1(t-t_1) - \ldots u_{min}1(t-t_2) + c_1 e^{-K(t-t_2)}1(t-t_2). \quad (4.26)$$

In this equation, the only unknowns are the switch times, $t_0$, $t_1$, and $t_2$, and the initial amplitude of the command tail, $c_1$. By forming and solving the constraint equations, and analytic result for these values can be reached.

Step 2: Impose the Problem Constraints

Since this system has both poles and zeros, the complete form of the time-optimal constraint equations, as summarized in Table 3.5, must be employed. For the dynamics cancellation constraint, since this system has two repeated rigid-body poles, the dynamics cancellation equation must be enforced twice at $s=0$, once with the pole multiplicity value, $q_i$, equal to one and again with $q_i$ equal to two. Performing the substitution for the first pole with $q_i=1$ yields the following result:

$$\left[ u_{max}e^{-st_0} + (u_{min}-u_{max})e^{-st_1} - u_{min}e^{-st_2} + e^{-st_2}\left(c_1 - \frac{c_1 K}{s+K}\right)\right]\bigg|_{s=0} = 0 \quad (4.27)$$

Similarly, for the second pole, $q_i=2$, the resulting constraint equation is:

$$\left[u_{max}t_0 e^{-st_0} + (u_{min}-u_{max})t_1 e^{-st_1} - u_{min}t_2 e^{-st_2} + \ldots e^{-st_2}\left(c_1 t_2 - \frac{c_1 K}{s+K}t_2 - \frac{c_1 K}{(s+K)^2}\right)\right]\bigg|_{s=0} = 0 \quad (4.28)$$

Now, with the dynamics cancellation constraints formulated, the boundary conditions can be imposed. The first boundary condition, as before, is trivial:

$$t_0 = 0. \quad (4.29)$$

The second boundary condition, as stated in Table 3.5, is a bit more complicated since it requires evaluating the double integral of the optimal command profile:

$$dx = \frac{K}{m} \cdot \left(\int\int u(t) dt\right)\bigg|_{t=\infty}, \quad (4.30)$$

where dx is the desired change in the position of the mass in the system. In order to find an analytic solution for the time-optimal command, the integral in this equation must be evaluated analytically for the given expression for u(t) in equation 4.26. This can be done by following a strategy similar to the one outlined in Appendix B attached hereto. Alternately, as discussed in section 3.2.2, this boundary condition can be enforced by evaluating the following general expression using L'Hospital's Rule:

$$dx = \lim_{s \to 0}\left(G(s)\left[\sum_{j=0}^{n} a_j e^{-st_j} + e^{-st_n}\sum_{j=1}^{r}\frac{c_j s}{s-z_j}\right]\right). \quad (4.31)$$

For the system at hand, this expression reduces to $$dx = \lim_{s\to 0}\frac{s+K}{ms^2}\ldots \quad (4.32)$$
$$u_{max}e^{-st_0} + (u_{min}-u_{max})e^{-st_1} -$$
$$u_{min}e^{-st_2} + e^{-st_2}c_1\frac{s}{s+K}\bigg),$$

which can be further simplified to $$dx = \lim_{s\to 0}\left(\frac{s+K}{m}\right)\ldots \quad (4.33)$$
$$\lim_{s\to 0}\left[\frac{1}{s^2}\left(u_{max}e^{-st_0} + (u_{min}-u_{max})e^{-st_1} - u_{min}e^{-st_2} + e^{-st_2}c_1\frac{s}{s+K}\right)\right].$$

Now, the first limit in this expression is easy to evaluate. The second limit, however, must be evaluated using L'Hospital's Rule since it is indeterminate of the form (0/0). In order simplify the notation in this derivation, values for system parameters will be substituted into this expression. Specifically, using the values: $u_{max}=1$, $u_{min}=-1$, and, from the first boundary condition, $t_0=0$, equation 4.33 can be rewritten as $$dx = \lim_{s\to 0}\left(\frac{s+K}{m}\right)\cdot\lim_{s\to 0}\left[\frac{1}{s^2}\left(1 - 2e^{-st_1} + 1e^{-st_2} + e^{-st_2}c_1\frac{s}{s+K}\right)\right]. \quad (4.34)$$

Evaluating the first limit in this equation results in $$dx = \frac{K}{m}\cdot\lim_{s\to 0}\left[\frac{1}{s^2}\left(1 - 2e^{-st_1} + 1e^{-st_2} + e^{-st_2}c_1\frac{s}{s+K}\right)\right]. \quad (4.35)$$

Now, from L'Hospital's Rule, it can be stated that, if $G_1(s)$ and $G_2(s)$ are zero at s=0, then $$\lim_{s \to 0} \frac{G_1(s)}{G_2(s)} = \frac{G_1'(s)}{G_2'(s)}\bigg|_{s=0}. \quad (4.36)$$

In order to apply this formula, we must first make the following statements:

$$G_1(s) = 1 - 2e^{-st_1} + 1e^{-st_2} + e^{-st_2}c_1\frac{s}{s+K}, \text{ and} \quad (4.37)$$

$$G_2(s) = s^2. \quad (4.38)$$

Now, with these definitions, applying L'Hospital's Rule is straightforward. Note that, since the expression for $G_2(s)$ contains an $s^2$ term, L'Hospital's Rule must be applied twice to reach a determinate result. Performing this task, namely taking the second derivative of the expressions for $G_1(s)$ and $G_2(s)$ and substituting the value s=0, yields the following result:

$$dx = \frac{K}{m} \cdot \frac{1}{2}\left(-2t_1^2 + t_2^2 - \frac{2c_1}{K^2} - \frac{2t_2 c_1}{K}\right) \quad (4.39)$$

This is the final form of the second boundary condition constraint for the system with one real zero and two rigid-body poles.

Given the dynamics cancellation constraint equations, 4.27 and 4.28, and the boundary condition constraint equations, 4.29 and 4.39, the only equation that needs to be formed is the actuator limits constraint. As in Table 3.5, this expression can be stated as $$u_{min} \leq u_{tail}(t) \leq u_{max}. \quad (4.40)$$

Now, as illustrated in FIG. 29c, given that the maximum value of the command tail is defined to be $c_1$, this equation reduces to $$u_{min} \leq c_1 \leq u_{max}. \quad (4.41)$$

With this expression, the constraint equations for the time-optimal command are complete.

Step 3: Solve Analytically

In order to minimize the notational complexity of the solution approach, we will first substitute values for the system parameters into the constraint equations. Specifically, for the dynamics cancellation constraints in equations 4.27 and 4.28, substituting the known values $u_{max}=1$, $u_{min}=-1$, K=2, and, from equation 4.29, $t_0=0$, and evaluating at s=0 yields $$1 - 2 + 1 + \left(c_1 - \frac{2c_1}{2}\right) = 0, \text{ and} \quad (4.42)$$

$$2t_1 - t_2 + \frac{c_1}{2} = 0. \quad (4.43)$$

From this result, it can be seen that the first constraint is always zero. As was the case for the example in section 4.1, the dynamics cancellation constraint for the first rigid-body pole in a system states simply that the sum of the pulse train amplitudes must be zero. Since the amplitude of the candidate command profile was already selected to meet this condition, equation 4.42 is automatically satisfied. From the second dynamics cancellation constraint, however, we can form an expression for $t_1$:

$$t_1 = \frac{t_2}{2} - \frac{c_1}{4}. \quad (4.44)$$

Now, from the boundary conditions constraint, equation 4.39, substituting the same system parameter values as well as m=1 and dx=1, produces the result $$1 = -2t_1^2 + t_2^2 - \frac{c_1}{2} - t_2 c_1. \quad (4.45)$$

From this equation, we can then substitute the expression for $t_1$ in equation 4.44 and simplify to yield $$t_2^2 - c_1 t_2 - \left(\frac{c_1^2}{4} + c_1 + 2\right) = 0 \quad (4.46)$$

Solving this equation for $t_2$ results in $$t_2 = \frac{c_1}{2} \pm \frac{\sqrt{2}}{2}\sqrt{c_1^2 + 2c_1 + 4}. \quad (4.47)$$

In order to minimize the length of the time-optimal command, we need to find the smallest value of $t_2$ that satisfies equation 4.47. Also, from the actuator limits constraint, equation 4.41, we must have a value of $c_1$ such that $$-1 \leq c_1 \leq. \quad (4.48)$$

By plotting the possible values of $t_2$ over this range of values for $c_1$, it can be found that $t_2$ is a minimum when $c_1=-1$. From this result, this optimal value of $c_1$ can be substituted into equation 4.47 to produce $$t_2 = -\frac{1}{2} \pm \frac{\sqrt{2}}{2}\sqrt{3} = 0.725, \text{ and} - 1.725 \text{ seconds}. \quad (4.47)$$

Now, since $t_2$ must be greater than zero, it can be concluded that the optimal value for $t_2$ is 0.725 seconds. Also, by using these values in equation 4.44, the optimal value for $t_1$ can be found to be 0.613 seconds.

Figure 30:
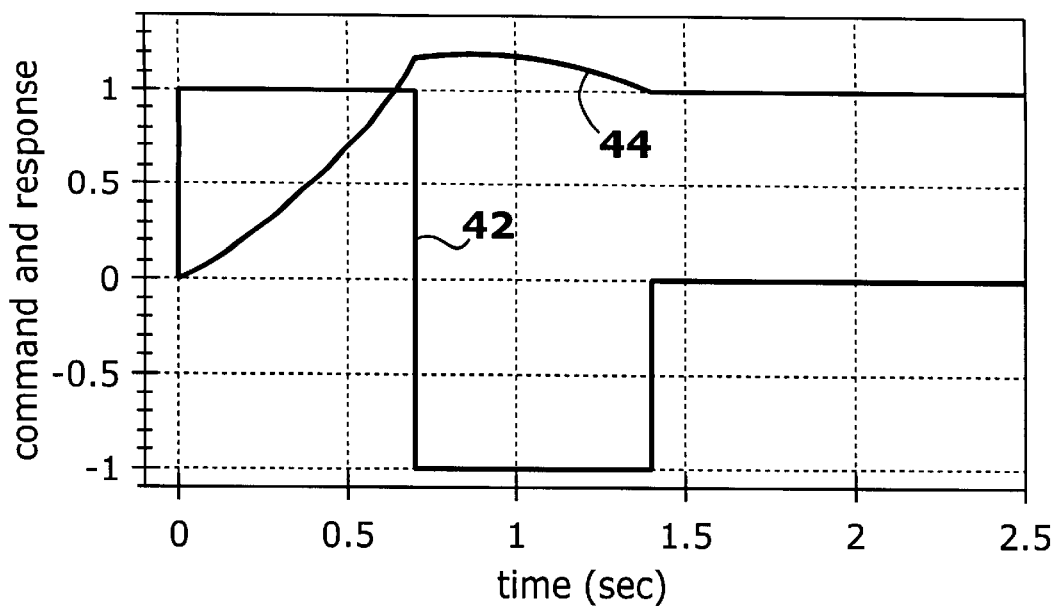
FIG. 30 shows the pulse command and response for the system with one real zero and two rigid body poles.
Figure 31:
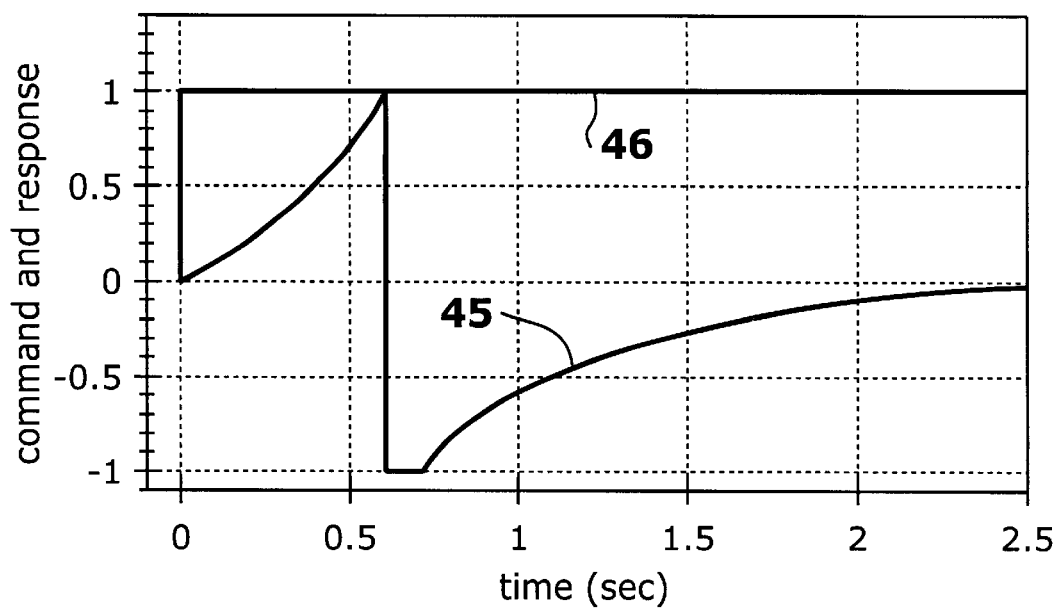
FIG. 31 shows the time-optimal command and response for the system with one real zero and two rigid body poles.

FIG. 30 illustrates the time-optimal command profile 42 resulting from this derivation and the corresponding system response 44. For comparison purposes, FIG. 31 illustrates the response 45 of the same system to a pulse command 46 designed to produce the same gross motion in the system output. This pulse command was created using only knowledge about the system rigid-body behavior. As the figure illustrates, when the zero dynamics are taken into consideration to design the command profile, the system response time can be cut in half.

4.5 A Simple Spring-Mass System

The four examples presented above all illustrated the procedure and the form of the governing equations for deriving time-optimal commands. These examples were selected since they were simple enough to allow for analytic solutions that revealed important features about the nature of time-optimal commands. In general, analytic solutions are only available for very simple systems. For most systems, a numerical optimization approach must be employed to solve the time-optimal constraint equations. This section looks at a more complicated system and how time-optimal commands can be derived using this optimization approach. Specifically, the system shown in FIG. 32a will be considered. This system consists of two masses with one flexible mode, one real mode and one rigid-body mode, and the transfer function from the specified force input to the position output also has a pair of complex zeros. This system might be a good descriptor of any vehicle or automated machine with a flexible appendage. The transfer function, G(s), for this system can be written as $$\frac{X(s)}{F(s)} = \frac{m_2 s^2 + b_2 s + k}{s(m_1 m_2 s^3 + (m_1 b_2 + m_2 b_1 + m_2 b_2)s^2 + (m_1 k + m_2 k + b_1 b_2)s + k b_1)}. \quad (4.48)$$

For the purposes of this example, the following values will be used for the system parameters: $m_1$=1 kg, $m_2$=2 kg, $b_1$=1 N/(m/s), $b_2$=0.8 N/(m/s), and k=2 N/m. Furthermore, for the problem specifications, it will be assumed that the actuator limits are $F_{max}$=1 N and $F_{min}$=−1 N and that the desired output motion of $m_1$ is 0.5 m. Substituting these values into the system transfer function yields the result:

$$G(s) = \frac{X(s)}{F(s)} = \frac{2s^2 + 0.8s + 2}{s(2s^3 + 4.4s^2 + 6.8s + 2)}. \quad (4.49)$$

Figure 32A:
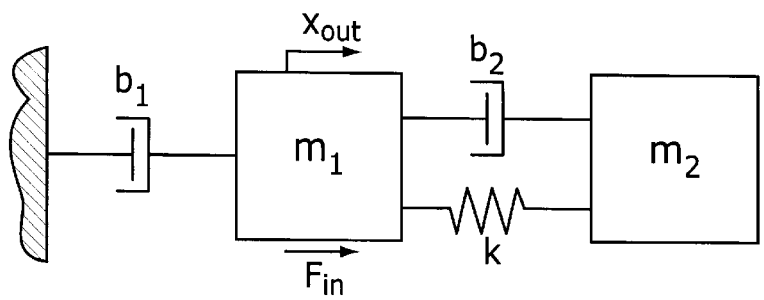
FIG. 32*a* shows a spring-mass system.
Figure 32B:
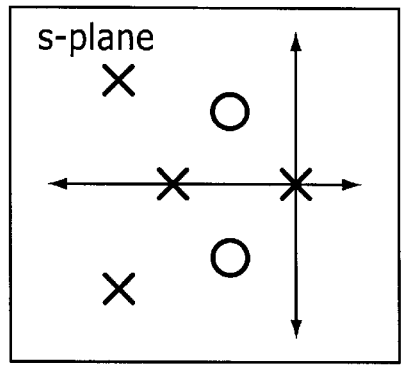
FIG. 32*b* shows the s-plane plot for the transfer function of the spring-mass system.

The pole-zero plot for this system is shown in FIG. 32b, and the values of the system poles and zeros are summarized in Table 4.1. Using this system information, a time-optimal command will now be derived.

TABLE 4.1

Summary of the dynamics in the simple spring-mass system.

| | |
|---|---|
| rigid-body pole: | s = 0 |
| real pole: | s = −0.37 |
| | time constant, $t_c$ = 2.73 sec. |
| complex poles: | s = −0.92 ± 1.37i |
| | frequency = 0.26 Hz |
| | damping ratio = 0.56 |
| complex zeros: | s = −0.20 ± 0.98i |
| | frequency = 0.16 Hz |
| | damping ratio = 0.20 |

Step 1: Select a Candidate Command Profile

Figure 32C:
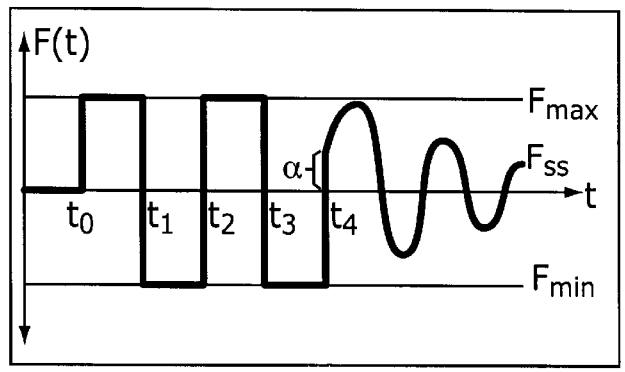
FIG. 32*c* shows the time-optimal command profile for the spring-mass system.

As shown in FIG. 32c, the candidate time-optimal command profile for the simple spring-mass system will have a pulse train followed by a tail. Since this system has four poles and two zeros, the minimum number of switches that must be in the pulse train is three, including the first and last, as discussed in section 2.3.3. However, as a good initial guess for the number of switches that will be required in the actual time-optimal command for the given system, a good rule of thumb is to select one more switch than the number of system poles. Since the specified system has four poles, the candidate time-optimal command in FIG. 32c has a pulse train with five switches. The general equation for a time-optimal command profile for a system with poles and zeros is listed in Table 3.5. For the case where the command has five switches, n=4, and two zeros, r=2, this expression can be rewritten as $$F(t) = \sum_{j=0}^{4} a_j 1(t - t_j) + \sum_{j=1}^{2} c_j e^{z_j(t-t_4)} 1(t - t_4). \quad (4.50)$$

From the given system actuator limits, the pulse train amplitudes in this equation can be specified as follows:

$$a = \begin{bmatrix} a_0 \\ a_1 \\ a_2 \\ a_3 \\ a_4 \end{bmatrix} = \begin{bmatrix} F_{max} \\ F_{min} - F_{max} \\ F_{max} - F_{min} \\ F_{min} - F_{max} \\ -F_{min} \end{bmatrix}, \quad (4.51)$$

where for the given values of the actuator limits, namely 1 and −1 N, this vector assumes the form:

$$a = \begin{bmatrix} 1 \\ -2 \\ 2 \\ -2 \\ 1 \end{bmatrix}. \quad (4.52)$$

Notice that, since the spring-mass system has a rigid body mode, the command profile must have a steady-state value of zero in order to produce point-to-point motion in the system output. By specifying the pulse train amplitudes in a to sum to zero, this factor is automatically taken into account. For the system zeros in equation 4.50, a similar vector expression can be formed:

$$z = [z_1 z_2], \quad (4.53)$$

and, given the values from Table 4.1, this vector becomes $$z = [-0.20 + 0.98i - 0.20 - 0.98i]. \quad (4.54)$$

Now, with the values for the pulse-train amplitudes and system zeros completely defined by equations 4.52 and 4.54, the only unknowns that remain in the command profile are the switch times, $$t = [t_0 t_1 t_2 t_3 t_4], \quad (4.55)$$

and the tail coefficients, $$c = \begin{bmatrix} c_1 \\ c_2 \end{bmatrix}. \quad (4.56)$$

In the case of the tail coefficients, since the system contains a pair of complex zeros, the tail will have a damped sinusoidal response. Consequently the coefficients can be expressed as $$c = \begin{bmatrix} \frac{\alpha}{2} e^{i\phi} \\ \frac{\alpha}{2} e^{-i\phi} \end{bmatrix}, \quad (4.57)$$

where $\alpha$ is the initial amplitude of the command tail, as shown in FIG. 32c, and $\phi$ is its phase. With this expression, it can be seen that the only unknown variables in equation 4.50 that are required to describe the time-optimal command profile are the switch times, t, and the tail parameters, $\alpha$ and $\phi$.

Step 2: Impose the Problem Constraints

Given that the only unknown parameters of the-time-optimal command are the switch times, t, and the variables that make up the tail coefficients, c, the problem constraints can be formed to guide the search for optimal solutions of these values. The first constraint that needs to be imposed is the dynamics cancellation constraint. As derived in section 3.2.1.1, these equations can be expressed in convenient matrix notation for systems without repeated roots as $$exp(-st)a + M.*exp(-st_n) = 0, \quad (4.58)$$

where $$M = (1./(1-(1./s)z))c. \quad (4.59)$$

The vector definitions for a, z, t, and c are given in equations 4.52, 4.54, 4.55, and 4.57, respectively, and, from the values of the system poles in Table 4.1, the vector s can be defined as $$s = \begin{bmatrix} p_1 \\ p_2 \\ p_3 \end{bmatrix} = \begin{bmatrix} 0 \\ -0.37 \\ -0.92 + 1.37i \end{bmatrix}. \quad (4.60)$$

As discussed previously, since the dynamics cancellation equations for each pole in a complex pair are identical, only one of the complex poles needs to be included in the vector s.

In order to impose the boundary condition constraint for this problem, the two equations from Table 3.5 can be applied:

$$t_o = 0 \quad (4.61)$$

$$dx = \lim_{s \to 0}\left(\frac{N(s)}{D(s)}\right) \cdot \left(\int F(t)dt\right)\bigg|_{t=\infty}. \quad (4.62)$$

In the second equation, given the desired system output motion, dx, of 0.5 m, and that the limit of the system transfer function without the rigid-body is unity, the final equation for the boundary condition constraint becomes:

$$0.5 = 1 \cdot (\int F(t)dt)|_{t=\infty}. \quad (4.63)$$

For the third and final constraint that needs to be enforced for the time-optimal control problem, the actuator limit constraint can be written as $$F_{min} \leq F_{tail}(t) \leq F_{max}, \quad (4.64)$$

where $F_{tail}(t)$ is the time-response of the command tail. From the expression for the time-optimal command profile in equation 4.50, an expression for this tail can be written as $$F_{tail}(t) = (c_1 e^{z1(t-t_4)} + c_2 e^{z2(t-t_4)})1(t-t_4). \quad (4.65)$$

This expression can be calculated during the solution of the constraint equations to make sure the actuator limits are never exceeded.

Step, 3: Solve and Verify

The final step in deriving the time-optimal command profile for the simple spring-mass system is to solve the constraint equations and verify the result. Since the constraint equations for this system are too complex to be solved analytically, a numerical optimization routine must be used. A routine, such as the one described in chapter 6, will take the vector of values for the system poles, s, and zeros, z, as well as the pulse-train amplitudes, a, and search for the shortest possible set of switch times, t, and tail coefficients, c, that satisfy the constraint equations. In order to evaluate the constraints for this problem, equations 4.58, 4.59, 4.61, 4.63, 4.64, and 4.65 must be used. Specifically, equations 4.58 and 4.59 are the matrix equations for the dynamics cancellation requirement. Upon evaluation, these equations will yield a set of four constraints, one for both the rigid-body and real system pole, and one for the both the real and imaginary part of the equation for the complex pole. Equations 4.61 and 4.63 are the problem boundary conditions. The first is trivial to impose and the second requires the evaluation of the integral of the command profile. This integral can be performed most efficiently using the analytic solution presented in Appendix B. Last, equations 4.64 and 4.65 are the actuator limit constraints. During the solution process, these equations must be used to calculate the profile of the command tail and ensure that it does not exceed the specified actuator limits.

Using a standard optimization process, such as GAMS [219] or the ones found in the Matlab Optimization Toolbox [218], solutions can be found for the time-optimal command profile that satisfies the problem constraints. Typically, these processes rely on an initial guess for the command switch times, t, and tail coefficients, c, and then proceed to search through the solution space of the constraint equations until a time-optimal solution is found. In general, as discussed in greater detail in section 6, initial guesses are easy to make based on intuition or the system dynamics. Also, since all of the constraint equations in this problem can be expressed algebraically, little computation is required to perform this optimization. Although solution times typically depend on the quality of the initial guess and the available computing resources, solution times for systems of moderate complexity are on the order of seconds. For the spring-mass system in this example, a time-optimal command profile was found in less than three seconds using a 150 MHz desktop workstation.

As a second step in the process of solving for time-optimal commands, a verification scheme is highly valuable. In particular, since optimization processes can often return local minima rather than the time-optimal global minimum, a verification scheme can prove useful if it can identify time-optimal solutions. As discussed in greater detail in section 6, by using the conditions of Pontryagin's Minimum Principle, a straightforward verification process can be constructed to guarantee that the commands delivered by the optimization process are indeed optimal.

Figure 33:
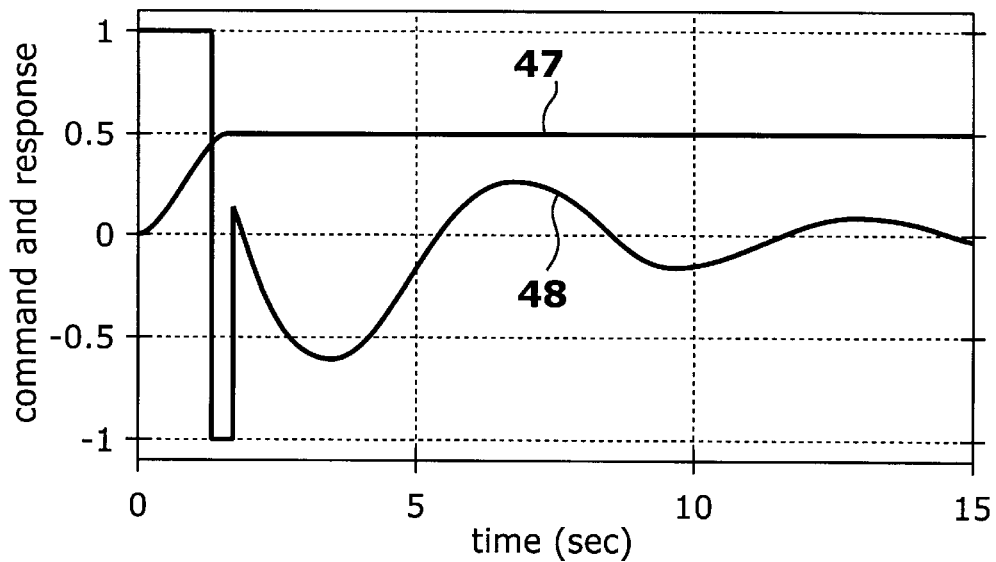
FIG. 33 shows the time-optimal command and response for the spring-mass system.

FIG. 33 illustrates the time-optimal command solution 48 and system response 47 that results from a numerical optimization of the constraint equations in this example. As this solution indicates, the resulting time-optimal force command delivers the system from its initial position to its final position in under two seconds. Notice that the pulse train in this command has only three switches. Even though the original candidate command profile contained five switches, the optimization routine successfully reduced the number of switches by two to the optimal level.

Figure 34A:
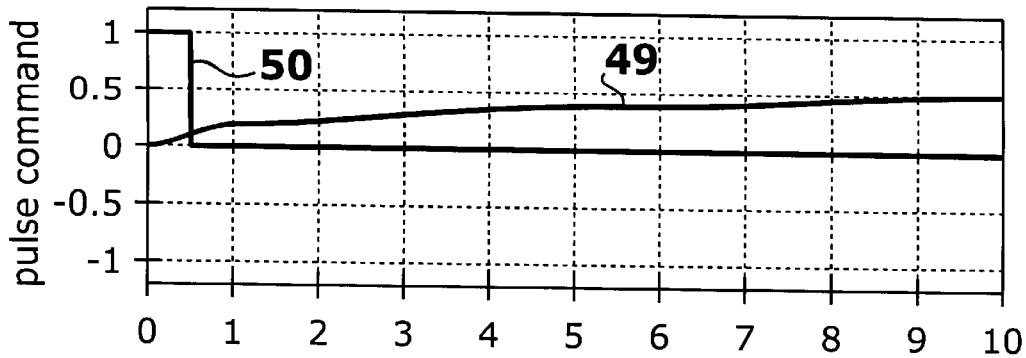
FIGS. 34*a*, 34*b*, 34*c* and 34*d* show the system command and response for a pulse command and three different types of time-optimal ("TO") commands.
Figure 34B:
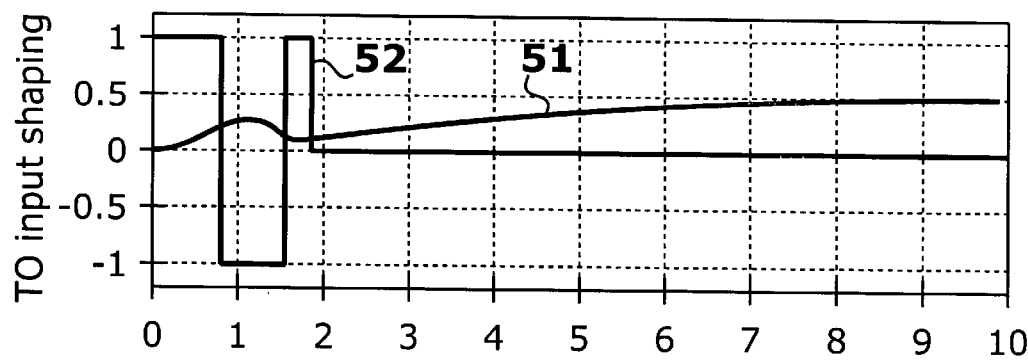
Figure 34C:
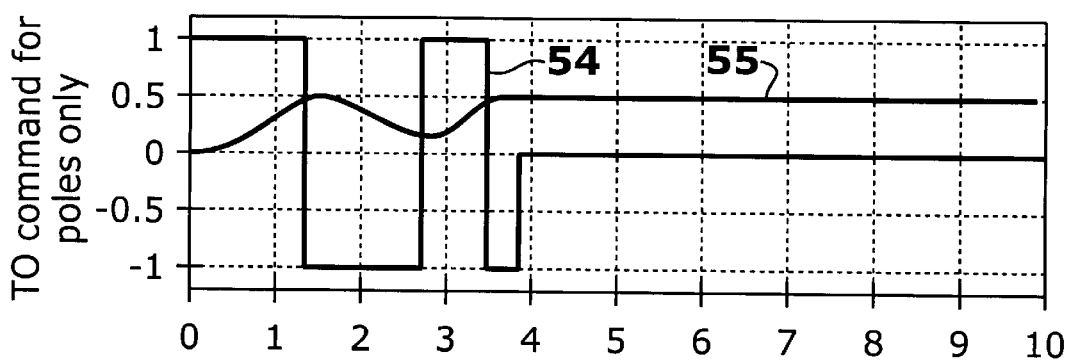
Figure 34D:
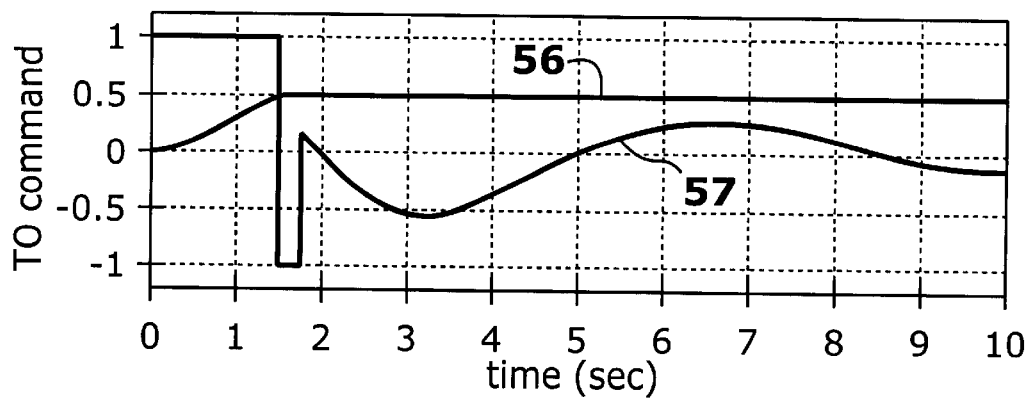

FIGS. 34a to 34d compare the time-optimal command and response for the spring-mass system to the performance of three other command profiles. The first plot in FIG. 34a illustrates the system response 49 to a simple pulse command 50 designed to meet the same actuator limits and produce the same amount of displacement in the system output. As this plot indicates, due to the real and complex system denominator dynamics, the system reaches its final value in response to the pulse after about nine seconds. The second plot in FIG. 34b depicts the system response 51 to a time-optimal negative input shaper 52. As discussed in section 2.4.4, time-optimal commands can be created using the input shaping constraint equations. The resulting command profiles are designed to produce point-to-point motion in the system output without exciting unwanted vibration in the system flexible modes. Since the flexibility in this system does not dominate the overall dynamic response, the response of the system to the time-optimal input shaper shows no improvement over the pulse command. In the third plot in FIG. 34c, a time-optimal input command 54 was designed for the equivalent spring-mass system with all of the numerator dynamics removed. Consequently, the resulting command profile consists of a pulse train without a tail. When applied to the spring-mass system in this example, this command delivers the system response 55 to its final value in slightly under four seconds. Comparing this response 55 to the response 56 to the full time-optimal command 57 in FIG. 34d, it can be seen that, by designing the time-optimal command profile using both the system numerator and denominator dynamics, the time of system response can be dramatically reduced. For the current example, this reduction is by about a factor of two; the amount of reduction that would be seen in other systems depends on the amount of contribution the numerator dynamics make to the overall system response.

5 Creating Time-Efficient Commands with Additional Constraints

In the preceding sections, an approach for deriving time-optimal commands for any type of linear system was presented. This approach provides a straightforward and effective procedure for identifying the bounded command profile that will produce the fastest possible response in a given system. In many time-critical applications, the optimal commands that result from this methodology can be highly valuable for maximizing system performance. However, in other systems that do not require such rapid response, time-optimal command profiles may be undesirable. For example, in systems with a large degree of dynamic uncertainty, time-optimal commands may excite unwanted residual vibration due to discrepancies between the system model and actual behavior. Additionally, because of their bang—bang nature, time-optimal commands may result in excessive fuel usage or heavy operating loads in certain classes of systems. In order to address these issues, new constraints can be incorporated into the solution methodology to derive commands with more practical properties. These commands, although not strictly time-optimal, can deliver time-efficient system behavior while accommodating other important system performance metrics.

The purpose of this section is to show how the solution framework developed in section 3 can be expanded to include more practical system constraints. In order to accomplish this, two extensions to the basic solution method will be considered: first, strategies will be presented for deriving time-efficient commands that are robust to uncertainty in the system model, and second, methods will be considered for limiting the length of the tail on optimal command profiles. Following these two specific cases, suggestions will be made for incorporating additional problem constraints into the general solution framework. This discussion will illustrate that the solution methodology presented herein is not only effective at deriving time-optimal command profiles but can also be extended easily to derive other types of more practical time-efficient commands.

5.1 Designing Commands with Enhanced Robustness to System Uncertainty

When modeling a physical system, designers attempt to create a mathematical representation that captures all important aspects of system operation. Unfortunately, due to such factors as time-varying dynamics and nonlinear behavior, discrepancies always exist between the model and the actual system. As a result of these discrepancies, time-optimal commands designed using model parameters can sometimes result in unacceptable performance upon implementation. In order to address this issue, a strategy can be formulated for deriving an input command that is robust to uncertainties in system dynamics. This strategy relies on the same solution framework outlined in previous chapters but incorporates additional problem constraints to enhance command robustness. Before this strategy can be presented, however, we must first be clear about the definition of robustness.

Figure 35:
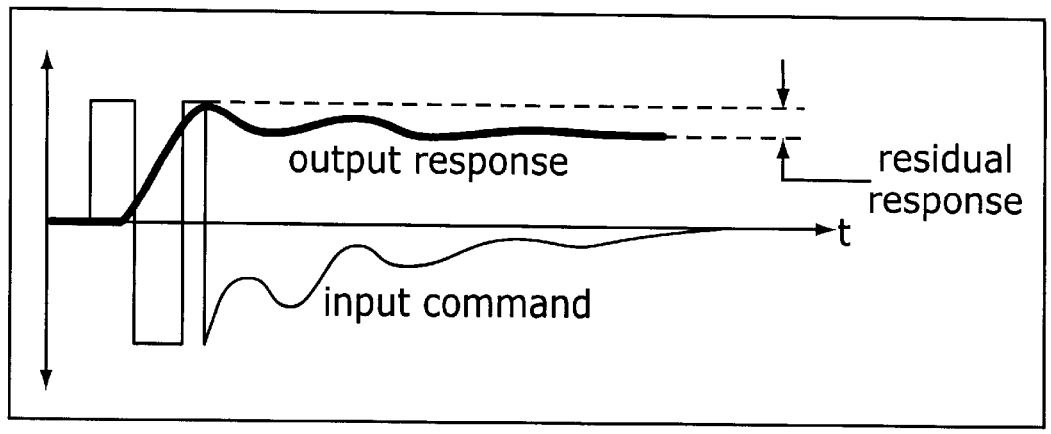
FIG. 35 shows a plot of a system's residual response to dynamic uncertainty.

A time-optimal command that is not robust to uncertain system dynamics will often deliver unacceptable performance when the system behaves differently than the model predicts. Typically, this performance degradation is measured in terms of the residual response of the system output. As illustrated in FIG. 35, residual response is a measure of the difference between the ideal system response and the actual behavior. In the ideal case, a time-optimal command will transition a system from its initial state to its exact final state and keep it there. However, when faced with model discrepancies, this time-optimal command will always result in a nonzero amount of residual response around the desired system output value.

Figure 36:
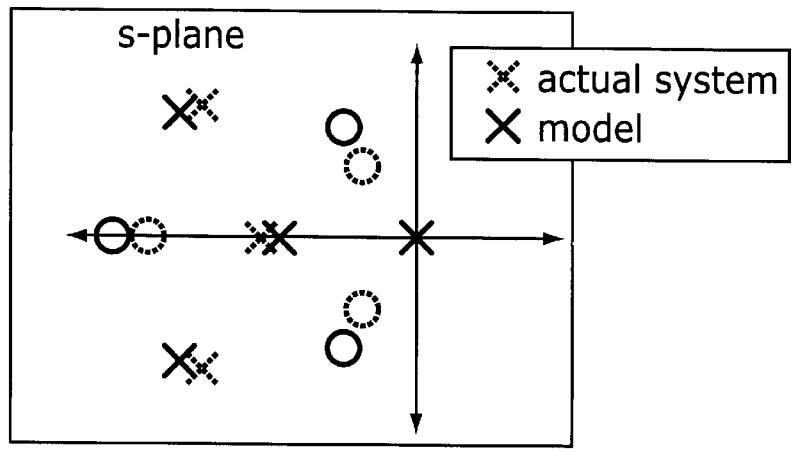
FIG. 36 shows a pole-zero representation of the dynamic uncertainty.

In order to characterize the influence of modeling uncertainties on unwanted system residual response, consider FIG. 36. As this figure suggests, a linear model can be represented as a collection of poles and zeros in the Laplace domain. When a system displays behavior somewhat different than the model, this can be manifested in one way as a difference in the actual locations of the system poles and zeros. The larger the distance between the modeled and actual system poles and zeros, the greater the amount of dynamic uncertainty in the system. When a time-optimal command that was designed for the system model is applied to the actual system, these discrepancies can result in output behavior with excessive residual response.

Figure 37:
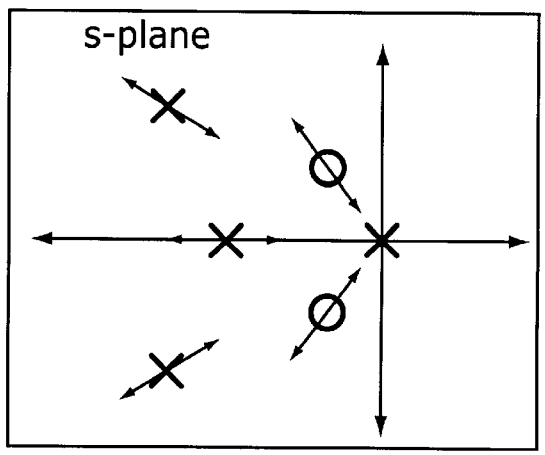
FIG. 37 characterizes system uncertainty by varying poles and zeros.

Given this understanding, one can imagine that a possible method for understanding the influence of dynamic uncertainties on system performance is to vary the locations of the system poles and zeros and catalog the resulting amount of residual response in the system output. A command that is robust to dynamic uncertainty will demonstrate little performance degradation over changes in the system dynamics, and a nonrobust command will show sharp changes. Using this approach, the locations of each system pole and zero can be varied from their nominal values to measure the level of robustness in the given command to changes in system dynamics. Of course, in order to create a complete picture of this relationship, the locations of the poles and zeros would have to be varied in the two-dimensions of the s-plane. Specifically, each pole and zero could be varied in both frequency and damping to produce a two-dimensional measure of the command robustness. Since the system residual response typically demonstrates similar behavior with variations in both of these directions, changing the system poles and zeros in one dimension is usually adequate for characterizing the robustness of the input command. Traditionally, command robustness has been measured by varying the natural frequency of the system pole or zero. As illustrated in FIG. 37, this corresponds to moving system poles and zeros along lines radial from the origin of the s-plane and plotting the resulting amplitude of residual response in the system output. Since rigid-body dynamics in a given system are relatively easy to characterize, this robustness measure is typically performed with only the nonzero system poles and zeros.

Figure 38:
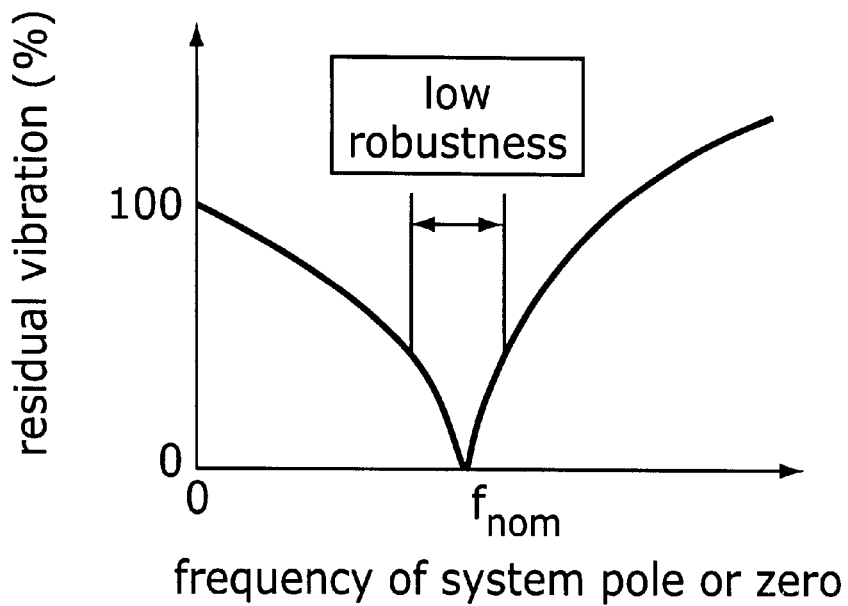
FIGS. 38 and 39 show typical robustness or insensitivity curves for a dynamic system.
Figure 39:
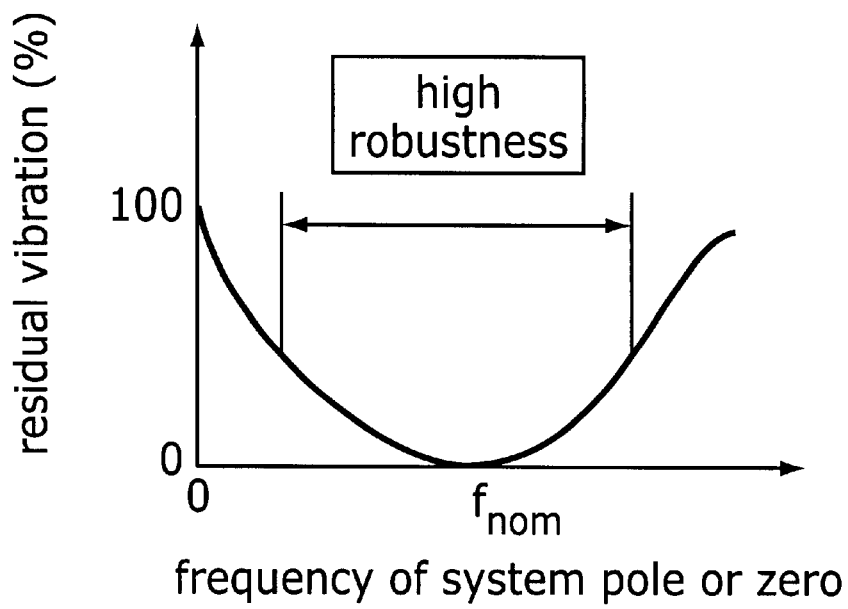
Figure 40A:
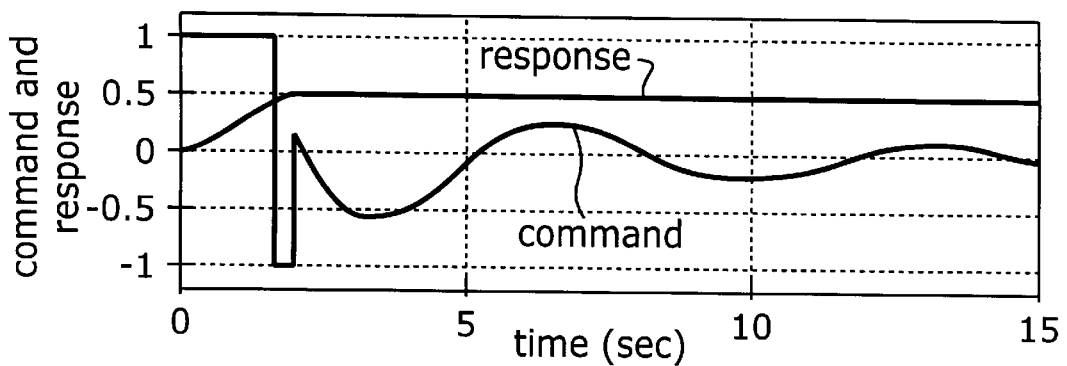
FIGS. 40*a*, 40*b*, 40*c* and 40*d* show a time-optimal command and its insensitivity to variations in the poles and zeros of a dynamic system.
Figure 40B:
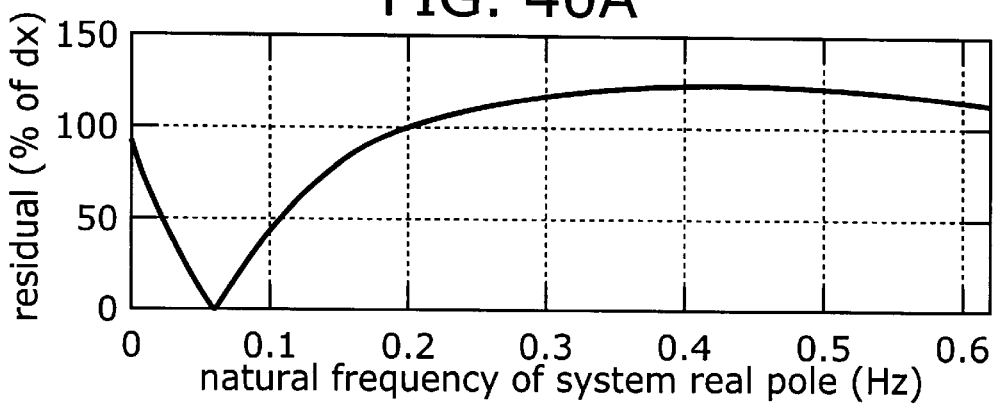
Figure 40C:
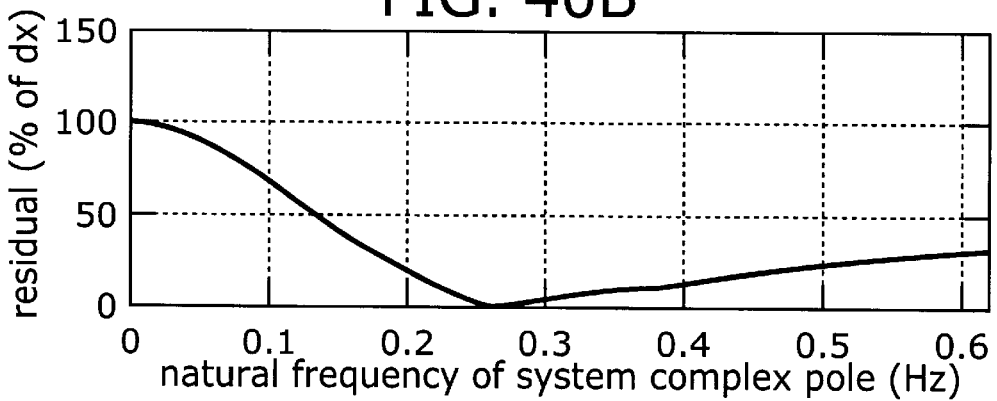
Figure 40D:
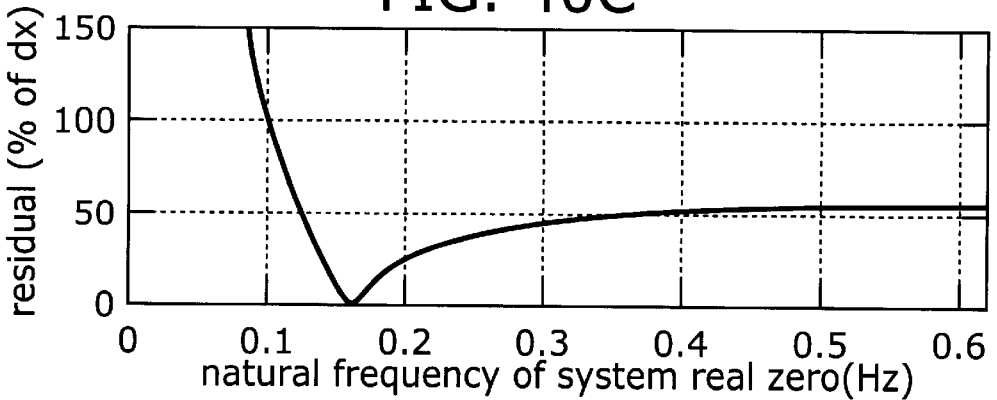

FIGS. 38 and 39 depict some typical robustness plots. For each of these plots, the system residual response amplitude is plotted versus frequency. Given an input command profile, one of these plots can be constructed for every nonzero pole and zero in the system assuming all other system dynamics are exact. Typically, the residual response is measured as the maximum deviation in the system residual from the desired value as a percentage of the total rigid-body motion of the system output. This residual percentage is plotted against the variation in the natural frequency of system pole or zero around its nominal value. As these plots illustrate, at the point where the system pole or zero is exactly equal to its modeled value, the residual vibration in the system response is zero. In some cases, this frequency axis is normalized so the nominal or modeled frequency has a value of one. As the two plots in FIGS. 38 and 39 illustrate, a curve that exhibits a flatter or lower shape around the nominal frequency value will have better robustness to system uncertainty than one with a steeper profile. Since the curve in each of these plots is a measure of the insensitivity that the command profile shows to dynamic variation, these diagrams are often called insensitivity plots.

In order to construct an insensitivity or robustness curve, the residual response amplitude of a system must be calculated for a range of different values for the locations of the system poles and zeros. While possible to perform using numerical simulation, this approach is computationally intensive and time consuming. A better approach is to use an analytic solution for the residual response of a system to a command profile. Fortunately, as presented in Appendix A, a general analytic solution is available for the residual system response to a command profile with a pulse train and a tail. Although notationally complex, this result allows for easy calculation of the residual response amplitude as a function of changing system dynamics.

With a clear definition of robustness and an approach for constructing plots to measure it, the remainder of this section looks at possible strategies for improving the robustness of time-optimal commands to variations in system dynamics. In this discussion, enhancing robustness to changes in system poles will first be considered followed by a look at improving robustness for system zeros. From these insights, time-efficient commands with improved robustness will be constructed for a simple spring-mass system to demonstrate the value of this technique.

5.1.1 Robustness to Variations in System Poles

As described above, in order to improve the robustness of time-optimal commands in the face of uncertainties in the system denominator dynamics, the insensitivity curve for the command must be flattened around the modeled modes. This flattening is achieved by reducing the residual vibration amplitude in the system response around the frequencies of the system response. In Appendix A, a derivation of the system response to a time-optimal command profile revealed that the residual response contribution of the nonzero poles could be separated from the overall system response. The resulting equation from Appendix A, which describes the residual response amplitude due to solely a system pole, $p_i$, is $$y_{pi}(t) = \frac{R_i}{p_i^{q_i}} e^{p_i t} \left[ \sum_{j=0}^{n} a_j e^{-p_i t_j} \left( \sum_{k=1}^{q_i} \frac{(-1)^{k-1}}{(q_i-k)!}(p_i(t-t_j))^{q_i-k} \right) + \right.$$
$$\left. \ldots \sum_{j=1}^{r} c_j e^{-p_i t_n} p_i^{q_i} \left( \sum_{k=1}^{q_i} \frac{Q_{ijk}}{(k-1)!}(t-t_n)^{(k-1)} \right) \right] + , \quad (5.1)$$

for all $t \geq t_n$. The notation in this equation is fully defined in Appendix A, but for the sake of clarity, a brief description is included here:

$R_i$=residue of system pole $p_i$,
$q_i$=multiplicity of system pole $p_i$,
$a_j$=pulse train amplitudes,
$t_j$=pulse train switch times,
$c_j$=tail coefficients,
$Q_{ijk}$=special residue defined in Appendix A,
n=number of switches in the command pulse train excluding the first, and
r=number of system zeros.

From this equation, the robustness curve for a given command profile, described by $a_j$, $t_j$, and $c_j$, can be plotted by calculating the maximum $y_{p_i}(t)$ over a range of frequency values for $p_i$. Therefore, in order to improve the robustness of the command profile, it is required to reduce the value of $y_{p_i}(t)$ over the frequencies near the nominal value of $p_i$. From this equation, it can be seen that, in order to reduce the value of $y_{p_i}(t)$ many things can be done. One possible approach for improving command robustness is to constrain the pulse-train amplitudes, $a_j$, to limit the amplitude of the residual response. Similarly, the tail coefficients, $c_j$, might also be able to be constrained in some manner to improve command robustness to variations in system poles. In general, when faced with these many alternatives, we must remember that we are looking for a solution that has enhanced robustness but is still as close to time-optimal as possible. A traditional approach for balancing these tradeoffs is to constrain the slope of the robustness curve. Originally applied to increase robustness in the input shaping technique [97], this approach has been used by many researchers [68, 81, 83, 95, 207]. Although not time-optimal by definition, the kinds of command profiles resulting from this approach represent a special class of solutions that have an excellent combination of good robustness and short system response times. These commands are often called robust, time-optimal commands.

In addition to identifying a useful class of robust, time-optimal solutions, the approach suggested in the preceding paragraph is easy to implement. Specifically, these kinds of robust commands can be derived by following the exact procedure for deriving time-optimal commands, as outlined in section 3, and adding one additional constraint equation for each uncertain system pole. This equation must enforce the condition that the slope of the robustness or insensitivity curve be zero at the location of the nominal system pole. This concept can be expressed mathematically for system pole, $p_i$, as $$\frac{d}{dp_i} y_{p_i}(t) \bigg|_{p_i=p_i^*} = 0, \quad (5.2)$$

where $y_{p_1}(t)$ can be calculated as in equation 5.1, and $p_i^*$ is the modeled value of $p_i$. As noted in section 2.4.4 and [207], enforcing this constraint for a given system pole, $p_i$, is identical to deriving the time-optimal command for an equivalent system with an additional pole at $s=p_i$. In other words, for a system that has a single pole at $s=p_i$, enforcing the robustness constraint in equation 5.2 can be achieved simply by deriving the time-optimal command for a different system that includes a double pole at $s=p_i$. Given this fact, the derivation of robust, time-optimal commands for a given system is as easy as deriving the time-optimal command for a similar system that contains an additional pole for every system mode with a significant degree of uncertainty. Furthermore, as discussed in [97], command robustness can be increased arbitrarily by taking additional derivatives of $y_{p_1}(t)$ with respect to $p_i$. As one might suspect, these additional constraints are identical to the constraints for the time-optimal command for a system with multiple poles at the location $p_j$, where one additional pole is added for each derivative of $y_{p_1}(t)$. With each additional robustness constraint, the resulting command profiles become longer in length but deliver less residual response in the face of uncertainties in the system poles.

5.1.2 Robustness to Variations in System Zeros

As discussed in the preceding section, a simple insight about the nature of time-optimal commands for systems with repeated poles led to a straightforward and effective approach for improving the robustness of commands for systems with uncertain denominator dynamics. Unfortunately, these same insights cannot be extended to system zeros. In order to explain this point, consider the equation from Appendix A that describes the contribution of the system zeros to the system residual response:

$$y_{z_j}(t) = \sum_{i=1}^{m} c_j(R_i Q_{ij(q_i+1)} + K) e^{z_j^*(t-t_n)} \quad (5.3)$$

for all $t \geq t_n$, where the notation is the same as described above, and

K≡constant resulting from the partial fraction expansion of G(s), $z_j^*$≡modeled value of system pole $z_j$, and m≡the number of system poles.

As was the case for the system poles, we can first attempt to improve the robustness of the command to variations in system zeros by taking the derivative of equation 5.3 and setting it to zero at the locations of the system zeros. Specifically, we must enforce the equation $$\left. \frac{d}{dz_j} y_{z_j}(t) \right|_{z_j=z_j^*} = 0, \quad (5.4)$$

where $z_j^*$ is the modeled value of each system zero, $z_j$. Now, from equation 5.3 and its derivation in Appendix A, it can be seen that the only term in the expression for $y_{z_j}(t)$ that depends on $z_j$ is $R_1$. Since $R_i$ is a residue of the system model, it is linearly dependent on $z_j$, and as a result $$\frac{d}{dz_j} y_{z_j}(t) = \text{constant in } z_j. \quad (5.5)$$

Therefore, the only way to set this expression to zero at $z_j=z_j^*$ is to set it completely to zero such as by constraining the values of the tail coefficients, $c_j$, to be zero. In this circumstance, the resulting optimal command profile would contain no tail and have infinite robustness to uncertainties in the system zeros.

As a more gradual approach for improving command insensitivity to system zeros, one can reconsider the expression for the residual response due to the system zeros in equation 5.3. As discussed previously, apart from constraining the slope of the insensitivity curve, the robustness of a command profile can be enhanced by limiting the amplitude of the residual response due to deviations in system zeros from their nominal values. From equation 5.3, it can be seen that, for a given system with specified values for $R_i$, $Q_{ijk}$, K, and $z_j^*$, the only way to reduce the amplitude of $y_{z_j}(t)$ is to decrease the value of the tail coefficients $c_j$. As discussed in more detail in section 5.2, constraints can be imposed easily to limit the value of the tail coefficients. The resulting command profiles are longer in time length, but have somewhat better robustness to variations in system zeros as well as a shorter tail.

In terms of the pole-zero cancellation argument, the method that was used to design commands to be robust to variations in system poles was to design the command for a similar system that included additional poles. The result of this was a command profile that contained multiple zeros at the locations of each uncertain system pole. Carrying this analogy to systems with uncertain zeros, one might try to place extra poles in the command at the same location of the system zeros. As may be obvious, this strategy only introduces extra dynamics into the system that will increase the amount of residual response. Consequently, the only option for increasing the robustness of an optimal command to variations in system zeros is to limit the amplitude of the tail coefficients, $c_j$. If necessary, these coefficients can be reduced all the way to zero to produce a longer command with no tail that has infinite robustness to uncertainties in system zeros. This approach will be discussed in more detail in section 5.2, which presents methods for limiting command tail length.

5.1.3 Examples of Robust, Time-Optimal Commands

This section presents some examples of robust, time-optimal commands that were designed using the approach outlined in this section. Specifically, command profiles were designed with enhanced robustness to system denominator dynamics by applying the exact procedure outlined in section 3 for deriving time-optimal commands to a similar system with additional poles. As discussed above, commands with improved robustness to uncertain system zeros can be derived by limiting the command tail length. Although not presented here, a discussion of this technique and examples of its performance will be given in the following section. For all of the results presented here, the simple spring-mass system shown in FIG. 32*a* will be used. The list of dynamics values for that system is repeated in Table 5.1 below.

TABLE 5.1

Summary of the dynamics in the simple spring-mass system.

| | |
|---|---|
| rigid-body pole: | s = 0 |
| real pole: | s = −0.37 |
| | time constant, $t_c$ = 2.73 sec. |
| complex poles: | s = −0.92 ± 1.37i |
| | frequency = 0.26 Hz |
| | damping ratio = 0.56 |
| complex zeros: | s = −0.20 ± 0.98i |
| | frequency = 0.16 Hz |
| | damping ratio = 0.20 |

FIGS. 40*a* to 40*d* illustrate the time-optimal command for the spring-mass system, as derived in section 4.5, and its corresponding robustness or insensitivity curves. For each of the insensitivity curves, the amount of residual vibration as a percentage of the total rigid-body motion of the system, 0.5 m, is plotted versus the frequency of each pole and zero. Each of these plots assumes that all system dynamics, other than the pole or zero under consideration, are modeled perfectly. The first insensitivity curve in FIG. 40*b* maps the insensitivity of the time-optimal command to variations in the system real pole. As expected, when the frequency of the system pole is identical to its modeled value, $f=1/(2\pi t_c)=$ 0.0582 Hz, the amount of residual vibration is zero. In the second and third insensitivity curves in FIGS. 40*c* and 40*d*, respectively, similar behavior is demonstrated for variations in the system complex poles and complex zeros.

Figure 41A:
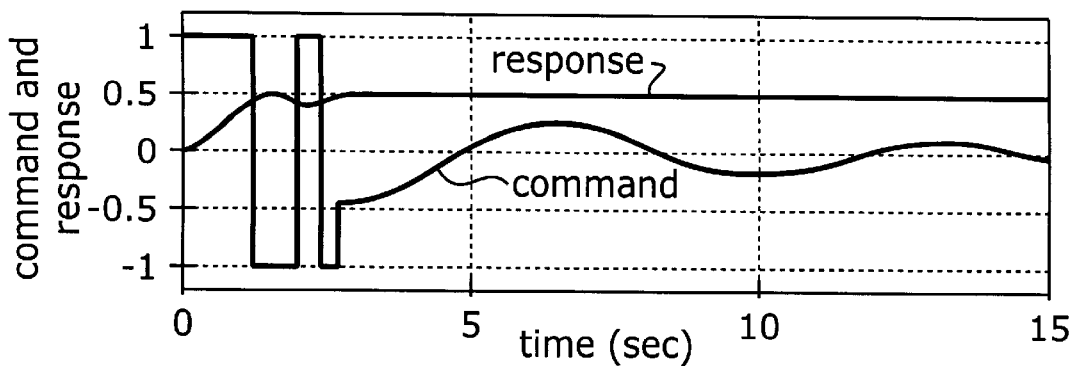
FIGS. 41*a*, 41*b*, 41*c* and 41*d* show a time-optimal command with enhanced robustness to variations in the complex poles of a system and the corresponding insensitivity curves.
Figure 41B:
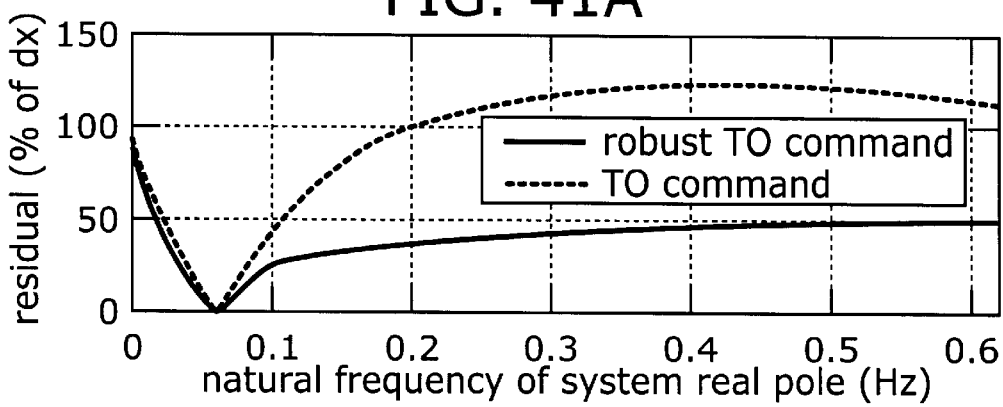
Figure 41C:
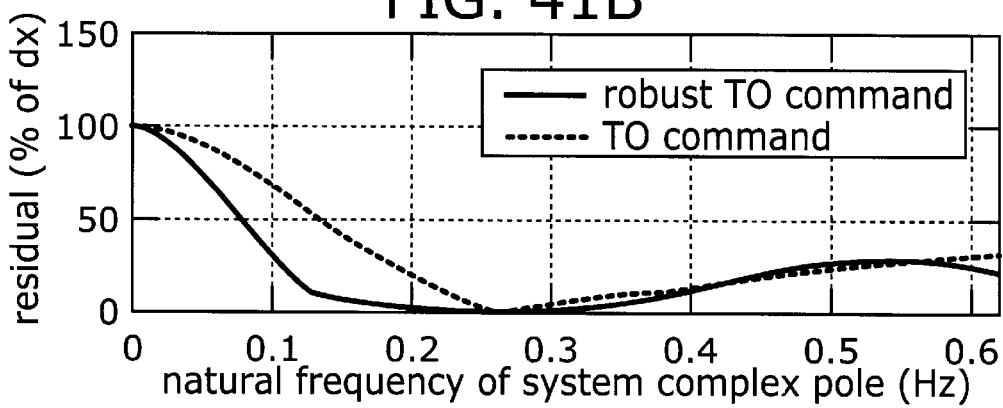
Figure 41D:
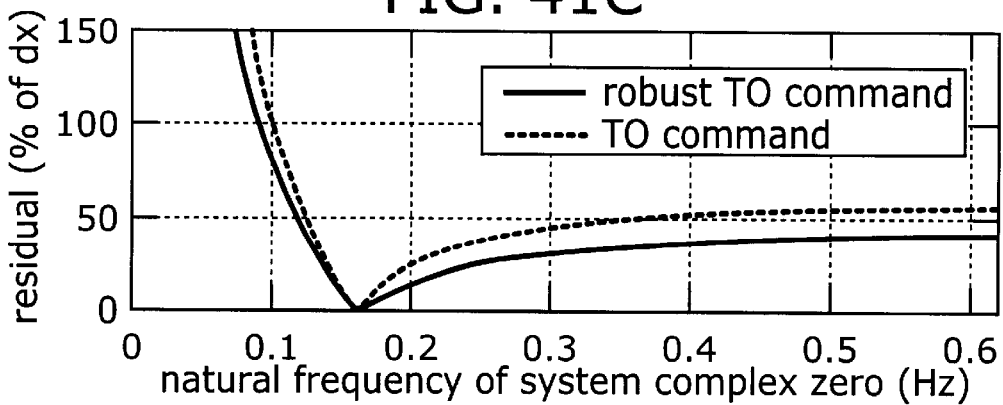

By creating a new system with one additional pole at each of the complex poles in the spring-mass system, the procedure for deriving time-optimal commands was used to create a new time-optimal command. This time-optimal command, when applied to the original spring-mass system, can be used to deliver time-efficient performance with improved robustness to uncertainties in the system complex mode. This robust, time-optimal command profile and the corresponding system response is shown in the plot of FIG. 41a. As this result illustrates, the robust, time-optimal command can deliver better robustness at the price of increasing the system response time by about a factor of two. Since this command was designed to be robust only to variations in the complex pole, the insensitivity curve for the complex pole, shown in FIG. 41c, shows greatly enhanced robustness. As enforced by the robustness constraint equations, this curve has zero slope and zero value at the nominal pole frequency. For the real pole and the complex zero (see FIGS. 41b and 41d, respectively), on the other hand, the robust, time-optimal command only demonstrates slightly improved robustness. Since the command profile was not designed with these dynamics in mind, this result is not surprising.

Figure 42A:
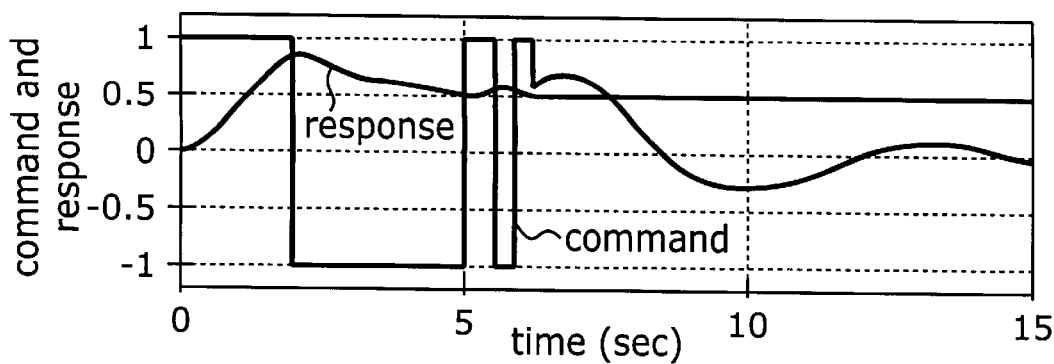
FIGS. 42*a*, 42*b*, 42*c* and 42*d* show a time-optimal command with enhanced robustness to variations in the real and complex poles of a system and the corresponding insensitivity curves.
Figure 42B:
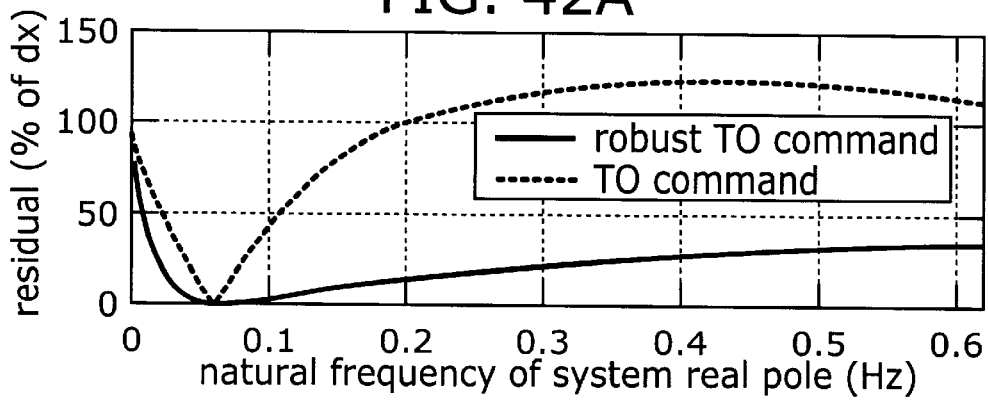
Figure 42C:
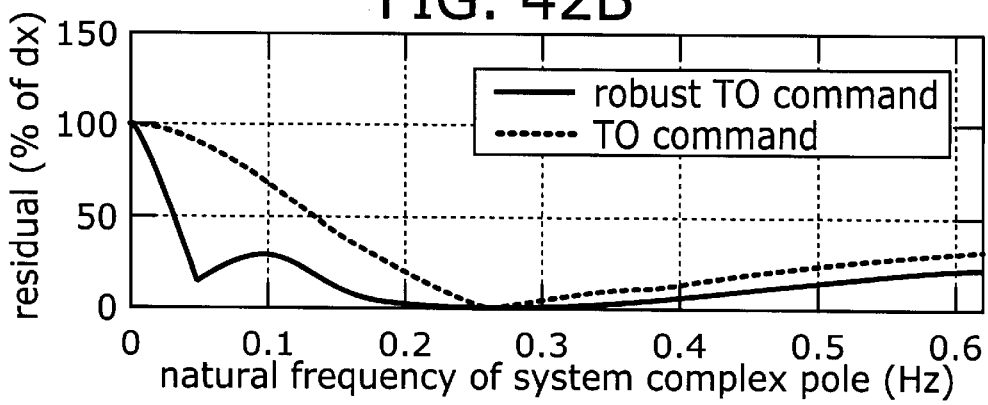
Figure 42D:
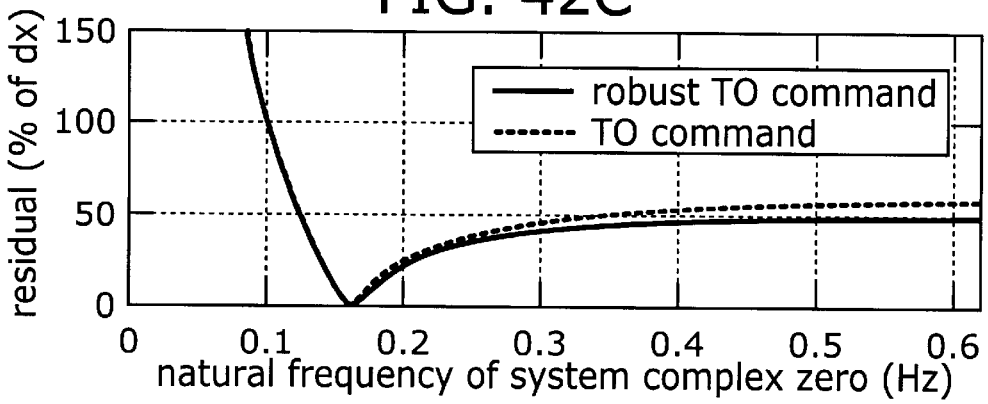

In order to create a time-efficient command profile with robustness to both the real and complex system poles, a new system can be created with a double pole at each of these poles locations. When the time-optimal command is derived for this new system and applied to the original spring-mass system, it should effect the desired system output behavior with greater insensitivity to variations in the system denominator dynamics. This robust, time-optimal command profile and the resulting system response is illustrated in FIG. 42a. As this result demonstrates, in order to make the command profile robust to variations in both the real and complex mode, the system response time increases by about a factor of three over the time-optimal command. As the insensitivity curves in FIGS. 42b, 42c and 42d illustrate, however, this command has much improved robustness for both system poles. Not surprisingly, the insensitivity curve for the system zero shows little improvement.

5.2 Designing Commands with a Limited Tail Length

For systems that contain both poles and zeros, the system response time can be greatly reduced by designing a time-optimal command with a tail. This tail excites the system at the frequency of the system zeros while keeping the system output at rest at its desired final value. This extra degree of flexibility in the solution space of the time-optimal command profile allows for shorter command lengths that improve the system's speed of response. In many applications, it is undesirable to have a tail that drives a system after the output has reached its desired final value. Furthermore, if the frequencies of the system zeros are not known exactly, this tail will cause problematic residual response in the system output. In order to avoid this situation, it is important to have a command derivation scheme that allows the length of the command tail to be limited. This section presents an approach that can be used to this end as well as a demonstration of its performance on a simple system.

As a necessary condition for maintaining the system output at its final value, the only acceptable profile for the tail of a time-optimal command is a linear combination of the initial condition response at the components of the system zeros. In other words, $$u_{tail}(t) = \sum_{j=1}^{r} c_j e^{z_j(t-t_n)} 1(t-t_n), \quad (5.6)$$

for $t \geq t_n$, where $c_j$ are the tail coefficients, $z_j$ are the modeled values for the system zeros, and r is the number of system zeros. Clearly, from this equation, the only way to limit the length of the tail is to limit the value of the coefficients, $c_j$. One possible approach for imposing this constraint is to place a limit on the amount of time it takes for a command tail to settle within a certain specified envelope. For example, if it is desired to have the tail settle to within 5% of the actuator limits, $u_{lim}$, by a time $t_f$ seconds after $t_n$, the following equation can be enforced:

$$\sum_{j=1}^{r} c_j e^{-\zeta_j \omega_{nj} t_f} \leq 0.05 u_{lim}, \quad (5.7)$$

where $-\zeta_j \omega_{nj}$ is the real component of the system zero, $z_j$. This equation constrains the sum of the envelopes that bound the time-response of the tail components to settle within a given level in a specified amount of time. Since this constraint equation is expressed in terms of the command parameters, $c_j$, it can be easily incorporated into the solution framework outlined in section 3 of this document. Specifically, by appending equation 5.7 to the three other problem constraints that ensure time-optimality, namely the dynamics cancellation, boundary conditions, and actuator limit constraints, the general solution procedure can be used to create time-efficient commands with a tail length tailored to the specific application at hand.

Figure 43A:
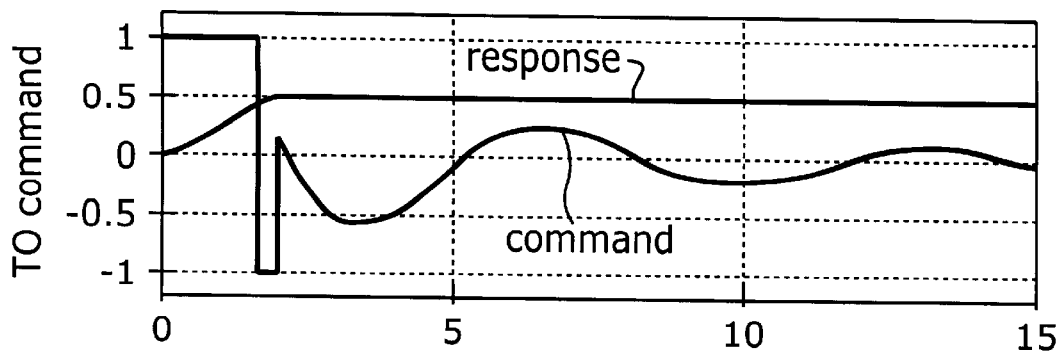
FIGS. 43*a*, 43*b*, 43*c* and 43*d* show time-optimal and time-efficient commands with varying tail lengths.
Figure 43B:
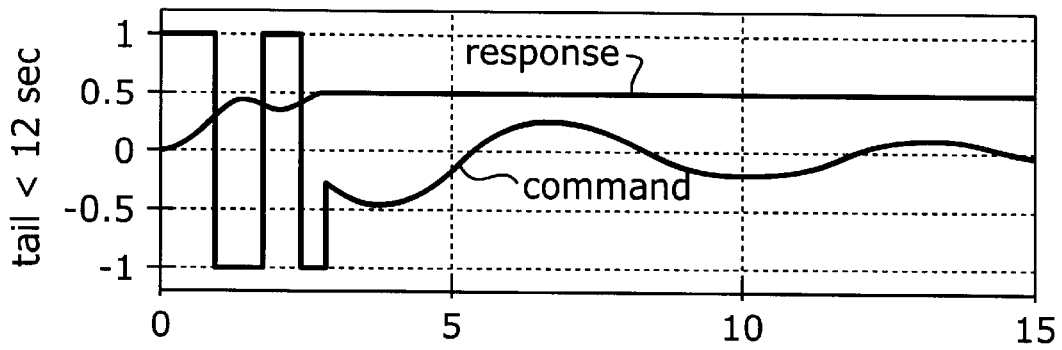
Figure 43C:
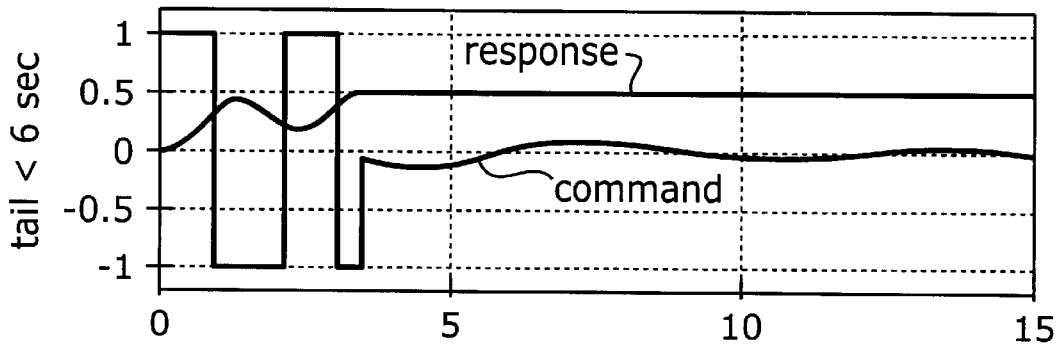
Figure 43D:
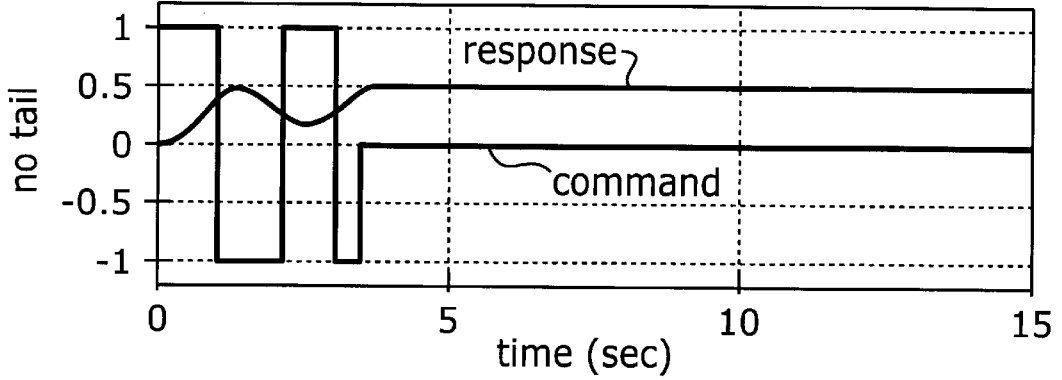

FIG. 43a illustrates some of the command solutions that were derived using this tail-length constraint for the same spring-mass system of FIG. 32a. In particular, FIGS. 43a to 43d compare the time-optimal command, in FIG. 43a, to three other commands with differing tail lengths. In FIG. 43b, the tail length was constrained to settle to within five percent of the actuator limits in twelve seconds. As this command profile and the resulting system response illustrate, a command with a smaller tail can be created at the expense of lengthening the system response time. Additionally, this command also contains two more switches than the time-optimal profile. Since the presence of zeros in a system can reduce the number of switches required in the time-optimal command, when the influence of these zeros is lessened by reducing the tail length, it is not surprising to see the number of command switches increase. The plot in FIG. 43c illustrates the command profile that resulted from a six second time limit on the length of the tail. As expected, this command has a tail of lower amplitude and length but a longer pulse train. In the last plot of FIG. 43d, the tail coefficients were constrained to be zero. Recalling the example from section 4.5, this command profile corresponds to the time-optimal control for an equivalent system with the zeros removed. This last result illustrates that if a command with no tail is desired, a designer can take a given system model, remove the zeros while keeping the same steady-state gain, and use the solution procedure from section 3 of this document to derive a time-optimal command profile. The resulting time-optimal command for the augmented system will be the shortest possible command that can deliver the actual system from its initial to its final value without the presence of a tail.

Figure 44:
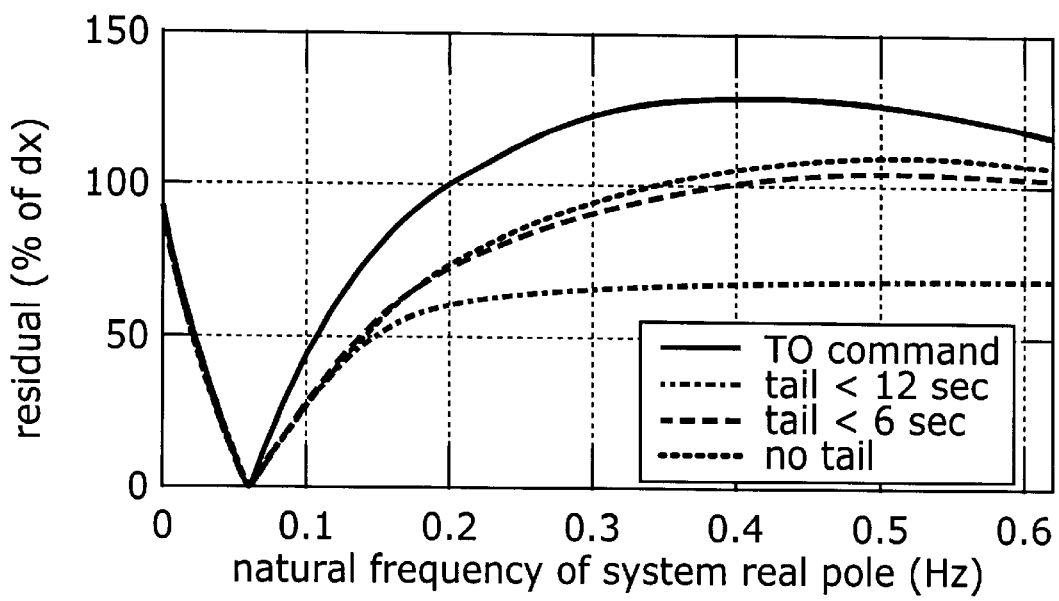
FIG. 44 shows the insensitivity of commands with four different tail lengths to variations in the real poles of a system.
Figure 45:
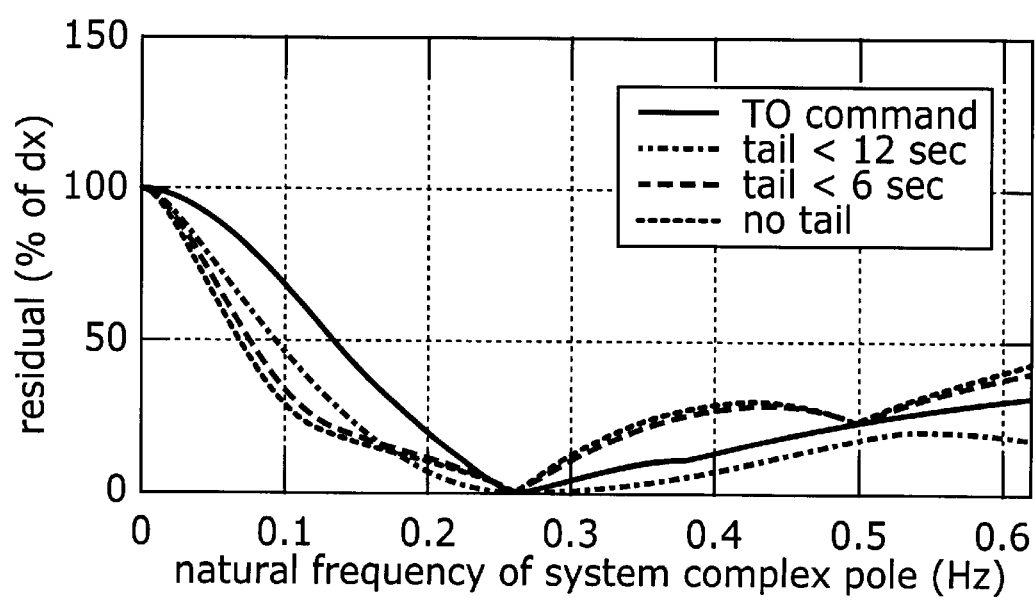
FIG. 45 shows the insensitivity of commands with four different tail lengths to variations in the complex poles of a system.
Figure 46:
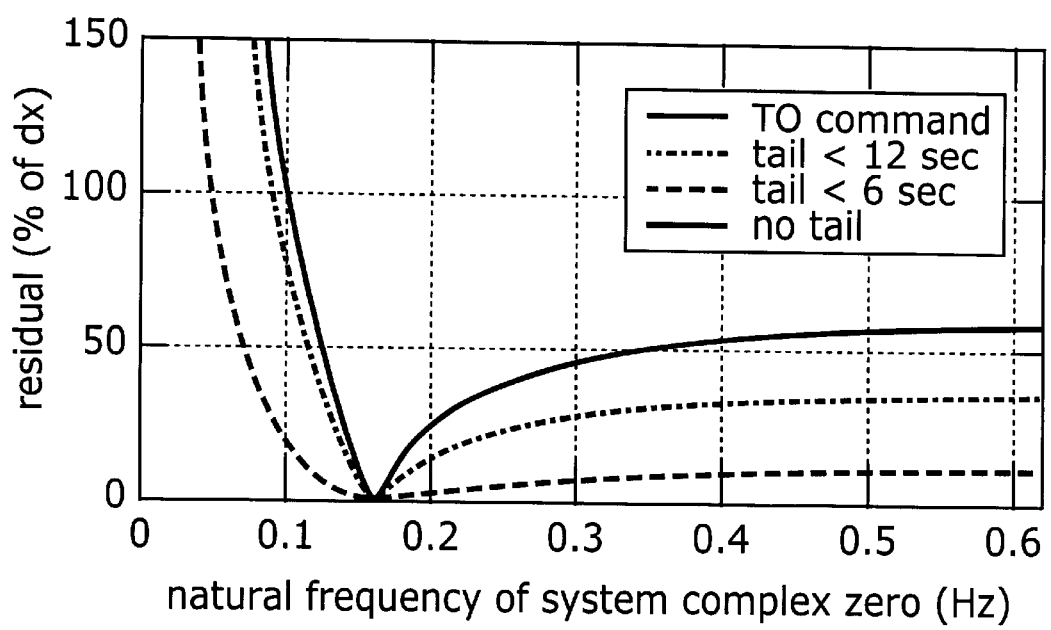
FIG. 46 shows the insensitivity of commands with four different tail lengths to variations in the complex poles of a system.

FIGS. 44, 45 and 46 illustrate the insensitivity curves of the four commands in FIGS. 43a to 43d to variations in the system dynamics. From the curves in FIG. 44 and FIG. 45, it can be seen that reducing the tail length of a command profile influences the robustness to uncertainties in system denominator dynamics in no appreciable manner. In FIG. 46, however, and as discussed in section 5.1.2, by reducing the tail length of the optimal command profiles, the robustness to uncertainties in system zeros can be enhanced. As the curve for the command with no tail illustrates, infinite insensitivity to variations in system zeros can be achieved if the tail is eliminated altogether.

5.3 Other Constraints

This section has illustrated that the solution framework presented in this document is not simply an approach for finding time-optimal command profiles. Instead, it can be viewed as an expandable framework capable of incorporating many different kinds of constraints to enrich command performance. For example, in systems that have limited fuel, designers may with to place constraints on the fuel usage of a command profile. This can often be accomplished by creating a constraint that penalizes the amount of time that the actuators are saturated. Similarly, in some systems that require gentle yet fast motion, deflection limiting constraints can be incorporated to limit the internal loads and resulting machine deflection during operation. Lastly, in systems where unmodeled modes may be excited by bang—bang command profiles, a constraint can be imposed to keep the amplitudes of the steps in the command pulse train to be greater than zero. The staircase commands that result from this solution approach will be identical to commands derived using the input shaping technique and can be used to achieve robust and rapid motion in many systems.

6 Solving for and Verifying Time-Optimal Commands

To this point, we have presented a general solution approach for the time-optimal control problem and illustrated methods for extending this technique for deriving a wider class of time-efficient commands. This methodology relies on formulating a compact and complete set of constraint equations that can be solved to find optimal command solutions. For most systems, this solution step must be accomplished using an optimization routine to search through the set of possible command solutions. This section is devoted to discussing one possible process for numerically searching for time-optimal and time-efficient command profiles. Furthermore, since numerical approaches can sometimes return non-optimal solutions, a process is also discussed in this chapter for verifying the optimality of command solutions. This combination of an efficient solution search routine and verification process provides a powerful tool for identifying optimal commands for linear systems. Following the individual discussion of these two solution components, some general statements will be made about the performance of these processes and their effectiveness at deriving time-optimal and time-efficient command profiles.

6.1 Optimization Process to Find Time-Optimal and Time-Efficient Commands

For linear systems that contain more than one or two poles, time-optimal and time-efficient solutions must be derived numerically using an optimization process. In general, as discussed in section 3, since the fundamental constraint equations for this problem can be expressed algebraically in a simple and compact form, numerical optimization of these constraints proves to be fast and reliable. This section presents a possible process that can be used to generate optimal command solutions using a numerical optimization process.

Figure 47:
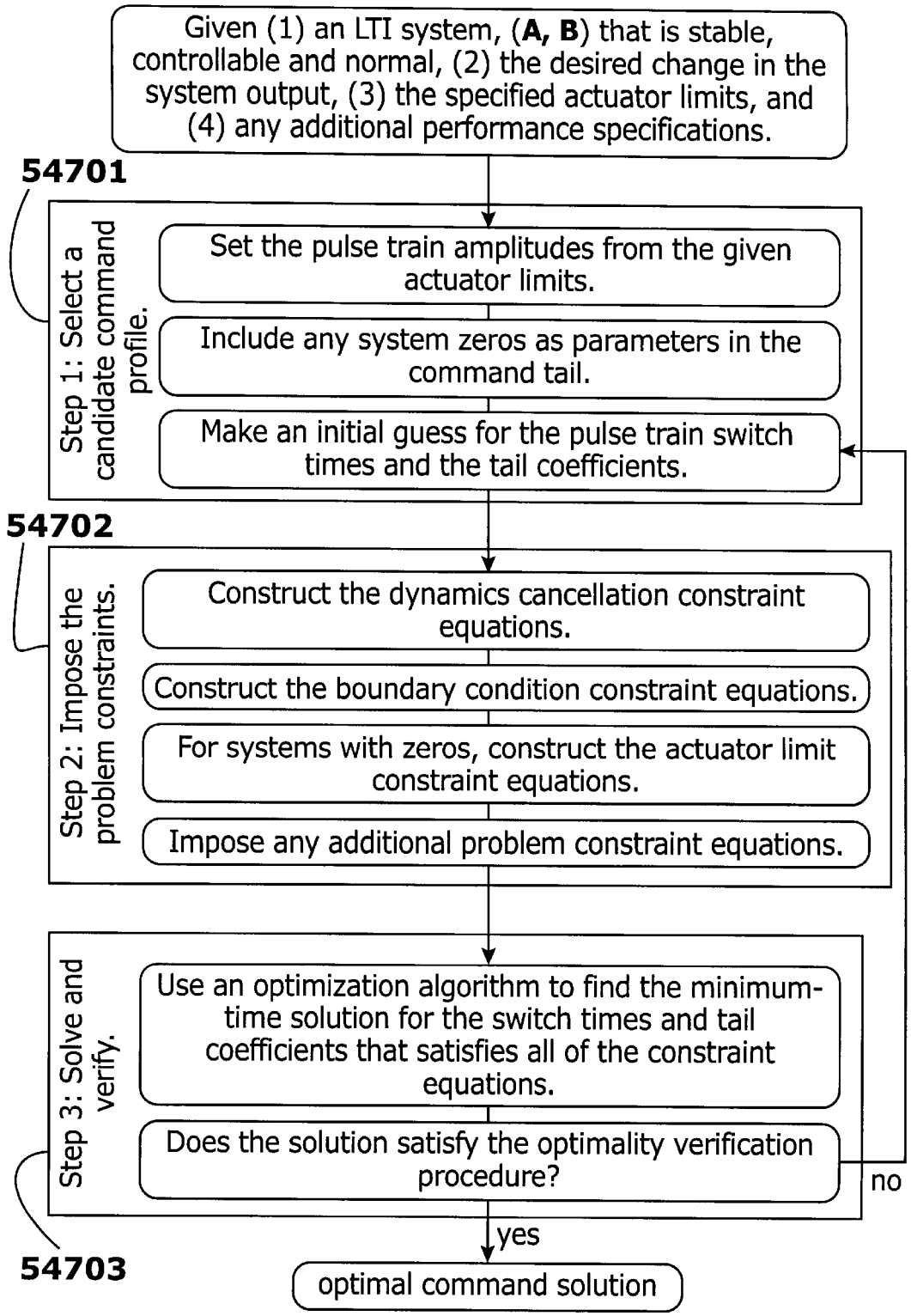
FIG. 47 shows computer-executable process steps for determining time-optimal and time-efficient commands.

FIG. 47 illustrates a computer-executable process for numerically identifying time-optimal and time-efficient commands. As this figure depicts, the procedure begins with a given linear, time-invariant system and a set of problem specifications. From this point, the remaining solution steps can be categorized into the three basic solution stages that surface throughout this document: (1) select a candidate command profile in step S4701, (2) impose the problem constraints in step S4702, and (3) solve and verify in step S4703.

In the first stage of this procedure in step S4701, the given system model and problem specifications are used to identify parameters which describe a candidate optimal command profile. In particular, the system actuator limits can be used to designate values for the command pulse train amplitudes and any zeros can be identified from the model and included as parameters for the command tail. For the command switch times and tail coefficients, since they are unknown prior to optimization, and initial guess must be made for each of their values. In the case of the tail coefficients, an initial value of zero is not a bad place to start. For the command switch times, however, initial estimates are somewhat more critical. In this case, the first guess which must be submitted is the number of switches that the candidate command must contain. As outlined in section 2.3.3, the minimum number of switches, not including the first and last, that any command must have is equal to $(n-1)-r$, where n is the number of system poles and r is the number of system zeros. For a system with no complex modes, the upper bound on the number of switches is exactly $(n-1)$. In general, in order to select the number of switches to include in the initial guess, it is better to select more switches than the optimal command will require. The reason for this is that, when an optimization routine has too few switches in a candidate command, there will be no viable solution that satisfies the problem constraints. However, if the candidate command has extra switch times, a good optimization strategy can typically merge the redundant command switches to create an optimal command with the correct number of switch times. As a starting point, $(n-1)$ is typically a good initial guess for the number of command switches. For systems with complex modes and long move distances, the designer may want to consider increasing this value by one or two.

Once an initial number of switches is selected, initial estimates for the value of each switch time must be made. This step, in many cases, relies on the intuition of the designer to select reasonable values given the system parameters. Fortunately, for systems of small to moderate complexity, optimization processes are typically forgiving when faced with poor initial guesses. For the examples in this document, initial guesses were typically derived by using a technique from input shaping. In particular, the approach outlined in [114] was used to create non-time-optimal bang—bang commands that satisfied the identical problem constraints. The values for these non-optimal switch times were then used as initial guesses for creating time-optimal and time-efficient commands. For many systems, this approach worked very well, however, for some more complex systems, different initial guesses were required. One effective approach for proposing initial guesses for complex problems is to derive commands for simplified versions of the same system. By constructing commands of increasing complexity, the switch times from each solution can be used to enlighten the initial guesses for each successive system. By capturing the logic of this approach and translating it into a formal procedure, it seems likely that a technique can be developed for creating reliable initial guesses that fully automate the command solution process.

The second stage in the solution procedure depicted in step S4702 is to impose the problem constraints. Discussed thoroughly in previous sections, this step is as simple as encoding the general expressions derived in section 3. Also, for systems with problem constraints beyond the basic time-optimal equations, additional expressions can be appended to this list as described in section 5. For the process used to solve the examples in this document, an efficient matrix notation, described in section 3, was employed to code the general constraint equations. Given the simplicity of the resulting expressions, this task can be achieved with little effort.

The third and final stage of the solution procedure, in step S4703, is to solve for the optimal command solution and verify the result. By enlisting the help of a commercial optimization package such as the Matlab Optimization Toolbox [215, 218] or GAMS [219], the first part of this stage is easy to achieve. Specifically, such an optimization process can be used to find the set of command switch times and tail coefficients that satisfy all of the constraint equations as well as minimize the time-length of the command. For the examples in this document, a constrained nonlinear optimization routine from the Matlab Optimization Toolbox was employed. This process relies on a Sequential Quadratic Programming method to search for optimal solutions. Since this and similar optimization approaches may return local solutions rather than global optimal solutions, a verification stage to the solution approach can be very valuable. Such a verification scheme, which is discussed in detail in the following section, was developed and implemented to check the validity of time-optimal command solutions. This scheme relies on Pontryagin's Minimum Principle to outline a set of necessary and sufficient conditions that the time-optimal command must satisfy. For every command solution that is returned by the optimization routine, these conditions can be invoked to verify its optimality. If they are satisfied, then the command is guaranteed to be the unique time optimal solution for the given problem. If not, then the solution process can be rerun with a different initial guess until the optimal command profile is found.

In order to streamline the creation of time-optimal and time-efficient command profiles for various systems, the graphical user interface to the solution code shown in FIG. 48 was constructed. This interface takes a given linear system model and lists all of the system poles and zeros. From this point, the designer can specify a number of options such as the exact problem specifications, the desired robustness at each system pole and zero, and the desired length of the command tail. If desired, upon creation of the command profile, different plots can be displayed demonstrating various aspects of the command performance.

6.2 Verifying Optimality Using Pontryagin's Minimum Principle

As mentioned above, an approach for verifying the time-optimality of bang—bang commands can be constructed from the conditions outlined in Pontryagin's Minimum Principle. This section builds on prior approaches and describes in detail how they can be applied to the solution methodology outlined in the previous section. This section proceeds by presenting first a brief review Pontryagin's Minimum Principle followed by a general five-step procedure for applying this principle to verify time-optimality.

6.2.1 A Review of Pontryagin's Minimum Principle

Pontryagin's Minimum Principle has been applied widely to solve time-optimal problems for both linear and nonlinear systems. This section will begin with a presentation of the principle for the more general nonlinear case and then explain how it can be simplified for linear systems. Note that, for the equations in this section, the notation ( )* indicates that the value in the parenthesis is that of the time-optimal solution, and the notation ( )|* indicates that the value in the parenthesis is evaluated using time-optimal values.

The general form of Pontryagin's Minimum Principle for the time-optimal control problem can be stated as follows. Given a controllable system, $$x'=f(x, u), \qquad (6.1)$$

where $x=x(t)=$state vector, and
$u=u(t)=$control vector,
the control vector, u(t), that will transition the system from a fixed initial state, $x_0$, to a fixed final state, $x_d$, in minimum time must necessarily satisfy the following conditions:

1. The Canonical Equations:

$$\text{state equation: } \dot{x}^* = \left.\frac{\partial H}{\partial p}\right|_* \qquad (6.2)$$

$$\text{costate equation: } \dot{p}^* = -\left.\frac{\partial H}{\partial x}\right|_*, \text{ where} \qquad (6.3)$$

$$H \equiv \text{Hamiltonian} = \sum_{i=1}^{m} p_i f_i(x, u), \qquad (6.4)$$

m is the number of system states, and $p_i$ and $f_i$ are the i-th elements of the vectors p and f, respectively.

2. Minimization of the Hamiltonian:

For all admissible controls (i.e. controls that remain within the actuator limits), u(t), $$H(x^*,p^*,u^*) \leq H(x^*,p^*,u). \qquad (6.5)$$

In other words, there is no control input, u(t), other than the optimal control, u(t)*, that will yield a lower value of the Hamiltonian, H.

3. Value of the Hamiltonian:

For all values of t in the interval from $t_0=0$ to $t=t_n^*$, where $t_n^*$ is the time length of the optimal control input, $$H(t)^* = H(t_n^*)^* = 0. \qquad (6.6)$$

Given this general form of Pontryagin's Minimum Principle for time-optimal commands, the conditions can be further simplified by considering only linear, time-invariant systems. More specifically, given a system of the form $$x'=Ax+Bu, \qquad (6.7)$$

where $x=x(t)=$state vector, and
$u=u(t)=$control vector, where
A and B are constant matrices that describe a completely controllable system, then the time-optimal control problem is to find the control, u(t), that will satisfy the following two conditions in minimum time: (1) it must remain within actuator limits, $$u_{min} \leq u(t) \leq u_{max}, \qquad (6.8)$$

and (2) it must transition the system from the known initial state, $x_0$ at t=0, to a desired fixed final state, $X_d$. The reduced form of Pontryagin's Minimum Principle states that the optimal control, u(t)*, that solves this problem must necessarily satisfy the following three conditions:
1. The Canonical Equations:

$$\dot{x}^* = \frac{\partial H}{\partial p}\bigg|_* = Ax^* + Bu^* \tag{6.9}$$

$$\dot{p}^* = -\frac{\partial H}{\partial x}\bigg|_* = -A^T p^* = -p^{*T} A \tag{6.10}$$

2. Minimization of the Hamiltonian:
For all admissible controls, u(t), $$H(x^*,p^*,u^*) \leq H(x^*,p^*,u). \tag{6.11}$$

Now, since $$H = 1 + p^T \dot{x} = 1 + p^T A x + p^T B u, \tag{6.12}$$

this condition becomes $$1 + p^{*T} A x^* + p^{*T} B u^* \leq 1 + p^{*T} A x^* + p^{*T} B u, \tag{6.13}$$

for all admissible u(t) on the interval from $t_0$ to $t_n^*$. It can be seen that this relation will be true when $$u(t)^* = u_{min}, \text{ for } q(t)^* > 0,$$

and $$u(t)^* = u_{max}, \text{ for } q(t)^* < 0,$$

where q(t)* is called the switching function and is defined as $$q(t)^* = p(t)^{*T} B = B^T p(t)^*. \tag{6.14}$$

3. Value of the Hamiltonian:
For all values of t in the interval from $t_0$ to $t_n^*$, $$H = 1 + p^{*T} A x^* + p^{*T} B u^* = 0. \tag{6.15}$$

In addition to outlining the three conditions for optimality stated above, Pontryagin's Minimum Principle also asserts that, if the system described by A and B is stable, and both the initial state, $x_0$, and the final state, $x_d$, are natural equilibrium states of the system, then a time-optimal control will always exist. Furthermore, if the final state, $x_d$, is not a natural equilibrium state but can be reached by an admissible control, then a time-optimal control will also always exist. If in addition to being controllable, the given system is also normal (i.e. the system is controllable from every input), then the time-optimal control, if it exists, is also unique. Therefore, as a summary of the scope of Pontryagin's Minimum Principle, for linear, time-invariant systems that are normal, stable and have a desired change of state that can be effected by an admissible control, the time-optimal control exists, is unique, and must necessarily satisfy conditions 1, 2, and 3.

Figure 49:
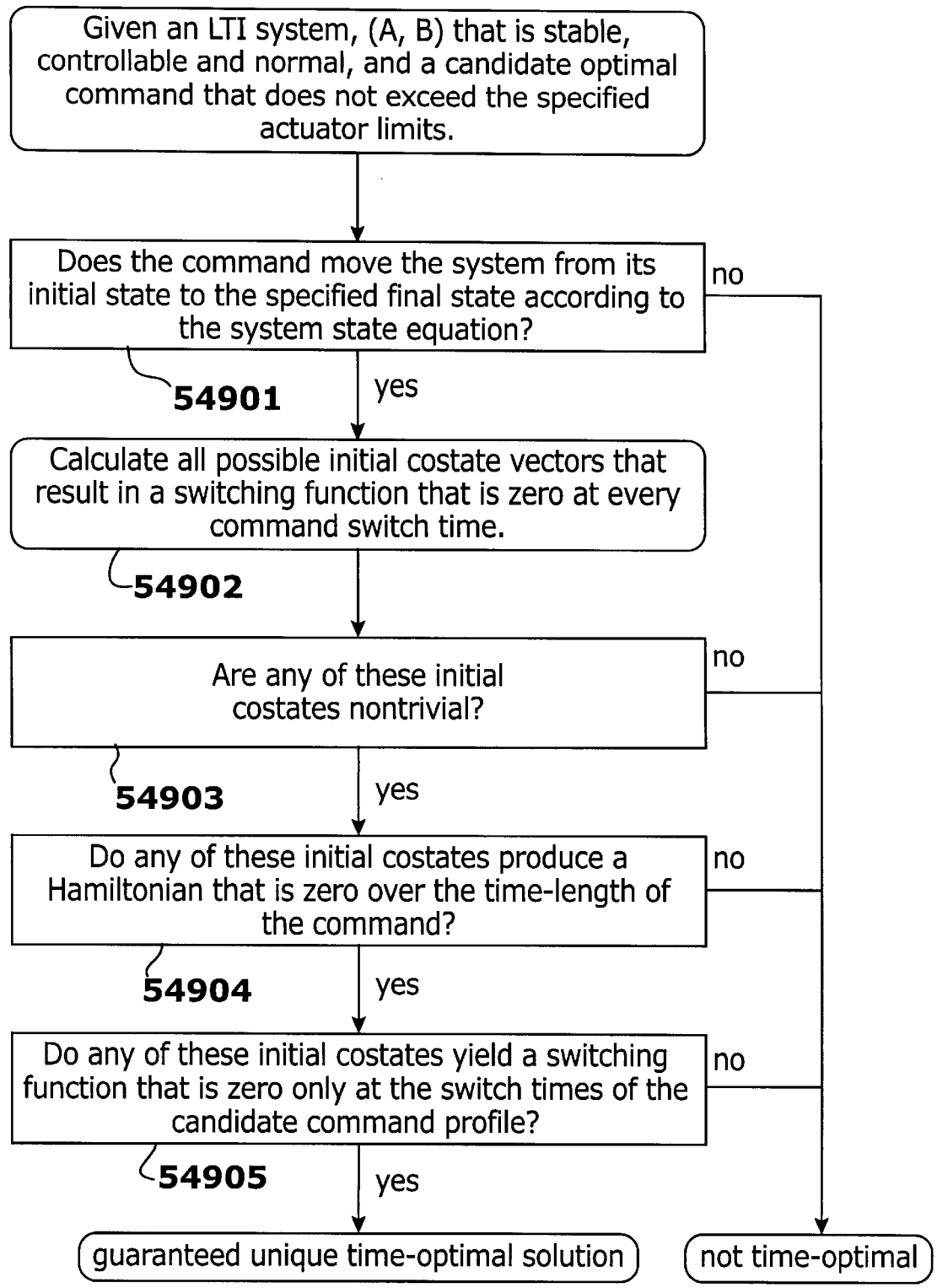
FIG. 49 shows a process for verifying optimality of a time-optimal command.

6.2.2 Procedure for Verifying Time-Optimality Using Pontryagin's Minimum Principle As outlined above, Pontryagin's Minimum Principle establishes a set of necessary and sufficient conditions that a time-optimal command must satisfy. While these conditions do not suggest a straightforward way to derive optimal command profiles, they do lend insight into a simple procedure that can be used for verifying the optimality of commands created using other methods. This verification procedure is illustrated in FIG. 49 and described in detail below.

Step S4901: The first step for checking optimality is to verify that a given linear, time-invariant system is stable and normal. If not, then the conditions in Pontryagin's Minimum Principle do not guarantee that a time-optimal solution will exist or be unique.

Step S4902: If the time-optimal command is designed correctly, it will deliver the system output from its initial state to the desired final state. This can be verified by solving or simulating the state equation, equation 6.9, in condition 1.

Step S4903: In order to satisfy the second condition of Pontryagin's Minimum Principle, namely that the Hamiltonian must be minimized over the time length of the optimal command, the value of the function $p(t)^T B u(t)$ must be minimized over the time length of the command. Therefore, in order to be optimal, u(t) must be at the minimum actuator value when the switching function, $p(t)^T B$, is greater than zero and the maximum actuator value when $p(t)^T B$ is less than zero. Also, since $p(t)^T B$ is a smooth function, it must be equal to zero at the exact locations of the switch times of the proposed optimal command. Now, in order to calculate the switching function, the value of p(t) must first be determined. This can be done by solving the costate equation, equation 6.10, in condition 1 to produce the expression $$p(t) = e^{-A^T t} p_o, \tag{6.16}$$

where $p_o$ is the initial value of the costate vector. This result can be substituted into the expression for switching function, q(t), as in equation 6.14, to yield $$q(t) = B^T e^{-A^T t} p_o. \tag{6.17}$$

Since the value of $p_0$ corresponding to the optimal solution is unknown, this equation cannot be used to calculate the switching function. However, since we know that this function must be zero at the locations of the command switch times, the proposed optimal command will only be optimal if $$q(t) = B^T e^{-A^T t_j} p_o = 0, \tag{6.18}$$

where $t_j$ are the values of the switch times in the candidate command, excluding $t_0$ and $t_n$. From this result, it can be seen that this expression can be evaluated for every switch time and the resulting set of equations can be solved to find all initial costate vectors, $p_0$, that satisfy these equations. If no initial costate vectors exist that satisfy this set of equations, then the proposed command is not time-optimal.

Step S4904: Once a set of initial costate vectors that satisfy equation 6.18 has been identified, the one which corresponds to the unique time-optimal command solution must be isolated. Condition 3 in Pontryagin's Minimum Principle can be used as the first metric for assessing the optimality of these initial costate vectors. As in equation 6.15, this condition asserts that the optimal command must result in a Hamiltonian that is zero over the time length of the command. This can be verified by calculating the Hamiltonian for each initial costate vector. Note however that equation 6.18 can only be used to determine the direction of the initial costate vectors, not the magnitude. As a result, each candidate initial costate vector can also be scaled by an arbitrary constant and still satisfy equation 6.18. Given this, it can be seen from the expression for the Hamiltonian in equation 6.15 that, in order to yield a Hamiltonian that is zero, the following relation must hold:

$$p^{*T} A x^* + p^{*T} B u^* = \text{constant}. \tag{6.19}$$

If this expression is satisfied by any of the candidate initial costate vectors, their magnitude can be scaled appropriately to also satisfy equation 6.15. If any of the initial costate vectors do not satisfy this expression, they cannot be optimal and must be eliminated from consideration.

Step S4905: The final step in verifying the optimality of a command profile is to use the initial costate vectors that fulfilled step 4 to calculate a switching function, as in equation 6.14. In order to be optimal, the resulting switching function must be zero at only the values of the command switch times. If the switching function has a fewer or greater number of values where it is zero, it cannot be optimal. If a nontrivial solution exists that satisfies this condition, then it is guaranteed to be the unique time-optimal solution.

The foregoing five-step verification procedure can be applied to validate time-optimal commands for linear, time-invariant systems, and as a result, it proves to be a valuable companion to any command solution process. The usefulness of this approach does not end there, however, since this approach can also be applied to robust, time-optimal commands and commands with tail-length constraints. For the case of robust, time-optimal commands, section 5 reveals that the robust, time-optimal command for a given system is equivalent to the time-optimal command for a similar system with additional poles at the locations of the uncertain system modes. Following this reasoning, it can be seen that the verification scheme can also be applied in this case to ensure that the robust, time-optimal command is indeed the time-optimal command for the augmented system model.

For commands that have tail length constraints, this scheme can be used as well. Specifically, as described above, Pontryagin's Minimum Principle only places restrictions on the bang—bang portion of the optimal command profile. For commands that contain a tail, typically the pulse train of the command can be shortened due to the additional flexibility in the allowable final state of the system. For a specified system final state, Pontryagin's Minimum Principle can identify the unique time-optimal command that will deliver the system there, but it makes no claims on what this optimal final state should be. By relying on the command solution scheme in section 6.1 to identify what the optimal final system state should be, the verification scheme can then be used to guarantee that the command pulse train is indeed optimal for delivering the system to this final state.

6.3 A Statement on the Performance of the Solution Approach

By combining a straightforward solution methodology with a verification scheme, a hybrid approach can be created that can reliably deliver time-optimal and time-efficient solutions for linear systems. Since the governing constraint equations in this approach are algebraic by nature, solutions for many systems can be reached quickly and reliably. Additionally, by employing a computationally efficient verification scheme, these solutions can be guaranteed to be optimal. The exact amount of time required to reach solutions using this procedure depends on both the system complexity as well as the quality of initial guesses for the command parameters. For systems that have fewer than around five poles, optimal commands can typically be found within a few seconds. In most cases, the solution process delivers and verifies the solution on the first iteration. For more complex systems, such as ones that contain five to fifteen poles, solution times are very much related to the accuracy of the initial guess. In the best case, solutions can be found immediately, and in the worst case, solutions could require dozens of iterations to locate the optimal solution.

For systems that are more complicated than these, finding time-optimal solutions can be tedious and unreliable. With greater attention to numerical conditioning and better initial estimates, this problem may be solvable. However, since time-optimal commands typically have little energy at higher system modes, commands designed for fewer than five system modes often prove to be more than adequate for delivering the desired performance upon implementation.

7 Experimental Results

Using the general solution process outlined in the previous chapter, time-optimal and time-efficient commands can be easily derived for a wide range of linear systems. As the examples in section 4 attest, the commands derived using this approach work effectively on linear system models. In order to truly demonstrate the effectiveness of this technique, however, implementation on hardware is required. In order to accomplish this, several experiments were run on a mechanical testbed designed for the Middeck Active Control Experiment. Originally constructed for a Space Shuttle flight experiment, this hardware was designed to be representative of a highly flexible space satellite. Consequently, the structure contains a lightly damped fundamental bending frequency below 2 Hz and four dominant flexible modes below 10 Hz. Because of these complex system dynamics, evaluating command profiles as well as control designs on this testbed is in some ways a trial by fire. However, if these command profiles can display acceptable performance on this experimental platform, then they can likely be implemented with much success on many other kinds of systems.

This section proceeds by first presenting an overview of the MACE experiment, including a discussion of the experiment goals and research efforts. Following this description, experimental results will be presented for the implementation of time-optimal and time-efficient commands on the MACE hardware. From these experimental results, it will be demonstrated that the command profiles derived using the approach in this document can be effectively applied to real physical systems.

7.1 The MACE Experiment

Figure 50:
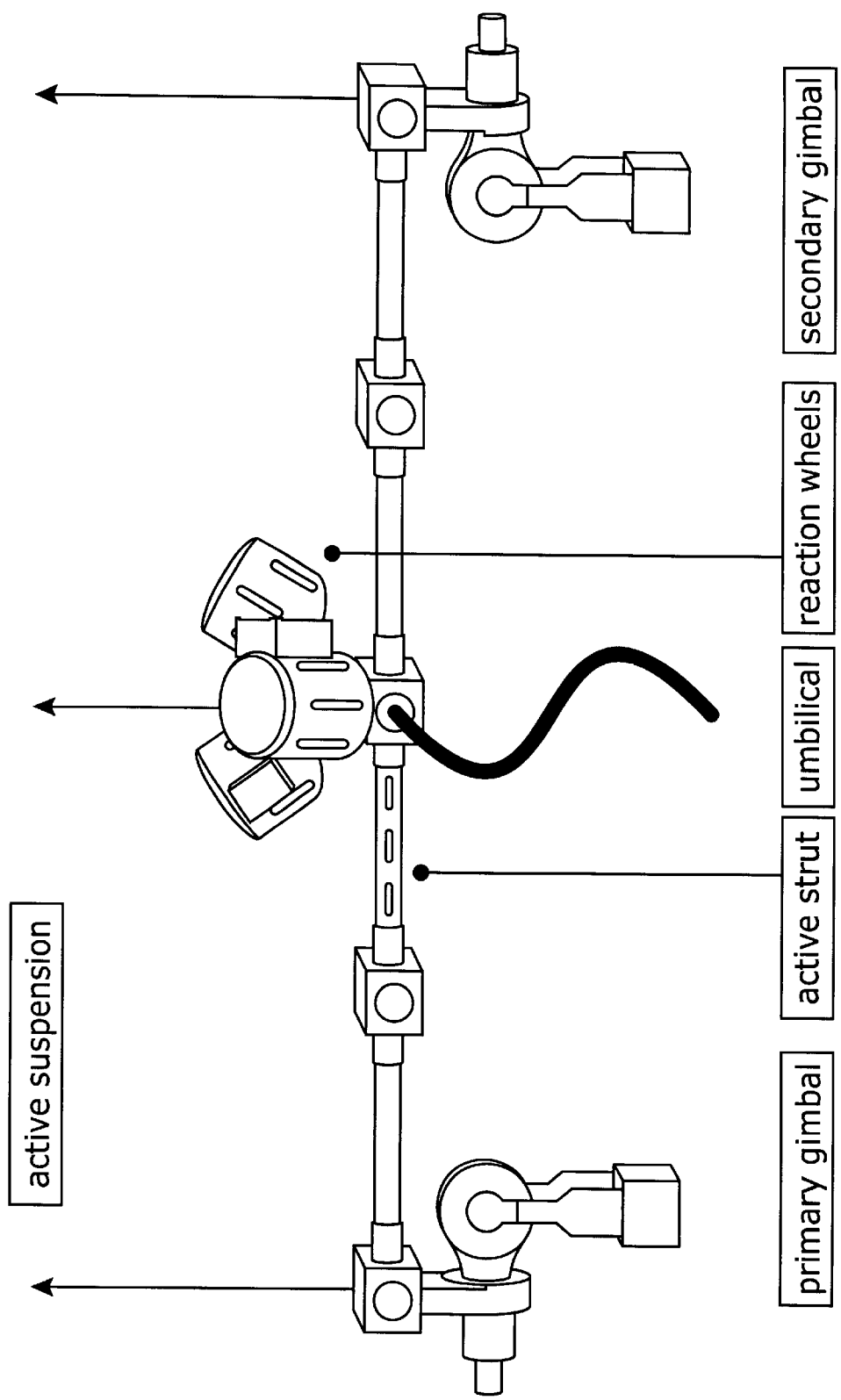
FIG. 50 shows hardware for the Middeck Active Control Experiment (MACE).

The purpose of MACE is to develop and verify a set of techniques that can be used to give designers of spacecraft, which cannot be tested adequately on the ground, confidence in eventual on-orbit performance. To achieve this objective, the MACE hardware, as shown in FIG. 50, was flown aboard the space shuttle Endeavour in March of 1995. Using this experimental platform, three main tasks were performed to investigate modeling and control design in a zero-gravity environment. First, controllers and shaped inputs, which were designed prior to flight using ground-based modeling efforts, were implemented. Second, a system identification was performed on-orbit and the resulting ID data was down-linked and used to formulate new controllers and shaped inputs. Last, these new controllers and inputs were up-linked during the mission and implemented on the MACE hardware. A more detailed overview of the MACE project is available in [220–222].

7.1.1 The MACE Hardware

The MACE test article was designed to be representative of a typical precision-controlled, high payload-mass-fraction spacecraft, such as an Earth-observing satellite, with multiple independent scanning or pointing instruments. As a result, the MACE hardware, as shown in FIG. 50, consists of a five-foot-long flexible bus with a gimbal at each end. Actuated by direct-drive DC torque motors, each of the two gimbals can move its payload around two perpendicular axes. The MACE bus is constructed from four tubular polycarbonate struts, one of which contains piezoelectric material to actuate bending strain in the structure. In addition to these actuators, a reaction-wheel assembly is located in the center of the MACE structure to provide attitude control of the test article. This assembly is comprised of three orthogonally mounted inertia wheels driven by DC servo motors.

In order to closely monitor open- and closed-loop performance, the test article is outfitted with a variety of sensors. Specifically, each gimbal axis has a laser rotary encoder to measure the angle of the gimbal relative to the bus. Also, a two-axis rate-gyro platform is mounted on the payload arm of the primary gimbal while a three-axis rate-gyro platform measures bus rotation at the reaction-wheel assembly. Last, eight pairs of strain gages are mounted on the bus links, two per strut, to monitor the vertical and horizontal bending strains in the structure.

All electronics for collecting sensor data and controlling actuators reside in the MACE Experiment Support Module (ESM). In addition to harboring a DSP-based real-time control computer to implement control processes, the ESM contains analog servos for the reaction wheels, rate-gyro notch filters, sensor anti-aliasing filters, as well as all data-acquisition electronics. Using the DSP board and feedback from encoder rate signals, all four gimbal motors are controlled by SISO proportional-integral servos. During experiments, the control computer is capable of sending predetermined commands to the gimbal actuators while simultaneously running a MIMO high-performance controller. All controllers are run at a 500 Hz sampling rate.

Both before and after flight, the MACE hardware was ground-tested thoroughly. In an attempt to replicate 0-g behavior in a 1-g environment, the entire structure is supported on a pneumatic-electric active suspension. This suspension supports the structure at the bus center and both ends and is designed to have low-frequency rigid-body modes well below 1 Hz.

7.1.2 MACE Modeling and Control

The design of high-performance command profiles and controllers for MACE rests heavily on the development of accurate models. Since the exact behavior of the MACE structure in 0-g could not be measured prior to flight, a finite-element model (FEM) to predict the on-orbit behavior was created using ground-based testing of the flight hardware. Specifically, a parameter-based FEM was developed to replicate the behavior of the MACE hardware as supported by the active suspension in 1-g. The open- and closed-loop behavior of this model was then compared to that of the actual structure in order to refine the model and verify its validity. When the 1-g FEM was sufficiently accurate, the 0-g model was created by removing gravity and the suspension system from the 1-g model. The resulting 0-g model, which contained 130 states and 13 modes below 20 Hz, represented the best available predictor of real on-orbit behavior for MACE. A detailed account of MACE finite-element modeling work can be found in [223–226].

The second aspect of the MACE modeling effort was the creation of measurement-based models using actual system identification data. Since these measurement-based models were derived directly from the experimental data, they proved to be highly accurate predictors of system behavior. As a result, they were also used as a baseline from which the accuracy of the finite-element models could be measured. In particular, the measurement-based system-identification to be performed on MACE employed the Frequency Domain Observability Range Space Extraction (FORSE) technique, as described in [227, 228] to convert frequency-domain data into a state-space system model. During the MACE mission, this process was applied to on-orbit data to create a highly accurate 0-g models which were used to design some of the controllers and command profiles implemented during the flight. The results of these redesigned experiments were used to understand the value of on-orbit system identification for maximizing 0-g performance.

The success of MACE was evaluated in part on its ability to exhibit high-performance structural control in a zero-gravity environment. Reaching this goal depended not only on accurate 0-g models but also on control-synthesis techniques that were robust to errors in these models. To address this issue, modern MIMO robust-control processes, such as Sensitivity Weighted Linear Quadratic Gaussian (LQG) and Multiple Model (MM) control, were implemented during the MACE mission. The performance of these controllers was measured by their ability to isolate the primary gimbal from vibrations in the test article excited by the secondary gimbal. More detail on the control techniques used on MACE can be found in [229–233], and an overview of the closed-loop mission results is presented in [234].

In addition to evaluating closed-loop control techniques in zero-gravity, the MACE testbed was also used to assess the performance of feedforward control techniques such as input shaping. During the mission, several different types of time-efficient command profiles were used to execute gimbal slewing maneuvers while suppressing system vibration. A detailed account of these experiments and the mission results can be found in [181, 235, 236].

7.2 Experimental Data

A set of experiments was conducted on the MACE test article to evaluate the performance of time-optimal and time-efficient commands created using the approach outlined in this document. For each of these experiments, the goal was to slew the MACE gimbal payload over an angle of about one degree and bring it to rest as quickly as possible. To accomplish this task, setpoint commands were sent to the gimbal servo and the resulting gimbal pointing angle was measured by a rate gyro.

In order to design optimal command profiles for the MACE structure, a linear system model was required. As described above, for the original MACE mission, a 156-state linearized FEM model was constructed to describe the test article in 1-g. This model was used to simulate the MACE gimbal response in all experimental trials. In order to design time-optimal commands, however, it was first necessary to reduce this model. As discussed in section 6.3, bang—bang commands for most systems work effectively when designed for only a few dominant system modes. In the case of the MACE test article, only the first four dominant system modes were considered. Using a balanced model reduction process, the 156-state MACE model was reduced to an 8-state model. The dynamics of this reduced model, which are summarized in Table 7.1, included four flexible modes and four complex zero pairs. Given values for the important system poles and zeros, several types of commands were designed to effect the desired gimbal slewing angle.

Figure 51:
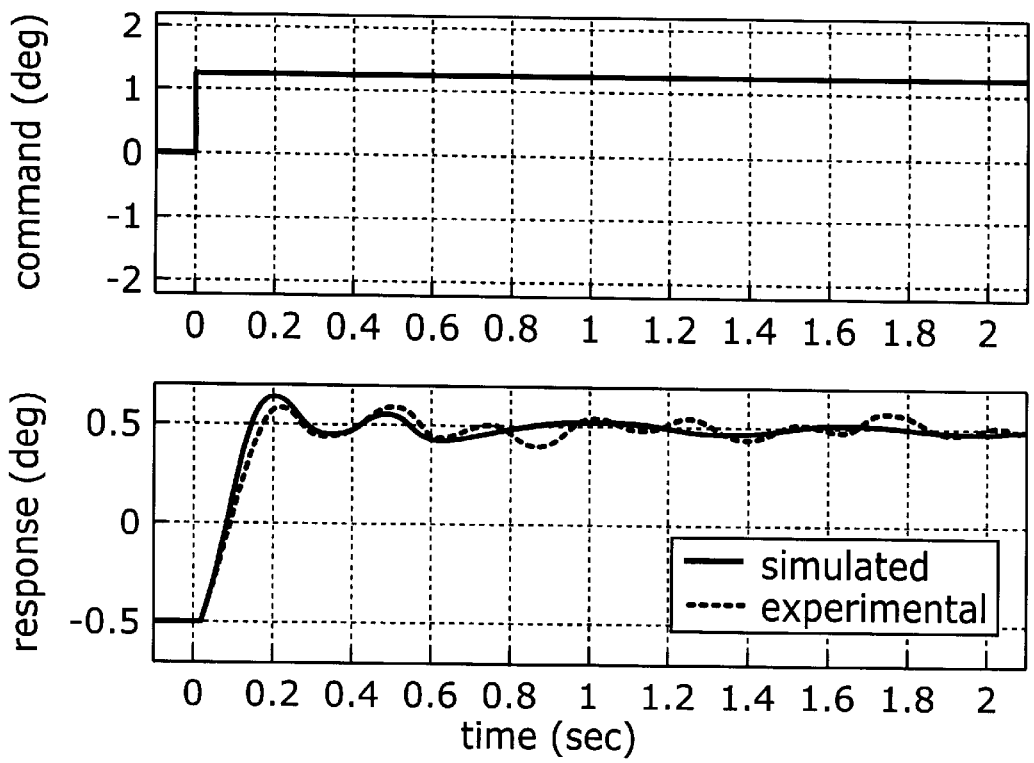
FIG. 51 comprises two plots showing the MACE gimbal response to a step command.
Figure 52:
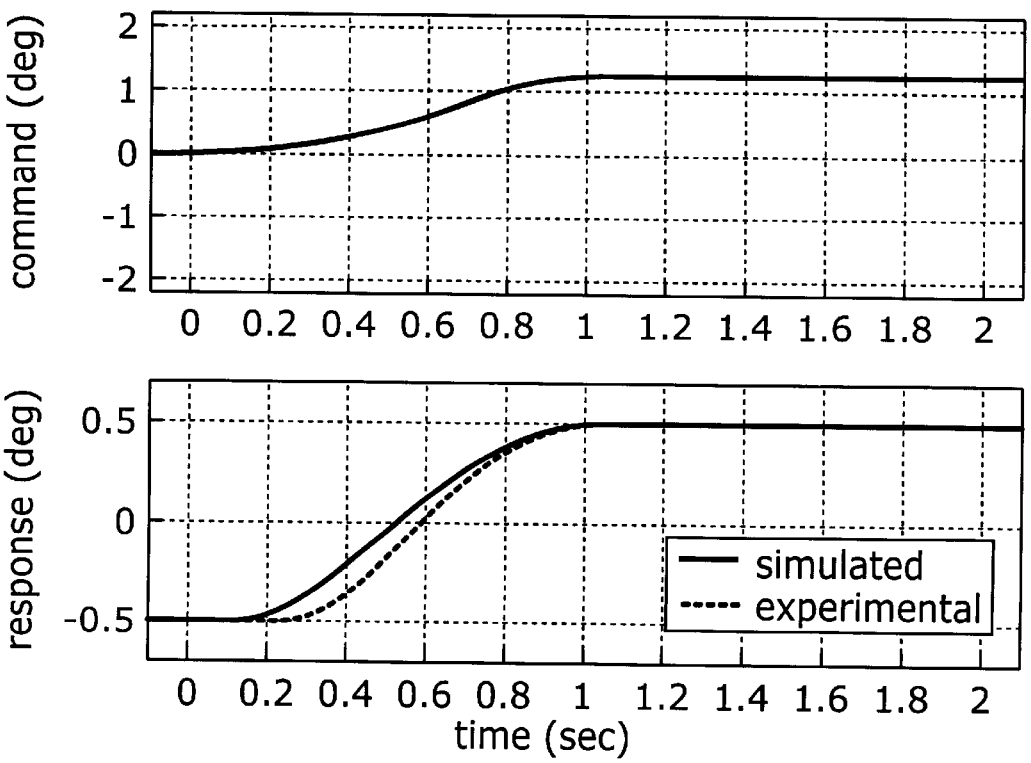
FIG. 52 comprises two plots showing the MACE gimbal response to a spline command.
Figure 53:
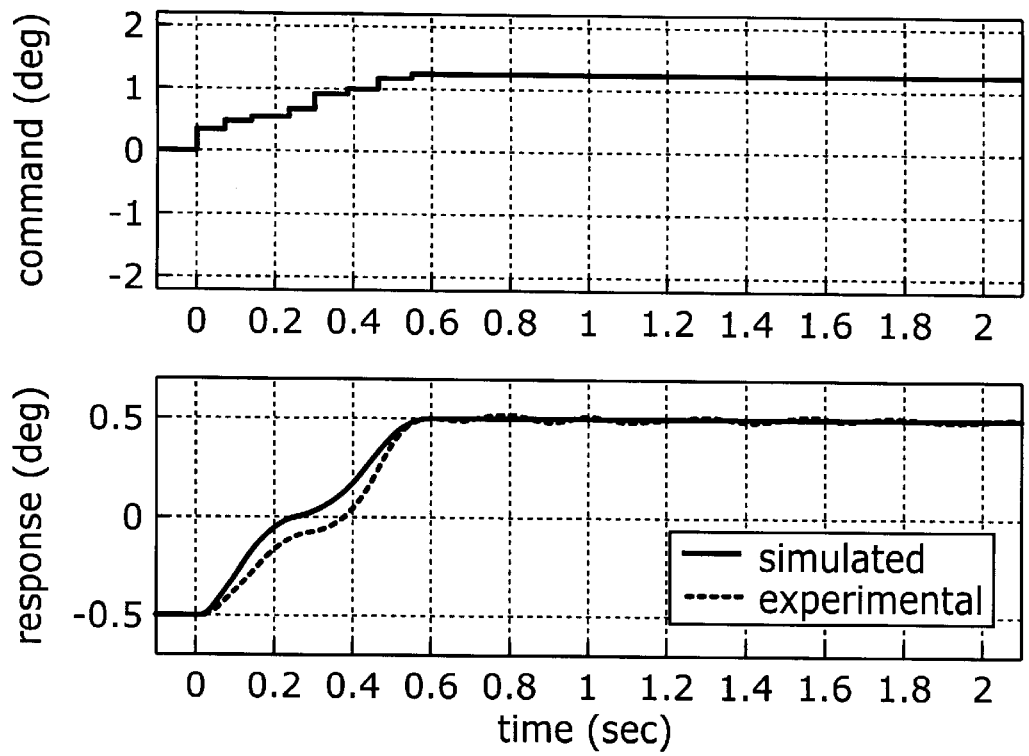
FIG. 53 comprises two plots showing the MACE gimbal response to an input shaper.

The first command profile evaluated on the MACE testbed was a simple step command. As the results in FIG. 51 illustrate, when a step command is sent to the gimbal servo to effect the desired change in gimbal angle, substantial lightly damped vibration is excited in the MACE structure which corrupts the pointing accuracy of the gimbal. As a first measure to remedy this poor performance, designers often employ smoothed commands such as splines to minimize residual vibration. As illustrated in FIG. 52, these commands can be effective at reducing problematic vibration but typically introduce a substantial lag in the system response. A better approach for eliminating unwanted vibration while ensuring rapid system response is to use the input shaping technique. In FIG. 53, the simulated and experimental gimbal response is shown for a command profile created by shaping a step command with an input shaper. The input shaper used in this experiment was designed to suppress vibration at the first four system modes with the minimum level of robustness to dynamic uncertainty. As the experimental results for this command illustrate, with a system response time of about 0.6 seconds, input shaping proves effective at delivering the gimbal to its final angle with little residual vibration.

TABLE 7.1

Summary of the modes used to design the MACE command profiles.

|  | frequency (Hz) | damping ratio |
|---|---|---|
| MACE poles: | 1.55 | 0.04 |
|  | 3.86 | 0.22 |
|  | 4.03 | 0.46 |
|  | 7.43 | 0.03 |
| MACE zeros: | 1.60 | 0.05 |
|  | 4.52 | 0.14 |
|  | 7.39 | 0.04 |
|  | 11.80 | 0.04 |

Figure 54:
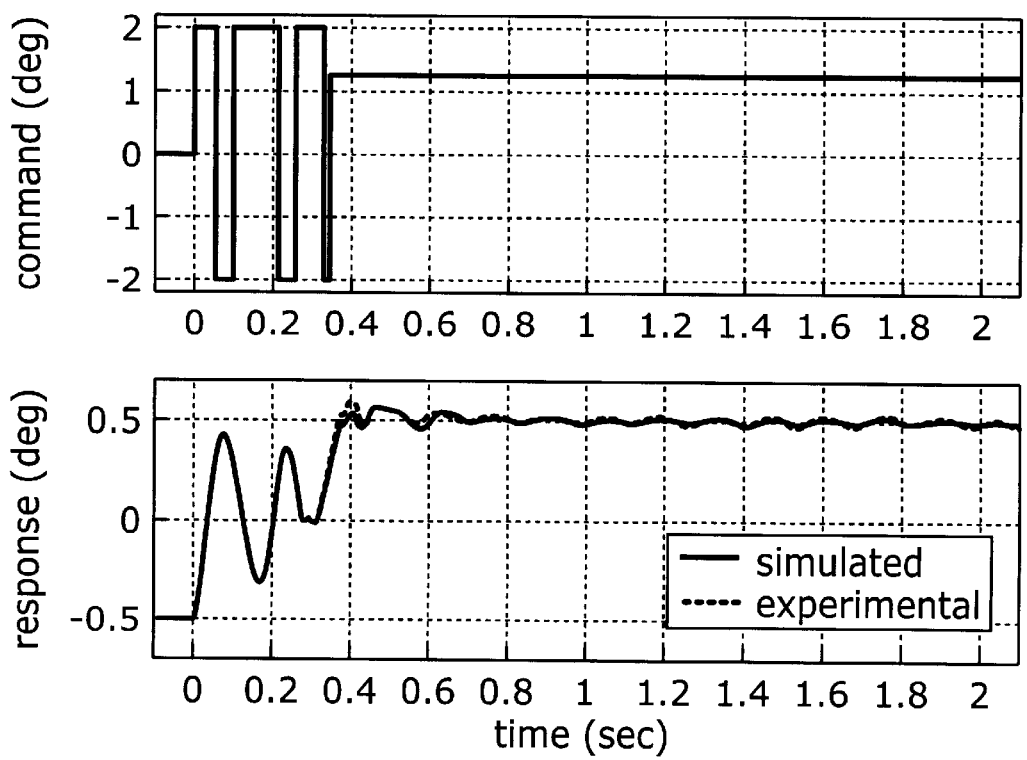
FIG. 54 comprises two plots showing the MACE gimbal response to a time-optimal command designed for the first three flexible modes and no zeros.
Figure 55:
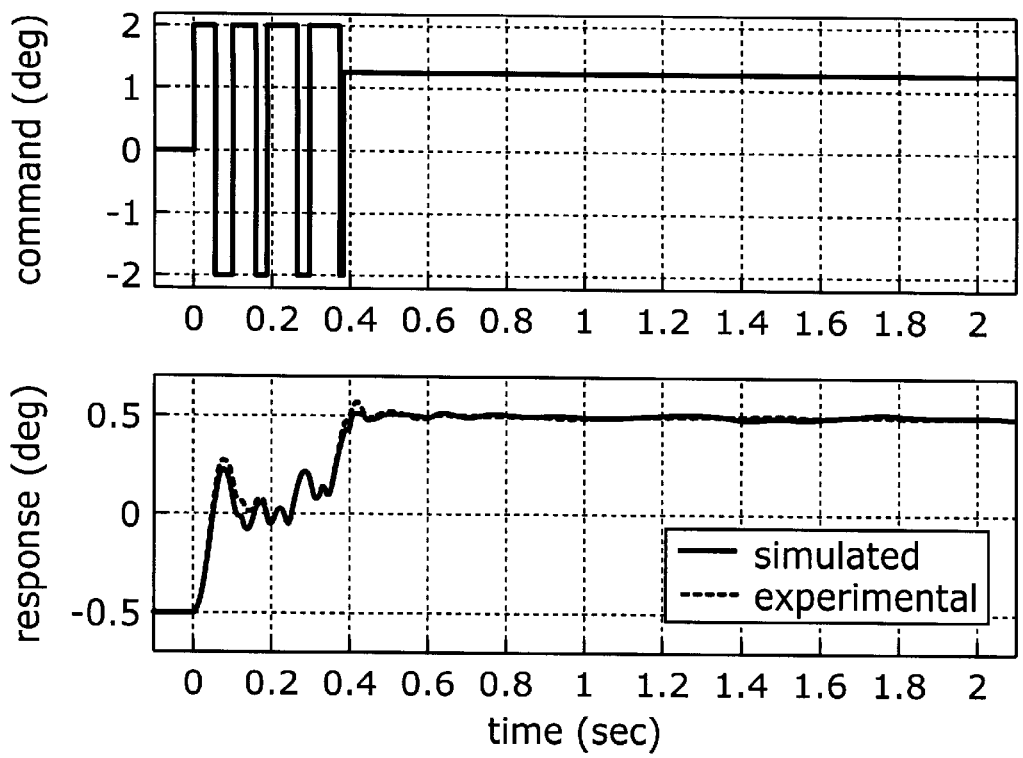
FIG. 55 comprises two plots showing the MACE gimbal response to a time-optimal command designed for the first four flexible modes and no zeros.

If speed of system response is not an important performance metric, the input shaping solution might be adequate for a given system. In time-critical applications, however, time-optimal commands must be employed to elicit the fastest system performance. FIG. 54 illustrates the experimental and simulated system response to a time-optimal command designed for a system with only the first three flexible modes in the MACE structure. This command was designed using the pole locations from the reduced system model, and the maximum and minimum amplitudes of the time-optimal command were set to plus and minus two degrees to correspond with the saturation limits of the gimbal motors. As the experimental response to this command indicates, the system rise time can be reduced to about 0.4 seconds, but a fair amount of residual vibration still remains in the response. Since this residual vibration occurs primarily at the frequency of the fourth system mode, 7.43 Hz, a new time-optimal command can be designed to include this mode as well. Shown in FIG. 55, this four-mode time-optimal command transitions the gimbal to its desired final angle in just over 0.4 seconds while eliminating all but some small residual vibration in the higher system modes.

Figure 56:
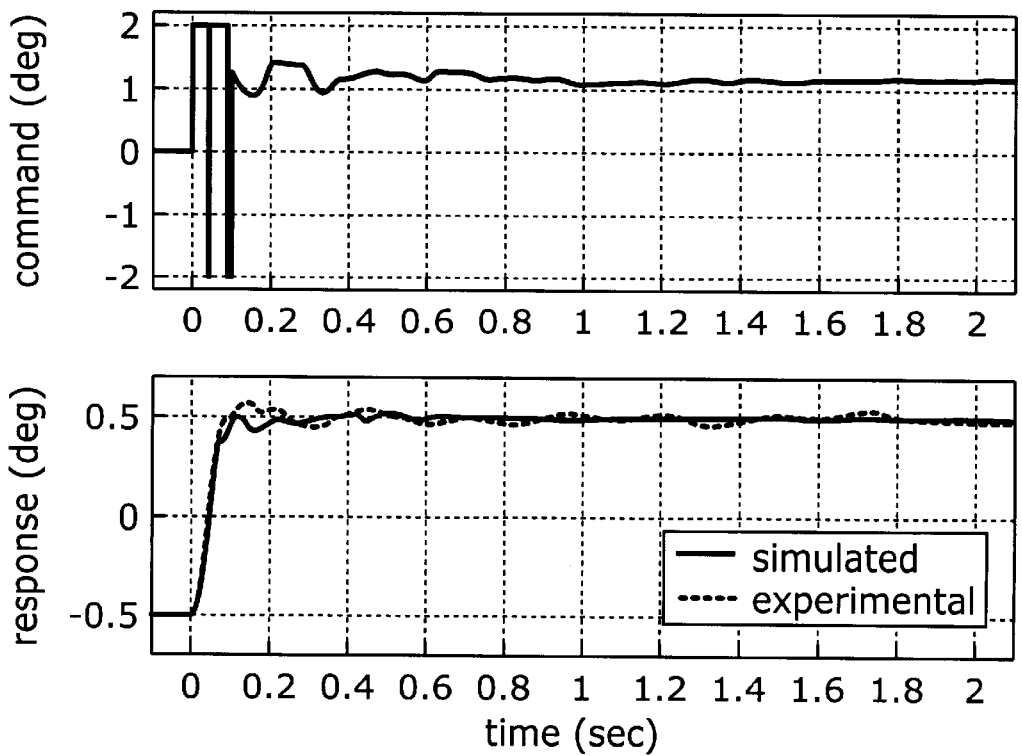
FIG. 56 comprises two plots showing the MACE gimbal response to a time-optimal command designed for the first four flexible modes and the first four pairs of complex zeros.
Figure 57:
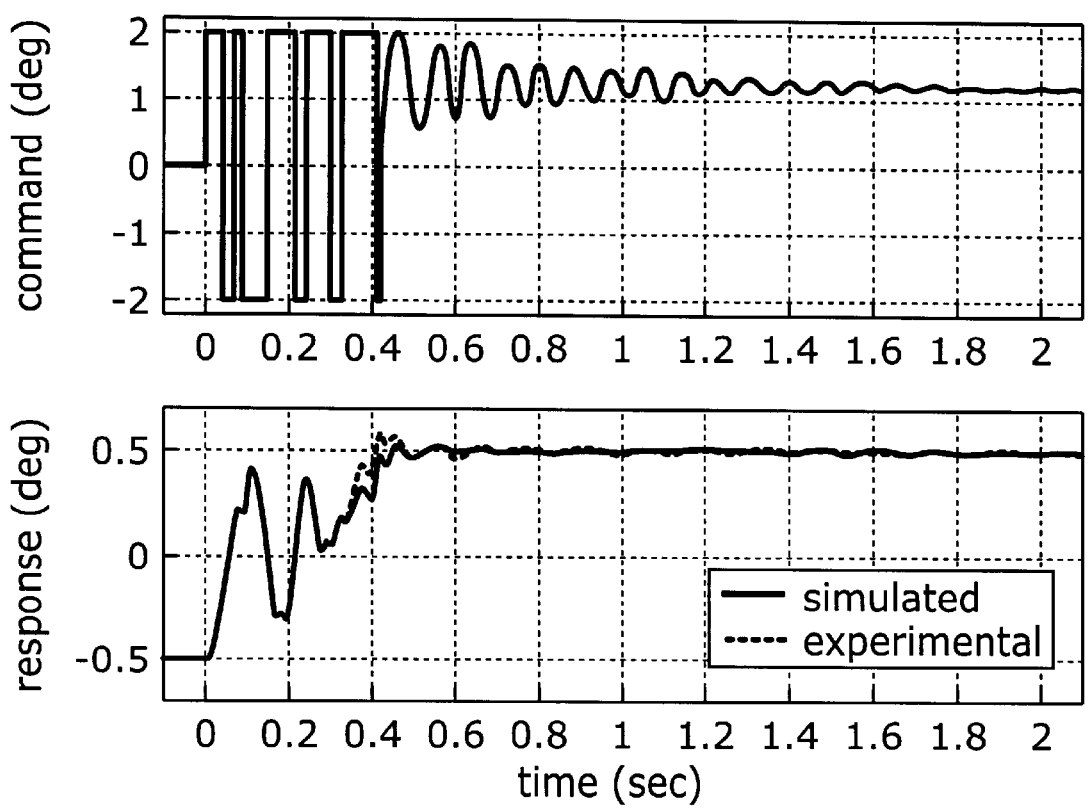
FIG. 57 comprises two plots showing the MACE gimbal response to a time-optimal command designed for the first four flexible modes and the first four pairs of complex zeros with additional robustness at the first two system modes.

In order to further reduce the response time of the MACE gimbal response, time-optimal commands can be designed for the system zeros as well as poles. As shown in FIG. 56, when a time-optimal command is designed for the four pairs of complex poles and zeros in Table 7.1, the system rise time can be dramatically reduced to about 0.1 seconds. The resulting command profile now contains five switches, including the first and last, as well as a tail with lightly damped vibration at the frequencies of the system zeros. Unfortunately, the price that is paid for this rapid system response is the undesirably high levels of residual vibration. Since this residual vibration is not present in the simulated response for the 156-state model, it can largely be attributed to poor command insensitivity to model inaccuracies. In order to improve this condition, the techniques for enhancing command robustness discussed in section 5 can be enlisted. Specifically, since the residual response in FIG. 56 occurs primarily at the first two system modes, a new time-optimal command can be designed with enhanced robustness for these modes. The resulting command profile, as shown in FIG. 57, contains a pulse train with eleven switches and length of about 0.4 seconds. As desired, the illustrated experimental response to this robust, time-optimal command profile shows little residual vibration at the end of the command. However, the increased response time required to obtain this measure of robustness undercuts the value of this command solution.

As the experimental results presented in this section illustrate, system response can be significantly improved over conventional methods when time-optimal commands are employed. For the MACE test article, in particular, the response times showed a substantial decrease when numerator dynamics were included in the time-optimal command formulation. Unfortunately, due to poor command robustness in the presence of many lightly damped system modes, these time-optimal commands often excited undesirable levels of residual vibration in the system response. To address this issue, techniques for enhancing command robustness proved effective, but only at the cost of increasing the system response time.

8 Conclusions

This document has presented a general strategy for deriving time-optimal and time-efficient commands for linear systems. As a primary component of this work, this approach was applied to the time-optimal control problem and used to derive commands for a variety of different systems. Additionally, by incorporating constraints to enhance robustness and limit tail length, it was illustrated that this solution method is an expandable framework that can accommodate a variety of performance constraints. The insights and conclusions presented in this work are summarized below.

1. A straightforward three-step procedure has been presented for deriving time-optimal and time-efficient commands for any type of linear, SISO system.
2. By applying this three-step approach specifically to the time-optimal control problem, four primary steps were taken:
    The set of fundamental and general constraint equations was derived for the time-optimal control problem and expressed in terms of parameters describing the optimal command profile.
    A simple and compact notation was formed to express the constraint equations and streamline implementation.
    By considering the analytic solution for the residual response to a time-optimal command, it was demonstrated that these equations represent the complete set of necessary constraints for the time-optimal control of a linear system.
    Since these constraint equations are algebraic by nature, solutions for time-optimal command profiles were found rapidly and reliably.
3. This three-step solution methodology was illustrated to be easily extendible to systems with additional practical constraints. In particular, a method for improving the robustness of command profiles to both numerator and denominator dynamics was presented, and a technique for constraining the command tail length was also considered.
4. An optimality verification scheme was developed by applying the conditions in Pontryagin's Minimum Principle. By pairing this scheme with a numerical optimization process, a hybrid solution approach was created that reliably delivers verifiably time-optimal and time-efficient commands.

5. By considering several simple examples, the time-optimal solution approach was demonstrated to work on systems with different combinations of numerator and denominator dynamics. As part of this demonstration, four specific analytic solutions for time-optimal commands were derived.
6. Using the MACE test article, these techniques were implemented and validated on a complex piece of mechanical hardware.

Due to the simplicity and reliability of the methodology outlined herein, time-optimal and time-efficient commands can now be generated for a much larger class of systems than previously possible. Additionally, since the general solution framework presented here has been shown to be easily expandable, engineers and designers will be able to extend the capabilities of the method to design new commands tailored to their specific needs.

Many possible areas for future work lie in the development of new types of practical constraints that can be appended to this approach. For example, constraint equations to regulate power consumption or system deflection may yield a new class of practical command profiles. Additionally, new ways to formulate the robustness constraint, perhaps by designing longer commands with fewer switch times, may prove useful for certain types of systems. Although a much larger problem in scope, a natural extension to the theory in this document is to apply the same solution framework to systems with multiple-inputs and multiple-outputs (MIMO). Any such MIMO formulation can adopt a similar constraint-optimization approach, but the constraint equations themselves will require a different form with better numerical conditioning properties.

The present invention has been described with respect to a particular illustrative embodiment. It is to be understood that the invention is not limited to the above-described embodiment and modifications thereto, and that various changes and modifications may be made by those or ordinary skill in the art without departing from the spirit and scope of the appended claims.

REFERENCES

Reducing Vibration Through Hardware Augmentation

[1] J. Ormondroyd and J. P. D. Hartog, "The Theory of the Dynamic Vibration Absorber," *Transactions of the ASME*, vol. APM-50-7, pp. 9–22, 1928.

[2] N. Olgac and B. Holm-Hansen, "Tunable Active Vibration Absorber: The Delayed Resonator," *Journal of Dynamic Systems, Measurement, and Control*, vol. 117, pp. 513–9, 1995.

Control of Flexible Systems

[3] W. J. Book, "Controlled Motion in an Elastic World," *ASME Journal of Dynamic Systems, measurement, and Control*, vol. 115, no. June, pp. 252–261, 1993.

[4] J. L. Junkins and Y. Kim, *Introduction to Dynamics and Control of Flexible Structures*. Washington, D.C.: American Institute of Aeronautics and Astronautics, Inc., 1993.

[5] T. E. Alberts, G. G. Hastings, W. J. Book, and S. L. Dickerson, "Experiments in Optimal Control of a Flexible Arm with Passive Damping," *Fifth VPISSU/AIAA Symposium on Dynamics and Control of Large Structures*, Blacksburg, Va., 1985.

[6] W. J. Book and S. Cetinkunt, "Near Optimal Control of Flexible Robot Arms on Fixed Paths," *IEEE International Conference on Robotics and Automation*, St. Louis, Mo., 1985.

[7] R. H. Cannon and E. Schmitz, "Initial Experiments on the Endpoint Control of a Flexible One-Link Robot," *The International Journal of Robotics Research*, vol. 3, no. 3, pp. 62–75, 1984.

[8] D. C. Hyland, J. L. Junkins, and R. W. Longman, "Active Control Technology for Large Space Structures," *Journal of Guidance, Control, and Dynamics*, vol. 16, no. 5, 1993.

[9] P. T. Kotnik, S. Yurkovich, and U. Ozguner, "Acceleration Feedback for Control of a Flexible Manipulator," *Journal of Robotic Systems*, vol. 5, no. 3, 1988.

[10] F. Pfeiffer and B. Gebler, "A Multistage-Approach to the Dynamics and Control of Elastic Robots," *IEEE International Conference on Robotics and Automation*, Philadelphia, Pa., 1988.

[11] W. P. Seering, A. Garcia-Reynoso, P. H. Meckl, and M. H. Benjamin, "Robot Vibration Modeling and Control," *Proceedings of the Fifth International Conference on Mathematical Modeling*, Berkeley, Calif., 1985.

[12] D. Wang, "Comparison of Optimal and Nonoptimal Control Strategies for the Single Flexible Link," *International Journal of Robotics and Automation*, vol. 9, no. 3, pp. 130–136, 1993.

Feedforward Commands for Trajectory Tracking

[13] M. Tomizuka, "Zero Phase Error Tracking Algorithm for Digital Control," *ASME Journal of Dynamic Systems, Measurement, and Control*, vol. 109, no. March, pp. 65–68, 1987.

[14] B. Haack and M. Tomizuka, "The Effect of Adding Zeros to Feedforward Controllers," *ASME Journal of Dynamic Systems, Measurement, and Control*, vol. 113, no. March, pp. 6–10, 1991.

[15] E. D. Tung and M. Tomizuka, "Feedforward Tracking Controller Design Based on the Identification of Low Frequency Dynamics," *ASME Journal of Dynamic Systems, Measurement, and Control*, vol. 115, no. September, pp. 348–356, 1993.

[16] H. Asada, Z. -D. Ma, and H. Tokumaru, "Inverse Dynamics of Flexible Robot Arms: Modeling and Computation for Trajectory Control," *ASME Journal of Dynamic Systems, Measurement, and Control*, vol. 112, no. 2, pp. 177–185, 1990.

[17] H. Asada, Z. -D. Ma, and H. Tokumaru, "Inverse Dynamics of Flexible Robot Arms for Trajectory Control," *Proceedings of the ASME Winter Annual Meeting*, pp. 329–336, 1987.

[18] Q. Tu, J. Rastegar, and F. Tangerman, "Trajectory Synthesis and Inverse Dynamics Formulation For Minimal Vibrational Excitation For Flexible Structures Based on Trajectory Patterns," *Proceedings of the American Control Conference*, San Francisco, Calif., pp. 2716–2720, 1993.

[19] H. M. Chun, J. D. Turner, and J. -N. Juang, "Disturbance-Accommodating Tracking Maneuvers of Flexible Spacecraft," *Journal of the Astronautical Sciences*, vol. 33, no. 2, 1985.

[20] J. T. Feddema, G. R. Eisler, and D. J. Segalman, "Integration of Model-Based and Sensor-Based Control for a Two-Link Flexible Robot Arm," *Proceedings of the IEEE International Conference on Systems Engineering*, Pittsburg, Pa., 1990.

[21] H. Moulin and E. Bayo, "On the Accuracy of End-point Trajectory Tracking for Flexible Arms by Non-causal Inverse Dynamic Solutions," *ASME Journal of Dynamic Systems, Measurement, and Control*, vol. 113, pp. 320–324, 1991.

[22] Z. Schiller and H. Chang, "Trajectory Preshaping for High-Speed Articulated Systems," *submitted to the ASME Journal of Dynamic Systems, Measurement, and Control,* 1993.

Command Formulation Using Analytic Functions

[23] D. M. Aspinwall, "Acceleration Profiles for Minimizing Residual Response," *ASME Journal of Dynamic Systems, Measurement, and Control,* vol. 102, no. March, pp. 3–6, 1980.

[24] J. L. Wiederrich and B. Roth, "Design of Low Vibration Cam Profiles," *Proceedings of the Conference on Cams and Cam Mechanisms,* Liverpool, England, vol. 1, 1974.

[25] J. L. Wiederrich and B. Roth, "Dynamic Synthesis of Cams Using Finite Trigonometric Series," *ASME Journal of Engineering for Industry,* no. February, pp. 287–293, 1975.

[26] J. L. Wiederrich, "Residual Vibration Criteria Applied to Multiple Degree of Freedom Cam Followers," *ASME Journal of Mechanical Design,* vol. 103, no. October, pp. 702–705, 1981.

[27] C. J. Swigert, "Shaped Torque Techniques," *Journal of Guidance and Control,* vol. 3, no. 5, pp. 460–467, 1980.

[28] P. H. Meckl and W. P. Seering, "Minimizing Residual Vibration for Point-to-Point Motion," *Journal of Vibration, Acoustics, Stress and Reliability in Design,* vol. 107, no. October, pp. 378–382, 1985.

[29] P. H. Meckl, "Controlling Velocity-Limited System to Reduce Residual Vibration," *Proceedings of the 1988 IEEE International Conference on Robotics and Automation,* Philadelphia, Pa., 1988.

[30] P. H. Meckl and W. P. Seering, "Experimental Evaluation of Shaped Inputs to Reduce Vibration for a Cartesian Robot," *ASME Journal of Dynamic Systems, Measurement, and Control,* vol. 112, no. June, pp. 159–165, 1990.

[31] P. H. Meckl, "Robust Motion Control of Flexible Systems Using Feedforward Forcing Functions," *Proceedings of the American Control Conference,* San Francisco, Calif., vol. 3, pp. 2690–2694, 1993.

[32] T. M. Chan and K. A. Stelson, "Point-to-Point Motion Commands the Eliminate Residual Vibration," *Proceedings of the American Control Conference,* Seattle, Wash., pp. 909–913, 1995.

[33] A. Cuccio, R. Garziera, P. Righettine, and R. Riva, "Experimental Tests in Reducing Residual Vibration in Point-to-Point Motion Control by Constant Acceleration Laws," *Proceedings of the Ninth World Congress on the Theory of Machines and Mechanisms,* Milan, Italy, pp. 1049–1053, 1995.

Optimal Control Command Formulation

[34] B. H. Karnopp, F. E. Fisher, and B. O. Yoon, "A Strategy for Moving a Mass from One Point to Another," *Journal of the Franklin Institute,* vol. 329, no. 5, pp. 881–892, 1992.

[35] R. L. Farrenkopf, "Optimal Open-Loop Maneuver Profiles for Flexible Spacecraft," *Journal of Guidance and Control,* vol. 2, no. 6, pp. 491–498, 1979.

[36] J. D. Turner and J. L. Junkins, "Optimal Large-Angle Single-Axis Rotational Maneuvers of Flexible Spacecraft," *Journal of Guidance and Control,* vol. 3, no. 6, pp. 578–585, 1980.

[37] J. L. Junkins and J. D. Turner, *Optimal Spacecraft Rotational Maneuvers.* New York: Elsevier Science Publishers, 1986.

[38] G. R. Eisler, D. J. Segalman, and R. D. Robinett; "Approximate Minimum-Time Trajectories for Two-link Flexible Manipulators," *Proceedings of the American Controls Conference,* San Diego, Calif., pp. 870–875, 1990.

[39] G. G. Parker, B. Petterson, C. Dohrmann, and R. D. Robinett, "Command Shaping for Residual Vibration Free Crane Maneuvers," *Proceedings of the American Controls Conference,* Seattle, Wash., pp. 934–938, 1995.

[40] S. P. Bhat and D. K. Miu, "Precise Point-to-Point Positioning Control of Flexible Structures," *Proceedings of the ASME Winter Annual Meeting,* San Francisco, Calif., 1989.

[41] S. P. Bhat and D. K. Miu, "Precise Point-to-Point Positioning Control of Flexible Structures," *ASME Journal of Dynamic Systems, Measurement, and Control,* vol. 112, no. 4, pp. 667–674, 1990.

[42] S. P. Bhat and D. K. Miu, "Solutions to Point-to-Point Control Problems using Laplace Transform Technique," *Proceedings of the American Control Conference,* San Diego, Calif., 1990.

[43] S. P. Bhat and D. K. Miu, "Solutions to Point-to-Point Control Problems Using Laplace Transform Technique," *Journal of Dynamic Systems, Measurement, and Control,* 1991.

[44] S. P. Bhat, M. Tanaka, and D. K. Miu, "Experiments on Point-to-Point Position Control of a Flexible Beam Using Laplace Transform Technique-Part 1: Open-Loop," *Journal of Dynamic Systems, Measurement, and Control,* vol. 113, pp. 432–437, 1991.

[45] S. P. Bhat, M. Tanaka, and D. K. Miu, "Experiments on Point-to-Point Position Control of a Flexible Beam Using Laplace Transform Technique-Part II: Closed-Loop," *Journal of Dynamic Systems, Measurement, and Control,* vol. 113, pp. 438–443, 1991.

[46] S. P. Bhat and D. K. Miu, "Point-to-Point Positioning of Flexible Structures Using a Time Domain LQ Smoothness Constraint," *Journal of Dynamic Systems, Measurement, and Control,* vol. 114, pp. 416–421, 1992.

[47] P. H. Meckl and R. Kinceler, "Trajectory Determination for Vibration-Free Motions of a Flexible-joint Robot," *Proceedings of the American Control Conference,* Baltimore, Md., vol. 3, pp. 2521–2525, 1994.

Creating Time-Efficient Commands

[48] J. T. Feddema, "Digital Filter Control of Remotely Operated Flexible Robotic Structures," *Proceedings of the American Control Conference,* San Francisco, Calif., vol. 3, pp. 2710–2715, 1993.

[49] J. F. Jansen, "Control and Analysis of a Single-Link Flexible Beam with Experimental Verification," Oak Ridge National Laboratory ORNL/TM-12198, December 1992.

[50] N. C. Singer and W. P. Seering, "Using Acausal Shaping Techniques to Reduce Robot Vibration," *Proceedings of the IEEE International Conference on Robotics and Automation,* Philadelphia, Pa., vol. 3, pp. 1434–1439, 1988.

[51] J. F. Jones and B. J. Petterson, "Oscillation Damped Movement of Suspended Objects," *Proceedings of the IEEE International Conference on Robotics and Automation,* Philadelphia, Pa., vol. 2, pp. 956–962, 1988.

[52] B. J. Petterson and R. D. Robinett, "Model Based Damping of Coupled Horizontal and Vertical Oscillations in a Flexible Rod," *AIAA Guidance, Navigation, and Controls Conference,* Boston, Mass., 1989.

[53] B. J. Petterson, R. D. Robinett, and J. C. Werner, "Parameter-Scheduled Trajectory Planning for Suppression of Coupled Horizontal and Vertical Vibrations in a Flexible Rod," *Proceedings of the IEEE International Conference on Robotics and Automation,* pp. 916–921, 1990.

[54] Z. Prucs, T. T. Soong, and A. Reinhorn, "An Analysis of Pulse Control for Simple Mechanical Systems," *ASME*

*Journal of Dynamic Systems, Measurement, and Control,* vol. 107, no. June, pp. 123–131, 1985.

[55] W. VanderVelde and J. He, "Design of Space Structure Control Systems Using On-Off Thrusters," *Journal of Guidance, Control and Dynamics,* vol. 6, no. 1, pp. 53–60, 1983.

Time-Optimal Control

[56] L. S. Pontryagin, V. G. Boltyanskii, R. V. Gamkrelidze, and E. F. Mishchenko, *The Mathematical Theory of Optimal Processes.* New York: John Wiley and Sons, Inc., 1962.

[57] M. Athans and P. L. Falb, *Optimal Control.* New York: McGraw-Hill Book Company, 1966.

[58] A. E. Bryson and Y. -C. Ho, *Applied Optimal Control,* vol. 1. Washington: Hemisphere Publishing Corporation, 1975.

[59] H. Hermes and J. P. Lasalle, *Functional Analysis and Time Optimal Control.* New York: Academic Press, 1969.

[60] S. Scrivener and R. Thompson, "Survey of Time-Optimal Attitude Maneuvers," *Journal of Guidance, Control, and Dynamics,* vol. 17, no. 2, pp. 225–233, 1994.

Time-Optimal Control of Nonlinear Systems

[61] A. V. Balakrishnan and L. W. Neustadt, "Mathematical Theory of Control,". New York, N.Y.: Academic Press, 1967, pp. 459.

[62] J. B. Plant, *Some Iterative Solutions in Optimal Control.* Cambridge, Mass.: The MIT Press, 1968.

[63] E. -B. Meier and J. Arthur E. Bryson, "Efficient Algorithm for Time-Optimal Control of a Two-Link Manipulator," *Journal of Guidance, Control, and Dynamics,* vol. 13, no. 5, pp. 859–866, 1990.

[64] Z. Schiller, "Time Optimal Motion of Robotic Manipulators,": Massachusetts Institute of Technology, 1987.

[65] Z. Schiller and S. Dubowski, "Robot Path Planning with Obstacles, Actuator, Gripper, and Payload Constraints," *International Journal of Robotics Research,* vol. 8, no. 6, pp. 3–18, 1989.

[66] Z. Schiller and H. -H. Lu, "Computation of Path Constrained Time Optimal Motions With Dynamic Singularities," *Journal of Dynamic Systems, Measurement, and Control,* vol. 114, no. March, pp. 34–40, 1992.

[67] Z. Schiller, H. Chang, and V. Wong, "The Practical Implementation of Time-Optimal Control for Robotic Manipulators," *Robotics & Computer-Integrated Manufacturing,* vol. 12, no. 1, pp. 29–39, 1996.

[68] S. -W. Liu and T. Singh, "Robust Time-Optimal Control of Nonlinear Structures with Parameter Uncertainties," *Proceedings of the AIAA Guidance, Navigation and Control Conference,* San Diego, Calif., 1996.

[69] J. W. Auernig and H. Troger, "Time Optimal Control of Overhead Cranes with Hoisting of the Load," *Automatica,* no. July, pp. 437–446, 1987.

[70] A. R. Golafshani and J. D. Aplevich, "Computation of Time-Optimal Trajectories for Tower Cranes," *Proceedings of the IEEE Conference on Control Applications,* pp. 1134–1139, 1995.

Time-Optimal Control of Linear Systems

[71] E. Barbieri and U. Ozguner, "Rest-to-Rest Slewing of Flexible Structures in Minimum Time," *Proceedings of the 27th Conference on Decision and Control,* Austin, Tex., pp. 1633–1638, 1988.

[72] S. Dodds and S. Williamson, "A Signed Switching Time Bang—Bang Attitude Control Law for Fine Pointing of Flexible Spacecraft," *International Journal of Control,* vol. 40, no. 4, pp. 795–811, 1984.

[73] L. Y. Pao, "Characteristics of the Time-Optimal Control of Flexible Structures with Damping," *IEEE Conference on Control Applications,* Glasgow, Scotland, pp. 1299–1304, 1994.

[74] G. Singh, P. T. Kabamba, and N. H. McClamroch, "Time Optimal Slewing of a Rigid Body with Flexible Appendages," *Proceedings of the 28th Conference on Decision and Control,* Los Angeles, Calif., vol. 1, pp. 1441–1442, 1987.

[75] G. Singh, P. T. Kabamba, and N. H. McClamroch, "Planar, Time-Optimal, Rest-to-Rest Slewing Maneuvers of Flexible Spacecraft," *Journal of Guidance, Control, and Dynamics,* vol. 12, no. 1, pp. 71–81, 1989.

[76] G. Singh, P. T. Kabamba, and N. H. McClamroch, "Time-Optimal Spinup Maneuvers of Flexible Spacecraft," *Journal of the Astronautical Sciences,* vol. 38, no. 1, pp. 41–67, 1990.

[77] J. Ben-Asher, J. A. Burns, and E. M. Cliff, "Time-Optimal Slewing of Flexible Spacecraft," *Journal of Guidance, Control, and Dynamics,* vol. 15, no. 2, pp. 360–367, 1992.

[78] L. Y. Pao and G. F. Franklin, "Time-Optimal Control of Flexible Structures," *Proceedings of the 29th Conference on Decision and Control,* Honolulu, Hi., pp. 2580–2581, 1990.

[79] L. Y. Pao, "Proximate Time-Optimal Control of Higher-Order Servomechanisms,": Stanford University, 1991.

[80] L. Y. Pao, "Minimum-Time Control Characteristics of Flexible Structures," *Journal of Guidance, Control, and Dynamics,* vol. 19, no. 1, pp. 123–129, 1996.

[81] Q. Liu and B. Wie, "Robust Time-Optimal Control of Uncertain Flexible Spacecraft," *Journal of Guidance, Control, and Dynamics,* vol. 15, no. 3, pp. 597–604, 1992.

[82] L. Y. Pao and W. E. Singhose, "Robust Minimum Time Control of Flexible Structures," *Submitted to Automatica,* 1996.

[83] T. Singh and S. R. Vadali, "Robust Time-Optimal Control: A Frequency Domain Approach," *AIAA Journal of Guidance, Control and Dynamics,* vol. 17, no. 2, pp. 346–353, 1994.

[84] B. Wie, R. Sinha, and Q. Liu, "Robust Time-Optimal Control of Uncertain Structural Dynamic Systems," *Journal of Guidance, Control, and Dynamics,* vol. 15, no. 5, pp. 980–983, 1993.

[85] J. L. Meyer and L. Silverberg, "Fuel Optimal Propulsive Maneuver of an Experimental Structure Exhibiting Spacelike Dynamics," *Journal of Guidance, Control, and Dynamics,* vol. 19, no. 1, pp. 141–149, 1996.

[86] T. Singh, "Fuel/Time Optimal Control of the Benchmark Two-Mass/Spring System," *Proceedings of the American Control Conference,* Seattle, Wash., vol. 6, pp. 3825–3829, 1995.

[87] T. Singh, "Fuel/Time Optimal Control of the Benchmark Problem," *Journal of Guidance, Control, and Dynamics,* vol. 18, no. 6, pp. 1225–31, 1995.

[88] M. L. O. Souza, "Exactly Solving the Weighted Time/Fuel Optimal Control of an Undamped Harmonic Oscillator," *Journal of Guidance, Control, and Dynamics,* vol. 11, no. 6, pp. 488–494, 1988.

[89] B. Wie, R. Sinha, J. Sunkel, and K. Cox, "Robust Fuel- and Time-Optimal Control of Uncertain Flexible Space Structures," *Proceedings of the AIAA Guidance, Navigation, and Control Conference,* Monterey, Calif., vol. AIAA-93-3804-CP, pp. 939–948, 1993.

[90] R. M. Byers, S. R. Vadali, and J. L. Junkins, "Near-Minimum Time, Closed-Loop Slewing of Flexible Spacecraft," *Journal of Guidance, Control, and Dynamics,* vol. 13, no. 1, pp. 57–65, 1990.

[91] H. A. Fujii, M. Nakagawa, and H. Hatakenaka, "Optimal Acceleration Profile for Flexible Space Structures," *in the Proceedings of an unknown AIAA Conference,* pp. 745–749, 1994.

[92] J. L. Junkins, Z. H. Rahman, and H. Bang, "Near-Minimum Time Control of Distributed Parameter Systems: Analytical and Experimental Results," *Journal of Guidance, Control, and Dynamics,* pp. 406–415, 1991.

[93] R. C. Thompson, J. L. Junkins, and S. R. Vadali, "Near-Minimum Time Open-Loop Slewing of Flexible Vehicles," *Journal of Guidance, Control, and Dynamics,* vol. 12, no. 1, pp. 82–88, 1989.

[94] L. Y. Pao and W. E. Singhose, "Verifying Robust Time-Optimal Commands for Multi-Mode Flexible Spacecraft," *Submitted to the Journal of Guidance, Control, and Dynamics,* 1997.

[95] W. E. Singhose, L. Y. Pao, and W. P. Seering, "Time-Optimal Rest-to-Rest Slewing of Multi-Mode Flexible Spacecraft Using ZVD Robustness Constraints," *Proceedings of the 1996 Guidance, Navigation, and Control Conference,* San Diego, Calif., 1996.

[96] T. D. Tuttle and W. P. Seering, "Deriving and Verifying Time-Optimal Commands for Linear Systems," *Proceedings of the American Controls Conference,* Albuquerque, N.Mex., 1997.

The Basic Theory of Input Shaping

[97] N. C. Singer and W. P. Seering, "Preshaping Command Inputs to Reduce System Vibration," *ASME Journal of Dynamic Systems, Measurement, and Control,* vol. 112, no. March, pp. 76–82, 1990.

[98] N. C. Singer and W. P. Seering, "Design and Comparison of Command Shaping Methods for Controlling Residual Vibration," *Proceedings of the IEEE International Conference on Robotics and Automation,* Scottsdale, Ariz., vol. 2, pp. 888–893, 1989.

[99] N. C. Singer, "Residual Vibration Reduction in Computer Controlled Machines," MIT Artificial Intelligence Lab, Technical Report AITR-1030, February 1989.

[100] N. Singer and W. P. Seering, "Experimental Verification of Command Shaping Methods for Controlling Residual Vibration in Flexible Robots," *Proceedings of the American Controls Conference,* 1989.

[101] N. C. Singer, W. P. Seering, and K. A. Pasch, "Shaping Command Inputs to Minimize Unwanted Dynamics," U.S. Pat. No. 4,916,635, 1990.

[102] J. M. Hyde and W. P. Seering, "Inhibiting Multiple Mode Vibration in Controlled Flexible Systems," *Proceedings of the American Control Conference,* Boston, Mass., 1991.

[103] J. M. Hyde and W. P. Seering, "Using Input Command Pre-Shaping to Suppress Multiple Mode Vibration," *Proceedings of the IEEE International Conference on Robotics and Automation,* Sacramento, Calif., vol. 3, pp. 2604–2609, 1991.

[104] J. M. Hyde, "Multiple Mode Vibration Suppression in Controlled Flexible Systems," Massachusetts Institute of Technology, Masters Thesis AITR 1295, May 1991.

[105] O. J. M. Smith, "Posicast Control of Damped Oscillatory Systems," *Proceedings of the IRE,* vol. 45, no. September, pp. 1249–1255, 1957.

[106] O. J. M. Smith, "Feedback Control Systems," New York: McGraw-Hill Book Company, Inc., 1958, pp. 331–345.

[107] G. H. Tallman and O. J. M. Smith, "Analog Study of Dead-Beat Posicast Control," *Transactions of the IRE,* no. March, pp. 14–21, 1958.

[108] G. Cook, "An Application of Half-Cycle Posicast," *IEEE Transactions on Automatic Control,* vol. 11, no. 3, pp. 556–559, 1966.

[109] G. Cook, "Control of Flexible Structures Via Posicast," *The Eighteenth Southeastern Symposium on System Theory,* Knoxville, Tenn., 1986.

[110] D. H. Mee, "A Feedback Implementation of Posicast Control Using Sampling Circuits," *Proceedings of the Institute of Radio and Electronics Engineering,* no. January/February, pp. 11–15, 1974.

[111] V. C. Shields and G. Cook, "Application of an Approximate Time Delay to a Posicast Control System," *International Journal of Control,* vol. 14, no. 4, pp. 649–657, 1971.

Extensions to the Input Shaping Theory

[112] P. Filipovic and I. Bar-Kana, "Oscillatory Modes Control Using Vibration Blocking Filter," *Proceedings of the IEEE Conference on Control Applications,* Albany, N.Y., pp. 882–883, 1995.

[113] B. R. Murphy and I. Watanabe, "Digital Shaping Filters for Reducing Machine Vibration," *IEEE Transactions on Robotics and Automation,* vol. 8, no. April, pp. 285–289, 1992.

[114] T. D. Tuttle and W. P. Seering, "A Zero-placement Technique for Designing Shaped Inputs to Suppress Multiple-mode Vibration," *Proceedings of the American Control Conference,* Baltimore, Md., vol. 3, pp. 2533–2537, 1994.

[115] T. Singh and S. R. Vadali, "Robust Time-Delay Control," *ASME Journal of Dynamic Systems, Measurement, and Control,* vol. 115, no. June, pp. 303–306, 1993.

[116] T. Singh, S. R. Vadali, and N. Abhyankar, "Robust Time-Delay Control of Multimode Systems," *Proceedings of the American Control Conference,* Baltimore, Md., pp. 681–685, 1994.

[117] T. Singh and S. R. Vadali, "Robust Time-Delay Control of Multimode Systems," *International Journal of Control,* vol. 62, no. 6, pp. 1319–1339, 1995.

[118] B. W. Rappole, "Minimizing Residual Vibrations in Flexible Systems," Charles Stark Draper Laboratory, Cambridge, Mass. CSDL-T-1144, May 1992.

[119] B. W. Rappole, N. C. Singer, and W. P. Seering, "Multiple-Mode Impulse Shaping Sequences for Reducing Residual Vibrations," *Proceedings of the ASME Mechanisms Conference,* Minneapolis, Minn., 1994.

[120] K. Rogers, "Limiting Vibrations in Systems with Constant Amplitude Actuators Through Command Shaping,": Massachusetts Institute of Technology, 1994.

[121] K. Rogers and W. P. Seering, "Input Shaping for Limiting Loads and Vibration in Systems with On-Off Actuators," *Proceedings of the AIAA Guidance, Navigation, and Control Conference,* San Diego, Calif., 1996.

[122] N. Singer, L. Pao, W. Singhose, and W. Seering, "An Efficient Algorithm for the Generation of Multi-Mode Input Shaping Sequences," *Proceedings of the IEEE International Conference on Control Applications,* Dearborn, Mich., 1996.

[123] T. Singh and G. R. Heppler, "Shaped Inputs for a Multimode System," *Proceedings of the IEEE International Conference on Robotics and Automation,* Atlanta, Ga., vol. 3, pp. 484–489, 1993.

[124] T. Singh and G. R. Heppler, "Shaped Input Control of a System With Multiple Modes," *ASME Journal of Dynamic Systems, Measurement, and Control,* vol. 115, no. September, pp. 341–437, 1993.

[125] W. Singhose and W. Seering, "Analytic Methods for Slewing Undamped Flexible Structures with On-Off Actuators," *Submitted to the* 1997 AIAA Guidance, Navigation, and Control Conference, 1997.

[126] W. Singhose, "A Vector Diagram Approach to Shaping Inputs for Vibration Reduction," MIT Artificial Intelligence Lab Memo No. 1223, March 1990.

[127] W. E. Singhose, W. P. Seering, and N. C. Singer, "Shaping Inputs to Reduce Vibration: A Vector Diagram Approach," *Proceedings of the IEEE International Conference on Robotics and Automation,* Cincinnati, Ohio, vol. 2, pp. 922–927, 1990.

[128] W. Singhose and W. Seering, "Generating Vibration-Reducing Inputs with Vector Diagrams," *Proceedings of the Eighth World Congress on the Theory of Machines and Mechanisms,* Prague, Czechoslovakia, vol. 1, pp. 315–318, 1991.

[129] W. Singhose, W. Seering, and N. Singer, "Residual Vibration Reduction Using Vector Diagrams to Generate Shaped Inputs," *ASME Journal of Mechanical Design,* vol. 116, no. June, pp. 654–659, 1994.

[130] B. W. Rappole, N. C. Singer, and W. P. Seering, "Input Shaping With Negative Sequences for Reducing Vibrations in Flexible Structures," *Proceedings of the American Control Conference,* San Francisco, Calif., vol. 3, pp. 2695–2699, 1993.

[131] W. Singhose, S. Derezinski, and N. Singer, "Input Shapers for Improving the Throughput of Torque-Limited Systems," *Submitted to the IEEE Conference on Control Applications,* Glasgow, Scotland, 1994.

[132] E. A. Crain, W. E. Singhose, and W. P. Seering, "Derivation and Properties of Convolved and Simultaneous Two-Mode Input Shapers," *Proceedings of the International Federation of Automatic Control World Congress,* San Francisco, Calif., vol. 15, pp. 441–446, 1996.

[133] W. E. Singhose, E. A. Crain, and W. P. Seering, "Convolved and Simultaneous Two-Mode Input Shapers," *Submitted to Control Theory and Applications.*

[134] L. Y. Pao, "Input Shaping Design For Flexible Systems With Multiple Actuators," *Proceedings of the International Federation of Automatic Control World Congress,* San Francisco, Calif., vol. 16, pp. 267–272, 1996.

[135] W. Singhose and W. Seering, "Use of Neural Networks for On-Off Control of Flexible Systems," *Submitted to the 1997 IEEE International Symposium on Intelligent Control,* 1997.

[136] N. C. Singer and W. P. Seering, "An Extension of Command Shaping Methods for Controlling Residual Vibration Using Frequency Sampling," *Proceedings of the IEEE International Conference on Robotics and Automation,* Nice, France, vol. 1, pp. 800–805, 1992.

[137] W. E. Singhose, L. J. Porter, T. D. Tuttle, and N. C. Singer, "Vibration Reduction Using Multi-Hump Input Shapers," *Accepted for publication in the ASME Journal of Dynamic Systems, Measurement, and Control,* 1997.

[138] W. Singhose, L. Porter, and N. Singer, "Vibration Reduction Using Multi-Hump Extra-Insensitive Input Shapers," *Proceedings of the American Control Conference,* Seattle, Wash., vol. 5, pp. 3830–3834, 1995.

[139] W. E. Singhose, W. P. Seering, and N. C. Singer, "Input Shaping for Flexible Systems with Specified Insensitivity to Modeling Errors," *Submitted to the IEEE Transactions on Robotics and Automation,* 1997.

[140] W. E. Singhose, W. P. Seering, and N. C. Singer, "Input Shaping for Vibration Reduction With Specified Insensitivity to Modeling Errors," *Proceedings of the Japan-USA Symposium on Flexible Automation,* Boston, Mass., 1996.

[141] L. Y. Pao, T. N. Chang, and E. Hou, "Input Shaper Designs for Minimizing the Expected Level of Residual Vibration in Flexible Structures," *Proceedings of the American Controls Conference,* Albuquerque, N.Mex., 1997.

[142] F. Khorrami, S. Jain, and A. Tzes, "Adaptive Nonlinear Control and Input Preshaping for Flexible-Link Manipulators," *Proceedings of the American Control Conference,* San Francisco, Calif., vol. 3, pp. 2705–2709, 1993.

[143] D. P. Magee and W. J. Book, "Experimental Verification of Modified Command Shaping Using a Flexible Manipulator," *Proceedings of the 1st International Conference on Motion and Vibration Control,* Yokohama, Japan, 1992.

[144] D. Magee and W. Book, "The Application of Input Shaping to a System with Varying Parameters," *Proceedings of the Japan/USA Symposium on Flexible Automation,* pp. 519–25, 1992.

[145] D. P. Magee and W. J. Book, "Eliminating Multiple Modes of Vibration in a Flexible Manipulator," *Proceedings of the IEEE International Conference on Robotics and Automation,* Atlanta, Ga., vol. 2, pp. 474–479, 1993.

[146] D. P. Magee and W. J. Book, "Implementing Modified Command Filtering to Eliminate Multiple Modes of Vibration," *Proceedings of the American Controls Conference,* San Francisco, Calif., vol. 3, pp. 2700–2704, 1993.

[147] A. P. Tzes, M. J. Englehart, and S. Yurkovich, "Input Preshaping With Frequency Domain Information For Flexible-Link Manipulator Control," *Proceedings of the AIAA Guidance, Navigation and Control Conference,* Boston, Mass., vol. 2, pp. 1167–1175, 1989.

[148] A. P. Tzes and S. Yurkovich, "Adaptive Precompensators for Flexible-Link Manipulator Control," *28th Conference on Decision and Control,* Tampa, Fla., pp. 2083–88, 1989.

[149] A. Tzes and S. Yurkovich, "An Adaptive Input Shaping Control Scheme for Vibration Suppression in Slewing Flexible Structures," *IEEE Transactions on Control Systems Technology,* vol. 1, no. June, pp. 114–121, 1993.

[150] A. Banerjee and W. Singhose, "Slewing and Vibration Control of a Nonlinearly Elastic Shuttle Antenna," *AIAA/AAS Astrodynamics Conference,* Scottsdale, Ariz., 1994.

[151] W. E. Singhose, A. K. Banerjee, and W. P. Seering, "Characteristics of Deflection-Limiting On-Off Command Profiles," *Submitted to the Journal of Guidance, Control, and Dynamics,* 1997.

[152] W. E. Singhose, W. P. Seering, and A. K. Banerjee, "Limiting Deflection During the Slewing of Flexible Spacecraft Using Deflection Sampling," *Proceedings of the AIAA Guidance, Navigation, and Control Conference,* San Diego, Calif., 1996.

[153] W. Singhose, A. Banerjee, and W. Seering, "Slewing Flexible Spacecraft with Deflection-Limiting Input Shaping," *Journal of Guidance, Control, and Dynamics,* vol. 20, no. 2, pp. 291–298, 1997.

[154] W. Singhose, T. Singh, and W. Seering, "On-Off Control with Specified Fuel Usage," *Submitted to the Journal of Dynamic Systems, Measurement, and Control,* 1997.

[155] W. Singhose, K. Bohlke, and W. Seering, "Fuel-Efficient Shaped Command Profiles for Flexible Spacecraft," *Proceedings of the AIAA Guidance, Navigation, and Control Conference,* Baltimore, Md., 1995.

[156] W. Singhose, K. Bohlke, and W. Seering, "Fuel-Efficient Pulse Command Profiles for Flexible Spacecraft," *Journal of Guidance, Control, and Dynamics,* vol. 19, no. 4, pp. 954–960, 1996.

[157] A. K. Banerjee and W. E. Singhose, "Minimum Time Fuel Efficient Maneuver of Flexible Spacecraft with Vibration Amplitude Constraint," *Proceedings of the AAS/AIAA Astrodynamics Specialist Conference,* Halifax, Nova Scotia, Canada, vol. AAS 95-318, 1995.

[158] W. E. Singhose, W. P. Seering, and A. Banerjee, "An Evaluation of Fuel-Efficient On-Off Input Shaping with Deflection Limiting," Proceedings of the AIAA/AAS *Astrodynamics Specialist Conference.,* San Diego, Calif., 1996.

[159] K. S. Rattan and V. Feliu, "Feedforward Control of Flexible Manipulators," *Proceedings of the IEEE International Conference on Robotics and Automation,* Nice, France, vol. 1, pp. 788–793, 1992.

[160] W. Singhose and N. Singer, "Initial Investigations into the Effects of Input Shaping on Trajectory Following," *Proceedings of the American Controls Conference,* Baltimore, Md., vol. 3, pp. 2526–32, 1994.

[161] W. Singhose and T. Chuang, "Reducing Deviations From Trajectory Components With Input Shaping," *Proceedings of the American Control Conference,* Seattle, Wash., vol. 1, pp. 929–933, 1995.

[162] W. Singhose and N. Singer, "Effects of Input Shaping on Two-Dimensional Trajectory Following," *Proceedings of the IEEE Transactions on Robotics and Automation,* vol. 12, no. 6, pp. 881–887, 1996.

Applications of Input Shaping

[163] K. L. Hillsley and S. Yurkovich, "Vibration Control of a Two-Link Flexible Robot Arm," *Proceedings of the IEEE International Conference on Robotics and Automation,* Sacramento, Calif., pp. 2121–2126, 1991.

[164] K. L. Hillsley and S. Yurkovich, "Vibration Control of a Two-Link Flexible Robot Arm," *Journal of Dynamics and Control,* vol. 3, pp. 261–280, 1993.

[165] F. Khorrami, S. Jain, and A. Tzes, "Experiments on Rigid Body Based Controllers with Input Preshaping for a Two-Link Flexible Manipulator," *Submitted to the IEEE Transactions on Robotics and Automation,* 1991.

[166] F. Khorrami, S. Jain, and A. Tzes, "Experiments of Rigid-Body Based Controllers with Input Preshaping for a Two-Link Flexible Manipulator," *Proceedings of the American Control Conference,* Chicago, Ill., vol. 3, pp. 2957–2961, 1993.

[167] S. Lim and J. How, "Input Command Shaping Techniques for Robust, High-Performance Control of Flexible Structures," *Proceedings of the AIAA Guidance, Navigation, and Control Conference,* San Diego, Calif., 1996.

[168] V. Drapeau and D. Wang, "Verification of a Closed-loop Shaped-input Controller for a Five-bar-linkage Manipulator," *Proceedings of the IEEE International Conference on Robotics and Automation,* Atlanta, Ga., vol. 3, pp. 216–221, 1993.

[169] J. Watkins and S. Yurkovich, "Input Shaping Controllers for Slewing Flexible Structures," *Proceedings of the IEEE International Conference on Control Applications,* vol. 1, pp. 188–93, 1992.

[170] J. Watkins and S. Yurkovich, "Vibration Control for Slewing Flexible Structures," *Proceedings of the American Control Conference,* pp. 2525–9, 1992.

[171] K. Zuo and D. Wang, "Closed Loop Shaped-Input Control of a Class of Manipulators with a Single Flexible Link," *Proceedings of the IEEE International Conference on Robotics and Automation,* Nice, France, vol. 1, pp. 782–787, 1992.

[172] K. Zuo, V. Drapeau, and D. Wang, "Closed Loop Shaped-Input Strategies for Flexible Robots," *original journal submission,* 1993.

[173] A. D. Christian and W. P. Seering, "Initial Experiments with a Flexible Robot," *Proceedings of the IEEE International Conference on Robotics and Automation,* Cincinnati, Ohio, vol. 1, pp. 722–727, 1990.

[174] S. Yurkovich, A. P. Tzes, and K. L. Hillsley, "Controlling Coupled Flexible Links Rotating in the Horizontal Plane," *Proceedings of the American Control Conference,* San Diego, Calif., pp. 362–367, 1990.

[175] D. P. Magee and W. J. Book, "Filtering Schilling Manipulator Commands to Prevent Flexible Structure Vibration," *Proceedings of the American Control Conference,* Baltimore, Md., pp. 2538–2542, 1994.

[176] D. P. Magee and W. J. Book, "Filtering Micro-Manipulator Wrist Commands to Prevent Flexible Base Motion," *Proceedings of the American Control Conference,* Seattle, Wash., pp. 924–928, 1995.

[177] T. Singh and S. R. Vadali, "Input-Shaped Control of Three-Dimensional Maneuvers of Flexible Spacecraft," *Proceedings of the AIAA Guidance, Navigation, and Control Conference,* Hilton Head Island, S.C., 1992.

[178] T. Singh and S. R. Vadali, "Input-Shaped Control of Three-Dimensional Maneuvers of Flexible Spacecraft," *Journal of Guidance, Control, and Dynamics,* vol. 16, no. 6, pp. 1061–8, 1993.

[179] A. K. Banerjee, "Dynamics and Control of the WISP Shuttle-Antennae System," *The Journal of Astronautical Sciences,* vol. 41, no. 1, pp. 73–90, 1993.

[180] K. W. Chang, "Shaping Inputs to Reduce Vibration in Flexible Space Structures," :Massachusetts Institute of Technology, 1992.

[181] T. D. Tuttle and W. P. Seering, "An Experimental Verification of Vibration Reduction in Flexible Spacecraft Using Input Shaping," *accepted for publication in the AIAA Journal of Guidance, Control, and Dynamics,* 1997.

[182] S. D. Jones, "Quantification and Reduction of Dynamically Induced Errors in Coordinate Measuring Machines,": University of Michigan, 1993.

[183] S. D. Jones and A. G. Ulsoy, "Control Input Shaping for Coordinate Measuring Machines," *Proceedings of the American Control Conference,* Baltimore, Md., vol. 3, pp. 2899–2903, 1994.

[184] N. Seth, K. S. Rattan, and R. W. Brandstetter, "Vibration Control of a Coordinate Measuring Machine," *Proceedings of the IEEE Conference on Control Applications,* Dayton, Ohio, pp. 368–373, 1993.

[185] W. E. Singhose and N. C. Singer, "Improving Coordinate Measuring Machine Repeatability with Input Shaping," *Proceedings of the NSF Design and Manufacturing Grantees Conference,* Cambridge, Mass., 1994.

[186] W. Singhose, N. Singer, and W. Seering, "Improving Repeatability of Coordinate Measuring Machines with Shaped Command Signals," *Precision Engineering,* vol. 18, no. April, pp. 138–146, 1996.

[187] W. Singhose, W. Seering, and N. Singer, "The Effect of Input Shaping on Coordinate Measuring Machine Repeatability," *Proceedings of the Ninth World Congress on the Theory of Machines and Mechanisms,* vol. 4, pp. 2930–2934, 1995.

[188] N. Singer, W. Singhose, and E. Kriikku, "An Input Shaping Controller Enabling Cranes to Move Without Sway," *Proceedings of the ANS 7th Topical Meeting on Robotics and Remote Systems,* Augusta, Ga., 1997.

[189] W. E. Singhose, L. J. Porter, and W. P. Seering, "Input Shaped Control of a Planar Gantry Crane with Hoisting," *accepted for publication in the Proceedings of the American Control Conference,* Albuquerque, N.Mex., 1997.

[190] J. M. Hyde, "Contact Transition Control: An Experimental Study," *Proceedings of the IEEE International Conference on Robotics and Automation,* Atlanta, Ga., 1993.

[191] J. M. Hyde and M. R. Cutkosky, "Controlling Contact Transition," *IEEE Control Systems Magazine*, no. Feb., pp. 25–30, 1994.

[192] B. B. Bederson, R. S. Wallace, and E. L. Schwartz, "Control and Design of the Spherical Pointing Motor," *Proceedings of the IEEE International Conference on Robotics and Automation*, Atlanta, Ga., vol. 2, pp. 630–636, 1993.

[193] K. Terashima, M. Hamaguchi, and K. Yamaura, "Modeling and Motion Control of Fluid Behavior in Automatic Pouring System," *Proceedings of the International Federation of Automatic Control World Congress*, San Francisco, Calif., 1996.

[194] K. Bohlke, "The Effects of Friction on Input Shaping," Massachusetts Institute of Technology Jul. 13, 1994.

[195] T. -C. Lin, "Design an Input Shaper to Reduce Operation-Induced Vibration," *Proceedings of the American Control Conference*, San Francisco, Calif., pp. 2502–6, 1993.

[196] M. Valasek, "Input Shaping Control of Mechatronical Systems," *Proceedings of the Ninth World Congress on the Theory of Machines and Mechanisms*, Milan, Italy, pp. 3049–3052, 1995.

[197] E. A. Crain, W. E. Singhose, and W. P. Seering, "Evaluation of Input Shaping on Configuration Dependent Systems," *Proceedings of the Japan-USA Symposium of Flexible Automation*, Boston, Mass., 1996.

[198] D. -S. Kwon, D. -H. Hwang, S. M. Babcock, and B. L. Burks, "Input Shaping Filter Methods for the Control of Structurally Flexible, Long-Reach Manipulators," *Proceedings of the IEEE Conference on Robotics and Automation*, San Diego, Calif., vol. 4, pp. 3259–3264, 1994.

[199] B. Wie and Q. Liu, "Comparison Between Robustified Feedforward and Feedback for Achieving Parameter Robustness," *Journal of Guidance, Control, and Dynamics*, vol. 15, no. 4, pp. 935–943, 1992.

[200] L. Y. Pao and W. E. Singhose, "A Comparison of Constant and Variable Amplitude Command Shaping Techniques for Vibration Reduction," *Proceedings of the IEEE Conference on Control Applications*, Albany, N.Y., 1995.

[201] W. E. Singhose and L. Y. Pao, "Comparison of Input Shaping Techniques for Speed-Critical Multi-Mode Flexible Systems," *Proceedings of the IEEE Conference on Control Applications*, Dearborn, Mich., 1996.

[202] N. C. Singer, W. E. Singhose, and W. P. Seering, "Comparison of Filtering Methods for Reducing Residual Vibration," *submitted to the European Journal of Control*, 1996.

[203] W. Singhose, N. Singer, and W. Seering, "Comparison of Command Shaping Methods for Reducing Residual Vibration," *Proceedings of the Third European Control Conference*, Rome, Italy, vol. 2, pp. 1126–1131, 1995.

[204] M. Bodson, "Experimental Comparison of Two Input Shaping Methods for the Control of Resonant Systems," *Proceedings of the International Federation of Automatic Control World Congress, San Francisco, Calif., vol. 11*, pp. 433–438, 1996.

Input Shaping and Time-Optimal Control

[205] W. Singhose, N. Singer, and W. Seering, "Design and Implementation of Time-Optimal Negative Input Shapers," *Proceedings of International Mechanical Engineering Congress and Exposition*, Chicago, Ill., pp. 151–157, 1994.

[206] W. Singhose, N. Singer, and W. Seering, "Time-Optimal Negative Input Shapers," *ASME Journal of Dynamic Systems, Measurement, and Control*, vol. 119, no. June, 1997.

[207] L. Y. Pao and W. E. Singhose, "On the Equivalence of Minimum Time Input Shaping with Traditional Time-Optimal Control," *Proceedings of the Fourth IEEE Conference on Control Applications*, Albany, N.Y., 1995.

[208] W. Singhose and L. Pao, "A Comparison of Input Shaping and Time-Optimal Flexible-Body Control," *Control Engineering Practice*, vol. 5, no. 4, 1997.

[209] W. Singhose, S. Derezinski, and N. Singer, "Extra-Insensitive Shapers for Controlling Flexible Spacecraft," *Proceedings of the AIAA Guidance, Navigation, and Control Conference*, Scottsdale, Ariz., 1994.

[210] W. Singhose, S. Derezinski, and N. Singer, "Extra-Insensitive Input Shapers for Controlling Flexible Spacecraft," *AIAA Journal of Guidance, Control, and Dynamics*, vol. 19, no. 2, pp. 385–91, 1996.

[211] W. E. Singhose, L. Y. Pao, and W. P. Seering, "Slewing Multi-Mode Flexible Spacecraft Using Zero Derivative Robustness Constraints," *Journal of Guidance, Control, and Dynamics, vol. 20*, no. 1, pp. 204–206, 1997.

[212] W. Singhose, W. Seering, and T. Singh, "On-Off Control of Flexible Spacecraft with Specified Fuel Usage," *accepted for publication in the Proceedings of the American Control Conference*, Albuquerque, N.Mex., 1997.

[213] L. Y. Pao and W. E. Singhose, "Unity Magnitude Input Shapers and Their Relation to Time-Optimal Control," *Proceedings of the International Federation of Automatic Control World Congress*, San Francisco, Calif., vol. 1, pp. 385–390, 1996.

[214] T. D. Tuttle and W. P. Seering, "Creating Time-Optimal Commands for Systems with Denominator Dynamics," *Proceedings of the International Conference on Control Applications*, Dearborn, Mich., vol. 1, pp. 385–390, 1996.

General References

[215] *MATLAB User's Guide*. Natick, Mass.: The MathWorks, Inc., 1991.

[216] K. Ogata, *Modern Control Engineering*. Englewood Cliffs, N.J.: Prentice-Hall, Inc., 1970.

[217] G. F. Simmons, *Calculus with Analytic Geometry*. New York, N.Y.: McGraw-Hill Book Company, 1985.

[218] A. Grace, *Optimization Toolbox For Use with MATLAB*. Natick, Mass.: The MathWorks, Inc., 1994.

[219] A. Brooke, D. Kendrick, and A. Meeraus, *GAMS: A User's Guide*. Redwood City, Calif.: The Scientific Press, 1988.

The MACE Project

[220] D. W. Miller, R. B. Sepe, D. Rey, E. Saarmaa, and E. F. Crawley, "The Middeck Active Control Experiment (MACE)," *Proceedings of the Fifth NASA/DOD CSI Technical Conference*, Tahoe, Calif., 1992.

[221] D. W. Miller, J. d. Luis, G. Stover, J. P. How, K. Liu, S. C. O. Grocott, M. E. Campbell, R. Glaese, and E. F. Crawley, "The Middeck Active Control Experiment (MACE): Using Space for Technology Research and Development," *Proceedings of the American Control Conference*, Seattle, Wash., vol. 1, pp. 397–401, 1995.

[222] D. W. Miller, J. d. Luis, G. Stover, and E. F. Crawley, "MACE: Anatomy of a Modern Control Experiment," *Proceedings of the International Federation of Automatic Control World Congress*, San Francisco, Calif., vol. 4, pp. 31–36, 1996.

[223] R. M. Glaese, "Development of Zero-Gravity Structural Control Models from Ground Analysis and Experimentation,": Massachusetts Institute of Technology, 1994.

[224] R. M. Glaese and D. W. Miller, "On-Orbit Modelling of the Middeck Active Control Experiment," 12th International Modal Analysis Conference, Honolulu, Hi., 1994.

[225] R. M. Glaese and D. W. Miller, "Derivation of 0-G Structural Control Models From Analysis and 1-G Experimentation," Proceedings of the Structures, Structural Dynamics, and Materials Conference, New Orleans, La., 1995.

[226] R. M. Glaese and K. Liu, "On-Orbit Modeling and Identification for MACE," Proceedings of the International Federation of Automatic Control World Congress, San Francisco, Calif., vol. 4, pp. 37–43, 1996.

[227] R. N. Jacques, K. Liu, and D. W. Miller, "Identification of Highly Accurate Low Order State Space Models in the Frequency Domain," Proceedings of the International Federation of Automatic Control World Congress, San Francisco, Calif., 1996.

[228] K. Liu, R. N. Jacques, and D. Miller, "Frequency Domain Structural System Identification by Observability Range Space Extraction," Proceedings of the 1994 American Controls Conference, Baltimore, Md., vol. 1, pp. 107–111, 1994.

[229] S. C. O. Grocott, J. P. How, and D. W. Miller, "Comparison of Control Techniques for Robust Performance on Uncertain Structural Systems," MIT Space Engineering Research Center 2-94, January 1994.

[230] S. C. O. Grocott, J. P. How, and D. W. Miller, "A Comparison of Robust Control Techniques for Uncertain Structural Systems," Proceedings of the AIAA Guidance, Navigation and Control Conference, Scottsdale, Ariz., pp. 261–271, 1994.

[231] S. C. O. Grocott and M. E. Campbell, "Control Analysis for MACE: Methods and Limitations," Proceedings of the International Federation of Automatic Control World Congress, San Francisco, Calif., vol. 4, pp. 43–48, 1996.

[232] J. How, R. Glaese, S. Grocott, and D. Miller, "Finite Element Model Based Robust Controllers for the MIT Middeck Active Control Experiment (MACE)," Proceedings of the American Controls Conference, Baltimore, Md., vol. 1, pp. 272–277, 1994.

[233] M. E. Campbell, S. C. O. Grocott, J. P. How, D. W. Miller, and E. F. Crawley, "Verification Procedure for On-orbit Controllers for the MIT Middeck Active Control Experiment," Proceedings of the American Control Conference, Seattle, Wash., vol. 6, pp. 3600–3605, 1995.

[234] M. E. Campbell, S. C. O. Grocott, J. P. How, and J. A. Woods-Vedeler, "Overview of Closed Loop Results for MACE," Proceedings of the International Federation of Automatic Control World Congress, San Francisco, Calif., vol. 4, pp. 49–54, 1996.

[235] T. D. Tuttle and W. P. Seering, "Vibration Reduction in 0-g Using Input Shaping on the MIT Middeck Active Control Experiment," Proceedings of the American Control Conference, Seattle, Wash., vol. 2, pp. 919–923, 1995.

[236] T. D. Tuttle and W. P. Seering, "Vibration Reduction in Flexible Space Structures Using Input Shaping On MACE: Mission Results," Proceedings of the International Federation of Automatic Control World Congress, San Francisco, Calif., vol. 4, pp. 55–60, 1996.

Appendix A

In this appendix, a general analytic expression is derived for the residual response of a linear system to a time-optimal or time-efficient command profile. As discussed in section 5 above, this expression is very useful for characterizing the amplitude of residual response that results due to modeling uncertainties. Additionally, as will be illustrated at the end of this derivation, the terms of this expression can be used to argue that the constraint equations specified in section 3 above are the minimum necessary set required to bound the time-optimal control problem.

Nomenclature

Before the derivation begins, we must first define some variables and concepts. First, as is the convention in this work, the residual response will be derived for the standard time-optimal or time-efficient command profile described in section 3 and depicted in FIG. 14. This command profile consists of a pulse train with a finite number of switches followed by a tail. The term "residual response" itself refers to the system behavior after the command pulse train is complete. As a general rule, the equations derived here will only apply to the system response for times $t \geq t_n$, where $t_n$ is the time of the final switch in the command pulse train.

For all of the steps of the derivation, several variables are required to describe the system dynamics and command profile. Definitions of these variables, for a given linear system and a given time-optimal or time-efficient command profile, are summarized below:

System Variables:

m=the total number of system poles, r=the total number of system zeros, rbm=the number of system rigid-body modes, $p_i$=the system poles, where i=1, 2, ..., m, $q_i$=the multiplicity of the system poles, where i=1, 2, ..., m, and $z_j$=the system zeros, where j=1, 2, ..., r.

Command Profile Variables:

n=the total number of switches in the command pulse train minus one, $a_j$=the amplitude of the steps in the pulse train, where j=0, 1, ..., n, $t_j$=the switch times of the pulse train, where j=0, 1, ..., n, $c_j$=the coefficients of the exponential terms in the command tail, where j=1, 2, ..., r, and $z_j^*$=the values of the system zeros used to construct the command tail, where j=1, 2, ..., r.

As expressed above, the one variable that may need further explanation is the pole multiplicity variable, $q_i$. The pole multiplicity is a number assigned to every system pole indicating the presence and number of repeated system poles. For nonrepeated poles, this value is simply 1. For repeated poles, the first pole would have $q_i=1$, the second pole would have $q_i=2$, the third pole would have $q_i=3$, and so on. For example, for a given system with four poles, two repeated rigid body poles and a pair of complex poles at $s=1\pm i$, the following values of $p_i$ and $q_i$ would result:

$p_1=0$, $p_2=0$, $p_3=1+i$, $p_4=1-i$, and $q_1=1$, $q_2=2$, $q_3=1$, and $q_4=1$.

With these variable definitions, we can now be clear about the nature of the system mathematics and the command profile equation.

Representation of the Command Profile

As discussed above, this derivation will be concerned with input commands that fall into the category of time-optimal or time-efficient command profiles. As discussed above, these types of command profiles typically contain a series of pulses or steps followed, in some cases, by an exponentially decaying tail. As originally proposed in section 3, an expression can be created to capture the general profile of this family of commands:

$$u(t) = \sum_{j=0}^{n} a_j 1(t - t_j) + \sum_{j=1}^{r} c_j e^{z_j^*(t-t_n)} 1(t - t_n), \quad (A.1)$$

where the terms in this expression are defined above, and 1(t) is the unit step command. In order to assist the clarity of the derivation to follow, the two distinct terms of this equation can be separated as follows:

$$u(t) = u_1(t) + u_2(t), \quad (A.2)$$

where $$u_1(t) = \sum_{j=0}^{n} a_j 1(t - t_j), \text{ and} \quad (A.3)$$

$$u_2(t) = \sum_{j=1}^{r} c_j e^{z_j^*(t-t_n)} 1(t - t_n). \quad (A.4)$$

As illustrated throughout this document, with the correct parameter values, not only can these equations represent all time-optimal command profiles for linear systems, but they can also capture the form of a wide range of time-efficient command profiles as well.

Representation of the System Dynamics

The derivation presented here will apply to SISO systems with any combination of linear dynamics. In general, a linear system can be expressed in the form of a SISO transfer function as follows:

$$G(s) = K_1 \frac{(s - z_1)(s - z_2) \ldots (s - z_r)}{(s - p_1)(s - p_2) \ldots (s - p_m)}, \quad (A.5)$$

where the system variables are defined above and $K_1$ is the transfer function gain. Using a partial fraction expansion, this transfer function can also be expressed as $$G(s) = G_1(s) + G_2(s) + \ldots + G_m(s) + K_2 \quad (A.6)$$
$$= \frac{R_1}{(s - p_1)} + \frac{R_2}{(s - p_2)} + \ldots + \frac{R_m}{(s - p_m)} + K_2,$$

where $R_i$ are the residues associated with each system pole in the expansion, and $K_2$ is the constant direct term, which is nonzero in the case where r=m. Equation A.6 applies only for the case when the given system has no repeated roots. If a given system does contain repeated roots, the following more general expression for the partial fraction expansion must be used:

$$G(s) = G_1(s) + G_2(s) + \ldots + G_m(s) + K_2 \quad (A.7)$$
$$= \frac{R_1}{(s - p_1)^{q_1}} + \frac{R_2}{(s - p_2)^{q_2}} + \ldots + \frac{R_m}{(s - p_m)^{q_m}} + K_2,$$

where $q_i$ are the pole multiplicities as defined above. Writing this expression with a more compact notation results in $$G(s) = \sum_{i=1}^{m} G_i(s) + K_2 \quad (A.8)$$

$$= \sum_{i=1}^{m} \frac{R_i}{(s - p_i)^{q_i}} + K_2.$$

Now, given this general representation for the partial fraction expansion of a linear system, we can develop a general expression for the impulse response and step response of G(s). The resulting equations will be composed here since they are required in the derivation that follows.

By taking the inverse Laplace Transform of the given transfer function, above, an expression can be created for the impulse response, g(t), of the system, G(s):

$$g(t) = L^{-1}\{G(s)\} = g_1(t) + g_2(t) + \ldots + g_m(t) + K_2\delta(t), \quad (A.9)$$

where $\delta(t)$ is the Dirac delta function. This equation can also be written as $$g(t) = \sum_{i=1}^{m} g_i(t) + K_2\delta(t). \quad (A.10)$$

Now, in order to find an expression for $g_1(t)$, we must take the inverse Laplace Transform of the individual terms in equation A.7. Performing this task results in the equation $$g_i(t) = \frac{R_i}{(q_i - 1)!} t^{(q_i-1)} e^{p_i t}, \quad (A.11)$$

where, as defined above, $q_i$ is the multiplicity of the pole $p_i$. Substituting this result into equation A.10 yields the following general expression for the impulse response of a given linear system, G(s):

$$g(t) = \sum_{i=1}^{m} \frac{R_i}{(q_i - 1)!} t^{(q_i-1)} e^{p_i t} + K_2\delta(t), \quad (A.12)$$

for $t \geq 0$. From this result, we can also derive a general equation for the step response, h(t), of the given linear system by taking the integral of the impulse response. More specifically, $$h(t) = \int_0^t g(t) \, dt \quad (A.13)$$
$$= \int_0^t \left( \sum_{i=1}^{m} \frac{R_i}{(q_i - 1)!} t^{(q_i-1)} e^{p_i t} + K_2\delta(t) \right) dt$$
$$= \sum_{i=1}^{m} \left[ \int_0^t \left( \frac{R_i}{(q_i - 1)!} t^{(q_i-1)} e^{p_i} \right) dt \right] + \int_0^t K_2\delta(t) \, dt.$$

The integral in each of the two terms in this equation will be evaluated separately. In the simpler case, the second term of this equation can be reduced to:

$$\int_0^t K_2\delta(t) \, dt = K_2 1(t) = K_2, \text{ for } t \geq 0. \quad (A.14)$$

In order to take the integral in the first term of this equation, two distinct cases must be considered separately. First, we will consider the case when $p_i = 0$, and second, we will consider when $p_i \neq 0$. In the first of these two cases, a general expression for each integral in the summation of equation A.13 can be written as:

$$h_i(t) = \int_0^t \left( \frac{R_i}{(q^i-1)!} t^{(q_i-1)} 1 \right) dt \qquad (A.15)$$

$$= \frac{R_i}{q_i!} t^{q_i}.$$

Now, for the case when $p_i \neq 0$, this expression is somewhat more complex:

$$h_i(t) = \int_0^t \left( \frac{R_i}{(q_i-1)!} t^{(q_i-1)} e^{p_i t} \right) dt \qquad (A.16)$$

$$= \frac{R_i}{p_i^{q_i}} \left[ e^{p_i t} \left( \sum_{k=1}^{q_i} \frac{(-1)^{(k-1)}}{(q_i-k)!} (p_i t)^{(q_i-k)} \right) + (-1)^{q_i} \right].$$

Although the derivation is not shown here, the reader can easily verify this result by evaluating the integral for some small values of $q_i$ like $q_i=1$ or 2. Given that an expression has been derived for all of the integrals in equation A.13, a general result for the step response of the linear system can now be constructed by combining equations A.14, A.15, and A.16:

$$h(t) = \sum_{i=1}^{rbm} \frac{R_i}{q_i!} t^{q_i} + \qquad (A.17)$$

$$\sum_{i=rbm+1}^{m} \frac{R_i}{p_i^{q_i}} \left[ e^{p_i t} \left( \sum_{k=1}^{q_i} \frac{(-1)^{(k-1)}}{(q_i-k)!} (p_i t)^{(q_i-k)} \right) + (-1)^{q_i} \right] + K_2,$$

for $t \geq 0$. Note that the summation in equation A.13 has been divided to separate the nonzero poles from the rigid-body poles. With this expression, our characterization of the time-response and frequency response of a given linear system is complete and we can proceed with the derivation of the residual response expression.

Calculating the Residual Response

For the given linear system transfer function, $G(s)$, and a specified input command, $u(t)$, the system output response can be expressed as $$y(t) = L^{-1}\{G(s)U(s)\}, \qquad (A.18)$$

where $U(s)$ is the Laplace Transform of the input command, or equivalently $$y(t) = g(t) * u(t), \qquad (A.19)$$

where $g(t)$ is the system impulse response and '*' represents the convolution operation. Now, from equation A.2, we can rewrite equation A.19 as $$y(t) = y_1(t) + y_2(t), \qquad (A.20)$$

where $$y_1(t) = g(t) * u_1(t), \qquad (A.21)$$

$$y_2(t) = g(t) * u_2(t), \qquad (A.22)$$

and $u_1(t)$ and $u_2(t)$ are defined according to equations A.3 and A.4. Dividing the problem in this manner allows us to consider each of the two terms, $y_1(t)$ and $y_2(t)$, separately.

Deriving an Expression for $y_1(t)$:

From the expression for $g(t)$ in A.10, we can rewrite the equation for $y_1(t)$ as follows:

$$y_1(t) = \left( \sum_{i=1}^{m} g_i(t) \right) * u_1(t) + (K_2 \delta(t)) * U_1(t). \qquad (A.23)$$

Substituting the expression for $u_1(t)$ from equation A.3 into this result yields $$y_1(t) = \left( \sum_{i=1}^{m} g_i(t) \right) * \left( \sum_{j=0}^{n} a_j 1(t-t_j) \right) + (K_2 \delta(t)) * \left( \sum_{j=0}^{n} a_j 1(t-t_j) \right). \qquad (A.24)$$

Now, since this derivation is only concerned with the system residual vibration rather than the complete system response, we only need to consider the response after the time of the final switch in the pulse train, namely $t \geq t_n$. This assumption reduces the complexity of the equations resulting from this derivation. In the case of equation (A.24), with this assumption, the second term becomes:

$$(K_2 \delta(t)) * \left( \sum_{j=0}^{n} a_j 1(t-t_j) \right) = K_2 \sum_{j=0}^{n} a_j, \text{ for } t \geq t_n. \qquad (A.25)$$

For the first term in equation A.24, a result can be more easily reached if we consider that the expression for $u_1(t)$ is simply a sum of weighted and shifted step commands. From linear system theory, this insight allows us to evaluate the convolution in the first term of this equation by constructing it from a sum of weighted and shifted step responses for each of the terms for $g_i(t)$. Following this reasoning, the first term in equation A.24 becomes $$\left( \sum_{i=1}^{m} g_i(t) \right) * \left( \sum_{j=0}^{n} a_j 1(t-t_j) \right) = \sum_{i=1}^{m} \left( \sum_{j=0}^{n} a_j h_i(t-t_j) \right), \qquad (A.26)$$

where $h_i(t)$ is the step response of the linear system that has the impulse response $g_i(t)$. Now, combining the results from equations A.25 and A.26 into equation A.24, we have $$y_1(t) = \sum_{i=1}^{m} \left( \sum_{j=0}^{n} a_j h_i(t-t_j) \right) + K_2 \sum_{j=0}^{n} a_j, \qquad (A.27)$$

for $t \geq t_n$. As presented in equation A.17, the general equation for the step response of a linear system was derived previously. From the individual terms in this equation, a result for the value of the step response terms, $h_i(t)$, in equation A.27 can be formulated. More specifically, for the case when $p_i$ is a rigid body pole, $$h_i(t) = \frac{R_i}{q_i!} t^{q_i}, \qquad (A.28)$$

and for the case when $p_i$ is a nonzero pole, $$h_i(t) = \frac{R_i}{p_i^{q_i}} \left[ e^{p_i t} \left( \sum_{k=1}^{q_i} \frac{(-1)^{(k-1)}}{(q_i-k)!} (p_i t)^{(q_i-k)} \right) + (-1)^{q_i} \right]. \qquad (A.29)$$

Now, substituting these two expressions into equation A.27 yields the complete general equation for the residual response due the command pulse train:

$$y_1(t) = \sum_{i=1}^{rbm}\left(\sum_{j=0}^{n} a_j \frac{R_i}{q_i!}(t-t_j)^{q_i}\right) + \sum_{i=rbm+1}^{m}\left[\sum_{j=0}^{n} a_j \frac{R_i}{p_i^{q_i}}\right. \quad (A.30)$$

$$\left(e^{p_i(t-t_j)}\left(\sum_{k=1}^{q_i} \frac{(-1)^{(k-1)}}{(q_i-k)!}(p_i(t-t_j))^{(q_i-k)}\right) + (-1)^{q_i}\right)\right] +$$

$$\ldots K_2 \sum_{j=0}^{n} a_j, \text{ for } t \geq t_n.$$

Deriving an Expression for $y_2(t)$:

With a formula found to describe the first component, $y_1(t)$, of the residual response equation, an expression can now be derived for the second part, $y_2(t)$. Unlike the derivation for $y_1(t)$ which was performed wholly in the time-domain, the derivation for $y_2(t)$ will proceed in the frequency domain. Specifically, rewriting the expression for $y_2(t)$ in equation A.22 in terms of the Laplace Transforms for the system, $G(s)$, and the tail of the command profile, $U_2(s)$, yields $$y_2(t) = L^{-1}\{G(s)U_2(s)\}. \quad (A.31)$$

Now, from equation A.8, $G(s)$ can be represented as $$G(s) = \sum_{i=1}^{m} \frac{R_i}{(s-p_i)^{q_i}} + K_2. \quad (A.32)$$

Also, by taking the Laplace Transform of the expression for $u_2(t)$ in equation A.4 results in $$U_2(s) = e^{-st_n}\sum_{j=1}^{r} \frac{c_i}{s-z_i^*}. \quad (A.33)$$

Substituting equations A.32 and A.33 into equation A.31 produces the result $$y_2(t) = L^{-1}\left\{\sum_{i=1}^{m}\sum_{j=1}^{r} \frac{e^{-st_n}R_i c_j}{(s-p_i)^{q_i}(s-z_j^*)}\right\} + L^{-1}\{K_2 U_2(s)\}, \quad (A.34)$$

which is equivalent to $$y_2(t) = \sum_{i=1}^{m}\sum_{j=1}^{r} L^{-1}\left\{\frac{e^{-st_n}R_i c_j}{(s-p_i)^{q_i}(s-z_j^*)}\right\} + K_2 u_2(t). \quad (A.35)$$

Now, given equation A.4, the second term in the equation can be easily rewritten as $$K_2 u_2(t) = K_2 \sum_{j=1}^{r} c_j e^{z_j^*(t-t_n)}, \text{ for } t \geq t_n. \quad (A.36)$$

For the first term in equation A.35, however, we must first find a method for taking the inverse Laplace Transform of the expression in braces. This can be done by using a partial fraction expansion. Specifically, the quantity in equation A.35 can be expressed as $$L^{-1}\left\{\frac{e^{-st_n}R_i c_j}{(s-p_i)^{q_i}(s-z_j^*)}\right\} = \quad (A.37)$$

$$L^{-1}\left\{e^{-st_n}R_i c_j\left(\frac{Q_{ij1}}{(s-p_i)} + \frac{Q_{ij2}}{(s-p_i)^2} + \frac{Q_{ijq_i}}{(s-p_i)^{q_i}} + \frac{Q_{ij(q_i+1)}}{(s-z_j^*)}\right)\right\},$$

or equivalently $$L^{-1}\left\{\frac{e^{-st_n}R_i c_j}{(s-p_i)^{q_i}(s-z_j^*)}\right\} = \quad (A.38)$$

$$L^{-1}\left\{e^{-st_n}R_i c\left[\left(\sum_{k=1}^{q_i} \frac{Q_{ijk}}{(s-p_i)^k}\right) + \frac{Q_{ij(q_i+1)}}{(s-z_j^*)}\right]\right\},$$

where $Q_{ijk}$ are the residues of the partial fraction expansion of the transfer function with numerator 1 and denominator roots $p_i$, $q_i$ times, and $z_j^*$. For example, in the case where $q_i=1$, the values for $Q_{ijk}$ are $$Q_{ij1} = \frac{1}{(p_i - z_j^*)}, \text{ and } Q_{ij2} = -\frac{1}{(p_i - z_j^*)}.$$

Now, from this partial fraction expansion, we can evaluate the inverse Laplace Transform. Performing this task on the result in equation A.38 produces $$L^{-1}\left\{e^{-st_n}R_i c_j\left[\left(\sum_{k=1}^{q_i} \frac{Q_{ijk}}{(s-p_i)^k}\right) + \frac{Q_{ij(q_i+1)}}{(s-z_j^*)}\right]\right\} = \quad (A.39)$$

$$R_i c_j\left[\sum_{k=1}^{q_i}\left(\frac{1}{(k-1)!}Q_{ijk}(t-t_n)^{(k-1)}e^{p_i(t-t_n)}\right) + Q_{ij(q_i+1)}e^{z_j^*(t-t_n)}\right].$$

Finally, substituting this result, along with the result in equation A.36, into equation A.35 yields the following expression for $y_2(t)$:

$$y_2(t) = \sum_{i=1}^{m}\sum_{j=1}^{r}\left\{R_i c_j\left[\sum_{k=1}^{q_i}\left(\frac{1}{(k-1)!}Q_{ijk}(t-t_n)^{(k-1)}e^{p_i(t-t_n)}\right) + \right.\right. \quad (A.40)$$

$$\left.\left. Q_{ij(q_i+1)}e^{z_j^*(t-t_n)}\right]\right\} + K_2\sum_{j=1}^{r} c_j e^{z_j^*(t-t_n)},$$

for $t \geq t_n$. With this result, the derivation of both $y_1(t)$ and $y_2(t)$ is complete. All that remains, now, is to combine these results to find a general expression for the total residual response, $y(t)$.

Collecting Terms to Find $y(t)$:

The equation for the residual response of the linear system, $G(s)$, to the time-optimal or time-efficient command profile, $y(t)$, can be constructed by combining the results for $y_1(t)$ and $y_2(t)$:

$$y(t) = y_1(t) + y_2(t). \quad (A.41)$$

Specifically, using the results from equations A.30 and A.40, the following expression can be created:

$$y(t) = \sum_{i=1}^{rbm}\left(\sum_{j=0}^{n} a_j \frac{R_i}{q_i!}(t-t_j)^{q_i}\right) + \sum_{i=rbm+1}^{m}\left[\sum_{j=0}^{n} a_j \frac{R_i}{p_i^{q_i}}\right. \quad (A.42)$$

-continued $$\left(e^{p_i(t-t_j)}\left(\sum_{k=1}^{q_i}\frac{(-1)^{(k-1)}}{(q_i-k)!}(p_i(t-t_j))^{(q_i-k)}\right)+(-1)^{q_i}\right)+$$

$$K_2\sum_{j=0}^{n}a_j+\sum_{i=1}^{m}\sum_{j=1}^{r}\left\{R_ic_j\right.$$

$$\left[\sum_{k=1}^{q_i}\left(\frac{1}{(k-1)!}Q_{ijk}(t-t_n)^{(k-1)}e^{p_i(t-t_n)}\right)+Q_{ij(q_i+1)}e^{z_j^*(t-t_n)}\right]\right\}+$$

$$K_2\sum_{j=1}^{r}c_je^{z_j^*(t-t_n)},\quad\text{for }t\geq t_n.$$

Understanding the Residual Response Equation

Equation A.42 can be used to calculate the profile of the residual response for any SISO, LTI system to any time-optimal or time-efficient command input that can be described by equation A.1. By reorganizing the terms in this equation, a better understanding can be gained about the contribution of the individual system dynamics to the overall residual response. Specifically, by regrouping the terms in the expression above, the following equation can be derived:

$$y(t)=\left(K_2+\sum_{i=rbm+1}^{m}(-1)^{q_i}\frac{R_i}{p_i^{q_i}}\right)\sum_{j=0}^{n}a_j+ \quad\text{(term 1a)}$$

$$\sum_{i=1}^{rbm}\frac{R_i}{q_i!}\left(\sum_{j=0}^{n}a_j(t-t_j)^{q_i}\right)+ \quad\text{(term 1b)}$$

$$\sum_{i=1}^{rbm}R_ie^{p_i(t-t_n)}\sum_{j=1}^{r}c_j\sum_{k=1}^{q_i}\frac{1}{(k-1)!}Q_{ijk}(t-t_n)^{(k-1)}+ \quad\text{(term 1c)}$$

$$\sum_{i=rbm}^{m}\frac{R_i}{p_i^{q_i}}e^{p_it}\left[\sum_{j=0}^{n}a_je^{-p_jt_j}\left(\sum_{k=1}^{q_i}\frac{(-1)^{(k-1)}}{(q_i-k)!}(p_i(t-t_j))^{(q_i-k)}\right)+ \quad\text{(term 2)}\right.$$

$$\left.\sum_{j=1}^{r}c_je^{-p_it_n}p_i^{q_i}\left(\sum_{k=1}^{q_i}\frac{Q_{ijk}}{(k-1)!}(t-t_n)^{(k-1)}\right)\right]+$$

$$\sum_{i=1}^{m}R_i\sum_{j=1}^{r}c_jQ_{ij(q_i+1)}e^{z_j^*(t-t_n)}+\sum_{j=1}^{r}c_jK_2e^{z_j^*(t-t_n)},\quad\text{for }t\geq t_n. \quad\text{(term 3)}$$

By observing the individual terms in this equation, some statements can be made about the contribution of each. First, the three terms 1a, 1b, and 1c, represent the total rigid-body motion produced in the system by the given command. In particular, term 1a has a value equal to the total system rigid-body motion in the cases where there are no system rigid-body modes. When a system does contain rigid-body modes, however, terms 1b and 1c become nonzero. Note that if the system contains no zeros, term 1c will be zero since the tail coefficients, $c_j$, will be zero. Term 2 in equation A.43 represents the contribution of the system denominator dynamics to the overall residual response. If the specified input command profile does not cancel all of the system poles, then this term will be nonzero and describe any response, such as oscillation, around the final system steady-state value. Term 3 in this equation, describes the contribution of any system zeros to the residual response. If the tail of a time-optimal or time-efficient command does not drive the system exactly at the frequencies of the system zeros, then this term will be nonzero. Also, this term disappears if the system has no zeros.

From this understanding of the system residual response, we can get a better idea of the origins of the problem constraints for the time-optimal control problem. As discussed in section 3, three basic constraints are imposed by the time-optimal control problem. The first states that the time-optimal command profile must produce rest-to-rest motion in the system output. The second states that the system output must change by a desired amount, dy, and the third states that the command profile must not violate the actuator limits. This last constraint is easily satisfied by selecting command amplitudes that remain within the specified system actuator limits. For the first two constraints, however, detailed equations were derived in section 3 to relate the system output behavior to the parameters describing the input command. These two types of constraints were named the dynamics cancellation constraint and the boundary condition constraint. From equation A.43, we can get a better understanding about the origins of these constraints.

First, for the case of the dynamics cancellation constraint, the resulting equations, when satisfied, ensure that the system will not have any residual vibration when the final resting state has been reached. In order for this to be true, both terms 2 and 3 in equation A.43 must be exactly zero. For term 3, this condition is satisfied if the values for the system zeros used in the command profile, $z_j^*$, exactly match the actual system zeros, $z_j$. When this occurs, the values of the residues, $R_i$ and $Q_{ij(q_i+1)}$, and the direct gain, $K_2$, will combine to a value zero. For term 2, although not immediately apparent, the bracketed expression is a more complicated form of the dynamics cancellation constraint equation from section 3. Therefore, if the dynamics cancellation constraint is satisfied, term 2 will go to zero and the command profile will not excite any residual vibration. This will be illustrated more clearly in the simple example to follow.

The boundary condition constraint in the time-optimal control problem ensures that the command profile will move the system output by the desired amount, dy. In terms of the residual vibration equation, A.43, this constraint is captured in terms 1a, 1b, and 1c. In other words, if the command profile is designed to satisfy the boundary condition constraint, then terms 1a, 1b, and 1c will be guaranteed to sum to the desired value of dy. Setting the value of these three terms equal to dy is an equivalent statement to the boundary condition constraint outlined in section 3.

From this analysis of the residual response equation, it is clear that the set of constraints imposed for the time-optimal control problem is the minimum, necessary set required to ensure that the residual response behaves as desired. Furthermore, as will be illustrated in the example below, these constraints represent the simplest expressions that can be composed to require the system residual response to behave accordingly.

A Simple Example

In order to gain a better understanding of the relationship between the time-optimal problem constraints derived in section three and their impact on the system residual response, consider the simple system $$G(s) = \frac{(s - z_1)}{(s - p_1)(s - p_2)},$$  (A.44)

where $p_1 \neq p_2$. From the variable definitions at the beginning of this Appendix, the following values can be assigned: rbm=0, m=2, r=1, $q_1$=1, and $q_2$=1. Also, assuming that the time-optimal command profile for this system will have a pulse train with two switches, not including the first, then n=2. Now, by taking the partial fraction expansion of the system transfer function, the following values can be found for the residues and the direct gain:

$$R_1 = \frac{p_1 - z_1}{p_1 - p_2}, \quad R_2 = \frac{p_2 - z_1}{p_2 - p_1}, \text{ and } K_2 = 0.$$

Also, by taking the partial fraction expansion of the transfer function with numerator 1 and denominator roots $p_i$ and $z_j^*$, values for the following terms can be found $$Q_{ij1} = \frac{1}{p_i - z_j^*}, \text{ and } Q_{ij2} = -\frac{1}{p_i - z_j^*}.$$

Therefore, substituting these values and expressions into the general equation for the system residual response in equation A.43 yields:

$$y(t) = -\left(\frac{R_1}{p_1} + \frac{R_2}{p_2}\right)(a_0 + a_1 + a_2) + \ldots$$  (A.45)

$$\frac{R_1}{p_1} e^{p_1 t} (a_0 e^{-p_1 t_0} + a_1 e^{-p_1 t_1} +$$

$$a_2 e^{-p_1 t_2} + c_1 e^{-p_1 t_2} p_1 Q_{111}) + \ldots$$

$$\frac{R_2}{p_2} e^{p_2 t} (a_0 e^{-p_2 t_0} + a_1 e^{-p_2 t_1} +$$

$$a_2 e^{-p_2 t_2} + c_1 e^{-p_2 t_2} p_2 Q_{211}) + \ldots$$

$$R_1 c_1 Q_{112} e^{z_1^*(t-t_2)} + R_2 c_1 Q_{212} e^{z_1^*(t-t_2)},$$

or equivalently $$y(t) = -\frac{z_1}{p_1 p_2}(a_0 + a_1 + a_2) + \ldots$$  (A.46)

$$\frac{1}{p_1} \cdot \frac{(p_1 - z_1)}{(p_1 - p_2)} e^{p_1 t} \left( a_0 e^{-p_1 t_0} + a_1 e^{-p_1 t_1} + \right.$$

-continued $$\left. a_2 e^{-p_1 t_2} + e^{-p_1 t_2} \frac{c_1 p_1}{p_1 - z_1^*} \right) + \ldots$$

$$\frac{1}{p_2} \cdot \frac{(p_2 - z_1)}{(p_2 - p_1)} e^{p_2 t} \left( a_0 e^{-p_2 t_0} + a_1 e^{-p_2 t_1} + \right.$$

$$\left. a_2 e^{-p_2 t_2} + e^{-p_2 t_2} \frac{c_1 p_2}{p_2 - z_1^*} \right) + \ldots$$

$$\left( \frac{z_1^* - z_1}{(z_1^* - p_1)(z_1^* - p_2)} \right) e^{z_1^*(t-t_2)}.$$

From this equation, it can be seen that, if a time-optimal command profile is designed using a value for $z_1^*$ that is identical to the actual system zero of $z_1$, then the last term in this expression disappears. Recalling the previous discussion, the first term in this equation represents the total system output rigid-body motion. It is an equivalent statement to the boundary condition constraint, and if satisfied, it will exactly equal dy, the desired system output transition. Finally, the second and third term in this equation describe any system residual vibration excited by the command pulse train. In order to satisfy the time-optimal control problem, these terms must be equal to zero. Fortunately, referring to the constraint equations in section 3, it can be seen that, if that the dynamics cancellation constraints are satisfied, the expression in parenthesis in both terms must be equal to zero. More specifically, the parenthetical expression in term 2 is the dynamics cancellation constraint for the first system pole, and the parenthetical expression in term 3 is the dynamics cancellation constraint for the second system pole. From this reasoning, it can be better seen that the constraint equations posed in the time-optimal control problem in section 3 correspond to the minimum set of necessary conditions that need to be enforced to ensure proper behavior in the system output response.

Appendix B

As discussed in section 3, the boundary condition constraint for the time-optimal control problem requires that the integral of the command profile be evaluated. For systems that contain multiple rigid-body modes, this integral needs to be evaluated multiple times. This appendix presents the derivation of an expression that can be used to evaluate the integral of the command profile analytically. Unlike numerical integration methods, this analytic integral allows for rapid calculation of the boundary condition constraint and provides a result that is exact. The derivation will proceed by considering the integral of the two command components separately. First the analytic integral for the command pulse train will be considered followed by the integral of the command tail.

The Analytic Integral of the Command Pulse Train

As discussed in section 3, the general equation for the pulse train of a time-optimal or time-efficient command can be expressed as $$u(t) = \sum_{j=0}^{n} a_j 1(t - t_j).$$  (B.1)

Now, in order to calculate the analytic integral of this expression, we will only consider the value of the integral at the specified switch times, $t_j$. For example, for the given command profile, a vector can be constructed with one element for each switch. Each element represents the value of the command or its integral at the corresponding switch time. For the command specified by equation B.1, this vector would be $$u_0 = \begin{bmatrix} u_{00} \\ u_{01} \\ u_{02} \\ u_{03} \\ \vdots \end{bmatrix} = \begin{bmatrix} 0 \\ a_0 \\ a_0 + a_1 \\ a_0 + a_1 + a_2 \\ \vdots \end{bmatrix}. \tag{B.2}$$

The first value of this vector corresponds to the initial command amplitude, which will be assumed to be always zero. The second element corresponds to the value of the amplitude of the command pulse train slightly before the switch time $t_1$. The third element corresponds to the command amplitude value just before the switch time $t_2$, and so on. Following this protocol, a similar vector can be constructed for the first integral of the command pulse train:

$$u_1 = \begin{bmatrix} u_{10} \\ u_{11} \\ u_{12} \\ u_{13} \\ \vdots \end{bmatrix} = \begin{bmatrix} 0 \\ u_{10} + u_{00}(t_1 - t_0) + \int_0^{(t_1-t_0)} a_0 \, dt \\ u_{11} + u_{01}(t_2 - t_1) + \int_0^{(t_2-t_1)} a_1 \, dt \\ u_{12} + u_{02}(t_3 - t_2) + \int_0^{(t_3-t_2)} a_2 \, dt \\ \vdots \end{bmatrix} \tag{B.3}$$

$$= \begin{bmatrix} 0 \\ u_{10} + u_{00}(t_1 - t_0) + a_0(t_1 - t_0) \\ u_{11} + u_{01}(t_2 - t_1) + a_1(t_2 - t_1) \\ u_{12} + u_{02}(t_3 - t_2) + a_2(t_3 - t_2) \\ \vdots \end{bmatrix},$$

where the initial value for the first integral of the command is assumed to be zero. For each element in this vector, the integral is calculated by evaluating the integral from one switch to the next and adding the result to the integral over all of the previous switches. Following this pattern, a similar vector can be constructed for the second integral of the command pulse train:

$$u_2 = \begin{bmatrix} u_{20} \\ u_{21} \\ u_{22} \\ u_{23} \\ \vdots \end{bmatrix} \tag{B.4}$$

$$= \begin{bmatrix} 0 \\ u_{20} + u_{10}(t_1 - t_0) + \int_0^{(t_1-t_0)} a_0 t \, dt \\ u_{21} + u_{11}(t_2 - t_1) + \int_0^{(t_2-t_1)} (a_0 + a_1) t \, dt \\ u_{22} + u_{12}(t_3 - t_2) + \int_0^{(t_3-t_2)} (a_0 + a_1 + a_2) t \, dt \\ \vdots \end{bmatrix}$$

$$= \begin{bmatrix} 0 \\ u_{20} + u_{10}(t_1 - t_0) + \frac{1}{2} a_0 (t_1 - t_0)^2 \\ u_{21} + u_{11}(t_2 - t_1) + \frac{1}{2} (a_0 + a_1)(t_2 - t_1)^2 \\ u_{22} + u_{12}(t_3 - t_2) + \frac{1}{2} (a_0 + a_1 + a_2)(t_3 - t_2)^2 \\ \vdots \end{bmatrix}.$$

Again, this vector assumes an initial value for the second integral of the command to be zero, and each subsequent value is constructed by adding the integral over a single pulse to the integral over all of the previous pulses. Following this pattern, a general expression can be formulated to evaluate the integral of the command pulse train any number of times. Since this formula is most easily expressed in vector form, let us first define some useful vectors. To capture the values for the time spacing from one switch time to the next, consider the following vector:

$$dt = \begin{bmatrix} t_0 - 0 \\ t_1 - t_0 \\ t_2 - t_1 \\ t_3 - t_2 \\ \vdots \end{bmatrix}. \tag{B.5}$$

Also, another useful vector can be defined which represents the values of the various integrals of the command profile shifted by one element. More specifically $$u_i^* = \begin{bmatrix} 0 \\ u_{i0} \\ u_{i1} \\ \vdots \\ u_{i(n-1)} \end{bmatrix}, \tag{B.6}$$

where n is the number of switch times in the pulse train. Now, given these vector definitions, the following formulas can be created to define the integral of the command pulse train at the values of the switch times. For the first integral of the command pulse train, another way to express equation B.3 is $$u_1 = \text{cumsum}(u_0.\!*dt), \tag{B.7}$$

where $u_0$ is defined according to equation B.2 and the operator, * represents the element-by-element multiplication of the two vectors. Also, the cumsum( ) function in this equation performs the task of adding to each vector element all of the previous elements in the vector. Following this precedent, an expression for the second integral of the pulse train can be written as $$u_2 = \text{cumsum}\left(\frac{1}{2} u_0.\!*dt^{\,2} + u_1^*.\!*dt\right), \tag{B.8}$$

where the ( )$^2$ operation defines the square of each vector element. This equation for the second integral of the command profile delivers the same result as the expression in equation B.4. Following the same approach, similar expressions can be formed for additional integrals of the command pulse train:

$$u_3 = \text{cumsum}\left(\frac{1}{2 \cdot 3} u_0.\!*dt^{\,3} + \frac{1}{2} u_1^*.\!*dt^{\,2} + u_2^*.\!*dt\right), \text{ and} \tag{B.9}$$

$$u_4 = \text{cumsum} \tag{B.10}$$
$$\left(\frac{1}{2 \cdot 3 \cdot 4} u_0.\!*dt^{\,4} + \frac{1}{2 \cdot 3} u_1^*.\!*dt^{\,3} + \ldots \frac{1}{2} u_2^*.\!*dt^{\,2} + u_3^*.\!*dt\right),$$

and so on. To reiterate, each of these vectors, $u_i$, represents the values of the i-th integral of the command pulse train at each switch time in the command. The value of the i-th integral of the entire pulse train is available in the last element of $u_i$. Conveniently, the form of the equations derived above allows for easy implementation in a matrix algebra programming environment such as Matlab. Listed in Table B.1 is a computer-executable implementation of these equations to calculate the integral of a command pulse train any number of times. Since this code relies on the fast matrix and vector operations performed in Matlab, these integrals can be calculated very rapidly. Additionally, due to the compact notation, very few lines of code are required to perform this calculation.

TABLE B.1

Matlab code to calculate the integral of the command pulse train.

```
% Given two row vectors, one containing the pulse train
% amplitudes, a, and switch times, t, the following code can
% be used to evaluate the integral of the pulse train
% intnum times. This code assumes that the initial command
% value and the initial value of all its integrals are
% zero. The result of this integral over the entire length
% of the pulse train is returned in the variable result.
% Initialize the matrix storing the integrated result.
% Each row, ii, of this matrix contains the ii-th integral
% of the command at every switch time except the first.
U = cumsum(a);
Utemp = U;
n = length(a);
% Now perform the integration loop with one loop for each
% order of integration.
for ii = 1:intnum,
    if ii==1, Utemp = cumsum(U.*dT); else
    Utemp = cumsum(sum(U.*dT)); end;
    U = [U; [0 Utemp(1:n−1)]];
    dT = [(1/(ii+1)) * dT(1,:) .* dt; dT];
end;
result = Utemp(n);
```

The Analytic Integral of the Command Tail

With an expression derived to calculate the integral of the pulse-train portion of the optimal command, all that remains is to derive a similar expression for the tail. This derivation can begin by considering the general equation for the tail of a time-optimal or time-efficient command:

$$u(t) = \sum_{j=1}^{r} c_j e^{z_j(t-t_n)} 1(t - t_n). \quad (B.11)$$

Since we are concerned now with calculating the integral of this equation only for times $t \geq t_n$, we can simplify this expression to:

$$u(t) = \sum_{j=1}^{r} c_j e^{z_j t}. \quad (B.12)$$

In order to calculate a general analytic expression for the multiple integral of this equation, we must first specify the initial conditions of the integration. More specifically, $$\left(\left(\int u(t)dt\right)\right)_{t=0} = u_{10}, \quad (B.13)$$

$$\left(\left(\int\int u(t)dt^2\right)\right)_{t=0} = u_{20}, \quad (B.14)$$

$$\ldots$$

$$\left(\left(\int^{(n)} u(t)dt^n\right)\right)_{t=0} = u_{n0}. \quad (B.15)$$

Now, to get a better understanding of the form of a general expression for the n-th integral of the tail equation, let us consider the first few integrals of command tail. By integrating equation B.12, an equation for the first integral of the tail, $u_1(t)$, can be calculated to be $$u_1(t) = \int u(t)dt = \int\left(\sum_{j=1}^{r} c_j e^{z_j t}\right)dt \quad (B.16)$$

$$= \sum_{j=1}^{r} \frac{c_j}{z_j} e^{z_j t} + \text{constant.} \quad (B.17)$$

The initial condition in equation B.13 can be used to derive an expression for the constant in this equation. Performing this task yields $$\text{constant} = u_{10} - \sum_{j=1}^{r} \frac{c_j}{z_j}. \quad (B.18)$$

Therefore, combining this result with equation B.17 produces the final expression for the first integral of the command tail:

$$u_1(t) = \left(u_{10} - \sum_{j=1}^{r} \frac{c_j}{z_j}\right) + \sum_{j=1}^{r} \frac{c_j}{z_j} e^{z_j t}. \quad (B.19)$$

Following a similar procedure, this task can also be performed for the second integral of the command tail, $u_2(t)$, to derive the result $$u_2(t) = \int\int u(t)dt = \int u_1(t)dt$$

$$u_2(t) = \int\int u(t)dt = \int u_1(t)dt \quad (B.20)$$

$$= \left(u_{20} - \sum_{j=1}^{r} \frac{c_j}{z_j^2}\right) + \left(u_{10} - \sum_{j=1}^{r} \frac{c_j}{z_j}\right)t + \sum_{j=1}^{r} \frac{c_j}{z_j^2} e^{z_j t},$$

where $u_{20}$ is the initial condition from equation B.14. Similarly, the third integral of the tail, $u_3(t)$, can be expressed as $$u_3(t) = \int\int\int u(t)dt = \int u_2(t)dt$$

$$u_3(t) = \int\int\int u(t)dt = \int u_2(t)dt \quad (B.21)$$

$$= \left(u_{30} - \sum_{j=1}^{r} \frac{c_j}{z_j^3}\right) + \left(u_{20} - \sum_{j=1}^{r} \frac{c_j}{z_j^2}\right)t + \ldots$$

$$\frac{1}{2}\left(u_{10} - \sum_{j=1}^{r} \frac{c_j}{z_j}\right)t^2 + \sum_{j=1}^{r} \frac{c_j}{z_j^3} e^{z_j t}.$$

Now, following the pattern suggested by these results, a general expression for the n-th integral of the command tail can be formulated as follows:

$$u_n(t) = \int^{(n)} u(t)dt \quad (B.22)$$

$$= \frac{1}{0!}\left(u_{n0} - \sum_{j=1}^{r} \frac{c_j}{z_j^n}\right)t^0 + \ldots$$

-continued $$\frac{1}{1!}\left(u_{(n-1)0} - \sum_{j=1}^{r} \frac{c_j}{z_j^{n-1}}\right)t^1 + \ldots$$

$$\frac{1}{2!}\left(u_{(n-2)0} - \sum_{j=1}^{r} \frac{c_j}{z_j^{n-2}}\right)t^2 + \ldots$$

$$\ldots$$

$$\frac{1}{(n-1)!}\left(u_{10} - \sum_{j=1}^{r} \frac{c_j}{z_j}\right)t^{n-1} + \ldots \sum_{j=1}^{r} \frac{c_j}{z_j^n}e^{z_jt}.$$

As indicated in Table B.2, this equation can be implemented easily into a r matrix algebra programming environment, such as Matlab, to rapidly calculate the integral of the command tail any number of times. In order to perform this integration, however, a final time for the integration must first be specified. Since the value of this final time has no influence over the amount of computation required, it can be selected to be sufficiently large enough to let the command settle to its final steady-state value.

TABLE B.2

Matlab code to calculate the integral of the command tail.

```
% Given two row vectors, one containing the tail coefficients,
% c, and one containing the values of the tail exponents, z,
% the following code can be used to evaluate the integral of
% the tail of a time-optimal or time-efficient command
% intnum times. The result of this integral over from the
% start of the tail to the final time, tf, is returned in the
% variable result. The initial conditions are specified in
% the initial condition vector ic, which should have as many
% elements as the desired number of integrations, intnum.
% The time integral of a sum of exponentials consists of a
% polynomial in 't' with as many terms as there are integrations
% plus an additional term containing a sum of exponentials.
coefs = [ ];
for ii = 0:intnum-1,
    n = intnum - ii;
    coefs = [coefs (1/fact(ii))*(ic(n) - sum(c./(z. ^ n)))];
end;
coefs = fliplr(coefs);
result = polyval(coefs,tf) + sum((c./(z. ^ intnum)).*exp(z*tf));
```

The Analytic Integral of the Entire Command

With the expressions derived in this appendix, it is possible to calculate the integral of the time-optimal or time-efficient command pulse train and tail. In order to obtain a value for the integral of the entire command, the separate expressions for the two different tail components can be combined as follows. First, using the code in Table B.1, for example, the integral of a given command pulse train can be calculated from the initial time to the final command switch time. This result can then be used as an initial condition to calculate the integral of the command tail. The value reached by this calculation will represent the value of the command integral from the start of the command to a specified final time. For multiple integrals, the code to integrate the command pulse train can be used once for every desired integral. The resulting values can be used as an initial condition vector for the integration of the command tail.

Since the equations derived in this appendix are compact and can be expressed in matrix form, they can be implemented easily as computer-executable code. Because this code is based on an analytic solution to the integral of the command profile, calculation is much faster than a standard numerical integration. Also, unlike a numerical integration, the result is exact. From this result, it is clear that the integral for any time-optimal or time-efficient command can be evaluated quickly and easily. Employing these expressions to impose the boundary condition constraint in the time-optimal control problem will similarly reveal that this approach is highly effective for deriving time-optimal and time-efficient command profiles.

What is claimed is:

1. A method of determining an input command profile for a dynamic system that can be modeled as a linear system, the input command profile for transitioning an output of the dynamic system from one state to another state, the method comprising the steps of:

identifying characteristics of the dynamic system;

selecting a command profile which defines an input to the dynamic system based on the characteristics identified in the identifying step, the command profile comprising one or more pulses which rise and fall at switch times and the command profile being useable with substantially any dynamic system that can be modeled as a linear system;

imposing a plurality of constraints on the dynamic system, at least one of the constraints being defined in terms of the switch times; and determining the switch times for the input to the dynamic system based on the command profile and the plurality of constraints.

2. A method according to claim 1, wherein the characteristics identified in the identifying step relate to poles and zeros of the dynamic system.

3. A method according to claim 1, wherein the plurality of constraints include a dynamics cancellation constraint which specifies that the input moves the dynamic system from a first state to a second state such that the dynamic system remains substantially at the second state.

4. A method according to claim 1, wherein the plurality of constraints include boundary condition constraints, the boundary condition constraints including an initial time of the input and a specified change "dy" in the output of the system.

5. A method according to claim 4, wherein the boundary condition constraints are based on the following equations:

$$t_0 = 0$$

$$dy = \lim_{s \to 0}\left(\frac{N(s)}{D(s)}\right)\left(\int^{(rbp)} u(t)dt\right)\bigg|_{t=\infty},$$

where u(t) represents the command profile, N(s) represents at least a part of a numerator of a transfer function of the system, D(s) represents at least a part of a denominator of the transfer function of the system, and "rbp" corresponds to rigid body poles in the system.

6. A method according to claim 1, wherein the plurality of constraints include an actuator limit constraint, the actuator limit constraint corresponding to limits in the system which keep the input within limits of the actuator.

7. A method according to claim 1, wherein the determining step comprises determining the switch times based on:

(i) a command profile, u(t), comprising:

$$u(t) = \sum_{j=0}^{n} a_j l(t - t_j) + \sum_{j=1}^{r} c_j e^{z_j(t-t_n)} l(t - t_n),$$

where "$a_j$" represents an amplitude of pulses in the function, "$t_j$" represents switch times for the pulses, "$c_j$" represents coefficients of exponential terms in a tail of the command profile, "$z_j$" represents zeros in the system, "n" represents a total number of switches excluding a first switch, and "r" represents a number of zeros in the system, (ii) a dynamics cancellation constraint comprising:

$$\left( \sum_{j=0}^{n} a_j t_j^{(q_i-1)} e^{-st_j} + \right.$$

$$\left. e^{-st_n} \sum_{j=1}^{r} \left[ c_j t_n^{(q_i-1)} + \sum_{k=1}^{q_i} (\beta_{q_i}(k)) \frac{c_j z_j}{(s-z_j)^k} t_n^{(q_i-k)} \right] \right) \Bigg|_{s=p_i} = 0,$$

where "$p_i$" represents system poles, "$q_i$" represents a multiplicity of each system pole "$p_i$", and where β is defined as follows:

$\beta_1(k)=1, k=1=0, k\neq 1 \beta_{q_i}(k)=\beta_{q_i-1}(k)+(k-1)\beta_{q_i-1}(k-1),$ (iii) boundary condition constraints comprising:

$t_0=0$ $$dy = \lim_{s \to 0} \left( \frac{N(s)}{D(s)} \right) \left( \int^{(rbp)} u(t) dt \right) LINESUBt = \infty,$$

where N(s) represents at least a part of a numerator of a transfer function of the system, D(s) represents at least a part of a denominator of the transfer function of the system, and "rbp" corresponds to rigid body poles in the system, and (iv) an actuator limit constraint comprising:

$u_{min} \leq u_{tail}(t) \leq u_{max},$ where $u_{min}$ represents a minimum value of the input, $u_{tail}(t)$ represents a value of a tail of the input at time "t", and $u_{max}$ represents a maximum value of the input.

8. A method according to claim 7, wherein the switch times are determined using an optimization algorithm.

9. A method according to claim 1, wherein, in a case that the identifying step identifies that the dynamic system contains poles only and no zeros, (i) the command profile comprises:

$$u(t) = \sum_{j=0}^{n} a_j l(t - t_j),$$

where "$a_j$" represents an amplitude of pulses in the command profile, "$t_j$" represents switch times for the pulses, and (ii) the plurality of constraints include only a dynamics cancellation constraint and boundary condition constraints.

10. A method according to claim 9, wherein (i) the dynamics cancellation constraint comprises:

$$\left( \sum_{j=0}^{n} a_j t_j^{(q_i-1)} e^{-st_j} \right) \Bigg|_{s=p_i} = 0,$$

where "$p_i$" represents system poles, and "$q_i$" represents a multiplicity of each system pole "$p_i$", and (ii) the boundary condition constraints comprise:

$t_0=0$ $$dy = \lim_{s \to 0} \left( \frac{N(s)}{D(s)} \right) \left( \int^{(rbp)} u(t) dt \right) \Bigg|_{t=\infty},$$

where N(s) represents at least a part of numerator of a transfer function of the system, D(s) represents at least a part of denominator of the transfer function of the system, and "rbp" corresponds to rigid body poles in the system.

11. A method according to claim 1, further comprising the step of verifying optimality of the input which includes the switch times determined in the determining step.

12. A method according to claim 11, wherein the optimality of the input which includes the switch times determined in the determining step is verified based on Pontryagin's Minimum Principle.

13. An apparatus which determines an input command profile for a dynamic system that can be monitored as a linear system, the input command profile for transitioning an output of the dynamic system from one state to another state, the apparatus comprising:

a memory which stores computer-executable process steps; and a processor which executes the process steps stored in the memory so as (i) to identify characteristics of the dynamic system, (ii) to select a command profile which defines an input to the dynamic system based on identified characteristics, the command profile comprising one or more pulses which rise and fall at switch times and the command profile being useable with substantially any dynamic system that can be modeled as a linear system, (iii) to impose a plurality of constraints on the dynamic system, at least one of the constraints being defined in terms of the switch times, and (iv) to determine the switch times for the input to the dynamic system based on the command profile and the plurality of constraints.

14. An apparatus according to claim 13, wherein the characteristics identified by the processor relate to poles and zeros of the dynamic system.

15. An apparatus according to claim 13, wherein the plurality of constraints include a dynamics cancellation constraint which specifies that the input moves the dynamic system from a first state to a second state such that the dynamic system remains substantially at rest at the second state.

16. An apparatus according to claim 15, wherein the command profile includes a tail following the one or more pulses; and wherein the dynamics cancellation constraint is based on the following equation:

$$\left( \sum_{j=0}^{n} a_j t_j^{(q_i-1)} e^{-st_j} + \right.$$

$$e^{-s_n}\sum_{j=1}^{r}\left[c_jt_n^{(q_i-1)}+\sum_{k=1}^{q_i}(\beta_{q_i}(k))\frac{c_jz_j}{(s-z_j)^k}t_n^{(q_i-k)}\right]\Bigg|_{s=p_i}=0,$$

where "$a_j$" represents an amplitude of pulses in the command profile, "$t_j$" represents switch times for the pulses, "$c_j$" represents coefficients of exponential terms in the tail, "$z_j$" represents zeros in the system, "n" represents a total number of switches excluding a first switch, "r" represents a number of zeros in the system, "$p_i$" represents system poles, "$q_i$" represents a multiplicity of each system pole "$p_i$", and where β is defined as follows:

$$\beta_1(k)=1, k=1=0, k\neq 1 \beta_{q_i}(k)=\beta_{q_i-1}(k)+(k-1)\beta_{q_i-1}(k-1).$$

17. An apparatus according to claim 13, wherein the plurality of constraints include boundary condition constraints, the boundary condition constraints including an initial time of the input and a specified change "dy" in the output of the system.

18. An apparatus according to claim 17, wherein the boundary condition constraints are based on the following equations:

$$t_0=0$$

$$dy=\lim_{s\to 0}\left(\frac{N(s)}{D(s)}\right)\left(\int^{(rbp)}u(t)dt\right)\Bigg|_{t=\infty},$$

where u(t) represents the command profile, N(s) represents at least a part of a numerator of a transfer function of the system, D(s) represents at least a part of a denominator of the transfer function of the system, and "rbp" corresponds to rigid body poles in the system.

19. An apparatus according to claim 13, wherein the plurality of constraints include an actuator limit constraint, the actuator limit constraint corresponding to limits in the system which keep the input within limits of the actuator.

20. An apparatus according to claim 13, wherein the processor determines the switch times based on:

(i) a command profile, u(t), comprising:

$$u(t)=\sum_{j=0}^{n}a_jl(t-t_j)+\sum_{j=1}^{r}c_je^{z_j(t-t_n)}l(t-t_n),$$

where "$a_j$" represents an amplitude of pulses in the function, "$t_j$" represents switch times for the pulses, "$c_j$" represents coefficients of exponential terms in a tail of the command profile, "$z_j$" represents zeros in the system, "n" represents a total number of switches excluding a first switch, and "r" represents a number of zeros in the system, (ii) a dynamics cancellation constraint comprising:

$$\left(\sum_{j=0}^{n}a_jt_j^{(q_i-1)}e^{-st_j}+e^{-st_n}\sum_{j=1}^{r}\left[c_jt_n^{(q_i-1)}+\right.\right.$$

$$\left.\left.\sum_{k=1}^{q_i}(\beta_{q_i}(k))\frac{c_jz_j}{(s-z_j)^k}t_n^{(q_i-k)}\right]\right)\Bigg|_{s=p_i}=0,$$

where "$p_i$" represents system poles, "$q_i$" represents a multiplicity of each system pole "$p_i$", and where β is defined as follows:

$$\beta_1(k)=1, k=1=0, k\neq 1 \beta_{q_i}(k)=\beta_{q_i-1}(k)+(k-1)\beta_{q_i-1}(k-1),$$

(iii) boundary condition constraints comprising:

$$t_0=0$$

$$dy=\lim_{s\to 0}\left(\frac{N(s)}{D(s)}\right)\left(\int^{(rbp)}u(t)dt\right)LINESUBt=\infty,$$

where N(s) represents at least a part of a numerator of a transfer function of the system, D(s) represents at least a part of a denominator of the transfer function of the system, and "rbp" corresponds to rigid body poles in the system, and (iv) an actuator limit constraint comprising:

$$u_{min}\leq u_{tail}(t)\leq u_{max},$$

where $u_{min}$ represents a minimum value of the input, $u_{tail}(t)$ represents a value of a tail of the input at time "t", and $u_{max}$ represents a maximum value of the input.

21. An apparatus according to claim 20, wherein the switch times are determined using an optimization algorithm.

22. An apparatus according to claim 13, wherein, in a case that the identifying step identifies that the dynamic system contains poles only and no zeros, (i) the command profile comprises:

$$u(t)=\sum_{j=0}^{n}a_jl(t-t_j),$$

where "$a_j$" represents an amplitude of pulses in the command profile, "$t_j$" represents switch times for the pulses, and (ii) the plurality of constraints include only a dynamics cancellation constraint and boundary condition constraints.

23. An apparatus according to claim 22, wherein (i) the dynamics cancellation constraint comprises:

$$\left(\sum_{j=0}^{n}a_jt_j^{(q_i-1)}e^{-st_j}\right)\Bigg|_{s=p_i}=0,$$

where "$p_i$" represents system poles, and "$q_i$" represents a multiplicity of each system pole "$p_i$", and (ii) the boundary condition constraints comprise:

$$t_0=0$$

$$dy=\lim_{s\to 0}\left(\frac{N(s)}{D(s)}\right)\left(\int^{(rbp)}u(t)dt\right)\Bigg|_{t=\infty},$$

where N(s) represents at least a part of a numerator of a transfer function of the system, D(s) represents at least a part of a denominator of the transfer function of the system, and "rbp" corresponds to rigid body poles in the system.

24. An apparatus according to claim 13, wherein the command profile further comprises, after a last one of the one or more pulses, a tail which trails off to a constant value; and wherein the plurality of constraints comprise insensitivity constraints that include a constraint which limits a length of the tail.

25. An apparatus according to claim 24, wherein the tail is defined by a function $u_{tail}(t)$ which comprises:

$$u_{tail}(t) = \sum_{j=1}^{r} c_j e^{z_j(t-tSUBn)} l(t-t_n),$$

where "$c_j$" represents coefficients of exponential terms in the tail, "$z_j$" represents zeros in the system, "n" represents a total number of switches excluding a first switch, and "r" represents a number of zeros in the system; and wherein the length of the tail is limited by limiting values of coefficients "$c_j$".

26. An apparatus according to claim 25, wherein the values of the coefficients "$c_j$" are limited by:

$$\sum_{j=1}^{r} c_j e^{\zeta_i \omega_{nj} t_r} \leq X u_{\lim},$$

where "$u_{1im}$" defines an actuator limit, "X" defines a percentage relative to limit $u_{1im}$ within which the tail settles, and $\zeta_i \omega_{nj}$ define a real component of zeros "z" within the system.

27. An apparatus according to claim 13, further comprising the step of verifying optimality of the input which includes the switch times determined by the processor.

28. An apparatus according to claim 27, wherein the optimality of the input which includes the switch times determined in the determining step is verified based on Pontryagin's Minimum Principle.

* * * * *